US012123556B2

(12) United States Patent
Wu et al.

(10) Patent No.: US 12,123,556 B2
(45) Date of Patent: Oct. 22, 2024

(54) LED TUBE LAMP

(71) Applicant: JIAXING SUPER LIGHTING ELECTRIC APPLIANCE CO., LTD, Jiaxing (CN)

(72) Inventors: Haitao Wu, Jiaxing (CN); Aiming Xiong, Jiaxing (CN); Junren Chen, Jiaxing (CN); Haibo You, Jiaxing (CN); Yueqiang Zhang, Jiaxing (CN); Guangdong Wang, Jiaxing (CN); Yingxu Liu, Jiaxing (CN); Dongmei Zhang, Jiaxing (CN); Mingbin Wang, Jiaxing (CN)

(73) Assignee: JIAXING SUPER LIGHTING ELECTRIC APPLIANCE CO., LTD, Jiaxing (CN)

( * ) Notice: Subject to any disclaimer, the term of this patent is extended or adjusted under 35 U.S.C. 154(b) by 0 days.

(21) Appl. No.: 18/243,112

(22) Filed: Sep. 7, 2023

(65) Prior Publication Data

US 2023/0417375 A1 Dec. 28, 2023

Related U.S. Application Data

(63) Continuation of application No. 18/021,806, filed as application No. PCT/CN2022/072037 on Jan. 14, 2022.

(30) Foreign Application Priority Data

Jan. 27, 2021 (CN) ......................... 202110110435.1
Jan. 29, 2021 (CN) ......................... 202110126332.4
(Continued)

(51) Int. Cl.
*F21K 9/278* (2016.01)
*F21K 9/235* (2016.01)
(Continued)

(52) U.S. Cl.
CPC .............. *F21K 9/278* (2016.08); *F21K 9/235* (2016.08); *F21K 9/272* (2016.08); *F21Y 2103/10* (2016.08); *F21Y 2115/10* (2016.08)

(58) Field of Classification Search
CPC ........... F21K 9/272; F21K 9/278; F21K 9/235
See application file for complete search history.

(56) References Cited

U.S. PATENT DOCUMENTS 5,616,990 A 4/1997 Garbowicz et al.
6,365,841 B1 4/2002 Takigami
(Continued)

FOREIGN PATENT DOCUMENTS

CN 2802892 Y 8/2006
CN 201656796 U 11/2010
(Continued)

OTHER PUBLICATIONS

Petition for Inter Partes Review Under 35 U.S.C. § 312; Case No. IPR2023-00269; U.S. Pat. No. 10,560,989.
(Continued)

*Primary Examiner* — Evan P Dzierzynski
*Assistant Examiner* — Nathaniel J Lee
(74) *Attorney, Agent, or Firm* — Simon Kuang Lu

(57) ABSTRACT

The fixing structure includes a first structure part and a second structure part. The first structure part is capable of sleeving over an end of the LED tube lamp and engages with the second structure part. The first structure part includes: a receiving opening capable of being inserted by the end of the LED tube lamp; a position through hole penetrating a back wall of the receiving opening, an area of the position through hole on the back wall being smaller than an area of the bottom wall of the receiving opening, the position through hole capable of engaging with a position part on the end of the LED tube lamp; at least two pins disposed on an outer
(Continued)

surface of the back wall; and two convex walls disposed on two opposite outer surfaces of the first structure part. Each of the convex wall forms a coupling structure with the first structure part. The second structure part includes a first wall, a second wall, a third wall and a fourth wall. The third wall has a first side, second side, third side and fourth side. The first side is parallel with the third side and the second side is parallel with the fourth side. The first wall connects to the first side of the third wall and is substantially perpendicular with the third wall. The second wall connects to the third side of the third wall and is substantially parallel with the first wall. The fourth wall connects to the second side and is substantially perpendicular with the third wall.

16 Claims, 63 Drawing Sheets

(30) Foreign Application Priority Data

| | | |
|---|---|---|
| Apr. 30, 2021 | (CN) | 202110484706.X |
| May 21, 2021 | (CN) | 202110554827.7 |
| May 21, 2021 | (CN) | 202110554855.9 |
| May 28, 2021 | (CN) | 202110589529.1 |
| May 31, 2021 | (CN) | 202110600036.3 |
| Jul. 20, 2021 | (CN) | 202110819521.X |
| Jul. 30, 2021 | (CN) | 202110868289.9 |
| Aug. 16, 2021 | (CN) | 202110938329.2 |
| Aug. 16, 2021 | (CN) | 202110938366.3 |
| Sep. 3, 2021 | (CN) | 202111030351.3 |
| Sep. 29, 2021 | (CN) | 202111153409.3 |
| Sep. 30, 2021 | (CN) | 202111159516.7 |
| Nov. 16, 2021 | (CN) | 202111351446.5 |
| Nov. 26, 2021 | (CN) | 202111419003.5 |
| Dec. 16, 2021 | (CN) | 202111543282.6 |
| Dec. 28, 2021 | (CN) | 202111626356.2 |

(51) Int. Cl.

| | |
|---|---|
| ***F21K 9/272*** | (2016.01) |
| *F21Y 103/10* | (2016.01) |
| *F21Y 115/10* | (2016.01) |

(56) References Cited

U.S. PATENT DOCUMENTS

| | | | | |
|---|---|---|---|---|
| 6,703,795 | B2 | 3/2004 | Johnson | |
| 6,846,094 | B2 | 1/2005 | Luk | |
| 7,114,830 | B2 | 10/2006 | Robertson et al. | |
| 7,256,505 | B2 | 8/2007 | Arms et al. | |
| 7,557,521 | B2 | 7/2009 | Lys | |
| 7,966,075 | B2 | 6/2011 | Johnson et al. | |
| 8,007,286 | B1 | 8/2011 | Holec et al. | |
| 8,134,297 | B2 | 3/2012 | Busse et al. | |
| 8,247,999 | B2 | 8/2012 | Chen et al. | |
| 8,330,381 | B2 | 12/2012 | Langovsky | |
| 8,381,299 | B2 | 2/2013 | Burdalski et al. | |
| 8,441,824 | B2 | 5/2013 | Eberbaum | |
| 8,461,602 | B2 | 6/2013 | Lerman et al. | |
| 8,558,255 | B2 | 10/2013 | Bisberg | |
| 8,591,057 | B2 | 11/2013 | KaWabata et al. | |
| 8,779,679 | B2 | 7/2014 | Miyamichi | |
| 8,792,253 | B2 | 7/2014 | Wang et al. | |
| 8,833,965 | B2 | 9/2014 | Shimasaki et al. | |
| 8,841,897 | B2 | 9/2014 | Williams et al. | |
| 8,872,437 | B2 | 10/2014 | Esaki et al. | |
| 8,888,976 | B2 | 11/2014 | Zhang et al. | |
| 9,066,403 | B2 | 6/2015 | Neser et al. | |
| 9,148,922 | B2 | 9/2015 | Shteynberg et al. | |
| 9,151,475 | B2 | 10/2015 | Huang et al. | |
| 9,206,970 | B2 | 12/2015 | Halliwell et al. | |
| 9,237,610 | B2 | 1/2016 | Neser et al. | |
| 9,271,354 | B2 | 2/2016 | Takahashi et al. | |
| 9,328,874 | B2 | 5/2016 | Demuynck et al. | |
| 9,338,853 | B2 | 5/2016 | Guang | |
| 9,726,330 | B2 | 8/2017 | Wilcox et al. | |
| 9,970,640 | B2 | 5/2018 | Zhao | |
| 10,045,406 | B2 | 8/2018 | Zhang | |
| 10,104,723 | B2 | 10/2018 | Zhang | |
| 2006/0126325 | A1* | 6/2006 | Lefebvre | F21K 9/65<br>362/217.05 |
| 2010/0265732 | A1 | 10/2010 | Liu | |
| 2012/0038289 | A1 | 2/2012 | Jee et al. | |
| 2012/0147564 | A1 | 6/2012 | Russell et al. | |
| 2012/0206433 | A1 | 8/2012 | Suzuki et al. | |
| 2012/0256551 | A1 | 10/2012 | Kim et al. | |
| 2012/0300501 | A1 | 11/2012 | Kojima et al. | |
| 2013/0076255 | A1 | 3/2013 | Kang et al. | |
| 2013/0234620 | A1 | 9/2013 | Wang et al. | |
| 2014/0009076 | A1 | 1/2014 | Tsuda | |
| 2014/0084701 | A1 | 3/2014 | Bae | |
| 2014/0218908 | A1 | 8/2014 | Kawashima et al. | |
| 2014/0312802 | A1 | 10/2014 | Recker et al. | |
| 2015/0173138 | A1 | 6/2015 | Roberts | |
| 2016/0174307 | A1 | 6/2016 | Tao | |
| 2016/0290606 | A1* | 10/2016 | Honold | F21V 15/015 |
| 2016/0345394 | A1 | 11/2016 | Warren et al. | |

FOREIGN PATENT DOCUMENTS

| | | | |
|---|---|---|---|
| CN | 203036295 | U | 7/2013 |
| CN | 103428948 | A | 12/2013 |
| CN | 103899939 | A | 7/2014 |
| CN | 203797412 | U | 8/2014 |
| CN | 106015996 | A | 10/2016 |
| CN | 209688551 | U | 11/2019 |
| CN | 111801989 | A | 10/2020 |
| CN | 211955768 | U | 11/2020 |
| CN | 211959612 | U | 11/2020 |
| JP | 2014103000 | A | 6/2014 |
| WO | 20130152485 | A1 | 10/2013 |
| WO | 20140115010 | A1 | 7/2014 |

OTHER PUBLICATIONS

Petition for Inter Partes Review Under 35 U.S.C. § 312; Case No. IPR2023-00269; U.S. Pat. No. 10,560,989; Declaration of Donald E. Ackley, Ph.D.

Petition for Inter Partes Review Under 35 U.S.C. § 312; Case No. IPR2023-00269; U.S. Pat. No. 10,560,989; Professional Experience of Donald E. Ackley, Ph.D.

Petition for Inter Partes Review Under 35 U.S.C. § 312; Case No. IPR2023-00271; U.S. Pat. No. 10,295,125.

Petition for Inter Partes Review Under 35 U.S.C. § 312; Case No. IPR2023-00271; U.S. Pat. No. 10,295,125; Declaration of R. Jacob Baker, Ph.D., P.E.

Petition for Inter Partes Review Under 35 U.S.C. § 312; Case No. IPR2023-00271; U.S. Pat. No. 10,295,125; Professional Experience of R. Jacob Baker, Ph.D., P.E.

Petition for Inter Partes Review Under 35 U.S.C. § 312; Case No. IPR2023-00272; U.S. Pat. No. 10,830,397.

Petition for Inter Partes Review Under 35 U.S.C. § 312; Inter Partes Review No. IPR2023-00984; U.S. Pat. No. No. 9,841,174; Declaration of Michael Lebby, Ph.D.

Petition for Inter Partes Review Under 35 U.S.C. § 312; Inter Partes Review No. IPR2023-00984; U.S. Pat. No. 9,841,174; Professional Experience of Michael Lebby, Ph.D.

Petition for Inter Partes Review Under 35 U.S.C. § 312; Case No. IPR2023_00270; U.S. Pat. No. 9,723,662.

Petition for Inter Partes Review Under 35 U.S.C. § 312; Case No. IPR2023_00270; U.S. Pat. No. 9,723,662 Declaration Of Dr. R. Jacob Baker.

Petition for Inter Partes Review of U.S. Pat. No. 9,723,662 Under 35 U.S.C. §§ 311-319 and 37 C.F.R. §§ 42.1-.80, 42.100-.123.

(56) References Cited

OTHER PUBLICATIONS

Decision; Denying Institution of Inter Partes Review under 35 U.S.C. § 314; Case No. IPR2020-00181; U.S. Pat. No. 9,723,662 B2.
Report of Dr. D'Andrade Regarding Infringement of U.S. Pat. Nos. 9,689,536; 9,723,662; 9,841,174 and 9,897,265.
How Resistor Works—A Primer on Resistance in Electronics; Mar. 3, 2023.
Defendant Current Lighting Solutions, LLC d/b/a GE Current's Preliminary Invalidity Contentions; Dec. 22, 2022.
Inter Partes Review No. IPR2023-00675; U.S. Pat. No. 10,897,801; Declaration of Donald E. Ackley, Ph.D.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00269, U.S. Pat. No. 10,560,989, Dec. 14, 2022.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00269, U.S. Pat. No. 10,560,989, Dec. 14, 2022; Expert Ackley Declaration.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00269, U.S. Pat. No. 10,560,989, Dec. 14, 2022; Ackley CV.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00271, U.S. Pat. No. 10,295,125, Dec. 14, 2022.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00271, U.S. Pat. No. 10,295,125, Baker Declaration.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00271, U.S. Pat. No. 10,295,125, CV of Jacob Baker.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00272, U.S. Pat. No. 10,830,397, Dec. 14, 2022.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00272, U.S. Pat. No. 10,830,397, Lebby Declaration.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00272, U.S. Pat. No. 10,830,397, Lebby's CV.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00270, U.S. Pat. No. 9,723,662, Dec. 19, 2022.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00270, U.S. Pat. No. 9,723,662, Baker Declaration.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00270, U.S. Pat. No. 9,723,662, EX1007; IPR2020_00181, Pr_1.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00270, U.S. Pat. No. 9,723,662, EX1008; IPR2020_00181, Pr_7.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00270, U.S. Pat. No. 9,723,662, EX1013; Dr. D'Andrade Infringement Report.
*Current Lighting Solutions, LLC* d/b/a *GE Current,* Petitioner, v. *Jiaxing Super Lighting Electric Appliance Co., LTD,* Patent Owner, Petition Under 35 USC §312, Inter Partes Review No. IPR2023-00270, U.S. Pat. No. 9,723,662; How_resistors_work.
Dec. 22, 2022 Current Lighting Preliminary Invalidity Contentions.
IPR2023-00675 Declaration of Donald Ackley.
How resistors work.

* cited by examiner

LED TUBE LAMP

CROSS-REFERENCE TO RELATED APPLICATIONS

This application is a continuation application of U.S. Ser. No. 18/021,806 filed on Feb. 17, 2023, which is a U.S. National Stage application under 35 USC 371 of PCT/CN2022/072037 filed on Jan. 14, 2022, which claims priority to the following Chinese Patent Applications No. CN202110110435.1 filed on 2021 Jan. 27, CN202110126332.4 filed on 2021 Jan. 29, CN202110484706.X filed on 2021 Apr. 30, CN202110554827.7 filed on 2021 May 21, CN202110554855.9 filed on 2021 May 21, CN202110589529.1 filed on 2021 May 28, CN202110600036.3 filed on 2021 May 31, CN202110819521.X filed on 2021 Jul. 20, CN202110868289.9 filed on 2021 Jul. 30, CN202110938366.3 filed on 2021 Aug. 16, CN202110938329.2 filed on 2021 Aug. 16, CN202111030351.3 filed on 2021 Sep. 3, CN202111153409.3 filed on 2021 Sep. 29, CN202111159516.7 filed on 2021 Sep. 30, CN202111351446.5 filed on 2021 Nov. 16, CN202111419003.5 filed on 2021 Nov. 26, CN202111543282.6 filed on 2021 Dec. 16, CN202111626356.2 filed on 2021 Dec. 28; the disclosures of which are incorporated herein in their entirety by reference.

TECHNICAL FIELD

The present application relates to the technical field of lighting apparatus and specifically relates to an LED lamp.

RELATED ART

Due to the rapid development of LED lighting technology, it has gradually replaced the traditional incandescent lamps and fluorescent lamps. In contrast to fluorescent lamps filled with inert gases and mercury, LED lamps do not need to be filled with mercury. Therefore, in a variety of lighting systems for homes and workplaces that are dominated by lighting options such as traditional fluorescent bulbs and tubes, LED lamps are becoming a highly anticipated lighting option. The advantages of LED lighting include improved durability and life and lower energy consumption. Therefore, LED lighting will be a cost-effective lighting option.

It is known that the LED straight tube lamp generally includes a lamp tube, a circuit board arranged in a lamp tube with a light source, and a lamp cap arranged at both ends of the lamp tube. The lamp cap is provided with a power supply, and the electric connection between the light source and the power supply is made through a circuit board. In practical applications, power supplying from a line power (or Utility Power) may encounter conditions of e.g., power outage or unstable power supplying, which may make an LED tube lamp not able to normally provide power to its LED module, therefore resulting in unstable power supplying to the LED tube lamp.

Besides, for applying to different occasions of usage, LED lamps have been designed to be models for different specifications of color temperature, to satisfy the needs of different customers. However, producers do not specifically know which specifications of color temperature are more needed in lamp markets, so they each usually produce the same quantity of lamps for each specification of color temperature for sale on the market. Such a situation may cause more waste of resource and be adverse to sustainable development of their environment. In addition, if terminal customers are not satisfied with effects produced by actually installed lamps and thus intend to replace with lamps of a different color temperature, then an entire replacement may be needed with large replacement costs. When an LED tube lamp has both functions of providing normal lighting and providing emergency lighting, the LED tube lamp needs to perform different operations according to a state of an external power signal and a state of an external switch, such as the operations respectively of being turned on to emit light, being turned off to not emit light, and entering into an emergency lighting mode. In such a case, a judging mechanism is needed to determine an operation state of the LED tube lamp according to a state of an external power signal and a state of an external switch, and to guarantee convenience in installing the LED tube lamp without the need to worry about the issue of installing.

When it's needed to judge an external power signal, this may involve determining whether to activate an emergency lighting mode by judging whether a line power signal is provided/present or not. Generally, a power-supply detection circuit employs voltage division to obtain a division voltage signal for judging whether a line power signal is provided/present or not, but when an external power signal has a broad voltage to cause a division voltage signal to also have a broad voltage which may exceed the operating voltage rating of logic circuits. Accordingly, if a voltage-regulating device is used to address this broad-voltage issue, power consumption by relevant circuits is significantly increased.

An LED emergency lamp has at least three lighting modes, including being turned on to emit light, being turned off to not emit light, and being activated to provide emergency lighting. In general, a driving circuit thereof needs to be disabled under an ordinary turned-off state of the LED emergency lamp. When an external power signal is no longer or not provided, the mode of emergency lighting is activated. During turning off of the LED emergency lamp, generally, the way of using a high voltage level to pull low a power-supply pin of a control chip of a driving circuit in the LED emergency lamp is adopted in current technologies, which way may cause flickering during turning on of the LED emergency lamp and increase power consumption for a main controller being not able to enter into a hibernate mode under a turned-off state of the LED emergency lamp.

If a power loop for conducting line power and a power loop for emergency lighting are not isolated from each other in an LED emergency lamp, crosstalk disturbance/interference will occur and may cause abnormal operation(s). Generally, an isolation-type power supply structure is adopted, but such types of circuit structure are more complicated, occupy more space, and are costly.

To provide power to different types of loads, generally, circuits which need to perform electric power conversion each convert AC power from a power grid or AC/DC power from other power source into electric energy for different loads. But current electric power conversion circuits can perform power conversion only unidirectionally from its input to its output, which requires disposing two electric power conversion circuits to perform power conversion in the occasions where bilateral providing of power is needed, therefore significantly increasing the circuit complexity and cost and making it more difficult to perform circuit integration, and layout on a PCB.

In practical applications, power supplying from a line power (or Utility Power) may encounter conditions of power outage or unstable power supplying, which may make an LED tube lamp not able to normally provide power to its LED module. In such a case, disposing an additional auxiliary power source is needed to provide power to an LED module in an LED tube lamp. That is, when power supplying from a line power is normal, the auxiliary power source needs to store electric energy, but when power supplying from a line power is abnormal, the auxiliary power source should discharge electricity, which operations cause the need to dispose a bidirectional-power-conversion circuit, which increases the difficulty and cost in the layout of a power module in the LED tube lamp.

When an auxiliary power source is providing power to an LED module, voltage-boosting conversion is often needed to satisfy a power-supply requirement for the LED module. When an output voltage from an energy-storage unit in the auxiliary power source is as low as for example in the range of 3.7-4.2V for a single-section lithium-ion battery as the energy-storage unit, ordinary voltage-boosting types of power conversion circuit cannot satisfy power-supply needs for an LED module, resulting in a need for a new type of voltage-boosting power conversion circuit.

Since the length of a power module of an emergency lamp in current or existing technologies is relatively long, if such a power module of the emergency lamp is disposed in an ordinary LED tube lamp (including a plastic-or-glass lamp tube), when the power module is disposed in an end cap, a significant part of the length of the power module will stretch into the lamp tube, which situation will block or reduce the effective length of the lamp tube in permitting the passage of light. Therefore, an emergency lamp in current or existing technologies usually adopts an aluminum-plastic lamp tube comprising a plastic translucent cover and a base of aluminum, wherein a containing room is disposed in the aluminum base in order to dispose a power module in the containing room in the aluminum base. Such an emergency tube lamp has the following drawbacks: higher production cost and inconvenience during installation and assembling; and since an aluminum base occupies space in a transverse direction crossing the lamp tube, translucent effects of the lamp tube are compromised and thus disposing of translucent lens is often needed.

Since emergency lighting function is added in an emergency tube lamp in current or existing technologies, the number of electronic components, and of heat-producing components, is correspondingly increased in the emergency tube lamp, so heat dissipation for a power module in such an emergency tube lamp may be an issue, which may impact the usage life of the overall emergency tube lamp. An LED tube lamp was disclosed in CN206409923U (Chinese patent, issued on Aug. 15, 2017), which includes a lamp tube, end caps, a power module, and an LED light strip, wherein the power module is disposed in the end cap(s), which include at least one hole for heat dissipation. However, the power module in the disclosed LED tube lamp does not have an emergency lighting function, so the number of its electronic components is smaller and heat generated by the operating power module may be not much, resulting in no need to consider blocking by the power module of a convection path (as through the at least one hole). In other words, the disclosed LED tube lamp does not have a design for preventing a power module from blocking a convection path (as through the at least one hole), so when its power module has a more complicated structure and needs more electronic components, the relationship between the power module and the heat-dissipation hole of the disclosed LED tube lamp may not satisfy heat-dissipation needs.

In light of the issues mentioned above, the present invention and its embodiments are disclosed as follows.

SUMMARY

A number of embodiments of this application are described in this summary. However, the term "this application" is used only to describe certain embodiments disclosed in this specification (whether already included in the claim) and is not a complete description of all possible embodiments. Certain embodiments of each of the features or aspects described below as "this application" may be combined in different ways to form an LED straight light or part thereof.

This application presents a fixing structure, having the feature that the fixing structure includes a first structure part and a second structure part. The first structure part is capable of sleeving over an end of the LED tube lamp and engages with the second structure part. The first structure part includes a receiving opening capable of being inserted by the end of the LED tube lamp, the receiving opening including a back wall capable of backing against the end of the LED tube lamp; a position through hole penetrating the back wall of the receiving opening, an area of the position through hole on the back wall being smaller than an area of the bottom wall of the receiving opening, the position through hole capable of engaging with a position part on the end of the LED tube lamp; at least two pins disposed on an outer surface of the back wall, each of the at least two pins being substantially parallel with the central axis of the receiving opening, the two pins capable of fixing to the lamp base, and two convex walls disposed on two opposite outer surfaces of the first structure part, each of the convex wall forming a coupling structure with the first structure part. The second structure part is capable of connecting to the first structure part. The second structure part includes a first wall, a second wall, a third wall and a fourth wall. The third wall has a first side, second side, third side and fourth side. The first side is parallel with the third side and the second side is parallel with the fourth side. The first wall connects to the first side of the third wall and is substantially perpendicular with the third wall. The second wall connects to the third side of the third wall and is substantially parallel with the first wall. The fourth wall connects to the second side and is substantially perpendicular with the third wall. Wherein the first wall and the second wall respectively insert into the two opposite coupling structures when the second structure part engages with the first structure part.

In one embodiment according to this invention, each of the first wall and the second wall of the second structure part includes a first position unit at an end thereof, each of the convex wall includes a second position unit, the first position unit and the second position unit cooperate with each other when the second structure part engages with the first structure part.

In one embodiment according to this invention, the first positioning unit includes a wedging hole and the second positioning unit includes a wedge cooperating with the wedging hole when the second structure part engages with the first structure part.

In one embodiment according to this invention, the second structure part includes a backstop disposed on an inner surface of the third wall, the backstop capable of engaging with an insertion path of the lamp base.

In one embodiment according to this invention, the first structure part includes a first engaging structural part disposing on an outer surface of the first structure part, the second structure part includes a second engaging structural part disposed on the third wall, wherein the first engaging structural part capable of engaging with the second engaging structural part when the second structure part engages with the first structure part.

In one embodiment according to this invention, the first engaging structural part comprises a hook and the second engaging structural part comprises a catching hole.

This application further presents an LED tube lamp, having the feature that the LED tube lamp includes a lamp tube; a light strip is disposed in the lamp tube; a first end cap and a second end cap, each of the first and second end caps is coupled to a respective end of the lamp tube, the second end cap includes a position part disposed on an end wall of the second end cap; a power module disposes in one or both of the first and second end caps and electrically connects to the light strip; a fixing structure is suitable for fixing an LED tube lamp to a lamp base. The fixing structure comprises a first structure part sleeving over the second end cap and a second structure part connecting to the first structure part. The first structure part includes: a receiving opening having a central axis, the second end cap inserted into the receiving opening, the receiving opening including a back wall backing against the second end cap; a position through hole penetrating the bottom wall of the receiving opening, an area of the position through hole on the back wall being smaller than an area of the back wall of the receiving opening, the position through hole engaging with the position part of the second end cap; at least two pins disposed on an outer surface of the back wall, each of the at least two pins being substantially parallel with the central axis of the receiving opening, the two pins capable of fixing to the lamp base; and two convex walls disposed on two opposite outer surfaces of the first structure, each of the convex wall forming a coupling structure with the first structure part. The second structure part includes a first wall, a second wall, a third wall and a fourth wall. The third wall has a first side, second side, third side and fourth side. The first side is parallel with the third side and the second side is parallel with the fourth side. The first wall connects to the first side of the third wall and is substantially perpendicular with the third wall. The second wall connects to the third side of the third wall and is substantially parallel with the first wall. The fourth wall connects to the second side and is substantially perpendicular with the third wall. Wherein the first wall and the second wall respectively insert into the two opposite coupling structures when the second structure part engages with the first structure part.

In one embodiment according to this invention, each of the first wall and the second wall of the second structure part includes a first position unit at an end thereof, each of the convex wall includes a second position unit, the first position unit and the second position unit cooperate with each other when the second structure part engages with the first structure part.

In one embodiment according to this invention, the first positioning unit includes a wedging hole and the second positioning unit includes a wedge cooperating with the wedging hole when the second structure part engages with the first structure part.

In one embodiment according to this invention, the second structure part includes a backstop disposed on an inner surface of the third wall, the backstop capable of engaging with an insertion path of the lamp base.

In one embodiment according to this invention, the first structure part includes a first engaging structural part disposing on an outer surface of the first structure part, the second structure part includes a second engaging structural part disposed on the third wall, wherein the first engaging structural part capable of engaging with the second engaging structural part when the second structure part engages with the first structure part.

In one embodiment according to this invention, the first engaging structural part comprises a hook and the second engaging structural part comprises a catching hole.

In one embodiment according to this invention, the second end cap includes a positioning part disposed on an end wall of the second end cap, the positioning part engaged with the position through hole by sleeving the first structure part with the second end cap.

In one embodiment according to this invention, the positioning part includes a plurality of arms evenly distributed around an axis of the second end cap, wherein an end of each of the arms includes a guiding part and a checking part, the guiding part guides the positioning part to penetrate the positioning through hole and the checking part cooperates with the back wall of the first structure part.

In one embodiment according to this invention, the first end cap includes a hole, the power module includes a conductive wire. The conductive wire passes out through the hole of the first end cap to be connected to an external power source.

In one embodiment according to this invention, when the LED tube lamp fixes to the lamp base, the two pins on the outer surface of the back wall connect to the lamp base, the backstop on the second structure part engages with an insertion path of the lamp base and the lamp base be disposed between the back wall of the first structure part and the fourth wall of the second structure part.

DETAILED DESCRIPTION

This application provides a new LED tube lamp to solve the problems mentioned in the background technology as well as the above problems. In order to make the above purposes, features and advantages of this application more obvious and easier to understand, the specific embodiments of this application are explained in detail in the context of the attached drawings. The following statements of the embodiments of this application are for illustrative purposes only and are not meant to be the entire embodiments of this application or to restrict this application to specific embodiments. In addition, the same component number can be used to represent the same, corresponding, or similar components, and is not limited to representing the same components.

In addition, it should be noted that in order to clarify the characteristics of each invention disclosed in this paper, the embodiment is divided into multiple embodiments, and each embodiment is described as follows. It does not mean that the embodiments can only be carried out separately. The technician familiar with the field can design the feasible embodiments together according to the requirements, or the interchangeable components/modules from different embodiments can be interchangeable according to the design requirements. In other words, the embodiments shown in this application are not limited to those described in the following embodiments, but also include, where feasible, substitutions and permutations between embodiments/components/modules, which are first described here.

Although the applicant has proposed in previous applications, such as CN105465640U, the improvement method of using flexible circuit boards to achieve the reduction of leakage accidents, some embodiments can be combined with the circuit method of this application, which will have a more significant effect.

Referring to FIGS. 1A to 1I, an LED tube lamp is provided in some embodiments, which includes a lamp tube 1*a*, a light strip 2*a*, end caps 3*a*, and a power module 5*a*. The light strip 2*a* is disposed in the lamp tube 1*a*; light source(s) 202*a* are disposed on the light strip 2*a*; and there are two end caps 3*a* respectively disposed at two opposite ends of the lamp tube 1*a*. The lamp tube 1*a* may be made of plastic or glass. Sizes respectively of the two end caps 3*a* may be the same or different, wherein the size of each end cap 3*a* herein refers to its length along a longitudinal direction of the lamp tube 1*a*. In these embodiments, light source(s) 202*a* include LED(s). The LED tube lamp in these embodiments may be a T8 emergency tube lamp, which includes an emergency battery configured to provide electric power, when an external power source is disconnected or cut off, to cause or continue lighting of the LED tube lamp.

Figure 1A:
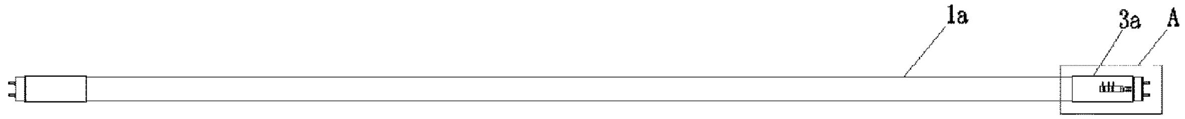
FIG. 1A is an overall view of an LED tube lamp according to some embodiments.
Figure 1B:
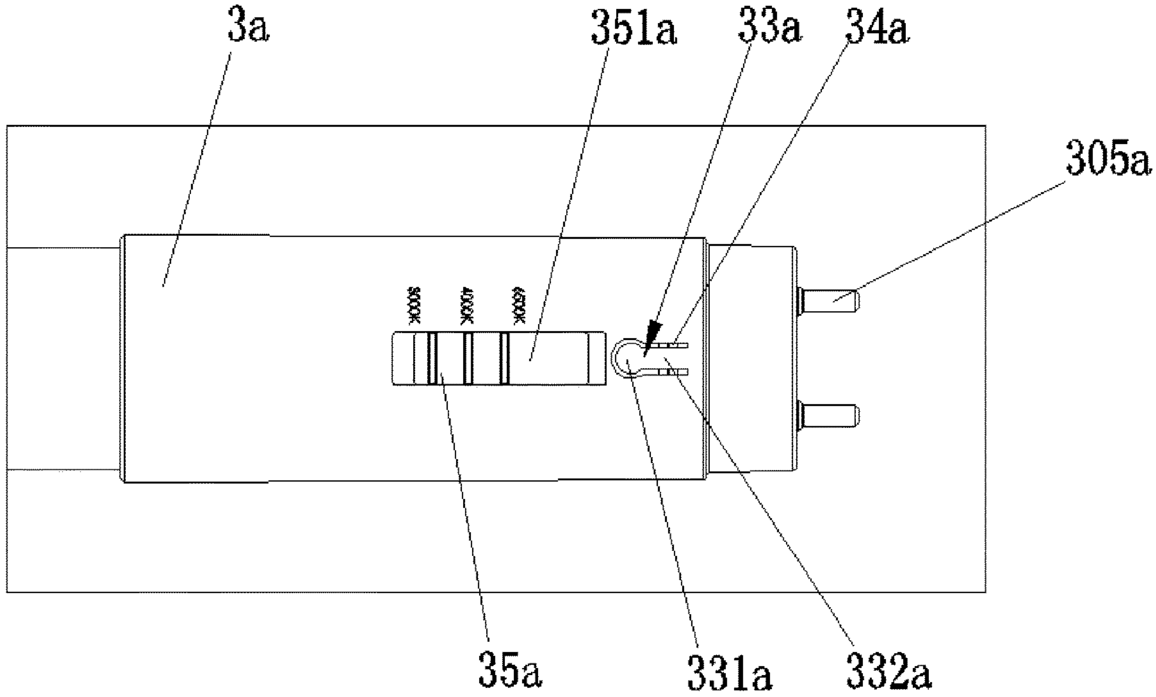
FIG. 1B is an enlargement view of the enclosed portion A of the LED tube lamp of FIG. 1A.
Figure 1C:
FIG. 1C is a diagram of a cross-sectional view of an LED tube lamp according to some embodiments.
Figure 1D:
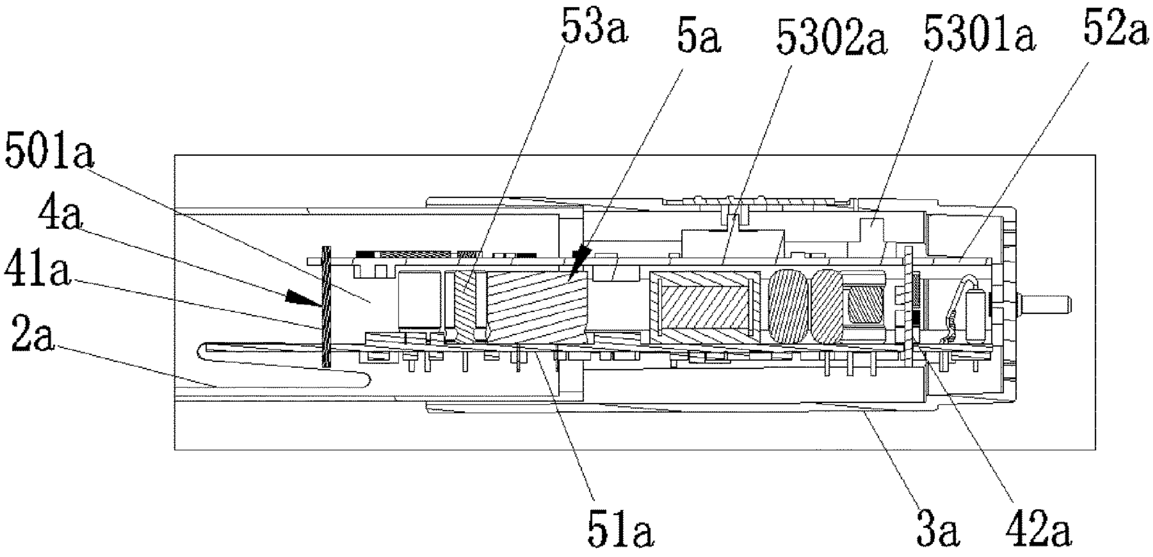
FIG. 1D is an enlargement view of the enclosed portion B of the LED tube lamp of FIG. 1C.
Figure 1E:
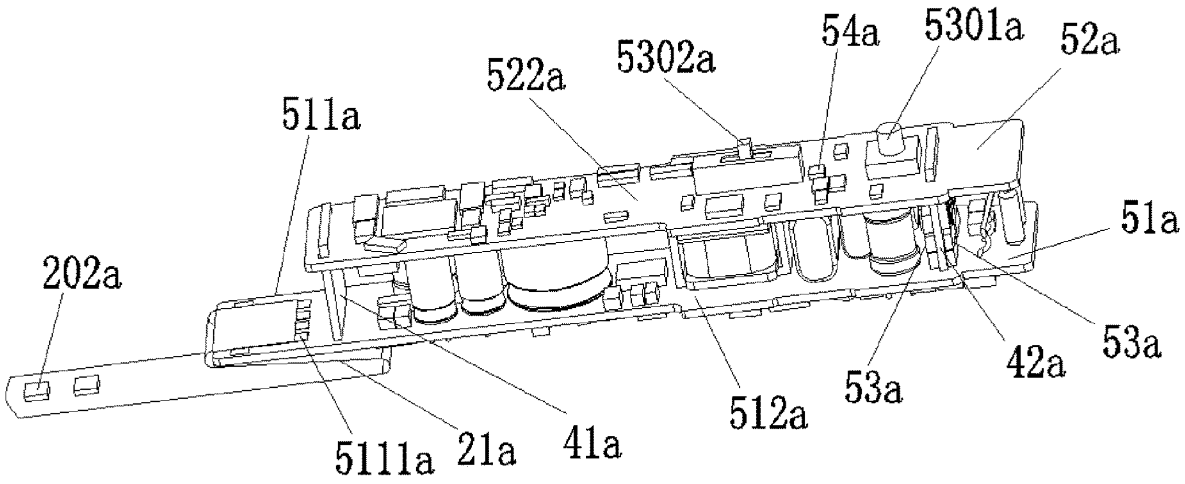
FIG. 1E is a diagram of a partial three-dimensional structure of a power module fitted to a light strip.
Figure 1F:
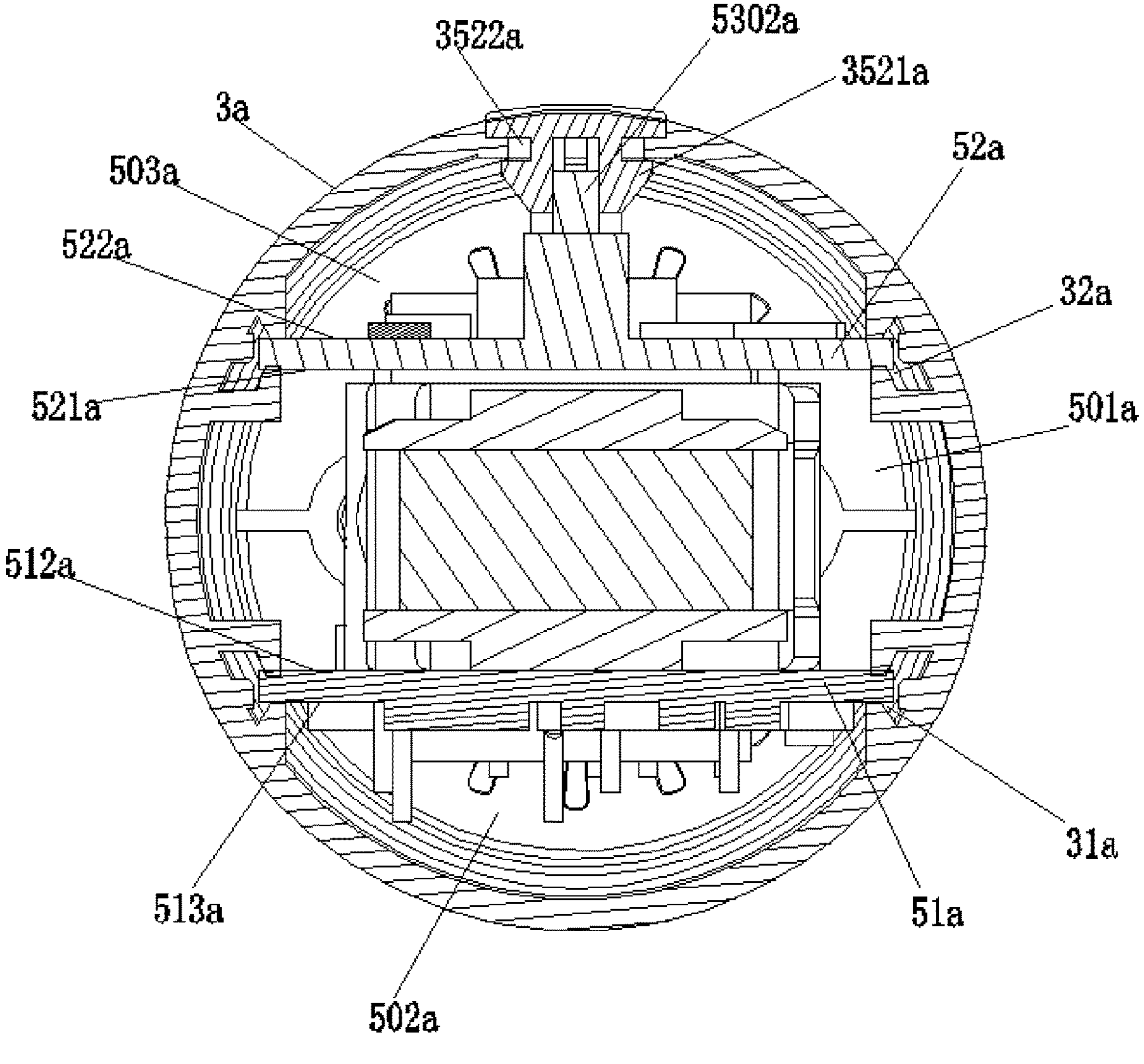
FIG. 1F is another diagram of a cross-sectional view of an LED tube lamp according to some embodiments.
Figure 1G:
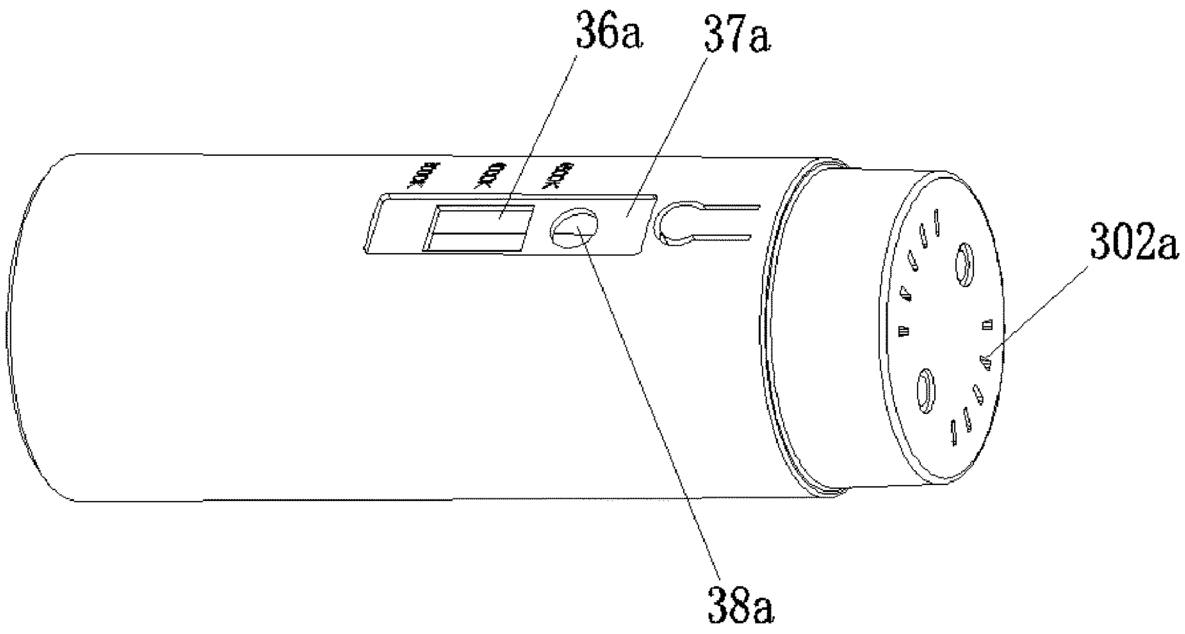
FIG. 1G is a diagram of a three-dimensional structure of an end cap according to some embodiments.
Figure 1H:
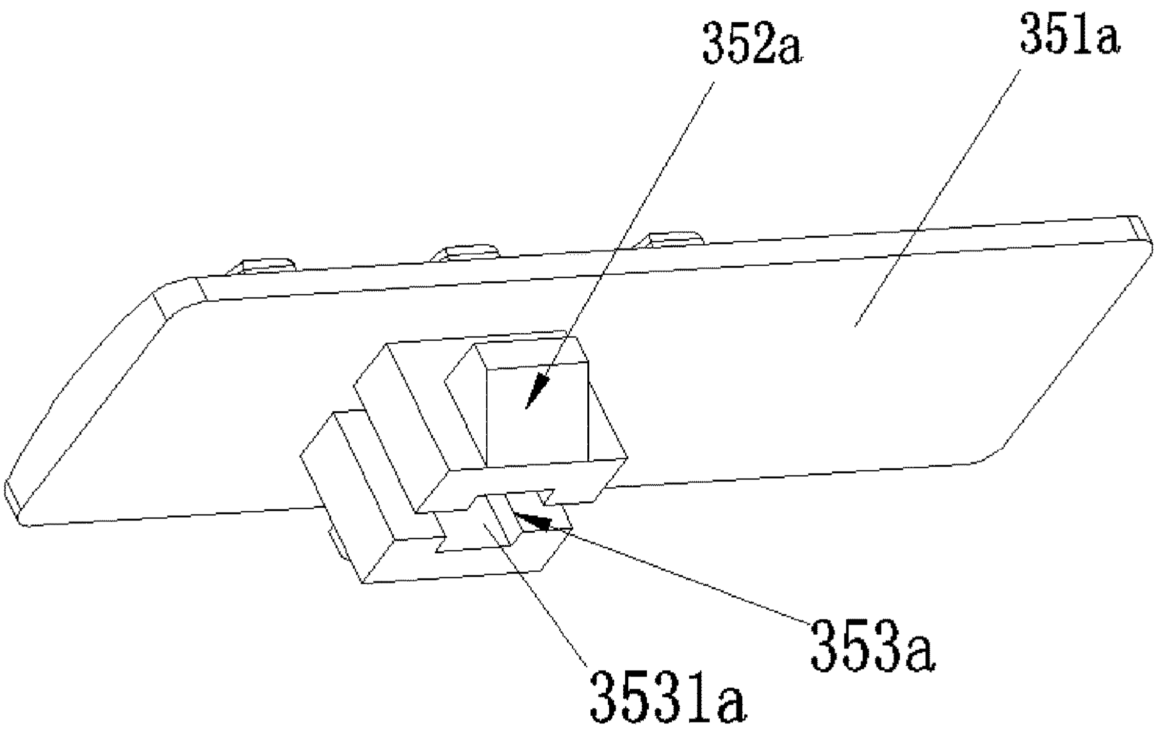
FIG. 1H is a diagram of a three-dimensional structure of a sliding button.
Figure 1I:
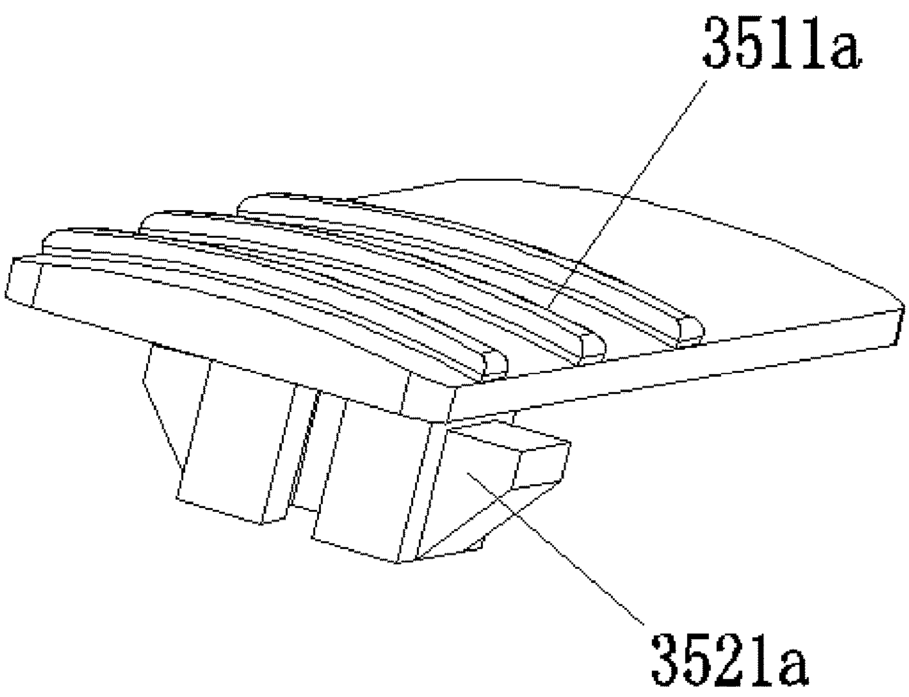
FIG. 1I is another diagram of a three-dimensional structure of a sliding button.
Figure 1J:
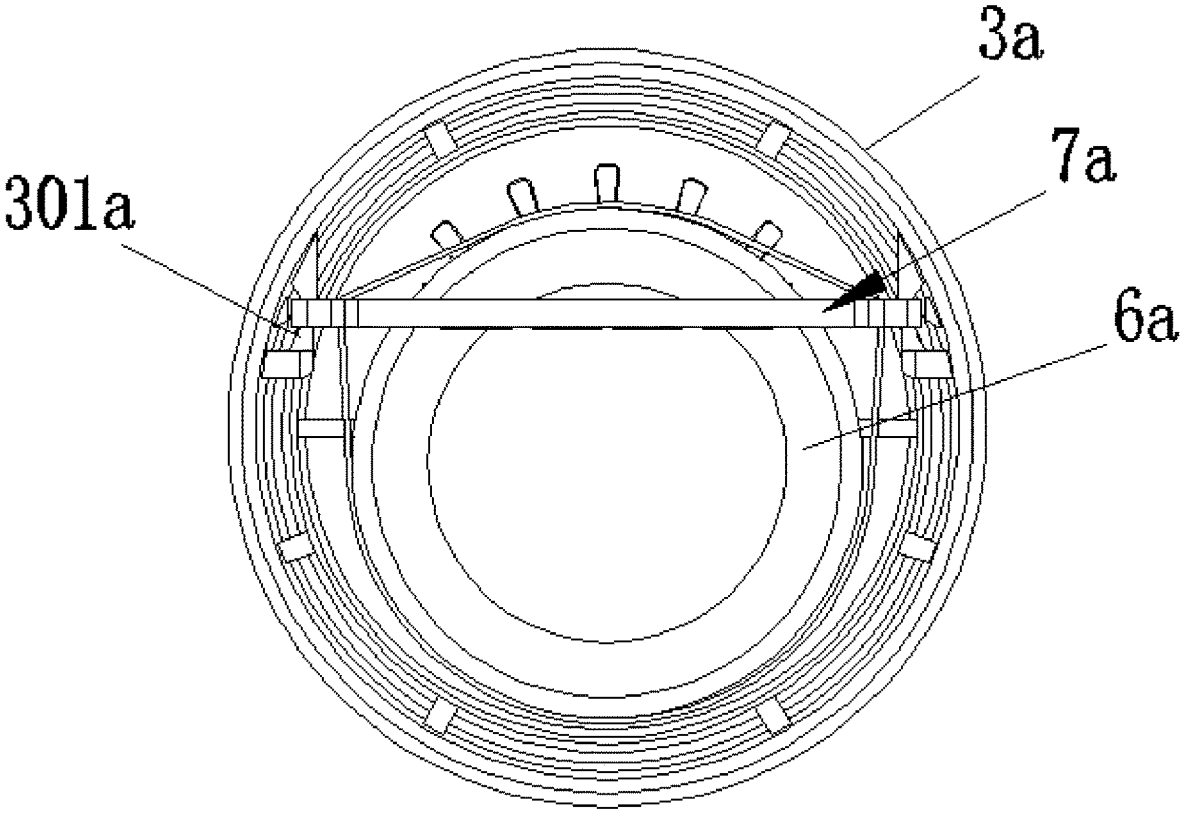
FIG. 1J is a diagram showing an end cap cooperating with an emergency battery.
Figure 1K:
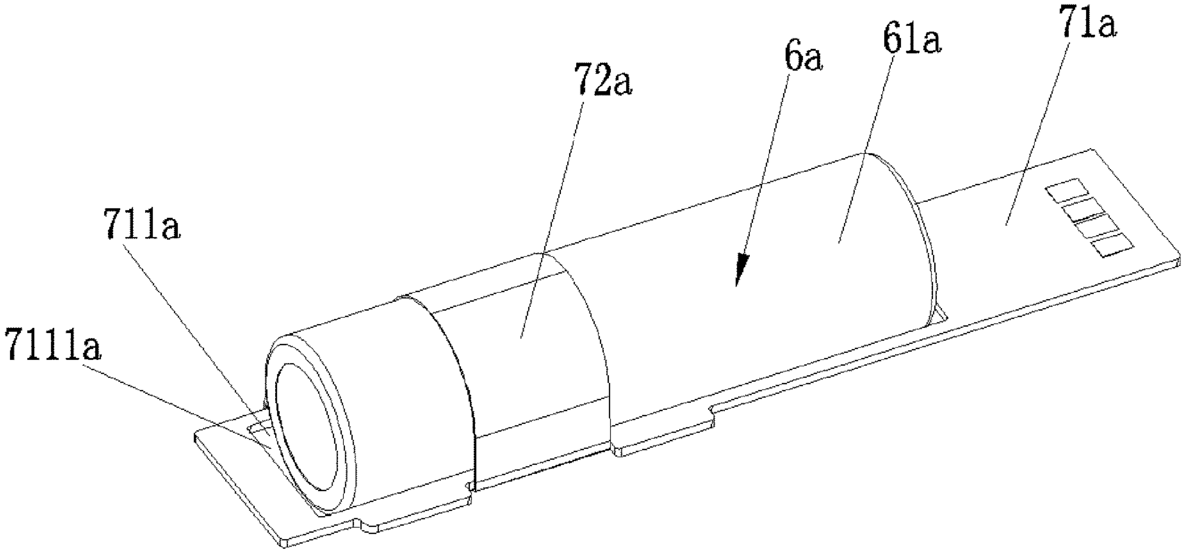
FIG. 1K is a diagram showing a fixing unit cooperating with an emergency battery.
Figure 1L:
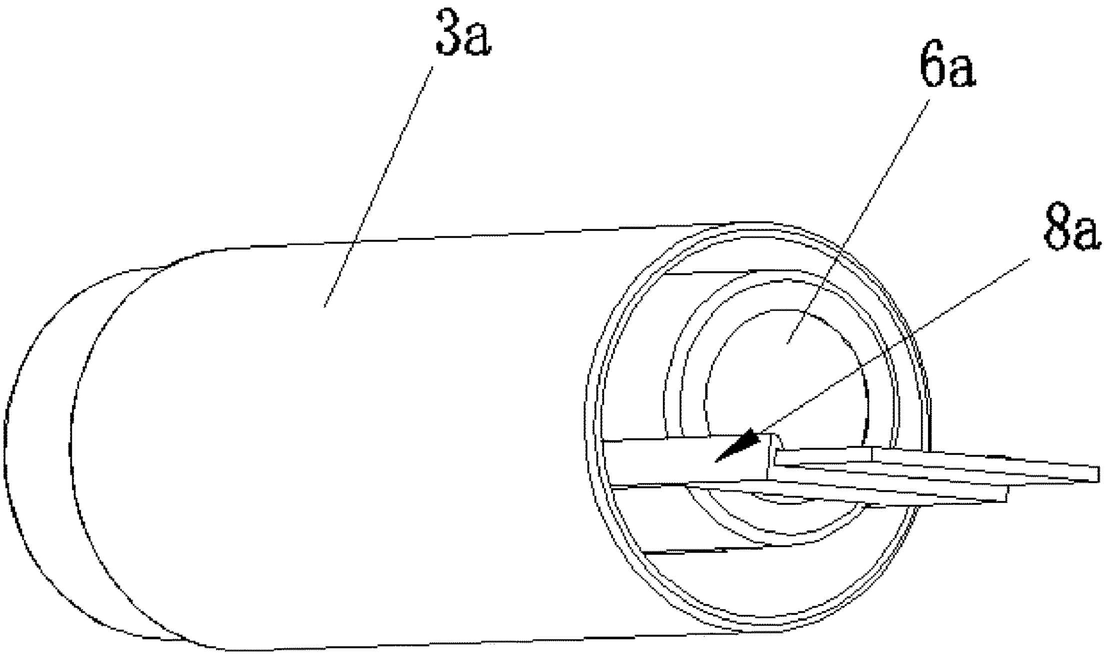
FIG. 1L is a diagram showing an end cap, an emergency battery, and a fixing unit in cooperation according to some embodiments.
Figure 1M:
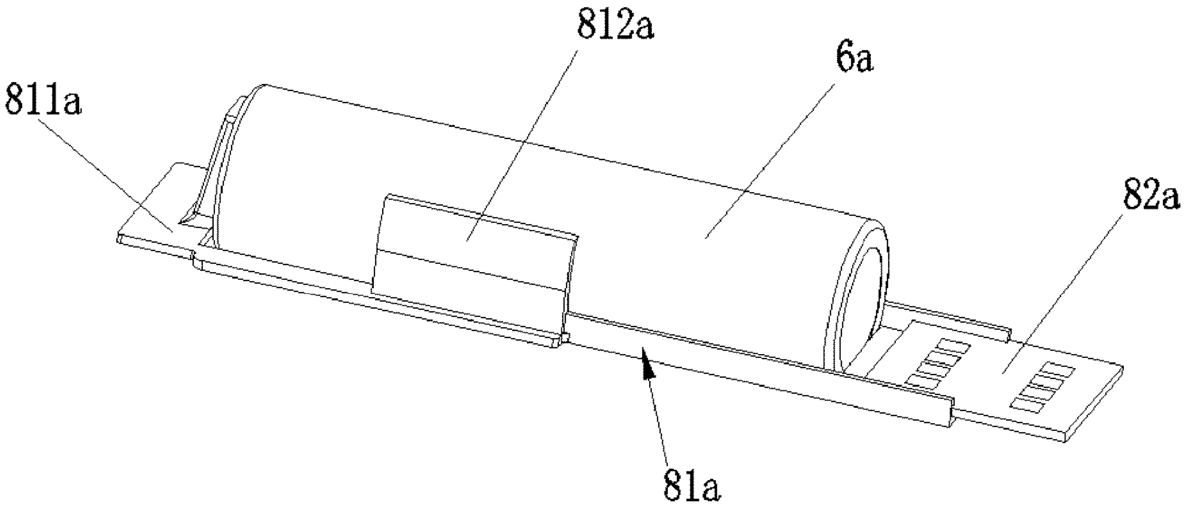
FIG. 1M is a diagram showing an emergency battery cooperating with a fixing unit according to some embodiments.
Figure 1N:
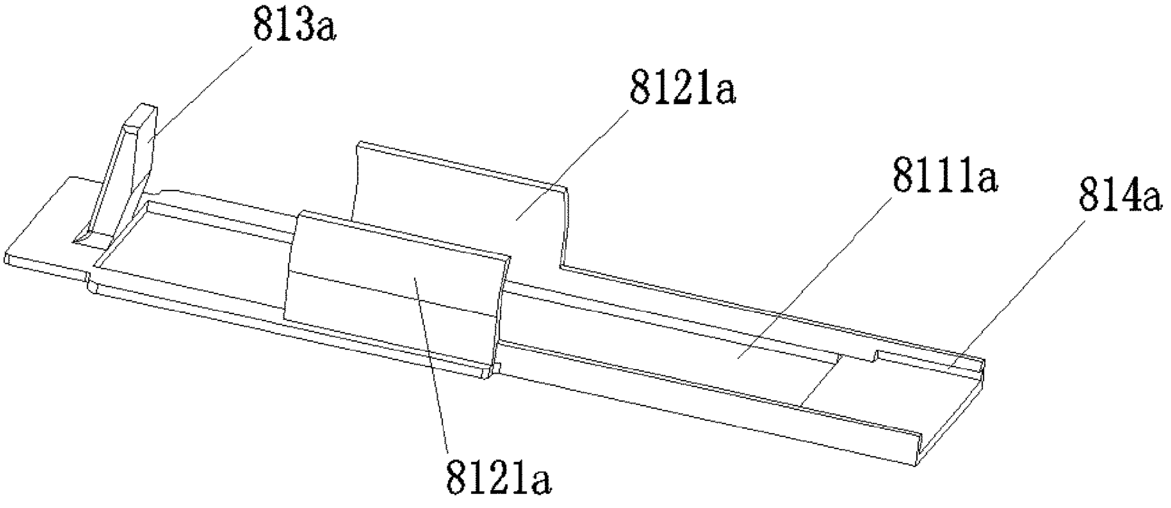
FIG. 1N is a diagram of a three-dimensional structure of a fixing unit according to some embodiments.
Figure 1O:
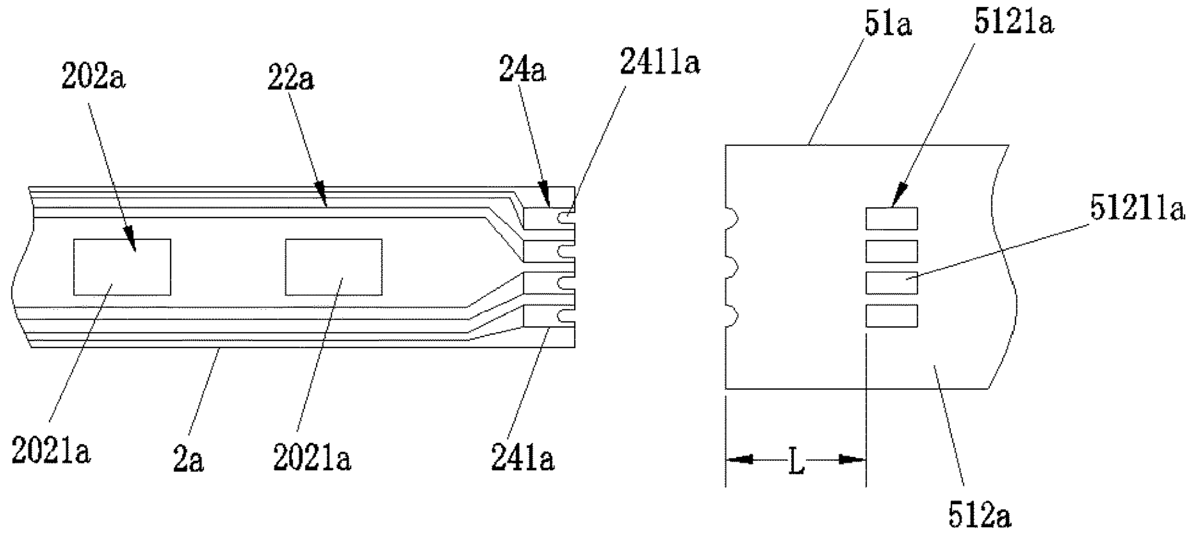
FIG. 1O is a diagram showing a light strip separate from a first circuit board and indicating a front side of the light strip and a first side of the first circuit board, according to some embodiments.
Figure 1P:
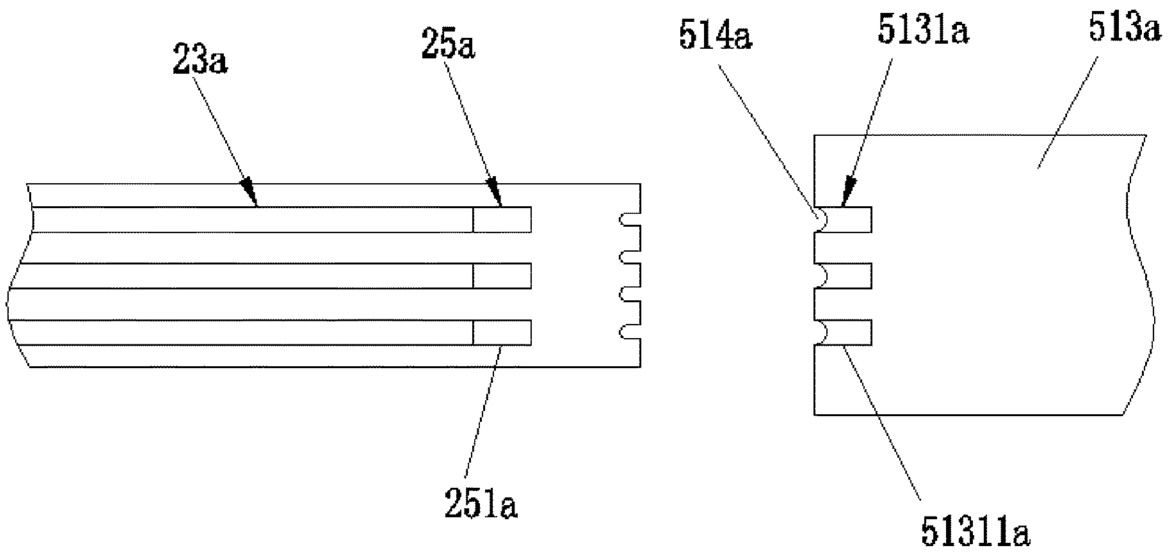
FIG. 1P is a diagram showing a light strip separate from a first circuit board and indicating a back side of the light strip and a second side of the first circuit board, according to some embodiments.
Figure 1Q:
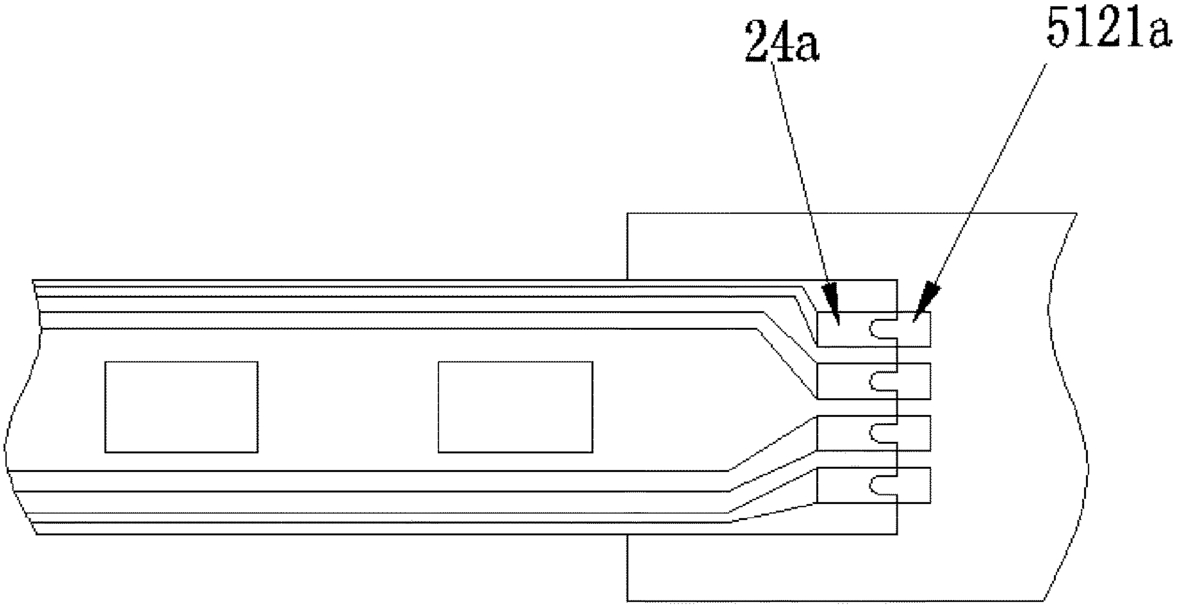
FIG. 1Q is a diagram showing a light strip cooperating with a first circuit board and indicating a front side of the light strip and a first side of the first circuit board, according to some embodiments.
Figure 1R:
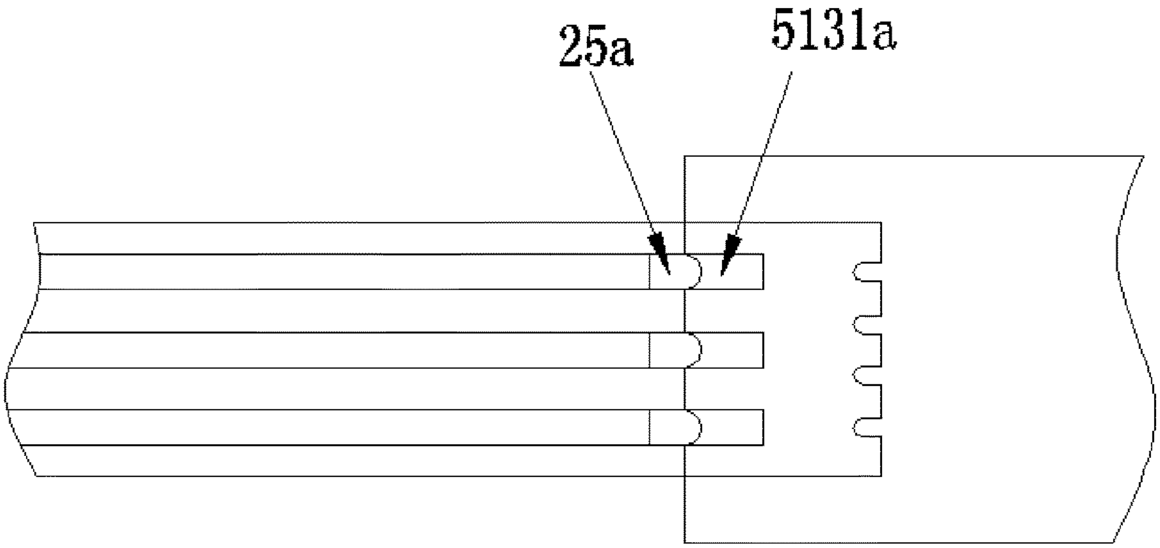
FIG. 1R is a diagram showing a light strip cooperating with a first circuit board and indicating a front side of the light strip and a first side of the first circuit board, according to some embodiments.
Figure 1S:
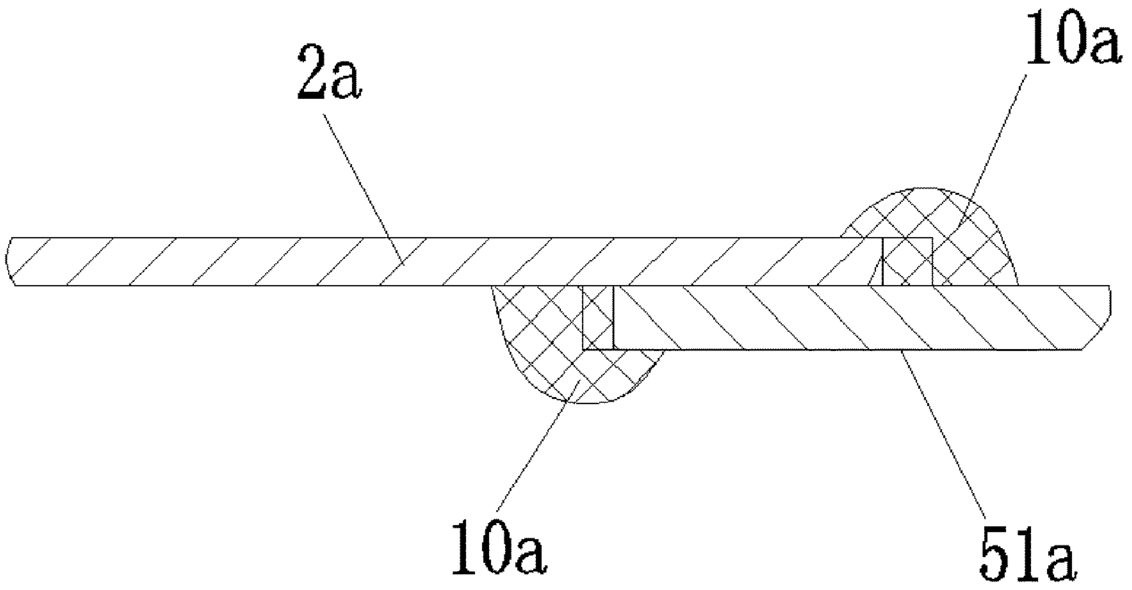
FIG. 1S is a cross-sectional view of a light strip cooperating with a first circuit board according to some embodiments.

Referring to FIGS. 1C to 1E, a power module 5*a* in some embodiments includes a first circuit board 51*a*, a second circuit board 52*a*, and electronic component(s) 53*a*, wherein a light strip 2*a* is connected to the first circuit board 51*a*, the first circuit board 51*a* is electrically connected to the second circuit board 52*a*, and electronic component(s) 53*a* are disposed respectively on each of the first circuit board 51*a* and second circuit board 52*a*. The first circuit board 51*a* and second circuit board 52*a* are each disposed as being extended along a longitudinal direction of a lamp tube 1*a*. There is at least partial overlap between projections respectively of the first circuit board 51*a* and second circuit board 52*a* along a radial direction crossing the lamp tube 1*a*, so as to allow a shorter length of the overall power module 5*a*, and thus to allow a shorter length of a dark area (without light emitting from the light strip) on the LED tube lamp due to the presence of the shorter-length power module 5*a* disposed at the end cap(s) 3*a*. In one embodiment, at least 60%, 65%, 70% or 75% of the length of a power module 5*a* may be disposed in an end cap 3*a*. For emergency lamps in existing or current technologies, usually the lamp tubes are made of aluminum-plastic tubes each comprising a plastic translucent cover and a base of aluminum, and their power modules are each disposed in the base and actually in the lamp tube. Compared to the existing or current technologies, an LED tube lamp in these embodiments of FIGS. 1C to 1E of present application has a simpler structure and whose lamp tube 1*a* is an integral lamp tube of glass, which has better translucent effect(s).

In one embodiment, the length of a second circuit board 52*a* is configured to be at least 50%, 55%, 60%, 65%, 70%, 75%, 80%, or 85% of that of a first circuit board 51*a*. In one embodiment, when a second circuit board 52*a* is projected to a plane on which a first circuit board 51*a* is disposed, at least 80% of the length of the second circuit board 52*a* is projected to be within the extent of the length of the first circuit board 51*a*. In one embodiment, when a second circuit board 52*a* is projected to a plane on which a first circuit board 51*a* is disposed, at least 90% of the length of the second circuit board 52*a* is projected to be within the extent of the length of the first circuit board 51*a*. In one embodiment, when a second circuit board 52*a* is projected to a plane on which a first circuit board 51*a* is disposed, the complete length of the second circuit board 52*a* is projected to be within the extent of the length of the first circuit board 51*a*. By such configurations, the length of a power module 5*a* may be maximally reduced while still guaranteeing sufficient space of distributing electronic components. Besides, since in some embodiments the complete length of a second circuit board 52*a* is projected to be within the extent of the length of a first circuit board 51*a*, a wiring layer of the second circuit board 52*a* is projected to be within a plane on which the first circuit board 51*a* is disposed, so as to avoid encountering the issue of fringe radiation and thus to control differential-mode radiation.

In one embodiment, a gap is present between the first circuit board 51*a* and the second circuit board 52*a* to form a containing room 501*a*, that is, a containing room 501*a* is formed between the first circuit board 51*a* and second circuit board 52*a*. The ratio of a height of the containing room 501*a* to an inside diameter of an end cap 3*a* is in the range of 0.25 to 0.5, in order to guarantee sufficient space to contain electronic components. At least some electronic components of the first circuit board 51*a* are disposed in the containing room 501*a*, and at least some electronic components of the second circuit board 52*a* are disposed in the containing room 501*a*. In some embodiments, an electronic component 53*a* having relatively larger volume, such as a transformer, a capacitor, or an inductor, may be disposed in the containing room 501*a* so as to have more reasonable usage of space. In some embodiments, a heat-producing component, such as an IC, a resistor, or a transformer, may be disposed in the containing room 501*a* so as to have more reasonable distribution of heat-producing components. In some embodiments, projections, along a radial or transverse direction crossing an end cap 3*a*, respectively of at least one electronic component 53*a* of the first circuit board 51*a* in the containing room 501*a* and at least one electronic component 53*a* of the second circuit board 52*a* in the containing room 501*a* at least partially overlap, thus allowing more compact distribution of electronic components in the containing room and allowing more electronic components 53*a* to be distributed within per unit length of the containing room 501*a*, which can therefore reduce the length needed of an overall power module 5*a*. Further, when projections, along a radial or transverse direction crossing an end cap 3*a*, respectively of an electronic component 53*a* of a first circuit board 51*a* in a containing room 501*a* and an electronic component 53*a* of a second circuit board 52*a* in the containing room 501*a* at least partially overlap, the sum of the heights respectively of the electronic component 53*a* of the first circuit board 51*a* and the electronic component 53*a* of the second circuit board 52*a* may be shorter than half of the height of the containing room 501*a*, in order to prevent the two electronic components 53*a* from affecting each other, which affecting may be in the form of thermal affecting or electrical interference. Besides, also under this condition of height, sufficient gap may be ensured between an electronic component 53*a* of a first circuit board 51*a* in a containing room 501*a* and a corresponding electronic component 53*a* of a second circuit board 52*a* in the containing room 501*a*, so as to be used for convection of heat dissipation. In some embodiments, electronic components 53*a* are disposed on surfaces of two opposite sides of a first circuit board 51*a*, and electronic components 53*a* are similarly disposed on surfaces of two opposite sides of a second circuit board 52*a*.

Figure 1T:
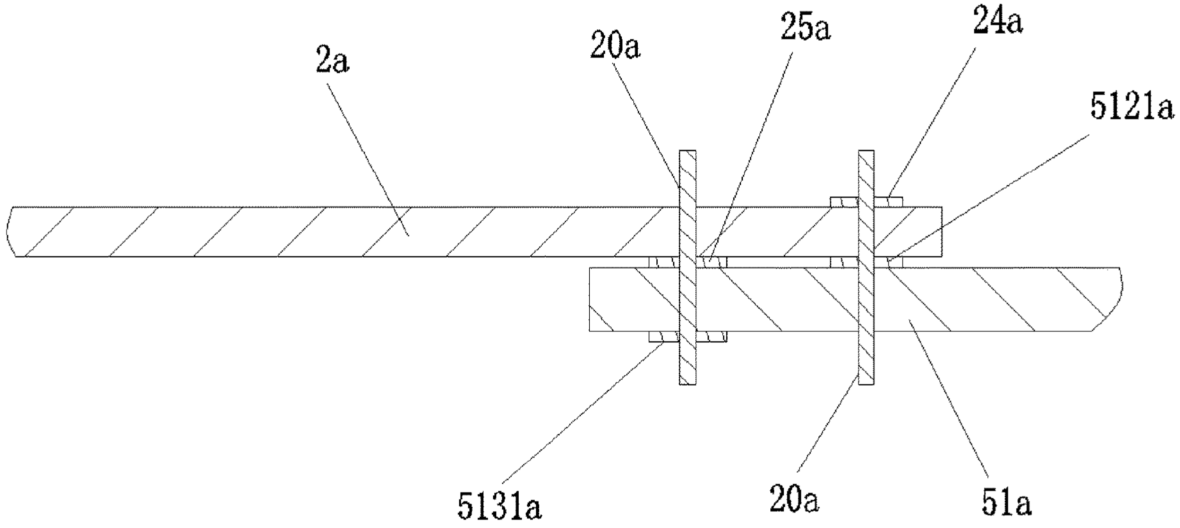
FIG. 1T is a cross-sectional view of a light strip cooperating with a first circuit board according to some embodiments.
Figure 1U:
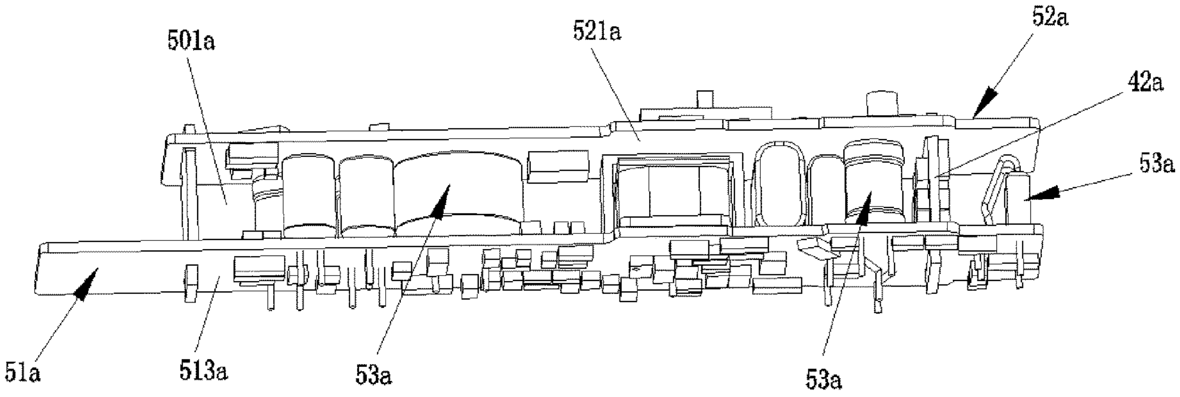
FIG. 1U is a diagram of a three-dimensional structure of a power module according to some embodiments.

Referring to FIGS. 1D, 1E, and 1U, in some embodiments a first circuit board 51*a* has a first side 512*a* and an opposite second side 513*a*, and electronic component(s) 53*a* are disposed respectively on the first side 512*a* and second side 513*a* of the first circuit board 51*a*. A second circuit board 52*a* has a front side 521*a* and an opposite back side 522*a*, and electronic component(s) 53*a* are disposed respectively on the front side 521*a* and back side 522*a* of the second circuit board 52*a*. The first side 512*a* of the first circuit board 51*a* and the front side 521*a* of the second circuit board 52*a* limit the height of a containing room 501*a*. Electronic components each having relatively higher height (including an electronic component having a height which is at least half of that of the containing room 501*a*, such as a capacitor, transformer, or inductor) are disposed on a first side 512*a* of a first circuit board 51*a*, and their corresponding front side of a second circuit board 52*a* does not have electronic component(s) disposed thereon. That is, when electronic components each having a height higher than half of that of the containing room 501*a* and disposed on the first side 512*a* of the first circuit board 51*a* are projected toward the second circuit board 52*a*, such electronic components do not (directly) correspond to or overlap with any electronic component disposed on the second circuit board 52*a*, which can prevent mutual affecting (in the form of e.g. thermal affecting or electrical interference) between electronic components. The electronic components each having a height higher than half of that of the containing room 501*a* and disposed on the first side 512*a* of the first circuit board 51*a* may include a transformer, an electrolytic capacitor, or an inductor. When an electronic component having a height higher than half of that of a containing room 501*a* and disposed on the first side 512*a* of the first circuit board 51*a* is a transformer, the above-described configuration can prevent heat generated by the transformer during operation from affecting corresponding electronic components on the second circuit board 52*a*. When an electronic component having a height higher than half of that of a containing room 501*a* and disposed on the first side 512*a* of the first circuit board 51*a* is a transformer or inductor, the above-described configuration can prevent heat generated by the transformer or inductor during operation from affecting corresponding electronic components on the second circuit board 52*a*. When an electronic component having a height higher than half of that of a containing room 501*a* and disposed on the first side 512*a* of the first circuit board 51*a* is an electrolytic capacitor, the above-described configuration can prevent the electrolytic capacitor from being affected by electromagnetic interference with corresponding electronic components on the second circuit board 52*a*.

In one embodiment, a plurality of filtering devices (such as capacitors) are disposed on a first circuit board 51*a* and in a containing room 501*a*. In one aspect, the containing room 501*a* may provide sufficient space for containing the filtering devices (each of which typically has larger volume or longer height). In another aspect, arranging the filtering devices side by side in the containing room 501*a* is able to prevent interference to circuit(s) receiving a filtered signal from the filtering devices.

In one embodiment, a first circuit board 51*a* is connected to a second circuit board 52*a* through a fixing unit 4*a*, in order to fix or fasten the first circuit board 51*a* and the second circuit board 52*a* to each other to avoid their shaking relative to each other. The fixing unit 4*a* includes a first connection board 41*a* and a second connection board 42*a*. The first circuit board 51*a* and the second circuit board 52*a* are fixed to each other near an end of a longitudinal direction of an end cap 3*a*, through the first connection board 41*a*. The first circuit board 51*a* and the second circuit board 52*a* are fixed to each other near the other end of the longitudinal direction of the end cap 3*a*, through the second connection board 42*a*. Further, through the way of soldering, two ends of the first connection board 41*a* are respectively connected to the first circuit board 51*a* and the second circuit board 52*a*. Through the way of soldering, two ends of the second connection board 42*a* are respectively connected to the first circuit board 51*a* and the second circuit board 52*a*. Further, positioning holes are respectively disposed on the first circuit board 51*a* and the second circuit board 52*a*, wherein two ends of the first connection board 41*a* are respectively inserted into positioning holes respectively of the first circuit board 51*a* and the second circuit board 52*a* for positioning, and two ends of the second connection board 42*a* are respectively inserted into positioning holes respectively of the first circuit board 51*a* and the second circuit board 52*a* for positioning, which configuration can make it more convenient to perform installing and fixing of the relevant components.

In one embodiment, a first connection board 41*a* comprises a circuit board in order to realize electrical connection between a first circuit board 51*a* and a second circuit board 52*a* through the first connection board 41*a*. Similarly, a second connection board 42*a* may comprise a circuit board in order to realize electrical connection between a first circuit board 51*a* and a second circuit board 52*a* through the second connection board 42*a*. In one embodiment, one of a first connection board 41*a* and a second connection board 42*a* comprises a circuit board in order to electrically connect a first circuit board 51*a* and a second circuit board 52*a*. And in one embodiment, both a first connection board 41*a* and a second connection board 42*a* each comprise a circuit board in order to electrically connect a first circuit board 51*a* and a second circuit board 52*a*, therefore making it more convenient to perform reasonable circuit layout.

In one embodiment, electronic component(s) 53*a* are disposed on a first connection board 41*a*. In one embodiment, electronic component(s) 53*a* are disposed on a second connection board 42*a*. Therefore, electronic component(s) 53*a* are disposed on a first connection board 41*a* and/or a second connection board 42*a*.

In one embodiment, electronic components 53*a* are disposed respectively on two opposite sides of a second connection board 42*a*, which two sides face along a longitudinal direction of an end cap 3*a*, wherein electronic component(s) 53*a* disposed on one side of the two sides are in a containing room 501*a* so as to improve spatial usage.

Referring to FIGS. 1D, 1E, and 1U, the second connection board 42*a* may further function as separation or isolation. Specifically, the electronic components 53*a* of the first circuit board 51*a* are disposed respectively on two opposite sides of the second connection board 42*a*, wherein heat-producing component(s) (such as an inductor, a resistor, or a transformer) of the first circuit board 51*a* are disposed on one side of the second connection board 42*a*, and fuse(s), heat-sensitive component(s) (such as an electrolytic capacitor), or heat-producing component(s) (such as an IC or resistor) of the first circuit board 51*a* are disposed on the other side of the second connection board 42*a*. When fuse(s) of the first circuit board 51*a* are disposed on said another side of the second connection board 42*a*, the second connection board 42*a* may function as thermally separation or isolation, as preventing heat radiation from reaching and thus affecting properties and functions of the fuse(s), wherein the heat radiation is from heat-producing component(s) of the first circuit board 51*a* and disposed on the one side of the second connection board 42*a*. When heat-sensitive component(s) of the first circuit board 51*a* are disposed on said another side of the second connection board 42*a*, the second connection board 42*a* may function as thermally separation or isolation, as preventing heat radiation from reaching and thus affecting properties and usage life of the heat-sensitive component(s), wherein the heat radiation is from heat-producing component(s) of the first circuit board 51*a* and disposed on the one side of the second connection board 42*a*. When heat-producing component(s) of the first circuit board 51*a* are disposed on said another side of the second connection board 42*a*, the second connection board 42*a* may function as thermally separation or isolation, as preventing mutual affecting between heat-producing component(s) of the first circuit board 51*a* and disposed on the one side of the second connection board 42*a* and the heat-producing component(s) disposed on said another side of the second connection board 42*a*, wherein the mutual affecting may cause local high temperature.

Referring to FIGS. 1D to 1G, an end wall of an end cap 3*a* has heat-dissipation hole(s) 302*a*, to be used at least for heat dissipation of electronic component(s) of a power module 5*a* in the end cap 3*a*. In the embodiments of FIGS. 1D to 1G, a second connection board 42*a* (compared to a first connection board 41*a* or a containing room 501*a*) is closer to heat-dissipation hole(s) 302*a* of the end cap 3*a*, and a width or widest dimension of the second connection board 42*a* is shorter than a width or widest dimension of a first circuit board 51*a* and/or a second circuit board 52*a*, in order to reduce the extent of blocking by the second connection board 42*a* of a convection path between the containing room 501*a* and the heat-dissipation hole(s) 302*a*, thereby guaranteeing the smoothness of convection between the containing room 501*a* and the heat-dissipation hole(s) 302*a*.

In one embodiment, the ratio of a cross-sectional area of a second connection board 42*a* (which is the area of a cross section crossing a convection path between a containing room 501*a* and heat-dissipation hole(s) 302*a* or crossing an axial direction of an end cap 3*a*) to a cross-sectional area in the end cap 3*a* does not exceed 50%, in order to reduce the extent of blocking by the second connection board 42*a* of a convection path between the containing room 501*a* and the heat-dissipation hole(s) 302*a*. In some embodiments, the ratio of a cross-sectional area of a second connection board 42*a* (which is the area of a cross section crossing a convection path between a containing room 501*a* and heat-dissipation hole(s) 302*a* or crossing an axial direction of an end cap 3*a*) to a cross-sectional area in the end cap 3*a* does not exceed 45%, in order to reduce the extent of blocking by the second connection board 42*a* of a convection path between the containing room 501*a* and the heat-dissipation hole(s) 302*a*. In some embodiments, the ratio of a cross-sectional area of a second connection board 42*a* (which is the area of a cross section crossing a convection path between a containing room 501*a* and heat-dissipation hole(s) 302*a* or crossing an axial direction of an end cap 3*a*) to a cross-sectional area in the end cap 3*a* is larger than 20%, in order to guarantee sufficient structural strength in the second connection board 42*a* for providing support and fixing for a first circuit board 51*a* and a second circuit board 52*a*.

A first circuit board 51*a* and a second circuit board 52*a* divide an interior space of the end cap 3*a* approximately into three portions including a first room 502*a*, a containing room 501*a*, and a second room 503*a*. The first room 502*a* is the space between a second side 513*a* (a plane on which the second side 513*a* is) of the first circuit board 51*a* and an internal wall/surface of the end cap 3*a*; the containing room 501*a* is the space between a first side 512*a* (or a plane on which the first side 512*a* is) of the first circuit board 51*a* and a front side 521*a* (or a plane on which the front side 521*a* is) of the second circuit board 52*a*, both of the first circuit board 51*a* and second circuit board 52*a* being in the end cap 3*a*; and the second room 503*a* is the space between a back side 522*a* (or a plane on which the back side 522*a* is) of the second circuit board 52*a* and an internal wall/surface of the end cap 3*a*. In one embodiment, heat generated by operating electronic component(s) in the containing room 501*a* is more than heat generated by operating electronic component(s) in the first room 502*a* or second room 503*a*, and the volume of the containing room 501*a* is larger than each of the first room 502*a* and second room 503*a*, in order to have larger space for better convection of heat dissipation for the electronic component(s) in the containing room 501*a*. In one embodiment, heat generated by operating electronic component(s) in the first room 502*a* or second room 503*a* is more than heat generated by operating electronic component(s) in the containing room 501*a*, and the area of the heat-dissipation hole(s) 302*a* corresponding to the first room 502*a* or second room 503*a* is larger than its area corresponding to the containing room 501*a*, which means when the first room 502*a* or second room 503*a* is projected to an end wall in the end cap 3*a*, the area of the heat-dissipation hole(s) 302*a* covered by the projection is larger than the area of the heat-dissipation hole(s) 302*a* covered by a projection of the containing room 501*a* to the end wall in the end cap 3*a*, in order to have better convection of heat dissipation for the first room 502*a* or second room 503*a*.

In one embodiment, a first circuit board 51*a* is connected to a light strip 2*a*. In one embodiment, a first circuit board 51*a* is directly connected to a light strip 2*a* through soldering. Specifically, an end portion of a first circuit board 51*a* along a longitudinal direction of a lamp tube 1*a* exceeds an end of a second circuit board 52*a*, so as to form a connection part 511*a*, which is directly fixed to the light strip 2*a* through soldering. The connection part 511*a* has soldering pad(s) 5111*a* disposed thereon, and is fixed to and electrically connected to the light strip 2*a* through the soldering pad(s) 5111*a*. The light strip 2*a* in the embodiment may comprise a bendable circuit sheet or flexible substrate.

In one embodiment, soldering pad(s) 5111*a* is disposed on a front side (which faces a side of a second circuit board 52*a*) of a first circuit board 51*a*, part of a light strip 2*a* is fixed on an inner surface of a lamp tube 1*a*, and freely extending portions 21*a* are formed at two ends of the light strip 2*a* and not fixed to an inner surface of the lamp tube 1*a*. An end of the freely extending portion 21*a* is on the front side of the first circuit board 51*a* and fixed through soldering to the soldering pad(s) 5111*a* on a connection part 511*a*.

In one embodiment, part of a freely extending portion 21*a* is on a back side (opposite to another side) of a first circuit board 51*a*. In one embodiment, a back side of a first circuit board 51*a* is pressed on part of a freely extending portion 21*a* and does not have electronic component(s) 53*a* or pin(s) of electronic component(s).

In one embodiment, an end of a first connection board 41*a* crosses a first circuit board 51*a* and is exposed above a back side of the first circuit board 51*a*; and the end of the first connection board 41*a* stretches against a freely extending portion 21*a*, in order to keep a distance between part of the freely extending portion 21*a* and the back side of the first circuit board 51*a*, thus preventing a surface on the first circuit board 51*a* from adversely scratching the freely extending portion 21*a* and preventing shaking movement of the freely extending portion 21*a*.

As shown in FIGS. 1C to 1E, in one embodiment, a power module 5*a* is disposed in one of the two end caps 3*a* (which may be so regarded if at least 65% of a longitudinal dimension of the power module 5*a* is in the end cap 3*a*). The end cap 3*a* has an internal volume a, and the power module 5*a* has a volume b inside the end cap 3*a*; and the ratio of the volume b to the volume a is at least 20%, in order to as much use internal space in the end cap 3*a*, so as to make the power module 5*a* occupy as little internal space in a lamp tube 1*a* and thus to avoid the power module 5*a* affecting translucent effects of the lamp tube 1*a*.

As shown in FIGS. 1C to 1E, in one embodiment, an entire length (along an axial direction of a lamp tube 1*a*) of a power module 5*a* is L (by the unit of millimeter), the number of parts (including electronic component(s) and circuit board(s)) included by the power module 5*a* is X, and the number of parts distributed within per unit length (or per length of millimeter) of the power module 5*a* is more than 0.6, meaning $X/L>0.5$. In one embodiment, the number of parts distributed within per unit length (or per length of millimeter) of the power module 5*a* is more than 0.7, meaning $X/L>0.7$. Such arrangements can make more compact the distribution of parts along a longitudinal direction of the power module 5*a*, thus allowing reduction of an entire length of the power module 5*a*.

Referring to FIGS. 1A to 1I, in one embodiment, a reset switch 5301*a* and a color-temperature selection switch 5302*a* are disposed on a side of a second circuit board 52*a* facing an end cap 3*a*, and need to correspond to corresponding structural parts on the end cap 3*a*, so positions respectively of the reset switch 5301*a* and color-temperature selection switch 5302*a* should be fixed relative to the end cap 3*a*. In one embodiment, an end wall of the end cap 3*a* has a second slot 32*a* disposed thereon, and a side of a second circuit board 52*a* is inserted into the second slot 32*a* to be fixed. In one embodiment, an end wall of the end cap 3*a* has a first slot 31*a* disposed thereon, and a side of a first circuit board 51*a* is inserted into the first slot 31*a* to be fixed. Since the first circuit board 51*a* and the second circuit board 52*a* are fixed to each other, a first slot 31*a* may be omitted or not disposed. In one embodiment, an end wall of the end cap 3*a* has a second slot 32*a* and a first slot 31*a* disposed thereon, and a first circuit board 51*a* and a second circuit board 52*a* are respectively inserted into the first slot 31*a* and the second slot 32*a* to be fixed, so a fixing unit 4*a* as described above may be omitted. In the embodiments of FIGS. 1A to 1I, a position-limiting part may be disposed on a first slot 31*a*, such as a bottom part of the first slot 31*a* at an end of a longitudinal direction of an end cap 3*a* and forming the position-limiting part, so when a second circuit board 52*a* is inserted to the first slot 31*a* to reach the position-limiting part, a reset switch 5301*a* and a color-temperature selection switch 5302*a* of the second circuit board 52*a* just correspond to corresponding structural parts on the end cap 3*a*.

In one embodiment, an end cap 3*a* has a button 33*a* disposed thereon, whose position corresponds to a reset switch 5301*a*. The button 33*a* and the end cap 3*a* constitute an integral structure, which is thus a relatively simple structure.

Further, the button 33*a* includes a pressing part 331*a* and an arm 332*a*, wherein the arm 332*a* is connected to a body of the end cap 3*a*, and the pressing part 331*a* is connected to the arm 332*a*. In some embodiments, a pressing part 331*a* is configured to have a shape of a circle and is connected to the body of the end cap 3*a* only through the arm 332*a*.

In one embodiment, an end cap 3*a* has a groove 34*a* disposed thereon, in order to form a pressing part 331*a* and an arm 332*a* as described above. The groove 34*a* in one aspect is used for forming the pressing part 331*a* and arm 332*a*, and in another aspect is used for forming heat-dissipation hole(s) in order to allow some heat generated by an operating power module 5*a* to be dissipated from the groove 34*a*. The groove 34*a* may be directly formed during the formation of the end cap 3*a*.

In one embodiment, an end cap 3*a* has a sliding button 35*a* disposed thereon, which is connected to a color-temperature selection switch 5302*a*. Specifically, the sliding button 35*a* includes a sheet 351*a*, a sliding part 352*a*, and a connection part 353*a*, wherein the sheet 351*a* is exposed out of the end cap 3*a*, the sliding button 35*a* is slidably connected to the end cap 3*a* through the sliding part 352*a*, and the connection part 353*a* is connected to the color-temperature selection switch 5302*a*.

In one embodiment, a sliding part 352*a* includes a clasp 3521*a*, an end cap 3*a* has a hole 36*a* disposed thereon. The clasp 3521*a* is clasped or snapped at the hole 36*a* and cooperates with a wall of the end cap 3*a* at the outer edge of the hole 36*a*, a sliding groove 3522*a* is formed between the clasp 3521*a* and a sheet 351*a*, and the sliding groove 3522*a* slidably cooperates with a wall of the end cap 3*a*.

In one embodiment, a color-temperature selection switch 5302*a* includes a cylinder, a connection part 353*a* includes an installation hole 3531*a*, and the cylinder is inserted to the installation hole 3531*a* to be fixed.

In one embodiment, a sheet 351*a* has some ribs 3511*a* disposed on its surface, in order to increase friction during its operation.

In one embodiment, an end cap 3*a* has a position-limiting groove 37*a* disposed on its surface, and at least part of a sheet 351*a* along the sheet 351*a*'s thickness direction is disposed in the position-limiting groove 37*a*. The position-limiting groove 37*a* is disposed to limit the sliding range of the sheet 351*a* relative to the end cap 3*a*, to prevent excessive force applied to the sheet 351*a* from damaging relevant parts.

In one embodiment, an indicating lamp 54*a* is disposed on a power module 5*a*, in order to indicate a state of an LED tube lamp. An end cap 3*a* has a hole 38*a* disposed thereon, in order to permit the passage of light from the indicating lamp 54*a*. In the embodiment, a sheet 351*a* is made of transparent material such as acrylic, covers the hole 38*a*, and permits the passage of light from the indicating lamp 54*a*. The sheet 351*a* is disposed in one aspect to function to protect the indicating lamp 54*a*, and in another aspect not to block light passage from the indicating lamp 54*a*.

Referring to FIGS. 1A to 1K, in one embodiment, an LED tube lamp further includes an emergency battery 6*a* for providing power when an external power source is cut off or not provided, in order to cause or continue lighting of the LED tube lamp. The emergency battery 6*a* is disposed in an end cap 3*a* at one of the two ends of a lamp tube 1*a*. Along an axial direction of the end cap 3*a*, the emergency battery 6*a* is partially or entirely in the end cap 3*a*.

In one embodiment, an emergency battery 6*a* and a power module 5*a* are disposed respectively in two end caps 3*a* respectively at the two ends of a lamp tube 1*a*, meaning the emergency battery 6*a* is disposed in one end cap 3*a* and the power module 5*a* is disposed in the other end cap 3*a*, in order to more reasonably dispose both the emergency battery 6*a* and the power module 5*a*, to avoid an excessive length of each of the two end caps 3*a*, and to prevent the emergency battery 6*a* and the power module 5*a* from occupying much space in the lamp tube 1*a*. If any of the emergency battery 6*a* and the power module 5*a* occupies excessive space in the lamp tube 1*a*, this may cause excessively long dark area on the lamp tube 1*a* or excessively large ill-translucent area on the overall LED tube lamp. In addition, by such disposition of an emergency battery 6*a* and a power module 5*a*, excessive concentration of heat source(s) may be prevented to avoid mutual thermal interaction or affecting between heat productions generated respectively by an operation power module 5*a* and an operating emergency battery 6*a*.

As shown in FIG. 1C, in one embodiment, an emergency battery 6*a* is disposed in one of the two end caps 3*a*, which may be so regarded if at least 80% of a longitudinal dimension of an emergency battery 6*a* is in the end cap 3*a*. In this embodiment, at least 80%, 85%, 90% or 95% of the length of an emergency battery 6*a* may be disposed in an end cap 3*a*. In one embodiment, at least 95% of the length of an emergency battery 6*a* is disposed in an end cap 3*a*, so as to prevent the emergency battery 6*a* from occupying excessive space in a lamp tube 1*a*, which occupying of excessive space may affect translucent effects of the lamp tube 1*a*. An end cap 3*a*, in which an emergency battery 6*a* is disposed, has an internal volume a, and the emergency battery 6*a* has a volume c inside the end cap 3*a*. The ratio of the volume c to the volume a is at least 30%, 35%, or 40%, in order to as much use internal space in the end cap 3*a*; and with considerations of satisfying heat dissipation of the emergency battery 6*a*, the ratio is for maximizing the capacity of the emergency battery 6*a* to increase its lasting time of emergency lighting.

In one embodiment, an emergency battery 6*a* is electrically connected to a light strip 2*a*. When the light strip 2*a* comprises a bendable circuit sheet or flexible substrate as mentioned above, it's needed to fix the emergency battery 6*a* to prevent shaking movements of the emergency battery 6*a* in a lamp tube 1*a* or the light strip 2*a*. In this embodiment, a fixing unit 7*a* may be further included for fixing the emergency battery 6*a*. In other embodiments, when a light strip 2*a* comprises a rigid substrate such as an FR4 substrate or an aluminum substrate, a fixing unit 7*a* may be used for fixing an emergency battery 6*a*.

Specifically, the fixing unit 7*a* includes a third circuit board 71*a*, on which the emergency battery 6*a* is fixed, meaning a body of the emergency battery 6*a* is born on the third circuit board 71*a*. The fixing unit 7*a* further includes a fixing part 72*a* used for fixing the emergency battery 6*a* to the third circuit board 71*a*. In one embodiment, a fixing part 72*a* fixes by adhering an emergency battery 6*a* to a third circuit board 71*a*, so the fixing part 72*a* may comprise a glue. In one embodiment, a fixing part 72*a* fixes by snapping an emergency battery 6*a* to a third circuit board 71*a*, so the fixing part 72*a* may comprise a snap. In this embodiment, the fixing part 72*a* fixes by bundling the emergency battery 6*a* and the third circuit board 71*a*, wherein the fixing part 72*a* surrounds the emergency battery 6*a* and third circuit board 71*a* in order to firmly bundle them. Specifically, the fixing part 72*a* may comprise a heat-shrinkable film, configured to shrink by heat in order to tightly bundle the emergency battery 6*a* and third circuit board 71*a*. In this embodiment, the light strip 2*a* is electrically connected to the third circuit board 71*a*. When the light strip 2*a* comprises a bendable circuit sheet or flexible substrate, the light strip 2*a* may be directly soldered to the third circuit board 71*a*. In this embodiment, the emergency battery 6*a* and third circuit board 71*a* may be electrically connected by wire(s).

In one embodiment, a third circuit board 71*a* has a positioning unit 711*a* disposed thereon, configured to cooperate with an emergency battery 6*a* in order to initially achieve positioning of the emergency battery 6*a* to the third circuit board 71*a*. Specifically, the positioning unit 711*a* includes a positioning hole 7111*a*, in which at least part of the emergency battery 6*a* is contained. In a thickness direction of the third circuit board 71*a*, at least part of the emergency battery 6*a* protrudes an upper surface of the third circuit board 71*a* (which is its surface over which the emergency battery 6*a* is disposed) to reach into the third circuit board 71*a*. Specifically, a cylindrical body 61*a* is configured in the emergency battery 6*a* such that a longitudinal axis of the body 61*a* is parallel or largely parallel with the third circuit board 71*a* and configured to extend along a longitudinal direction of the third circuit board 71*a*. At least part of the body 61*a* of the emergency battery 6*a* is in the positioning hole 7111*a*, so as to keep an overall height of the emergency battery 6*a* relatively low upon being installed onto the third circuit board 71*a* and thereby to control the overall volume.

In one embodiment, when a third circuit board 71*a* along with an emergency battery 6*a* are formed into an integral unit and disposed in an end cap 3*a*, two ends of a widthwise direction or transverse direction of the third circuit board 71*a* may be engaged or inserted respectively into slot(s) 301*a* of the end cap 3*a*, in order to fix the third circuit board 71*a*. Thereby, when the third circuit board 71*a* along with the emergency battery 6*a* are formed into an integral unit, their movement(s) relative to a lamp tube 1*a* or the end cap 3*a* may be prevented. In this embodiment, the end cap 3*a* containing the emergency battery 6*a* may be identical to an end cap 3*a* containing a power module 5*a* as mentioned above, that is, two end caps 3*a* respectively at two opposite ends of a tube lamp may be identical. And the slot 301*a* may be a first slot 31*a* or a second slot 32*a* as mentioned above.

Referring to FIGS. 1A to 1I, and 1L to 1N, instead another structural fixing unit 8*a* may be adopted in some embodiments to fix an emergency battery 6*a*. Specifically, the fixing unit 8*a* includes a carrying part 81*a*, on which the emergency battery 6*a* is fixed. Compared to using an entire circuit board to carry an emergency battery, the costs of materials of the carrying part 81*a* may be lower.

Further, the carrying part 81*a* includes a substrate 811*a* and a fastener 812*a*, which is fixed on the substrate 811*a*. The emergency battery 6*a* is fixed to the carrying part 81*a* directly through the fastener 812*a*. In some embodiments, the manner of adhering is used to fix an emergency battery 6*a* to a carrying part 81*a*. In some embodiments, the manner of bundling is used to fix an emergency battery 6*a* to a carrying part 81*a*.

In this embodiment, the fastener 812*a* includes at least two flexible arms 8121*a* disposed to correspond to each other, and when the emergency battery 6*a* is engaged with the fastener 812*a*, side wall(s) of the emergency battery 6*a* is clamped or gripped by the two flexible arms 8121*a*, making engagement or assembling of the emergency battery 6*a* and the fastener 812*a* easy and convenient and thus improving efficiency in assembling.

In this embodiment, the substrate 811*a* has a positioning unit 8111*a* disposed thereon, configured to cooperate with the emergency battery 6*a* in order to further achieve positioning of the emergency battery 6*a* to the substrate 811*a*, thus preventing or reducing movement(s) of the emergency battery 6*a* relative to the substrate 811*a*. The positioning unit 8111*a* includes a positioning hole, in which at least part of the emergency battery 6*a* is contained. In the thickness direction of the substrate 811*a*, at least part of the emergency battery 6*a* protrudes an upper surface of the substrate 811*a* (which is its surface over which the emergency battery 6*a* is disposed) to reach into the substrate 811*a*. Specifically, the emergency battery 6*a* is configured to be cylindrical such that a longitudinal axis of the emergency battery 6*a* is parallel or largely parallel with the substrate 811*a* and configured to extend along the longitudinal direction of the substrate 811*a*. At least part of the emergency battery 6*a* is in the positioning hole 8111*a*, so as to keep an overall height of the emergency battery 6*a* relatively low upon being installed onto the substrate 811*a* and thereby to control the overall volume.

A substrate 811*a* in this embodiment has an abutting arm 813*a* disposed thereon. When an emergency battery 6*a* is fixed to the carrying part 81*a*, the abutting arm 813*a* tightly abuts an end of an axial direction of the emergency battery 6*a*, in order to limit shaking movements of the emergency battery 6*a* relative to the substrate 811*a* and along a longitudinal direction of the substrate 811*a*. Further, there may be only one abutting arm 813*a* disposed to abut an end of the emergency battery 6*a*, which has another end whose position is limited by an internal wall of a positioning hole, in order to fix the emergency battery 6*a* along its axial direction relative to the substrate 811*a*.

In this embodiment, when the carrying part 81*a* along with the emergency battery 6*a* are formed into an integral unit and disposed in the end cap 3*a*, two ends of a widthwise direction or transverse direction of the substrate 811*a* of the carrying part 81*a* may be engaged or inserted respectively into slot(s) of the end cap 3*a*, in order to fix the substrate 811*a*. Thereby, when the carrying part 81*a* along with the emergency battery 6*a* are formed into an integral unit, their movement(s) relative to the lamp tube 1*a* or the end cap 3*a* may be prevented. In this embodiment, the end cap 3*a* containing the emergency battery 6*a* may be identical to the end cap 3*a* containing the power module 5*a* as mentioned above, that is, two end caps 3*a* respectively at two opposite ends of the tube lamp may be identical. And the slot of the end cap 3*a* may be the first slot 31*a* or the second slot 32*a* as mentioned above.

Further, the fixing unit 8*a* may further include a fourth circuit board 82*a*, which is fixed to the carrying part 81*a*. Specifically, the carrying part 81*a* has a third slot 814*a* disposed thereon, and a side of the fourth circuit board 82*a* is engaged or inserted into the third slot 814*a* for fixing the fourth circuit board 82*a*. The emergency battery 6*a* is electrically connected to the fourth circuit board 82*a* by wire(s). The light strip 2*a* may be directly soldered to the fourth circuit board 82*a* or connected to the fourth circuit board 82*a* by wire(s).

In some embodiments, the fourth circuit board 82*a* may be omitted or not disposed, and the emergency battery 6*a* is directly connected to the light strip 2*a* by wire(s), so as to reduce some costs, while if the light strip 2*a* comprises a bendable circuit sheet or flexible substrate, relatively big room may exist between an end of the light strip 2*a* not fixed to the lamp tube 1*a* and the connecting wire(s) for their shaking movement(s).

Referring to FIGS. 1C, and 1O to 1S, in one embodiment, a light strip 2*a* has a front side and an opposite back side, with light source(s) 202*a* disposed on the front side. The front side of the light strip 2*a* has a first set of wires 22*a* disposed thereon, which include one or more conductive wires, and the back side of the light strip 2*a* has a second set of wires 23*a* disposed thereon, which include one or more conductive wires. By distributing wires on the front and back sides of the light strip 2*a*, rooms on the light strip 2*a* may be reasonably used in order to reduce the width needed on the light strip 2*a* within which to dispose wire(s) and light source(s) 202*a*. By controlling the width of the light strip 2*a*, the incidence of curving of the light strip 2*a* attached inside a lamp tube 1*a* may be reduced and thus the light strip 2*a*'s impact on the lamp tube 1*a*'s translucent ability may be reduced. In this embodiment, the width of a light strip 2*a* may be controlled to be within 12 mm. Further, the width of a light strip 2*a* may be controlled to be within 10 mm±1 mm. In this embodiment, a lamp tube 1*a* may have any one of different diameters, but in general the ratio of the width of the light strip 2*a* to the inner perimeter of the lamp tube 1*a* should be controlled to be under 0.2, 0.18, 0.15, or 0.13, in order to prevent curving of the light strip 2*a* when being installed into the lamp tube 1*a* and thus to reduce the light strip 2*a*'s impact on the lamp tube 1*a*'s translucent ability. In this embodiment, the light strip 2*a* may be a flexible light strip as described above and thus have freely extending portion(s) as described above. So the light strip 2*a* may be applied in above mentioned embodiments.

In this embodiment, the first set of wires 22*a* and the second set of wires 23*a* are respectively electrically connected to a first circuit board 51*a*. Specifically, the first circuit board 51*a* has a first side 512*a* and an opposite second side 513*a*, wherein the first side 512*a* may face a side of a second circuit board 52*a*; but in some embodiments, a second circuit board 52*a* is omitted or not disposed and the first side 512*a* is the side of the first circuit board 51*a* that has electronic component(s) disposed thereon, which include capacitor(s), transformer(s), or resistor(s). The first side 512*a* has a first set of soldering pads 5121*a* for a power module disposed thereon, the first set of soldering pads 5121*a* includes one or more sets of first power-module soldering pad(s) 51211*a*. And the second side 513*a* has a second set of soldering pads 5131*a* for a power module disposed thereon, the second set of soldering pads 5131*a* includes one or more sets of second power-module soldering pad(s) 51311*a*. The front side of the light strip 2*a* has a first set of soldering pads for light source(s) 24*a* disposed thereon, which includes one or more sets of first light-source soldering pad(s) 241*a*, and the back side of the light strip 2*a* has a second set of soldering pads for light source(s) 25*a* disposed thereon, which includes one or more sets of second light-source soldering pad(s) 251*a*. The first set of soldering pads 5121*a* is electrically connected to the first set of soldering pads 24*a*, and the second set of soldering pads 5131*a* is electrically connected to the second set of soldering pads 25*a*.

In this embodiment, when the light strip 2*a* has 5 or more sets of wires disposed thereon, a width on or of the light strip 2*a* may be controlled to be within 10 mm±1 mm.

The first set of soldering pads 5121*a* is directly fixed and electrically connected to the first set of soldering pads 24*a* through solder tin 10*a*, and the second set of soldering pads 5131*a* is directly fixed and electrically connected to the second set of soldering pads 25*a* through solder tin 10*a*. Specifically, the first power-module soldering pad(s) 51211*a* of the first set of soldering pads 5121*a* are disposed respectively corresponding to and fixed by solder tin 10*a* to the first light-source soldering pad(s) 241*a* of the first set of soldering pads 24*a*. The second power-module soldering pad(s) 51311*a* of the second set of soldering pads 5131*a* are disposed respectively corresponding to and fixed by solder tin 10*a* to the second light-source soldering pad(s) 251*a* of the second set of soldering pads 25*a*. In some embodiments, the first set of soldering pads 5121*a* is connected to the first set of soldering pads 24*a* through wire(s), and the second set of soldering pads 5131*a* is connected to the second set of soldering pads 25*a* through wire(s). In some embodiments, the first set of wires 22*a* and the second set of wires 23*a* are connected by inserting male plug(s) into female socket(s).

A quantity of the first light-source soldering pad(s) 241*a* of the first set of soldering pads 24*a* is equal to a quantity of the first set of wires 22*a* of the light strip 2*a*. The first set of wires 22*a* includes at least positive conductive wire(s) and negative conductive wire(s), both are (to be) connected to the light source(s) 202*a*, so the first set of wires 22*a* may include two sets of wires, and thus the first light-source soldering pad(s) 241*a* may include two sets disposed for corresponding to the two sets of wires. The light source(s) 202*a* may include a first set of light sources 2021*a* and a second set of light sources 2022*a*, which two sets respectively comprise different models of LEDs, such as corresponding to different color temperatures, and for the two sets the first set of wires 22*a* may include two sets of positive conductive wire(s) and one set of negative conductive wire(s), which two sets of positive conductive wire(s) are connected respectively to the first set of light sources 2021*a* and the second set of light sources 2022*a*. That is, when the light source(s) 202*a* include a first set of light sources 2021*a* and a second set of light sources 2022*a*, the first set of wires 22*a* includes at least three sets of positive conductive wire(s), and the first light-source soldering pad(s) 241*a* may include three sets. When a driving power supply for an LED tube lamp is designed to be input in a double-ended configuration, meaning pins at both end caps of the two ends of the tube lamp are used to concurrently receive the driving power supply, a line of conductive wire (a Neutral or N wire) should be included in the first set of wires 22*a* of the light strip 2*a*. In this embodiment, the first light-source soldering pad(s) 241*a* may be directly formed at terminal(s) of a wire. In other embodiments, first light-source soldering pad(s) 241*a* may be separately disposed on a light strip 2*a*, and be electrically connected to wire(s) of a first set of wires 22*a*.

A quantity of the second light-source soldering pad(s) 251*a* of the second set of soldering pads 25*a* is equal to a quantity of the second set of wires 23*a* of the light strip 2*a*. The second set of wires 23*a* includes at least positive conductive wire(s) and negative conductive wire(s), both to be connected to an emergency battery 6*a*, and both are disposed on the light strip 2*a* for connecting to the emergency battery 6*a* when the emergency battery 6*a* and a power module 5*a* are disposed respectively at two ends of the light strip 2*a*. So the second set of wires 23*a* may include two sets of wires, and thus the second light-source soldering pad(s) 251*a* may include two sets disposed for corresponding to the two sets of wires. When a driving power supply for an LED tube lamp is designed to be input in a double-ended configuration, meaning pins at both end caps of the two ends of the tube lamp are used to concurrently receive the driving power supply, a line of conductive wire (a Live or L wire) should be included in the second set of wires 23*a*. In this embodiment, the second light-source soldering pad(s) 251*a* may be directly formed at terminal(s) of a wire. In other embodiments, second light-source soldering pad(s) 251*a* may be separately disposed on a light strip 2*a*, and be electrically connected to wire(s) of the second set of wires 23*a*.

The first set of soldering pads 24*a* is at an end of the light strip 2*a* along a longitudinal direction of the light strip 2*a*, and the first set of soldering pads 5121*a* for a power module is disposed on the first circuit board 51*a* and at a distance from an end of a longitudinal direction of the first circuit board 51*a*. In some embodiments, a distance L at which a first set of soldering pads 5121*a* for the power module is disposed from an end of a longitudinal direction of the first circuit board 51*a* is in the range of 4 mm to 15 mm. In some embodiments, a distance L at which the first set of soldering pads 5121*a* for the power module (or the first set's end) is disposed from an end of a longitudinal direction of the first circuit board 51*a* is in the range of 5 mm to Such a kept distance may help maintain sufficient creepage distance.

First light-source soldering pad(s) 241*a* of a first set of soldering pads 24*a* has soldering opening 2411*a* disposed thereon, and at least some solder tin 10*a* penetrates through the soldering opening 2411*a* to be fixed to first power-module soldering pad(s) 51211*a* of the first set of soldering pads 5121*a*. Through disposing the soldering opening 2411*a*, connection strength between the first light-source soldering pad(s) 241*a* and the first power-module soldering pad(s) 51211*a*.

The second set of soldering pads 25*a* for light source(s) is located at a distance from an end of a light strip 2*a* along a longitudinal direction of the light strip 2*a*, and the second set of soldering pads 5131*a* is disposed at an end of a first circuit board 51*a*. In some embodiments, a distance at which a first set of soldering pads 5121*a* for a power module is disposed from an end of a longitudinal direction of the first circuit board 51*a* is in the range of 4 mm to 15 mm. In some embodiments, a distance at which the first set of soldering pads 5121*a* for a power module (or the first set's end) is disposed from an end of a longitudinal direction of the first circuit board 51*a* is in the range of 5 mm to 10 mm. Such a kept distance may help maintain sufficient creepage distance.

A back side of the light strip 2*a* is attached to the first side 512*a* of a first circuit board 51*a*; a first set of soldering pads 24*a* and a first set of soldering pads 5121*a* for a power module are aligned; and solder tin 10*a* is disposed on each of the first set of soldering pads 24*a* and the first set of soldering pads 5121*a*, in order to realize fixing in structure and circuit for the first set of soldering pads 24*a* and the first set of soldering pads 5121*a*. In this embodiment, the light strip 2*a* may cover part of first power-module soldering pad(s) 51211*a* of the first set of soldering pads 5121*a*, wherein the parts of the first power-module soldering pad(s) 51211*a* of the first set of soldering pads 5121*a* not covered by the light strip 2*a* are connected through solder tin 10*a*.

When the first set of soldering pads 24*a* and the first set of soldering pads 5121*a* are aligned, the second set of soldering pads 25*a* on the backside of the light strip 2*a* are aligned with the second set of the soldering pads 5131*a* on the second side of the first circuit board 51*a*. Under the circumstances the second set of soldering pads 25*a* and the second set of soldering pads 5131*a* can be fixed through solder tin 10*a*.

An end of the first circuit board 51*a* has several grooves 514 disposed thereon, which are disposed respectively corresponding to the second power-module soldering pad(s) 51311*a* of the second set of soldering pads 5131*a*. The grooves 514 have a conductive layer disposed therein, which is to be connected to the second power-module soldering pad(s) 51311*a*, and at least some solder tin 10*a* is to penetrate into the grooves 514 to connected to the conductive layer, so as to improve connection strength between the solder tin 10*a* and the second power-module soldering pad(s) 51311*a*.

As shown in FIG. 1T, in some embodiments, the first set of soldering pads 24*a* and the first set of soldering pads 5121*a* are positioned and connected through conductive pin(s) 20*a*. Specifically, the conductive pin(s) 20*a* goes through the light strip 2*a* and the first circuit board 51*a*, and solder tin is disposed at the conductive pin(s) 20*a* in order to connect the light strip 2*a*, first circuit board 51*a*, and conductive pin(s) 20*a* together and to realize conduction between the first set of soldering pads 24*a* and the first set of soldering pads 5121*a*. Conductive pin(s) 20*a* may be disposed directly at the place of the first set of soldering pads 24*a* and the first set of soldering pads 5121*a*, or directly penetrate the first set of soldering pads 24*a* and first set of soldering pads 5121*a*. In these embodiments, the first set of soldering pads 24*a* may be disposed not at an end of the light strip 2*a*, but at a distance from an end of the light strip 2*a*.

As shown in FIG. 1T, in some embodiments, the second set of soldering pads 25*a* and the second set of soldering pads 5131*a* are positioned and connected through conductive pin(s) 20*a*. Specifically, the conductive pin(s) 20*a* goes through the light strip 2*a* and the first circuit board 51*a*, and solder tin is disposed at the conductive pin(s) 20*a* in order to connect the light strip 2*a*, first circuit board 51*a*, and conductive pin(s) 20*a* together and to realize conduction between the second set of soldering pads 25*a* and second set of soldering pads 5131*a*. Conductive pin(s) 20*a* may be disposed directly at the place of the second set of soldering pads 25*a* and the second set of soldering pads 5131*a*, or directly penetrate the second set of soldering pads 25*a* and second set of soldering pads 5131*a*. In these embodiments, the second set of soldering pads 25*a* may be disposed not at an end of the first circuit board 51*a*, but disposed at a distance from an end of the first circuit board 51*a*.

Referring to FIGS. 3A to 3L, in one embodiment, a lighting system is provided and includes the LED tube lamp, the lamps base 200*a* and the fixing structure 300*a* in the above-described embodiments, such as the LED tube lamp described in any of the FIGS. 1A to 1U.

Figure 3A:
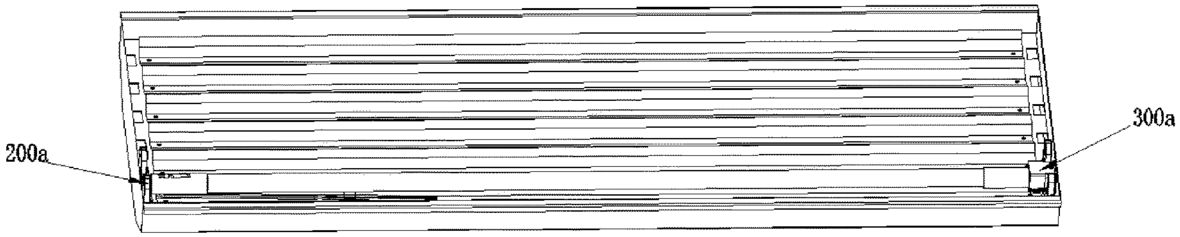
FIG. 3A is a diagram of a three-dimensional structure of a lighting system according to some embodiments.
Figure 3B:
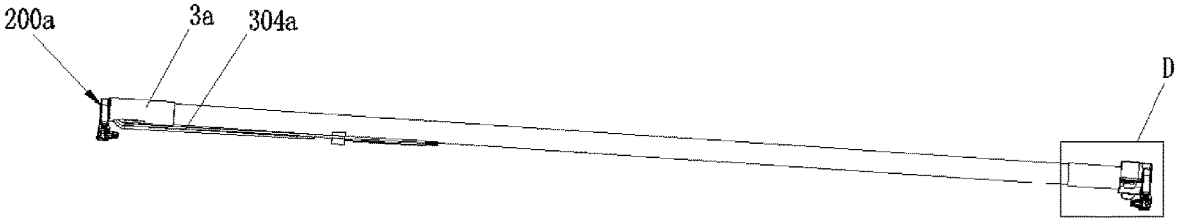
FIG. 3B is a diagram illustrating a tube lamp, a lamp base, and a fixing unit in cooperation.

As shown in FIG. 1B, an end cap 3*a* at one end of an LED tube lamp has pin(s) 305*a* disposed thereon, the pin(s) 305*a* is for connecting to a lamp base. As shown in FIG. 3D, an end cap 3*a* at the other end of the LED tube lamp has a positioning part 39*a* disposed thereon, the positioning part 39*a* is for connecting to the fixing structure 300*a*. In other words, the LED tube lamp has a first end cap and a second end cap, the first end cap has a first connection structure (as the pin(s) 305*a*) and the second end cap has a second connection structure (as the positioning part 39*a*). The first connection structure and second connection structure are different in structure to satisfy different installation needs.

In this embodiment, the fixing structure 300*a* includes a first structural part 3001*a* and a second structural part 3002*a*, wherein the first structural part 3001*a* has an opening 30011*a* disposed, and at least part of the end cap 3*a* of the LED tube lamp is inserted along its axial direction into the opening 30011*a*.

The opening 30011*a* of the first structural part 3001*a* has a backstop 30012*a* disposed, which provides support against an end surface of the end cap 3*a*. For example, when an LED tube lamp cooperates with the first structural part 3001*a*, the end surface of the end cap 3*a* of the LED tube lamp is backed against the backstop 30012*a*. The positioning part 39*a* may be disposed to protrude from the end surface of the end cap 3*a*. Gaps exist between the backstop 30012*a* and two circumferential sides, around an axial direction, of the end cap 3*a*. And the backstop 30012*a* has a positioning through hole 30013*a* to allow the positioning part 39*a* to penetrate through for performing positioning.

In this embodiment, the positioning part 39*a* may be formed as an integral part of the end cap 3*a*. The positioning part 39*a* in this embodiment includes several arms 391*a*, which are disposed to be evenly distributed around an axis of the end cap 3*a*. Each arm 391*a* is flexible due to its own material's attribute(s), and thus may comprise plastic material to have some degree of flexibility. The end of the arm 391*a* has a guiding part 3911*a* and a checking part 3912*a*, wherein the guiding part 3911*a* is disposed to guide the positioning part 39*a* to penetrate a positioning through hole 30013*a*, and the checking part 3912*a* cooperates with the backstop 30012*a* in order to limit/prevent the positioning part 39*a* from escaping out of the positioning the through hole 30013*a*.

In this embodiment, the first structural part 3001*a* of the fixing structure 300*a* has a third connection structure (as pin(s) 30014*a*), whose structure is substantially the same as that of the first connection structure and which cooperates with the lamp base 200*a*. That is, the fixing structure 300*a* and the LED tube lamp constitute a lamp system, whose one end is to connect to the lamp base 200*a* through the pin(s) 305*a* of the end cap 3*a* and whose other end is to connect to the lamp base 200*a* through pin(s) 30014*a* of the fixing structure 300*a*. The lamp base 200*a* may comprise a designation—G11, G13, or G15 base in existing technologies. In some embodiments, the pin(s) 30014*a* merely function to be fixed to the lamp base 200*a*, without having the function for electrical connection. In some embodiments, when the pin(s) 305*a*/30014*a* are merely in a fixing relationship with the lamp base 200*a*, but without the function for electrical connection, the pin(s) 305*a*/30014*a* may comprise non-metallic material(s), such as plastic material(s), or other material(s) without electrically-conductive property.

Specifically, the lamp base 200*a* includes a body 2001*a* and a rotor 2002*a*. The body 2001*a* includes a shell 20011*a* having a groove 20012*a* disposed therein, which has a circular opening. The shell 20011*a* also has an insertion path 20013*a* disposed therein, which penetrates through the shell 20011*a* along a radial direction of the circular groove 20012*a* and connects the groove 20012*a* and sideway exterior of the shell 20011*a*.

The rotor 2002*a* is disposed on the shell 20011*a* and is configured to rotate correspondingly. The rotor 2002*a* has a containing groove 20021*a* for cooperating with the pin(s) 30014*a*. When the containing groove 20021*a* corresponds with the insertion path 20013*a*, the pin(s) 30014*a* may be removed through the insertion path 20013*a*. When the rotor 2002*a* is rotated such that the containing groove 20021*a* does not correspond with the insertion path 20013*a*, the pin(s) 30014*a* is prevented from slipping out through the insertion path 20013*a*.

In this embodiment, the second structural part 3002*a* is fixed on the first structural part 3001*a*. Specifically, the second structural part 3002*a* includes a first wall 30021*a* and a second wall 30022*a*. When the second structural part 3002*a* encloses the first structural part 3001*a*, the first wall 30021*a* and the second wall 30022*a* respectively cover two sides across a widthwise direction of the first structural part 3001*a*. The first wall 30021*a* and/or the second wall 30022*a* has a first positioning unit 30023*a* disposed, the first structural part 3001*a* has a second positioning unit 30015*a* disposed, and the first positioning unit 30023*a* and the second positioning unit 30015*a* cooperate to realize fixing between the first structural part 3001*a* and the second structural part 3002*a*.

The first positioning unit 30023*a* includes wedging hole(s) 30024*a*, and the second positioning unit 30015*a* includes wedge(s) 30016*a* that can cooperate with the wedging hole(s) 30024*a*. When the wedge(s) 30016*a* is wedged or engaged into the wedging hole(s) 30024*a*, fixing between the first positioning unit 30023*a* and the second positioning unit 30015*a* is realized.

Two sides of the first structural part 3001*a* may each have a convex wall 30017*a* disposed, which has a through hole, and the wedge(s) 30016*a* is disposed on an internal wall of the through hole. That is, a first wall 30021*a* and a second wall 30022*a* of the second structural part 3002*a* are to be inserted respectively into the two convex walls 30017*a* respectively on the two sides of the first structural part 3001*a*, for positioning and for allowing or causing cooperation between the wedging hole(s) 30024*a* and the wedge(s) 30016*a*.

The second structural part 3002*a* further has a third wall 30025*a* disposed, which cooperates with the lamp base 200*a* and limits relative rotation between the first structural part 3001*a* and the lamp base 200*a*, in order to prevent the first structural part 3001*a* and the lamp base 200*a* from accidentally slipping out due to the rotor 2002*a* being rotated by some degree that allows the pin(s) 30014*a* to slip out through an insertion path 20013*a*.

The third wall 30025*a* has a backstop 30026*a* disposed, which cooperates with the lamp base 200*a* and limits relative rotation between the second structural part 3002*a* of the third wall 30025*a* and the lamp base 200*a*. That is, by the backstop 30026*a*, the third wall 30025*a* realizes limiting of relative rotation between the second structural part 3002*a* and the lamp base 200*a*. And since the first structural part 3001*a* is fixed to the second structural part 3002*a*, the limiting of relative rotation eventually limits relative rotation between the first structural part 3001*a* and the lamp base 200*a*. In this embodiment, the backstop 30026*a* is inserted through the insertion path 20013*a*, in order to limit rotation of the backstop 30026*a* through the insertion path 20013*a*. In some embodiments, two backstops 30026*a* may be disposed (not illustrated), which are respectively disposed at two sides of the lamp base 200*a* in order to limit relative rotation between the second structural part 3002*a* of the third wall 30025*a* and the lamp base 200*a*.

The second structural part 3002*a* may have a fourth wall 30027*a* disposed, which is connected to the third wall 30025*a*. The fourth wall 30027*a* is disposed on the back side of the lamp base 200*a*, which is opposite to the side of the lamp base 200*a* having the rotor 2002*a* disposed, in order to further improve structural stability.

The end cap 3*a* at the end of an LED tube lamp in this embodiment has a positioning part 39*a* disposed, and another end cap 3*a* at the other end of the LED tube lamp may have pin(s) disposed. When in use, the end cap 3*a* having pin(s) disposed may be directly installed to the matching lamp base 200*a*, and the end cap 3*a* having the positioning part 39*a* disposed may be fixed to the matching lamp base 200*a* through the fixing structure 300*a*.

In this embodiment, the pin(s) on the end cap 3*a* may function for physically fixing only (without electrical signal transition).

As shown in FIGS. 4A to 4F, a fixing structure 400*a* is provided, whose fundamental structure is the same as that of the fixing structure 300*a* in the above described embodiments, with a difference in fixing between a first structural part 4001*a* and a second structural part 4002*a* of the fixing structure 400*a*.

Specifically, the fixing structure 400*a* includes a first structural part 4001*a* and a second structural part 4002*a*, wherein the fixing structure or way of cooperation between the first structural part 4001*a* and the end cap of an LED tube lamp is the same as that in the above described embodiments.

Similarly, the second structural part 4002*a* is fixed on the first structural part 4001*a*. Specifically, the second structural part 4002*a* is fixed onto the first structural part 4001*a* through an engaging structure 500*a*. The engaging structure 500*a* includes a first engaging structural part 5001*a* and a second engaging structural part 5002*a*, wherein the first engaging structural part 5001*a* is disposed on the first structural part 4001*a* and the second engaging structural part 5002*a* is disposed on the second structural part 4002*a*. Through cooperation between the first engaging structural part 5001*a* and the second engaging structural part 5002*a*, fixing between the second structural part 4002*a* and the first structural part 4001*a* may be realized.

The first engaging structural part 5001*a* may comprise a hook (whose structure may be largely the same as that of the positioning part 39*a* in the above described embodiments), while the second engaging structural part 5002*a* may comprise a catching hole, wherein when the first engaging structural part 5001*a* penetrates the second engaging structural part 5002*a*, fixing between the first engaging structural part 5001*a* and the second engaging structural part 5002*a* is realized. Without breaking the engaging structure 500*a*, the first engaging structural part 5001*a* and the second engaging structural part 5002*a* may not be separated.

The second structural part 4002*a* includes a body 40023*a*, which may be applied to cover the surface of the first structural part 4001*a*. And the second engaging structural part 5002*a* is disposed on the body 40023*a*.

The second structural part 4002*a* may similarly include a first wall 40021*a* and a second wall 40022*a*, disposed respectively on two sides of the body 40023*a*. When the second structural part 4002*a* encloses the first structural part 4001*a*, the first wall 40021*a* and the second wall 40022*a* respectively cover two sides across a widthwise direction of the first structural part 4001*a*, thus improving the stability in cooperation between the second structural part 4002*a* and the first structural part 4001*a* and limiting relative rotation between the second structural part 4002*a* and the first structural part 4001*a*.

Two sides of the first structural part 4001*a* may each have a convex wall 40017*a* disposed, which has a through hole 40018*a*, and a first wall 40021*a* and a second wall 40022*a* of the second structural part 4002*a* are inserted respectively into through holes 40018*a* respectively of the convex walls 40017*a* respectively on the two sides of the first structural part 4001*a*. This structure can further limit relative motion between the first structural part 4001*a* and the second structural part 4002*a* and thus improve structural stability.

In this embodiment, the hardness and/or flexibility of the material(s) of the second structural part 4002*a* is larger than that of the first structural part 4001*a*.

Besides, as in the above mentioned embodiment(s), the second structural part 4002*a* may have one or more of a third wall 40025*a*, a backstop 40026*a*, and a fourth wall 40027*a*, wherein the structure and function of each of which are largely the same as those of such components in the above described embodiments and thus are not repeatedly described here.

As shown in FIGS. 3A-3L, and 4A-4J, in this embodiment, an LED tube lamp is installed between two parts of a lamp base configured to correspond to each other. A distance A is between end surfaces respectively of two end caps 3*a* of the LED tube lamp. When a fixing structure 300*a* (or fixing structure 400*a*) is coupled to (one end of) the LED tube lamp, a distance B is between an end surface of its first structural part 3001*a* (or first structural part 4001*a*) and an end surface of the end cap 3*a* at the other end of the LED tube lamp (which is the end not connected to the fixing structure 300*a*).

When a distance C is between the two parts of the lamp base, the distances A and C satisfy the relationship: $0.9C<A<0.995C$, and the distances C and B satisfy the relationship: $0.95C\leq B\leq C$. When the distances A and C satisfy this mentioned relationship, an LED tube lamp for use with such a lamp base has relatively longer longitudinal dimension for permitting the passage of light. When the distances C and B satisfy this mentioned relationship, the installation needs may be satisfied for cooperation between a first structural part 4001*a* installed onto an LED tube lamp (to constitute a lamp system) and such a lamp base.

When the distance 300 mm is between the two parts of a lamp base, the distances A and C satisfy the relationship: $0.9C<A<0.94C$, and the distances C and B satisfy the relationship: $0.95C\leq B\leq C$.

When the distance 600 mm is between the two parts of a lamp base, the distances A and C satisfy the relationship: $0.94C<A<0.98C$, and the distances C and B satisfy the relationship: $0.98C\leq B\leq C$.

When the distance 900 mm is between the two parts of a lamp base, the distances A and C satisfy the relationship: 0.97C<A<0.99C, and the distances C and B satisfy the relationship: 0.99C≤B≤C.

When the distance 1200 mm is between the two parts of a lamp base, the distances A and C satisfy the relationship: 0.98C<A<0.995C, and the distances C and B satisfy the relationship: 0.992C≤B≤C.

When the distance 1500 mm is between the two parts of a lamp base, the distances A and C satisfy the relationship: 0.98C<A<0.995C, and the distances C and B satisfy the relationship: 0.995C≤B≤C.

In this embodiment, the end cap 3*a* at one end of an LED tube lamp is connected to a lamp base through pin(s) and the end cap 3*a* at the other end of the LED tube lamp is connected to a lamp base through the first structural part 4001*a*. In this embodiment, the distances A and C satisfy the relationship: 0.95A<B<0.995A, meaning a completed connection of the first structural part 4001*a* and the corresponding end cap 3*a* and lamp base needs to extend a longitudinal dimension in the range of 0.005A~0.05A. In one embodiment where the first structural part 4001*a* is installed to the LED tube lamp to constitute a lamp system, the first structural part 4001*a* along a longitudinal direction of the lamp system runs a length less than 20 mm, 15 mm, or 12 mm. That is, the difference between the length of the lamp system, or the distance B, and the length of the LED tube lamp, or the distance A, is less than 20 mm, 15 mm, or 12 mm, but needs to be larger than 5 mm or 8 mm. The difference may be regarded as a longitudinal dimension of the first structural part 4001*a* along a longitudinal direction of the LED tube lamp.

In this embodiment, one end cap 3*a* (which internally has a power module disposed) has a hole for threading, to allow a conductive wire 304*a* (or a connection part) on or connected to the power module to be passed out through the threading hole of the end cap 3*a*. The conductive wire 304*a* may be connected to an external power source (such as line power or Utility Power), or be electrically connected to a lamp fixture for providing power to the LED tube lamp. As illustrated in FIG. 3B, a threading hole is disposed on a side wall of the end cap 3*a*.

In some embodiments, a threading hole 303*a* is disposed in a different position. As shown in FIGS. 4A-4D and 4G-4I, a threading hole 303*a* is disposed at a conjunction between an end wall and a side wall of the end cap 3*a* (which is not connected to the fixing structure 400*a*). Specifically, along an axial direction of the end cap 3*a*, the threading hole 303*a* is linked to the interior of the end cap 3*a*, meaning along an axial direction of the end cap 3*a* the contour of the threading hole 303*a* is projected to the internal space of the end cap 3*a*. In other words, when facing an end surface of the end cap 3*a* along an axial direction of the end cap 3*a*, internal space of the end cap 3*a* can be seen through the threading hole 303*a*. With this configuration, when a conductive wire 304*a* penetrates out through the threading hole 303*a*, the conductive wire 304*a* may directly penetrate out through the threading hole 303*a* along a longitudinal direction of the end cap 3*a*, without the need of bending the conductive wire 304*a* to penetrate out through the side wall of the end cap 3*a*, and therefore the difficulty in crafting for threading a conductive wire is reduced. Along a radial direction of the end cap 3*a*, the threading hole 303*a* is linked to the internal space of the end cap 3*a*, and thus the contour of the threading hole 303*a* is projected to internal space of the end cap 3*a* along a radial direction of the end cap 3*a*. In other words, when facing a side surface of an end cap 3*a* along a radial direction of the end cap 3*a*, internal space of the end cap 3*a* can be seen through the threading hole 303*a*. With this configuration, when the conductive wire 304*a* penetrates out through the threading hole 303*a*, the conductive wire 304*a* may be bent and led out along a radial direction of the end cap 3*a*, in order to prevent the conductive wire 304*a* from occupying the exterior outside an end wall of the end cap 3*a* and from impacting cooperation between the end wall of the end cap 3*a* and a corresponding lamp base.

In these above embodiments, when the conductive wire 304*a* penetrates out through the threading hole 303*a*, the threading hole 303*a* may then have some space for convection for heat dissipation, in order to improve the ability of the interior of the end cap 3*a* to dissipate heat. For example, when the conductive wire 304*a* penetrates out through the threading hole 303*a*, the area on the threading hole 303*a* that can be used for convection for heat dissipation, or the area not occupied by the conductive wire 304*a*, is at least 1%, 2%, 3%, 4%, or 5% of the total area on the threading hole 303*a*. Besides, to prevent the conductive wire 304*a* from being loose, the area on the threading hole 303*a* that can be used for convection for heat dissipation, or the area not occupied by the conductive wire 304*a*, does not exceed 20% of the total area on the threading hole 303*a*.

As shown in FIGS. 5A to 8, a fixing structure 600*a* is provided, whose fundamental structure is the same as that of the fixing structure 300*a* (or fixing structure 400*a*) in the above described embodiments, and applicable with an LED tube lamp of the present invention. The difference from the fixing structure in the above described embodiments is in the specific structure of the fixing structure 600*a*.

The fixing structure 600*a* includes a first structural part 6001*a* and a second structural part 6002*a*, wherein the first structural part 6001*a* and the second structural part 6002*a* may comprise separate parts to form a structure or comprise an integral structure. In this embodiment, the first structural part 6001*a* and the second structural part 6002*a* comprise separate parts to form a structure.

The end cap 3*a* at one end of the LED tube lamp has pin(s) 305*a* disposed, the pin(s) 305*a* is for connecting to the lamp base. The end cap 3*a* at the other end of the LED tube lamp has a positioning part 39*a* disposed, which is for connecting to the fixing structure 600*a*. In other words, the LED tube lamp has a first end cap and a second end cap, the first end cap has a first connection structure (as the pin(s) 305*a*) and the second end cap has a second connection structure (as the positioning part 39*a*). The first connection structure and the second connection structure are different in structure to satisfy different installation needs. In other embodiments, a fixing structure 600*a* and an end cap 3*a* may comprise an integral structure.

In this embodiment, the first structural part 6001*a* has an opening 60011*a* disposed, and at least part of the end cap 3*a* of the LED tube lamp is inserted along its axial direction into the opening 60011*a*.

The opening 60011*a* of the first structural part 6001*a* has a backstop 60012*a* disposed, which is a stop against an end surface of the end cap 3*a*. For example, when an LED tube lamp cooperates with a first structural part 6001*a*, an end surface of an end cap 3*a* of the LED tube lamp is backed against a backstop 60012*a*. A positioning part 39*a* may be disposed to protrude from the end surface of an end cap 3*a*. Gaps exist between the backstop 60012*a* and two circumferential sides, around an axial direction, of the end cap 3*a*, and the backstop 60012*a* has a positioning through hole 60013*a* disposed to allow the positioning part 39*a* to penetrate through for performing positioning. By this way, the positioning part 39*a* is secured against being pulled out from the positioning through hole 60013*a* without breaking the structure of their combination, so as to achieve the fixing between the fixing structure 600*a* and the end cap 3*a*. In this embodiment, an end surface of the end cap 3*a* for cooperation with a fixing structure 600*a* has heat-dissipation hole(s) disposed which is not blocked or is only partially blocked by a backstop 60012*a*, so that the heat-dissipation hole(s) connects to a space between the backstop 60012*a* and an end wall of the first structural part 6001*a* for better heat dissipation. In the embodiment of FIGS. 5A to 8, a space between a backstop 60012*a* and an end wall of a first structural part 6001*a* can perform heat dissipation through a hole on a pin 60014*a* and/or a hole on the end wall of the first structural part 6001*a*.

In this embodiment of FIGS. 5A to 8, the positioning part 39*a* may be formed as an integral part of the end cap 3*a*. The positioning part 39*a* in this embodiment may include several arms 391*a*, which are disposed to be evenly distributed around an axis of the end cap 3*a*. Each arm 391*a* is flexible due to its constituent material's attribute/property, and thus may comprise plastic material to have some degree of flexibility. An end of the arm 391*a* has a guiding part 3911*a* and a checking part 3912*a*, wherein the guiding part 3911*a* is disposed to guide the positioning part 39*a* to penetrate through a positioning through hole 30013*a*, and the checking part 3912*a* is disposed to cooperate with a backstop 30012*a* in order to limit/prevent the positioning part 39*a* from escaping out of the positioning through hole 60013*a*. In this embodiment of FIGS. 5A to 8, two arms 391*a* are disposed with an interval between them to allow them to have room for their deformation, which can facilitate connecting of the positioning part 39*a* to the fixing structure 600*a*.

In this embodiment, the positioning through hole 60013*a* is a long hole with circular cross-section, and the surface contour of a positioning part 39*a* matches the shape of the positioning through hole 60013*a*, so after the positioning part 39*a* is inserted into the positioning through hole 60013*a*, the positioning part 39*a* limits relative rotation between the end cap 3*a* and the first structural part 6001*a*. In other embodiments, a cross-section of the positioning through hole 60013*a* may have another shape which is not circular, so as to prevent relative rotation between the end cap 3*a* and the first structural part 6001*a* after the insertion.

In this embodiment, the end cap 3*a* and the first structural part 6001*a* are positioned by a positioning unit, in order to allow aligning of the end cap 3*a* and first structural part 6001*a* through the positioning unit when the end cap 3*a* cooperates with the first structural part 6001*a*.

The positioning unit includes a first positioning unit 701*a* and a second positioning unit 702*a* which mutually cooperate. The first positioning unit 701*a* is disposed on a first structural part 6001*a*, and the second positioning unit 702*a* is disposed on the end cap 3*a*. The first positioning unit 701*a* is a positioning protrusion, which protrudes from an internal wall of the first structural part 6001*a*. The second positioning unit 702*a* is a positioning groove disposed on the end cap 3*a*. When the positioning protrusion is aligned with the positioning groove, the end cap 3*a* can be inserted to the first structural part 6001*a*; otherwise, the end cap 3*a* cannot be inserted to the first structural part 6001*a*. In this embodiment, when the positioning protrusion is aligned with the positioning groove, it follows that the positioning part 39*a* is aligned with the positioning through hole 60013*a*.

In this embodiment, a first structural part 6001*a* of a fixing structure 600*a* has a third connection structure (as pin(s) 60014*a*), whose structure is largely the same as that of the first connection structure (as pin(s) 305*a* on an end cap 3*a*) and which cooperates with a lamp base. That is, the fixing structure 600*a* and an LED tube lamp constitute a lamp system, whose one end is to connect to a part of the lamp base through pin(s) 305*a* of the end cap 3*a* and whose other end is to connect to another part of the lamp base through pin(s) 60014*a* of the fixing structure 600*a*. The lamp base may comprise a designation—G11, G13, or G15 base in existing technologies. In some embodiments, the pin(s) merely function to be fixed to a lamp base, without having the function for electrical connection. In some embodiments, the pin(s) 305*a*/60014*a* not only function to be fixed to a lamp base, but also function for electrical connection. When the pin(s) 305*a*/60014*a* are merely in a fixing relationship with a lamp base, but don't have the function for electrical connection, the pin(s) 305*a*/60014*a* may comprise non-metallic material(s), such as plastic material(s), or other material(s) without electrically-conductive property.

Figure 3C:
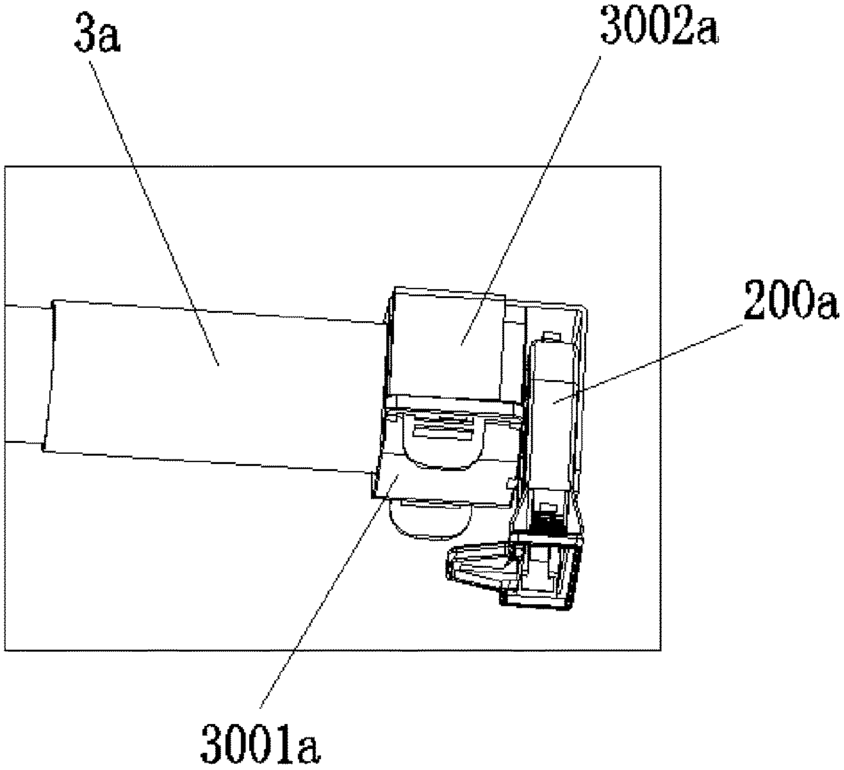
FIG. 3C is an enlargement view of the enclosed portion D of the structure of FIG. 3B.
Figure 3D:
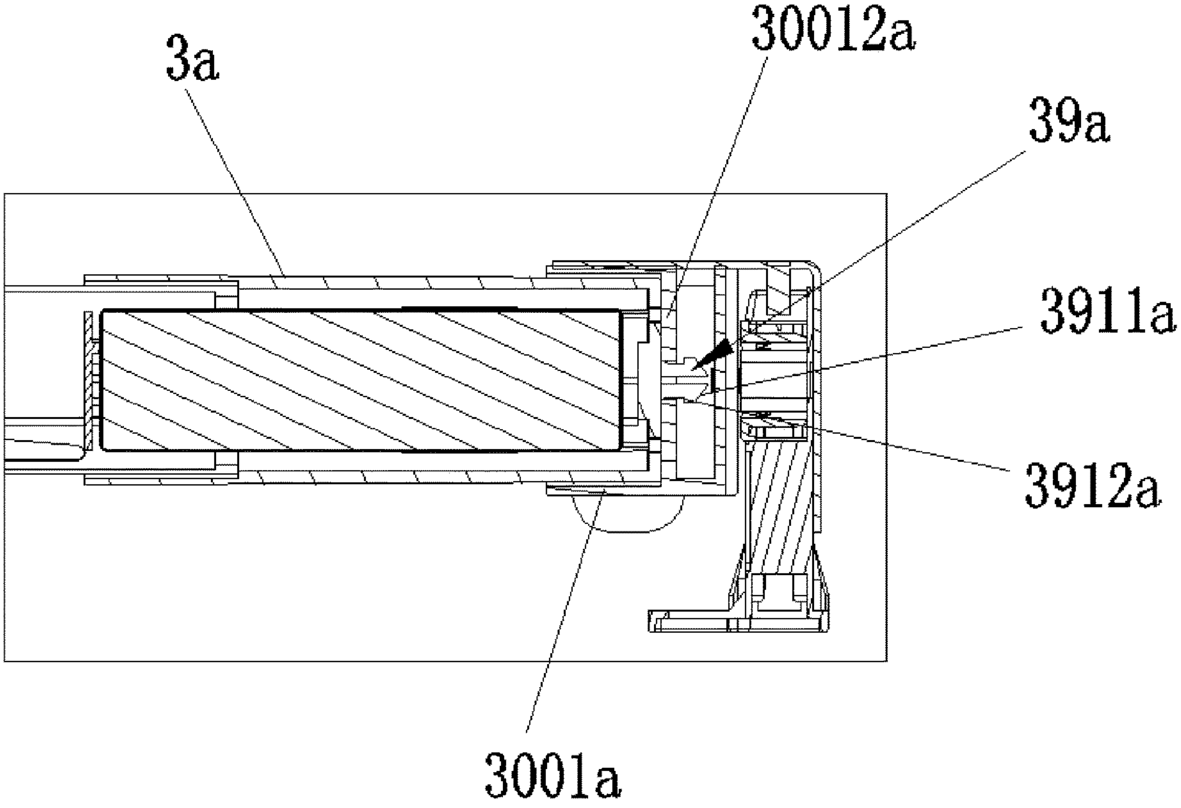
FIG. 3D is a topical cross-sectional diagram of a tube lamp, a lamp base, and a fixing unit in cooperation.
Figure 3E:
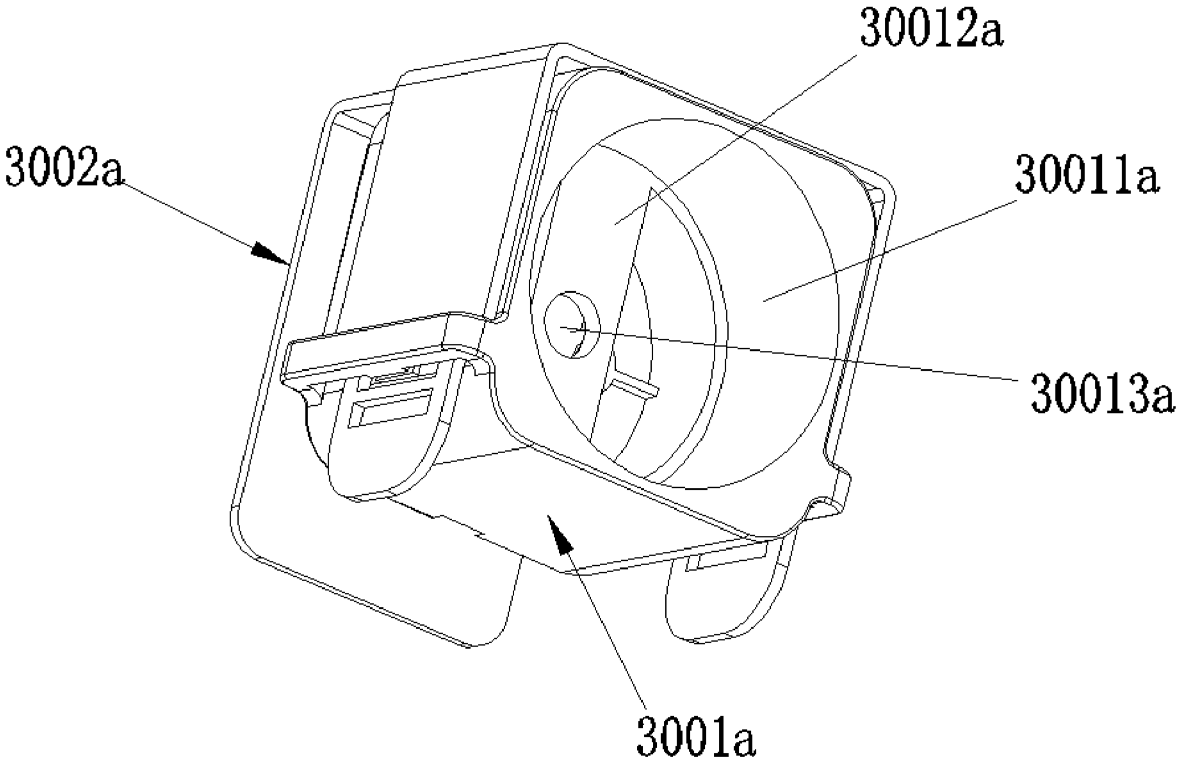
FIG. 3E is a first diagram of a three-dimensional structure of a fixing unit.
Figure 3F:
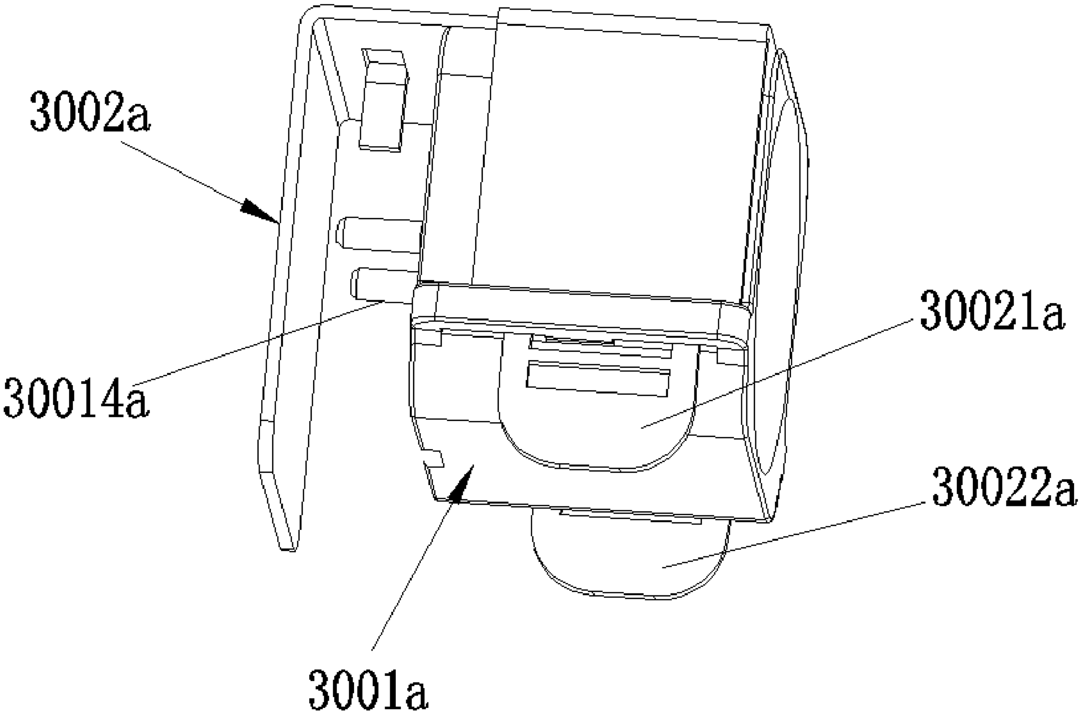
FIG. 3F is a second diagram of a three-dimensional structure of a fixing unit.
Figure 3G:
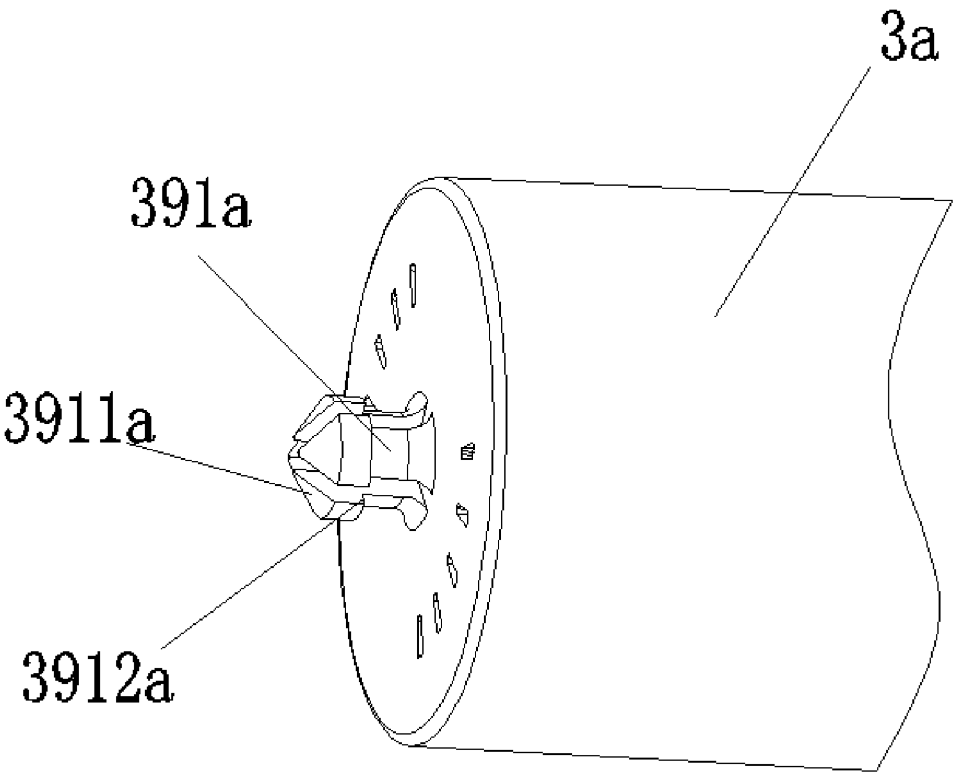
FIG. 3G is a topical diagram of an end cap.
Figure 3H:
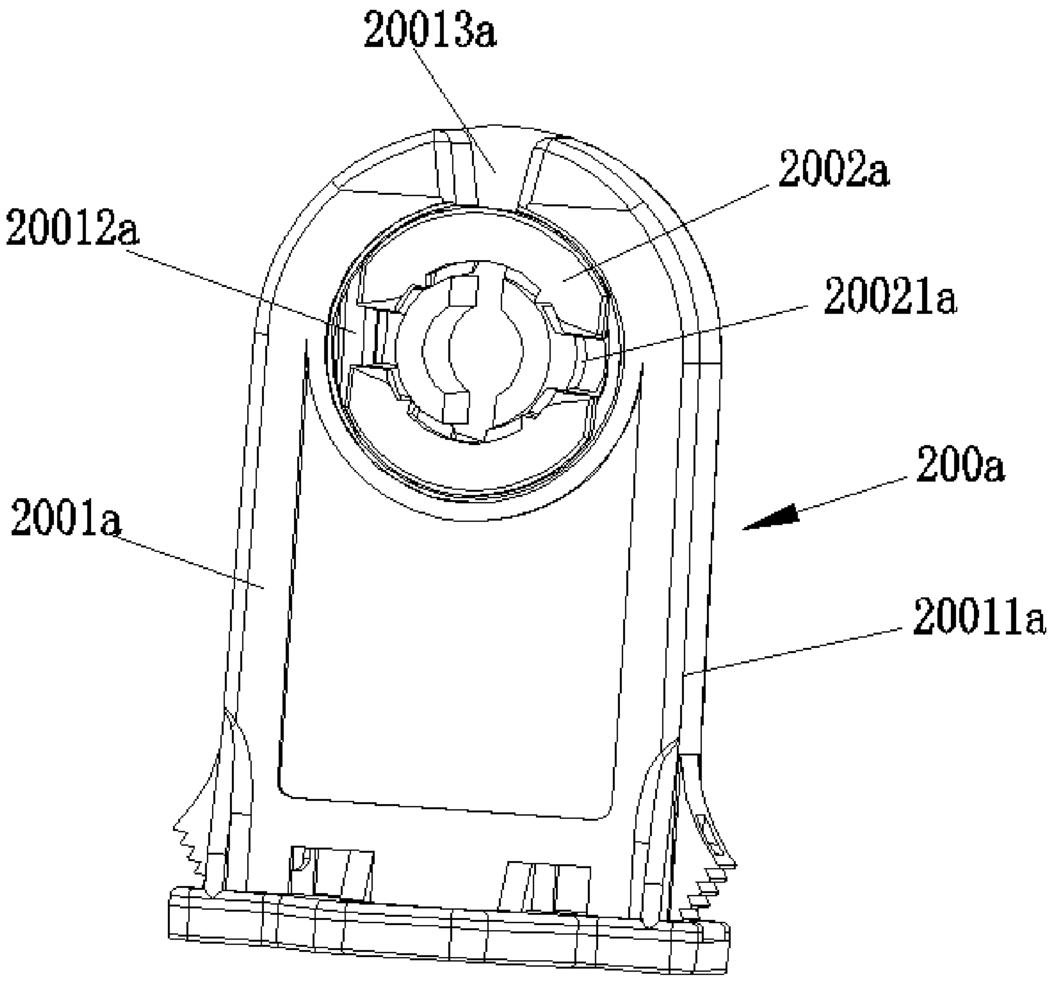
FIG. 3H is a diagram of a three-dimensional structure of a lamp base.
Figure 3I:
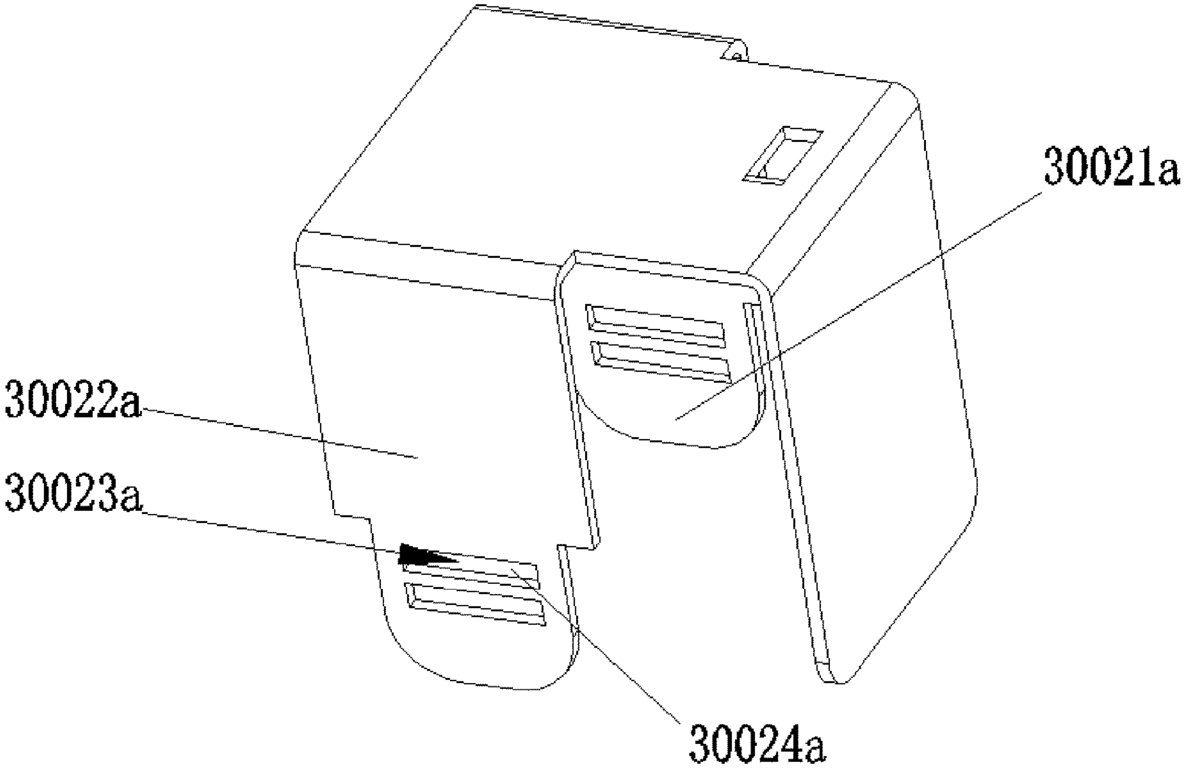
FIG. 3I is a first diagram of a three-dimensional structure of a second structural part.
Figure 3J:
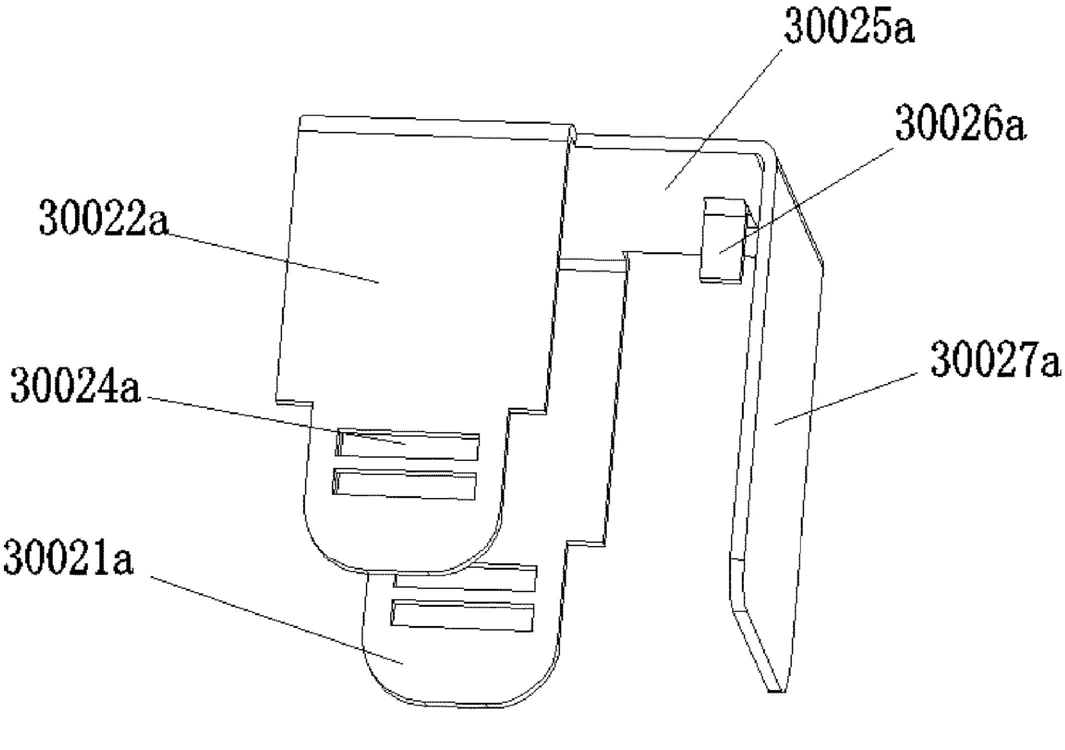
FIG. 3J is a second diagram of a three-dimensional structure of a second structural part.
Figure 3K:
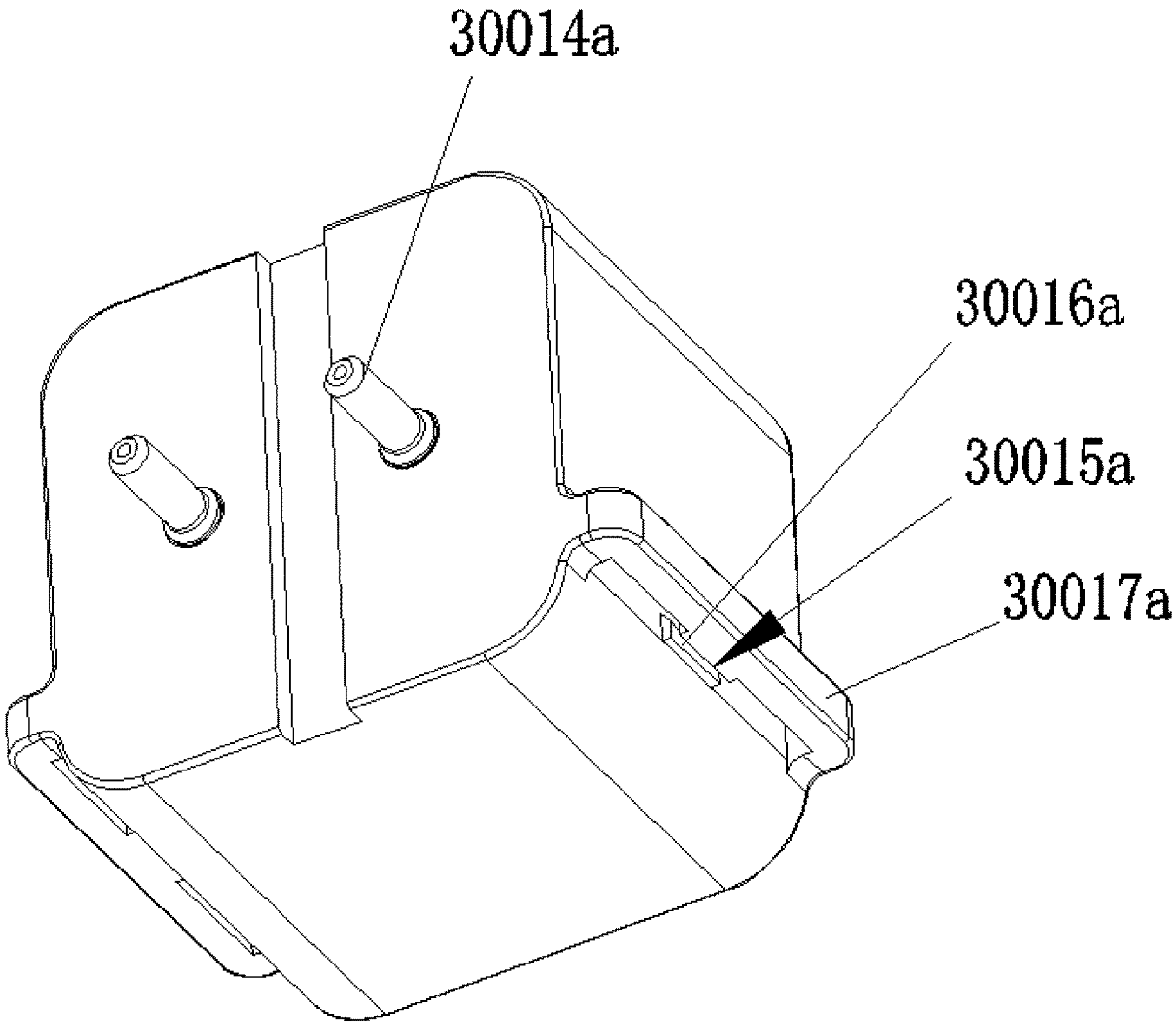
FIG. 3K is a first diagram of a three-dimensional structure of a first structural part.
Figure 3L:
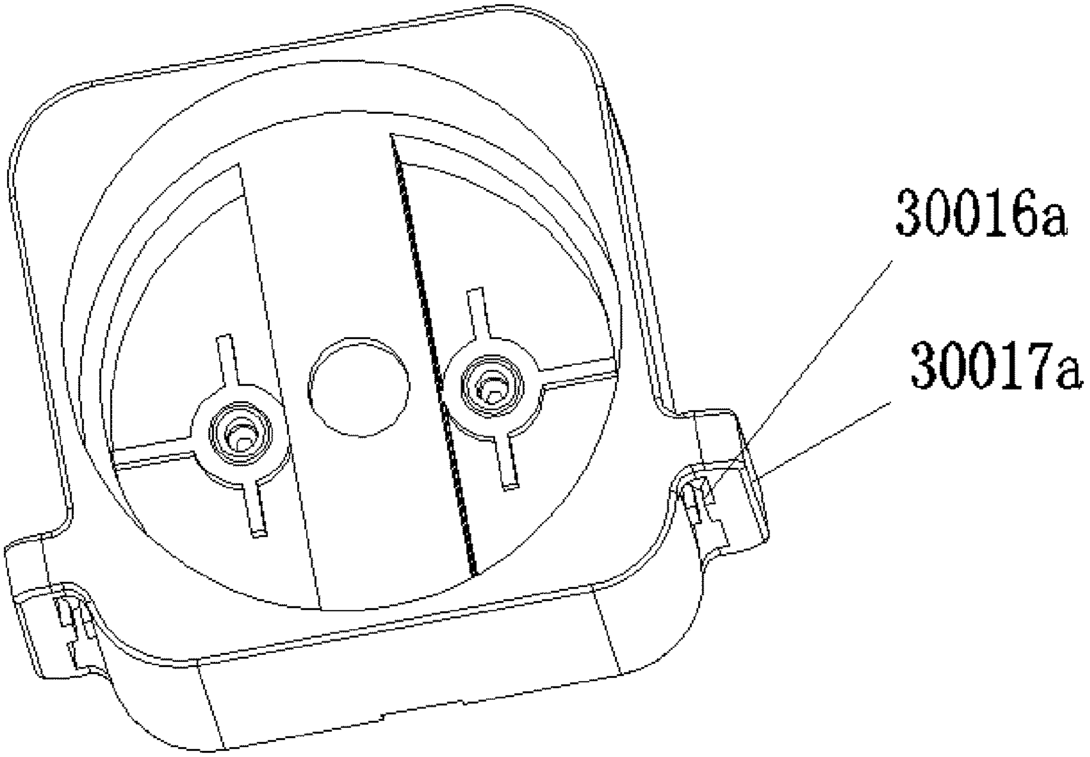
FIG. 3L is a second diagram of a three-dimensional structure of a first structural part.
Figure 4A:
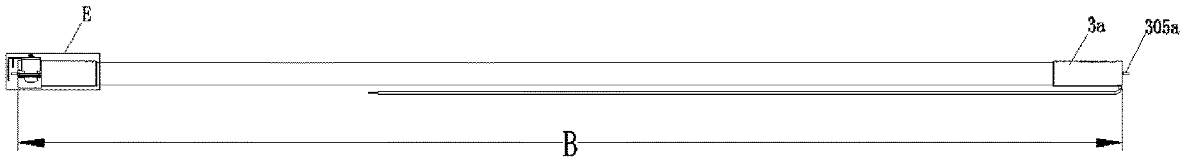
FIG. 4A is an overall view of an LED tube lamp according to some embodiments.
Figure 4B:
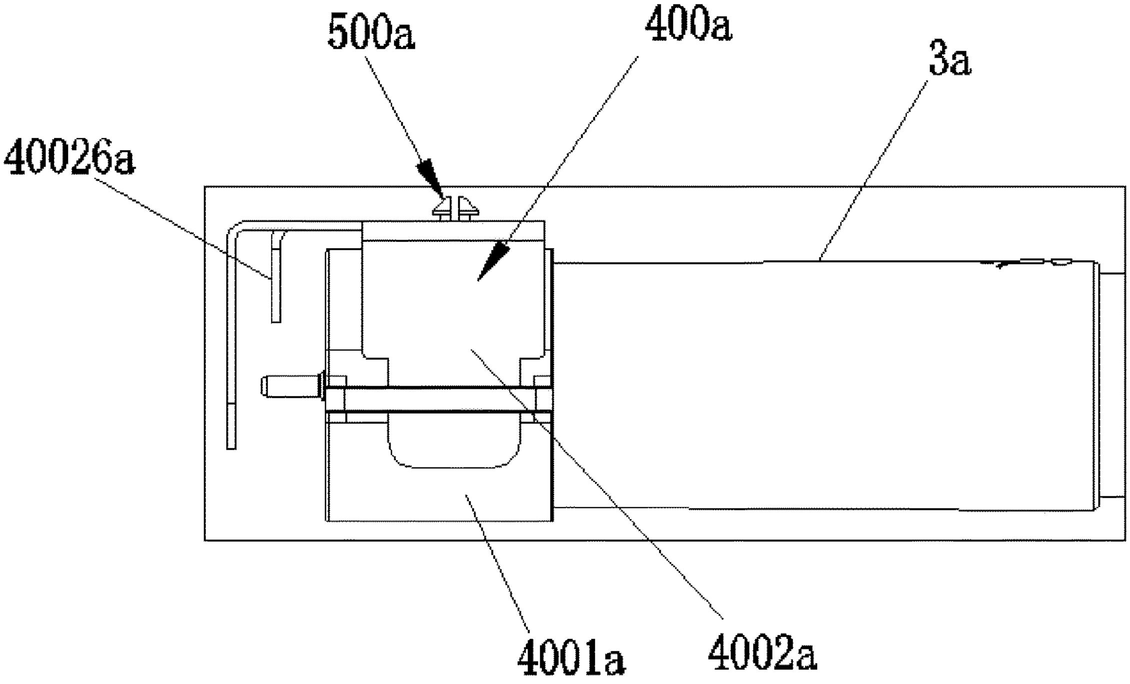
FIG. 4B is an enlargement view of the enclosed portion E of the LED tube lamp of FIG. 4A.
Figure 4C:
FIG. 4C is a first diagram of a three-dimensional structure of an LED tube lamp according to some embodiments.
Figure 4D:
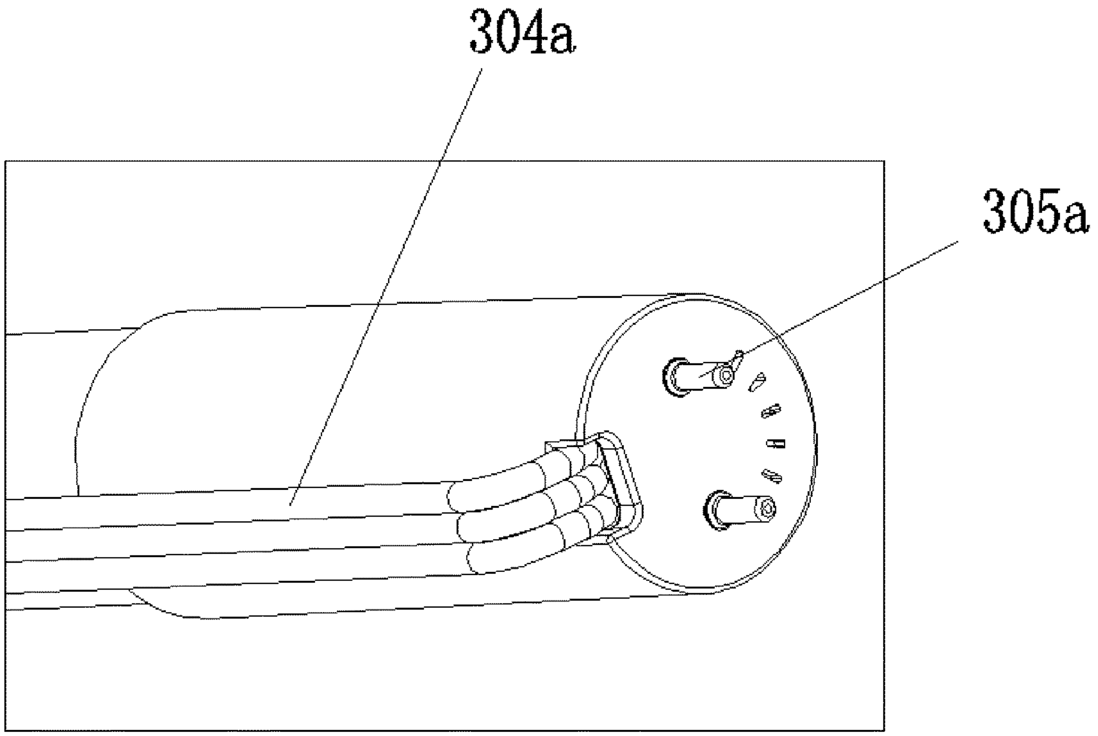
FIG. 4D is an enlargement view of the enclosed portion F of the LED tube lamp of FIG. 4C.
Figure 4E:
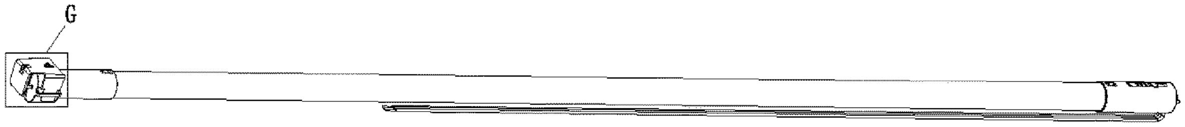
FIG. 4E is a second diagram of a three-dimensional structure of an LED tube lamp according to some embodiments.
Figure 4F:
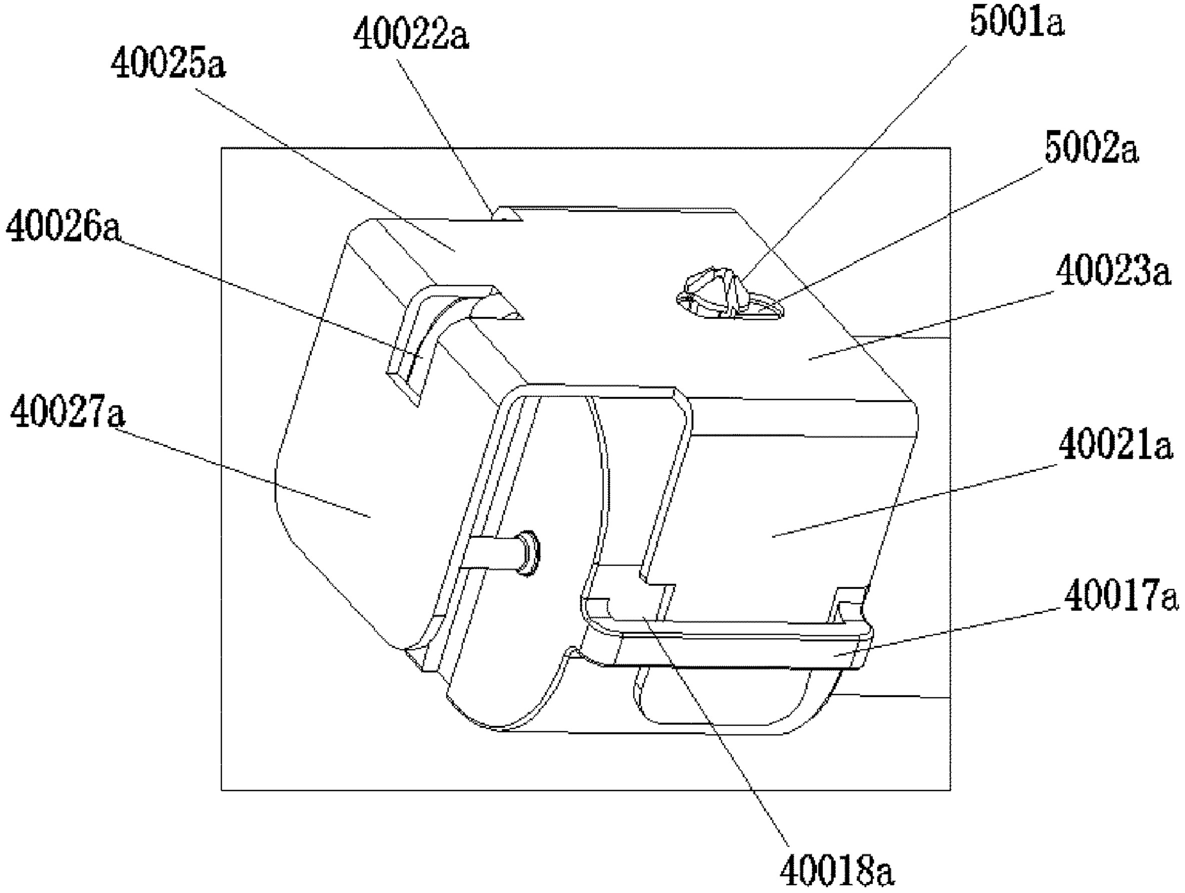
FIG. 4F is an enlargement view of the enclosed portion G of the LED tube lamp of FIG. 4E.
Figure 4G:
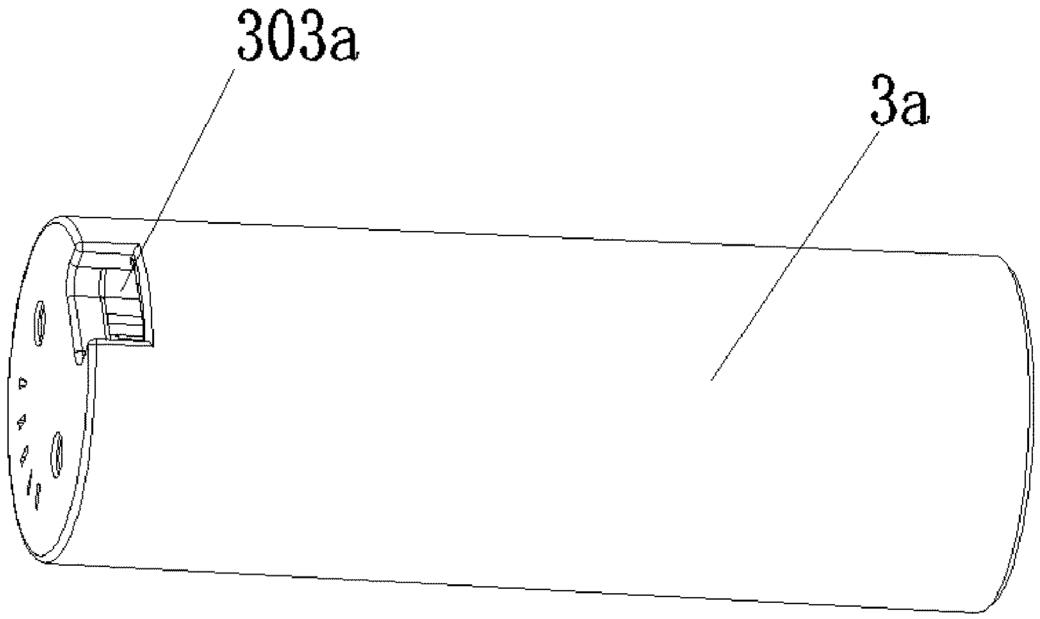
FIG. 4G is a diagram of a three-dimensional structure of an end cap.
Figure 4H:
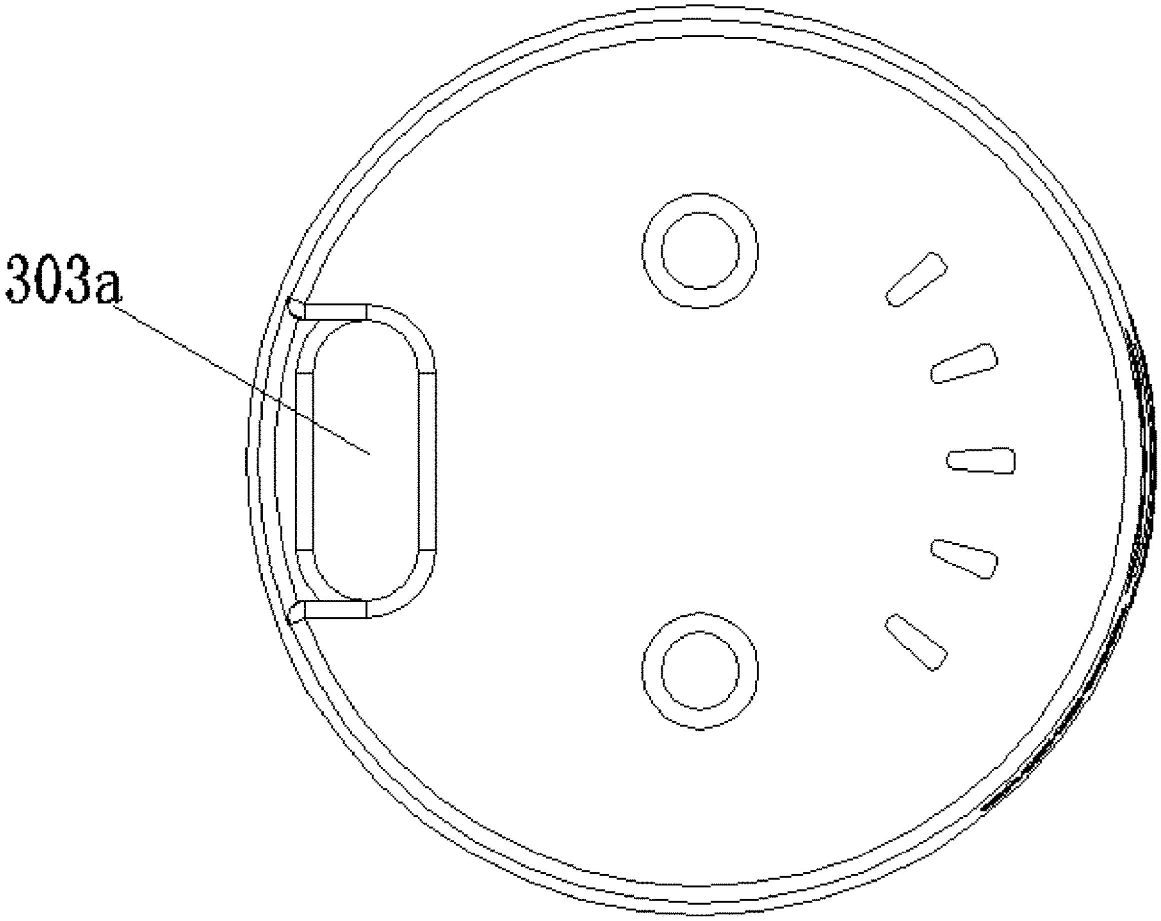
FIG. 4H is a perspective view along an axial direction of a structure of an end cap.
Figure 4I:
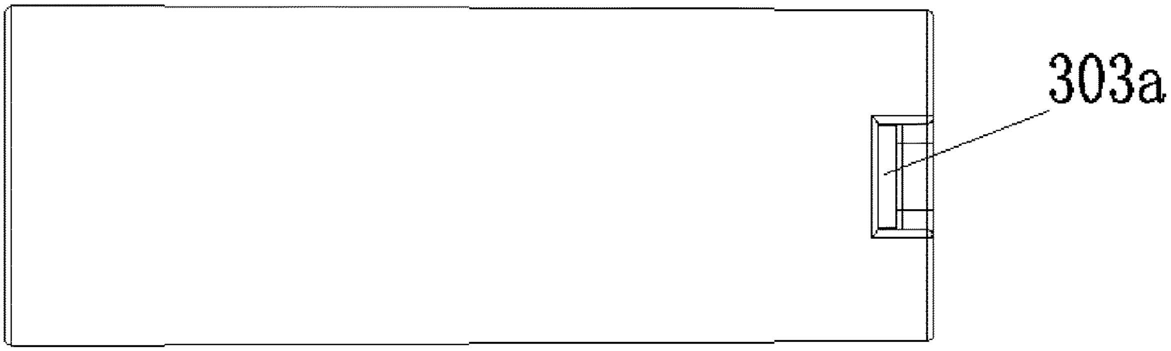
FIG. 4I is a perspective view along a sideway direction of the structure of an end cap of FIG. 4H.
Figure 4J:
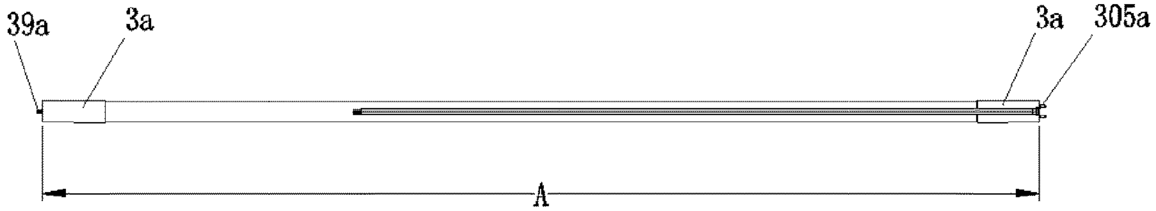
FIG. 4J is an overall view of an LED tube lamp according to some embodiments.
Figure 5A:
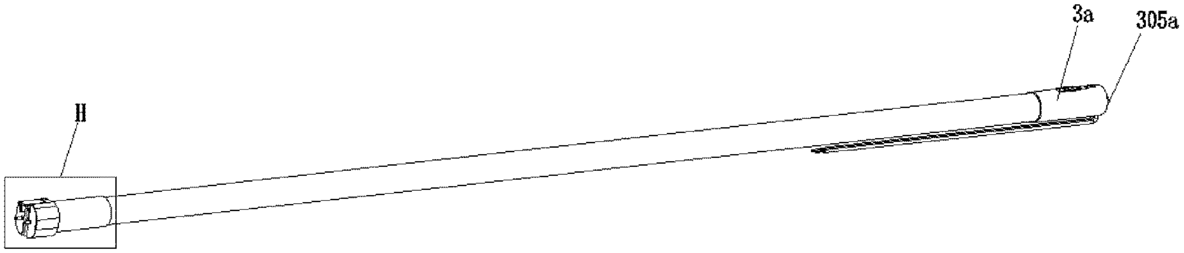
FIG. 5A is a diagram of a three-dimensional structure of an LED tube lamp according to some embodiments.
Figure 5B:
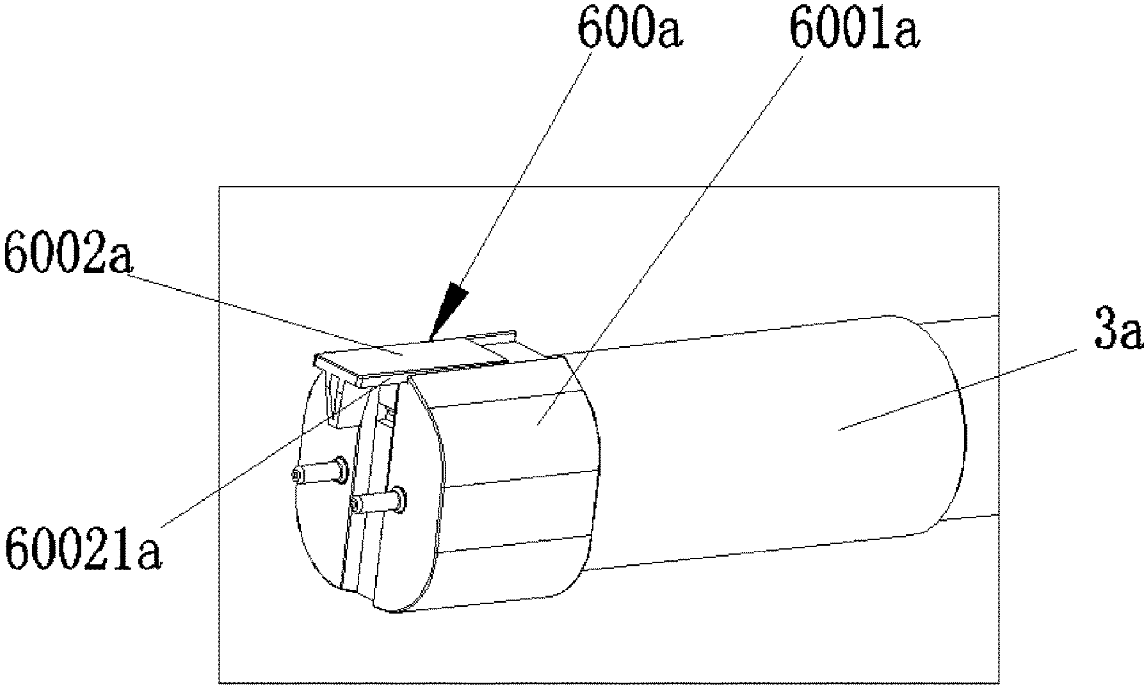
FIG. 5B is an enlargement view of the enclosed portion H of the LED tube lamp of FIG. 5A.
Figure 5C:
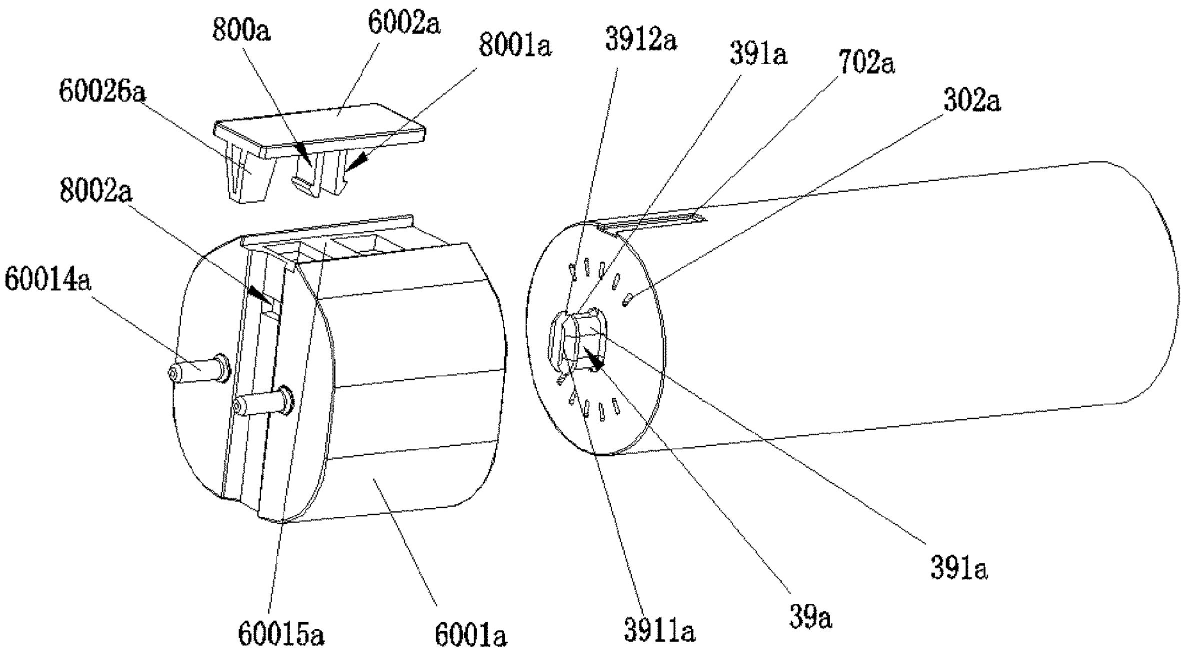
FIG. 5C is an exploded view of a structure of a fixing unit.
Figure 5D:
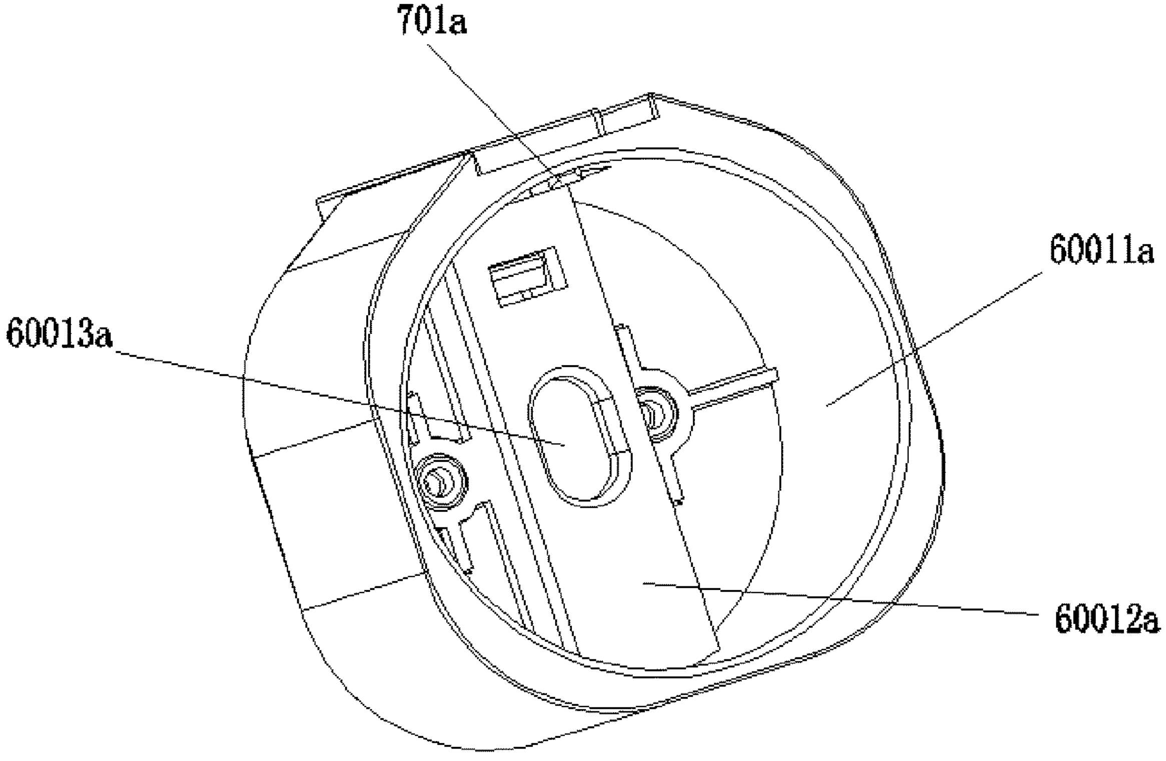
FIG. 5D is a diagram of a three-dimensional structure of a fixing unit.
Figure 6:
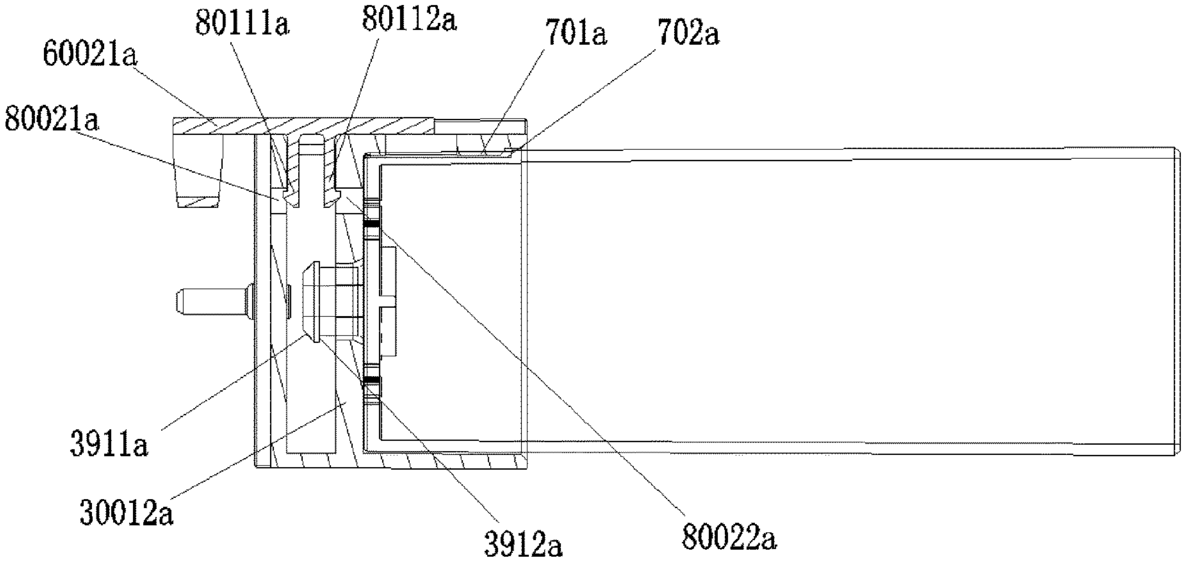
FIG. 6 is a cross-sectional diagram of a structure of a fixing unit cooperating with an end cap.
Figure 7:
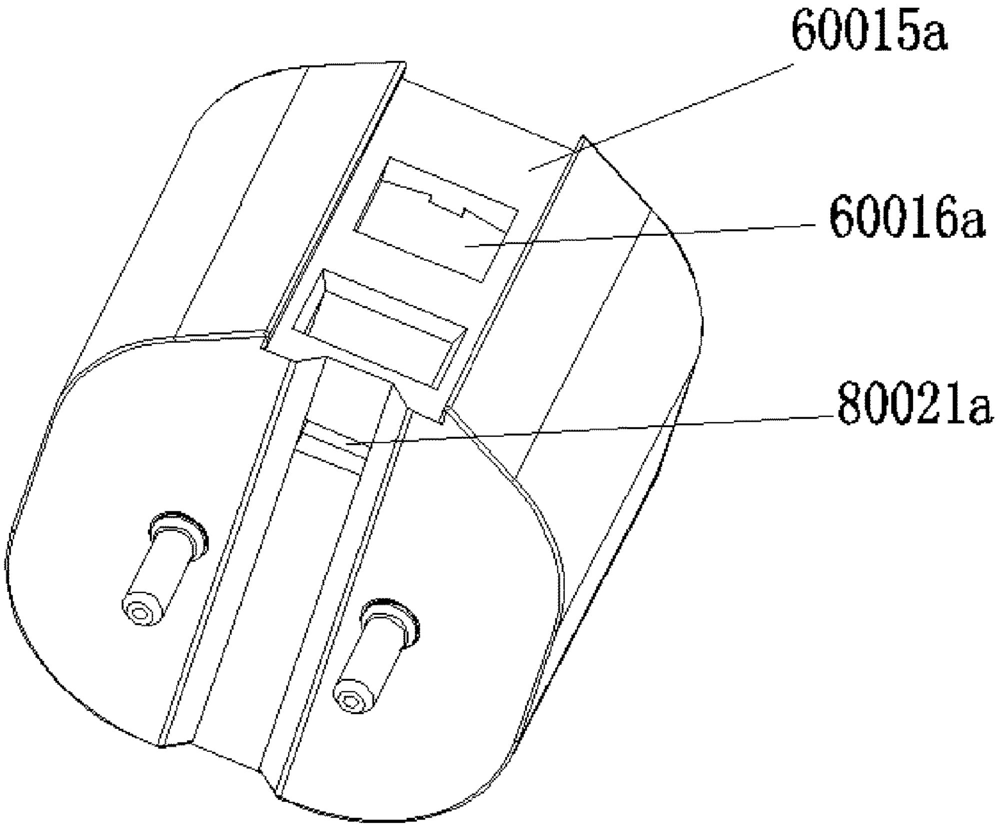
FIG. 7 is a diagram of a three-dimensional structure of a first structural part.
Figure 8:
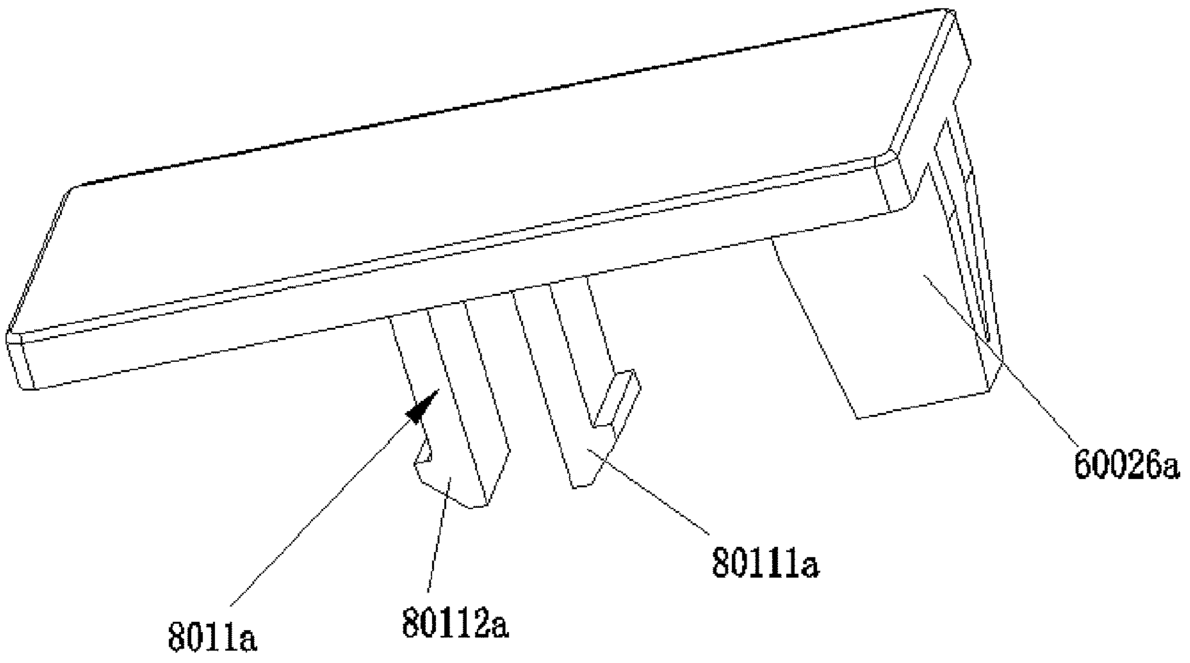
FIG. 8 is a diagram of a three-dimensional structure of a second structural part.

Referring to FIGS. 3C, 3D, and 3H, a specific structure of a lamp base is as described in the above mentioned embodiments, that is, a lamp base 200*a* includes a body 2001*a* and a rotor 2002*a*. The body 2001*a* includes a shell 20011*a* having a groove 20012*a* disposed, which has a circular opening. The shell 20011*a* also has an insertion path 20013*a* disposed, which penetrates through the shell 20011*a* along a radial direction of the groove 20012*a* and connects the groove 20012*a* and sideway exterior of the shell 20011*a*.

The rotor 2002*a* is disposed on the shell 20011*a* and is configured to rotate correspondingly. The rotor 2002*a* has a containing groove 20021*a* for cooperating with the pin(s) 30014*a*. When the containing groove 20021*a* corresponds with the insertion path 20013*a*, the pin(s) 30014*a* may be removed through the insertion path 20013*a*. When the rotor 2002*a* is rotated such that the containing groove 20021*a* does not correspond with the insertion path 20013*a*, the pin(s) 30014*a* is fixed and prevented from slipping out through the insertion path 20013*a*.

In this embodiment, a second structural part 6002*a* is fixed on a first structural part 6001*a*. Specifically, the second structural part 6002*a* is fixed to the first structural part 6001*a* through a fixing structure 800*a*. The fixing structure 800*a* includes a first fixing structure 8001*a* and a second fixing structure 8002*a*, wherein when the first fixing structure 8001*a* and second fixing structure 8002*a* cooperate, connection between the second structural part 6002*a* and the first structural part 6001*a* is realized. The first fixing structure 8001*a* is disposed on the second structural part 6002*a* and the second fixing structure 8002*a* is disposed on the first structural part 6001*a*.

The first fixing structure 8001*a* includes a hooking structure 8011*a*, and the second fixing structure 8002*a* includes wedging hole(s). Specifically, the hooking structure 8011*a* includes a first hook 80111*a* and a second hook 80112*a*, which are largely the same in structure, and are disposed to be symmetrical. The wedging hole(s) include a first wedging hole 80021*a* and a second wedging hole 80022*a*, the first hook 80111*a* cooperates with the first wedging hole 80021*a*, and the second hook 80112*a* cooperates with the second wedging hole 80022*a*. The first wedging hole 80021*a* may be disposed on an end surface of a first structural part 6001*a*, and the second wedging hole 80022*a* may be disposed on a backstop 60012*a* of the first structural part 6001*a*.

In this embodiment, a body 60021*a* of a second structural part 6002*a* has a shape of strip. The first structural part 6001*a* has a positioning groove 60015*a* disposed, which is disposed to extend along an axial direction of the first structural part 6001*a* and on an outer surface of the first structural part 6001*a*. At least part of the body 60021*a* of the second structural part 6002*a* is contained in the positioning groove 60015*a*; and thus when the second structural part 6002*a* cooperates with the first structural part 6001*a*, due to the positioning groove 60015*a* limiting the second structural part 6002*a*, relative rotation of the second structural part 6002*a* to the first structural part 6001*a* may be limited in order to improve structural stability.

In some embodiments, at least 70%, 75%, 80%, or 85% of a thickness direction of a body 60021*a* is contained in a positioning groove 60015*a*, in order to reduce the space occupied by a second structural part 6002*a* along a radial direction of a lamp tube. In some embodiments, all of a thickness direction of a body 60021*a* is contained in a positioning groove 60015*a*, in order for a second structural part 6002*a* not to occupy additional space along a radial direction of a lamp tube.

A first structural part 6001*a* has a hole 60016*a* disposed, which may be disposed on a positioning groove 60015*a*. A body 60021*a* of a second structural part 6002*a* covers part of the hole 60016*a*, that is, part of the hole 60016*a* is exposed in exterior of the body 60021*a*. When it's needed to uninstall, it may be performed by inserting a tool into the hole 60016*a* to pry open the second structural part 6002*a*, which is to break the fixed structure to separate the first structural part 6001*a* from the second structural part 6002*a*.

In this embodiment, a second structural part 6002*a* has a backstop 60026*a* disposed, which cooperates with a lamp base 200*a* and limits relative rotation between the second structural part 6002*a* and the lamp base 200*a*. That is, by the backstop 60026*a*, the second structural part 6002*a* realizes limiting of relative rotation between the second structural part 6002*a* and the lamp base 200*a*. And since a first structural part 6001*a* is fixed to the second structural part 6002*a*, the limiting of relative rotation eventually limits relative rotation between the first structural part 6001*a* and the lamp base 200*a*, so as to prevent removing of the LED tube lamp from the lamp base 200*a* without breaking the structure of their combination. In this embodiment, the backstop 60026*a* includes two walls respectively disposed to protrude from a body 60021*a* of the second structural part 6002*a*. The other ends respectively of the two walls are connected to each other, in order to improve structural strength of the backstop 60026*a*.

During installing, a first structural part 6001*a* is connected to an end cap 3*a* of an LED tube lamp, and then pin(s) on the first structural part 6001*a* and pin(s) on the other end cap 3*a* at the other end of the LED tube lamp respectively cooperate with two lamp bases (or two parts of a lamp base) disposed to correspond to each other. And then a second structural part 6002*a* is fixed on the first structural part 6001*a*, and a backstop 30026*a* of the second structural part 6001*a* is inserted through an insertion path 20013*a* of a corresponding lamp base 200*a*, in order to limit relative rotation of the first structural part 6001*a* to the lamp base 200*a* and thus to prevent the pin(s) of the first structural part 6001*a* from slipping out of the lamp base 200*a*.

In one embodiment, the thickness of a circumferential wall on a first structural part 6001*a* is not evenly distributed. A circumference of the first structural part 6001*a* has a plane surface and an arc surface. The thickness of the arc surface is larger than the thickness of the plane surface, in order to have a relatively large strength at the connection border between the arc surface and the plane surface, and thus to improve the structural strength of the first structural part 6001*a*.

An end cap 3*a* at an end of an LED tube lamp in this embodiment has a positioning part 39*a* disposed, and another end cap 3*a* at the other end of the LED tube lamp may have pin(s) disposed. When in use, the end cap 3*a* having pin(s) disposed may be directly installed to a matching lamp base 200*a*, and the end cap 3*a* having a positioning part 39*a* disposed may be fixed to a matching lamp base 200*a* through a fixing structure 300*a*.

Referring to FIGS. 2A to 2E, in one embodiment, an LED lamp is provided, which is especially an integral emergency LED lamp including a lamp tube 10*a*, a circuit board 20*a*, light source(s) 30*a*, and a power supply 50*a*. The lamp tube 10*a* may be a lamp tube described in the above-mentioned embodiments, or comprise a lamp tube different in structure or shape from the lamp tube described in the above-mentioned embodiments. The circuit board 20*a* is disposed inside the lamp tube 10*a*, and the light source(s) 30*a* are disposed on and electrically connected to the circuit board 20*a*. In this embodiment, the LED lamp may be an emergency LED lamp including an emergency battery, to allow the LED lamp to provide power on its own to continue or cause lighting of the LED lamp when an external power source is disconnected or cut off. The light source(s) 30*a* in this embodiment may comprise an LED in current technologies.

Figure 2A:
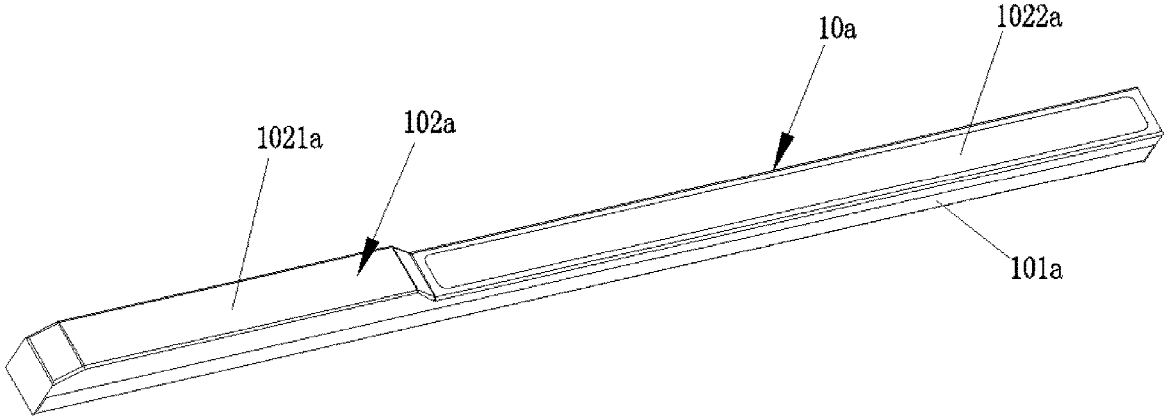
FIG. 2A is a diagram of a three-dimensional structure of an LED lamp according to some embodiments.
Figure 2B:
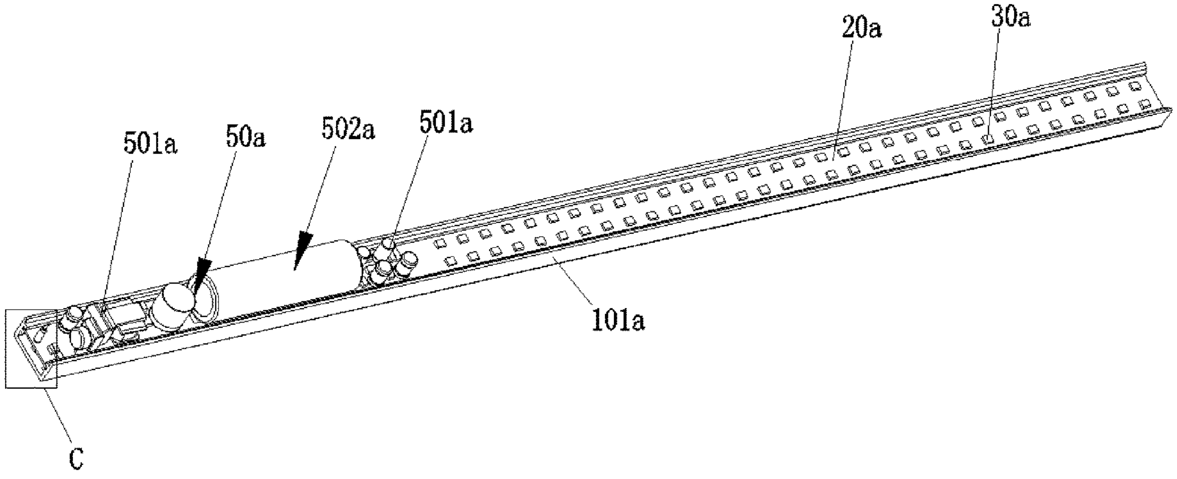
FIG. 2B is a diagram of a three-dimensional structure of an LED lamp without a covering according to some embodiments.
Figure 2C:
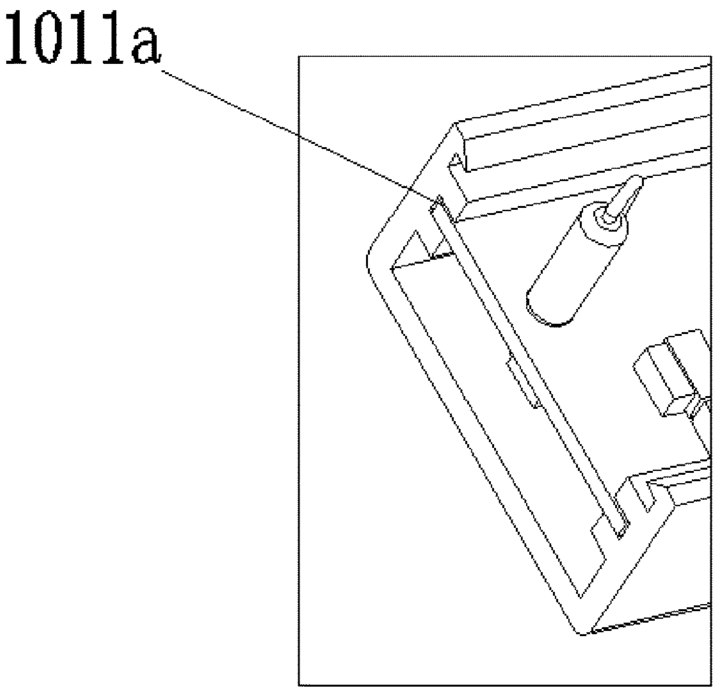
FIG. 2C is an enlargement view of the enclosed portion C of the LED lamp of FIG. 2B.
Figure 2D:
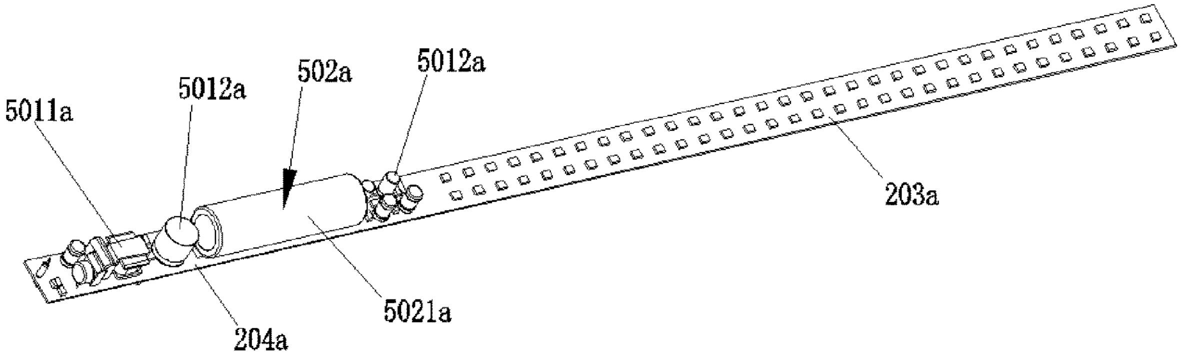
FIG. 2D is a first diagram of a three-dimensional structure of a circuit board, light source(s), and a power supply in cooperation.
Figure 2E:
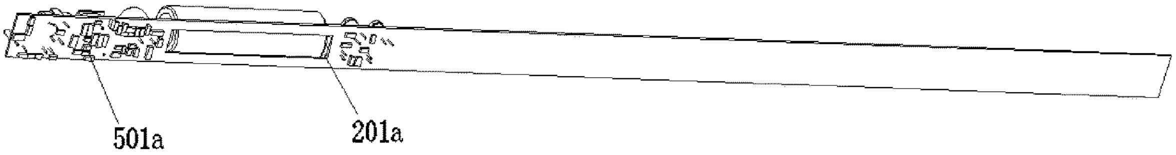
FIG. 2E is a second diagram of a three-dimensional structure of a circuit board, light source(s), and a power supply in cooperation.

Referring to FIG. 2B, in this embodiment, a power supply 50*a* includes electronic component(s) 501*a* and a battery 502*a*. The battery 502*a* is configured to provide power for continuing or causing lighting of the LED lamp when an external power source is disconnected or cut off. The electronic component(s) 501*a* and battery 502*a* are both disposed on the circuit board 20*a*. Through disposing the electronic component(s) 501*a*, battery 502*a*, and light source(s) 30*a* all on the same circuit board, the overall structure can be simpler and their production and assembling can be more convenient.

Referring to FIGS. 2B to 2E, in this embodiment, the electronic component(s) 501*a* and battery 502*a* may be disposed at the same end of a longitudinal direction of the circuit board 20*a*. In other embodiments, the electronic component(s) 501*a* and battery 502*a* may be disposed at different ends of a longitudinal direction of the circuit board 20*a*. The electronic component(s) 501*a* include heat-producing component(s) 5011*a* (such as a transformer, a resistor, or an IC) and relatively non-heat-producing component(s) 5012*a* (including a component that does not produce heat or produces relatively less heat during operation, such as a capacitor). In this embodiment, when disposing or distributing the electronic component(s) 501*a*, non-heat-producing component(s) 5012*a* may be disposed between heat-producing component(s) 5011*a* (such as a transformer, a resistor, or an IC) and the battery 502*a*, in order to in one aspect keep certain distance between the heat-producing component(s) 5011*a* and the battery 502*a*, thus increasing the distance for heat conduction, radiation, and convection, and in another aspect block mutual heat radiation between the heat-producing component(s) 5011*a* and the battery 502*a*, thus reducing mutual thermal affecting between the heat-producing component(s) 5011*a* and the battery 502*a*. Besides, when the non-heat-producing component(s) 5012*a* comprises a capacitor, it has better heat resistivity.

In this embodiment, non-heat-producing component(s) 5012*a* (including a component that does not produce heat or produces relatively less heat during operation, such as a capacitor) may be disposed between a battery 502*a* and light source(s) 30*a* (along a longitudinal direction of a circuit board 20*a*), in order to in one aspect keep certain distance between the light source(s) 30*a* and the battery 502*a*, thus increasing the distance for heat conduction, radiation, and convection, and in another aspect block mutual heat radiation between the light source(s) 30*a* and the battery 502*a*, thus reducing mutual thermal affecting between the light source(s) 30*a* and the battery 502*a*.

The non-heat-producing component(s) 5012*a* in this embodiment may be in a plurality and disposed at different positions along a widthwise direction of the circuit board 20*a* in order to increase the area for blocking heat radiation.

In this embodiment, a circuit board 20*a* has an upper surface having light source(s) 30*a* disposed, on which surface a battery 502*a* is disposed. In a thickness direction of the circuit board 20*a*, at least part of the battery 502*a* protrudes the upper surface of the circuit board 20*a* to reach into the circuit board 20*a*. Specifically, the battery 502*a* is configured to have a cylindrical body 5021*a*, whose axis is parallel or largely parallel with the circuit board 20*a* and configured to extend along a longitudinal direction of the circuit board 20*a*. The circuit board 20*a* has a positioning hole 201*a* disposed, and at least part of the body 5021*a* of the battery 502*a* is in the positioning hole 201*a*, so as to keep an overall height of the battery 502*a* relatively low upon being installed onto the circuit board 20*a* and thereby to control the overall volume. Besides, through disposing the positioning hole 201*a*, shaking movement(s) of the battery 502*a* relative to the circuit board 20*a* may be limited, reducing the risk of separation between pin(s) of the battery 502*a* and the circuit board 20*a*.

The width of a positioning hole 201 occupies 40% to 70% of the width of a circuit board 20*a*, so as to in one aspect guarantee a space in the positioning hole 201 for a battery 502*a* to sink into, and in another aspect to reserve sufficient space on the circuit board 20*a* for laying out circuit wiring.

In some embodiments, light source(s) 30*a* is disposed to be in one or more rows on a circuit board 20*a*. Specifically, in this embodiment, light source(s) 30*a* is disposed to be in 2 rows.

A first zone 203*a* and a second zone 204*a* are disposed along a longitudinal direction of a circuit board 20*a*, wherein the first zone 203*a* is for disposing the light source(s) 30*a*, and the second zone 204*a* is for disposing the power supply 50*a*. In some embodiments, component(s) on a first zone 203*a* include only light source(s) 30*a* but no other electronic component(s). In some embodiments, component(s) on a second zone 204*a* include only include electronic component(s) 501*a* and a battery 502*a* of a power supply 50*a* but not light source(s) 30*a*. By such arrangements, more reasonable management of heat and layout design can be performed. In some embodiments, electronic components 501*a* are respectively disposed on both an upper surface and a lower surface of a circuit board 20*a* on a second zone 204*a*, so as to achieve a more compact disposition of electronic components on a unit length of the second zone 204*a*.

A length of a first zone 203*a* may be disposed to be 50%, 55%, 60%, 65%, or 70% or more of that of a circuit board 20*a*, in order to have a generally longer dimension for light transmission.

Referring to FIGS. 2A to 2E, a lamp tube 10*a* includes a substrate 101*a*, having a circuit board 20*a* fixed thereon. In some embodiments, a circuit board 20*a* is adhered to a substrate 101*a* by a glue. In some embodiments, a circuit board 20*a* is fastened or wedged onto a substrate 101*a*. In some embodiments, a circuit board 20*a* is fixed to a substrate 101*a* through a bolt. In the embodiments of FIGS. 2A to 2E, a substrate 101*a* has a slot 1011*a* disposed thereon, wherein two ends of the width of a circuit board 20*a* are to be inserted into and fixed against the slot 1011*a*, which structure for fixing a circuit board 20*a* is simple and has higher efficiency in being assembled.

In the embodiments of FIGS. 2A to 2E, an interval is disposed between a circuit board 20*a* and a bottom of a substrate 101*a*, in order to form a containing room. Electronic component(s) 501*a* is disposed on a lower surface of the circuit board 20*a*, and is located in the containing room. Besides, electronic component(s) 501*a* disposed on an upper surface of the circuit board 20*a* may have pins, which may also be located in the containing room.

A lamp tube 10*a* may further include a covering 102*a*, which is fixed to a substrate 101*a* and disposed as an external cover for a circuit board 20*a*. In one embodiment, a covering 102*a* may be made of translucent material(s). In one embodiment, a covering 102*a* includes a main body 1021*a* and a translucent part 1022*a*. The main body 1021*a* is configured to be connected to a substrate 101*a* and configured to cover non-translucent area on a circuit board 20*a*, such as an area of the circuit board 20*a* on which electronic component(s) are disposed and an area on which a battery 502*a* is disposed. The translucent part 1022*a* covers translucent area on the circuit board 20*a*, such as an area of the circuit board 20*a* on which light source(s) 30*a* is disposed, so as to allow light generated when the light source(s) 30*a* is lighted to pass through the translucent part 1022*a*. In the embodiments of FIGS. 2A to 2E, a translucent part 1022*a* may be configured to have a diffusing function. In some embodiments, a diffusion coating may be applied to a surface of a translucent part 1022*a* to realize the diffusing function. In some embodiments, a translucent part 1022*a* has a diffusing function due to the property of its constitution material(s), such as acrylic material. In the embodiments of FIGS. 2A to 2E, a translucent part 1022*a* is installed on a covering 102*a*.

In the embodiments of FIGS. 2A to 2E, a covering 102*a* has a first portion and a second portion, which first portion has a height larger than that of the second portion, so that a larger containing space exists between the first portion and a substrate 101*a* for containing a terminal of a circuit board 20*a* bearing electronic component(s) 201*a* and a battery 502*a*, while the second portion corresponds to a portion of the circuit board 20*a* bearing light source(s) 30*a*.

In some embodiments, a power supply described herein may be referred to as a power module.

Figure 9A:
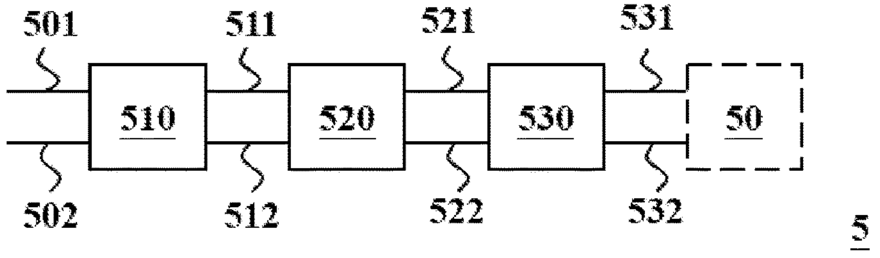
FIGS. 9A-9C are block diagrams of an exemplary power supply module in an LED lamp according to some embodiments.

FIG. 9A is a block diagram of an exemplary power supply module in an LED lamp according to some embodiments. Referring to FIG. 9A, the power supply module 5 is coupled to an LED module 50 in the LED tube lamp 500 and includes a rectifying circuit 510 (also referred to as first rectifying circuit 510), a filtering circuit 520, and a driving circuit 530. The rectifying circuit 510 is coupled to a first pin 501 and a second pin 502 at one end, for receiving and then rectifying an external driving signal in order to output or produce a rectified signal at a first rectifying output terminal 511 and a second rectifying output terminal 512. The external driving signal in this embodiment may be an AC power signal provided by an AC power supply 508 under any of the power-supply, or even be a DC signal compatible with or suitable for normal operations of the LED tube lamp 500. The filtering circuit 520 is coupled to the rectifying circuit 510 for performing filtering of the rectified signal. Specifically, the filtering circuit 520 is coupled to the first rectifying output terminal 511 and second rectifying output terminal 512 in order to receive and then filter the rectified signal, and then outputs or produces a filtered signal at a first filtering output terminal 521 and a second filtering output terminal

522. The driving circuit 530 is coupled to the LED module 50 and the filtering circuit 520, in order to receive the filtered signal and then produce a driving signal for driving the LED module 50 to emit light. The driving circuit 530 includes e.g. a DC-to-DC converter circuit for converting the received filtered signal into the driving signal, which is output at a first driving output terminal 531 and a second driving output terminal 532. In FIG. 9A, the driving circuit 530 is coupled to the first filtering output terminal 521 and second filtering output terminal 522 in order to receive the filtered signal and then drive LEDs (not illustrated) in the LED tube lamp 500 to emit light. The operation(s) of embodiments of the driving circuit 530 is further described in more detail below. The LED module 50 is coupled to the first driving output terminal 531 and second driving output terminal 532 in order to receive the driving signal to emit light, for which the electrical current flowing on or through the LED module 50 is preferably stable at a set or defined current value. In some embodiments, an LED module 50 being driven to emit light can refer to lumens of the LED module reaching at least fifty percent of the lumen output indicated by the manufacturer, also described as nominal lumens (e.g., at least fifty percent of the lumens expected to be output under full power operating condition). The specific configuration of the LED module 50 can be found in the subsequent descriptions of FIGS. 10A to 10I.

Figure 9B:
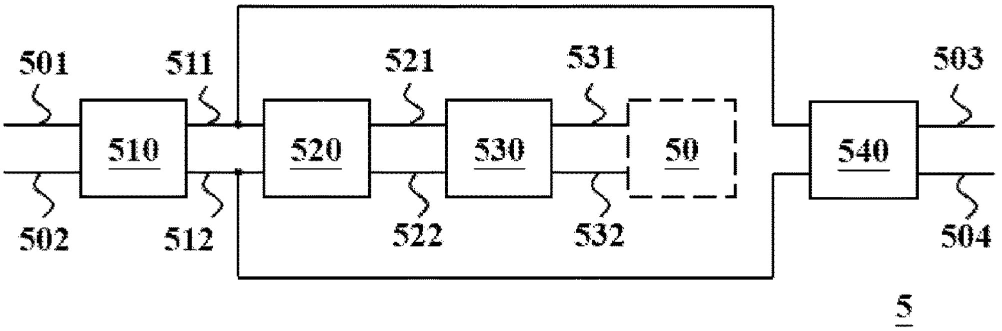

FIG. 9B is a block diagram of an exemplary power supply module in LED lamp according to some exemplary embodiments. Referring to FIG. 9B, the power supply module of the LED lamp includes a first rectifying circuit 510, a filtering circuit 520, a driving circuit 530, and another rectifying circuit 540 (also referred to as second rectifying circuit 540). The power supply module 5 of FIG. 9B can be utilized in the single-end power supply configuration or the dual-end power supply configuration. The first rectifying circuit 510 is coupled to the pins 501 and 502 to receive and then rectify an external driving signal transmitted by the pins 501 and 502; the second rectifying circuit 540 is coupled to the pins 503 and 504 to receive and then rectify an external driving signal transmitted by pins 503 and 504. The first rectifying circuit 510 and the second rectifying circuit 540 of the power supply module collectively output a rectified signal at two rectifying circuit output terminals 511 and 512. The filtering circuit 520 is coupled to the rectifying circuit output terminals 511 and 512 to receive and then filter the rectified signal, so as to output a filtered signal at two filtering output terminals. The driving circuit 530 is coupled to the first filtering output terminal 521 and second filtering output terminal 522 in order to receive the filtered signal and then drive LEDs (not illustrated) in the LED tube lamp to emit light.

Figure 9C:
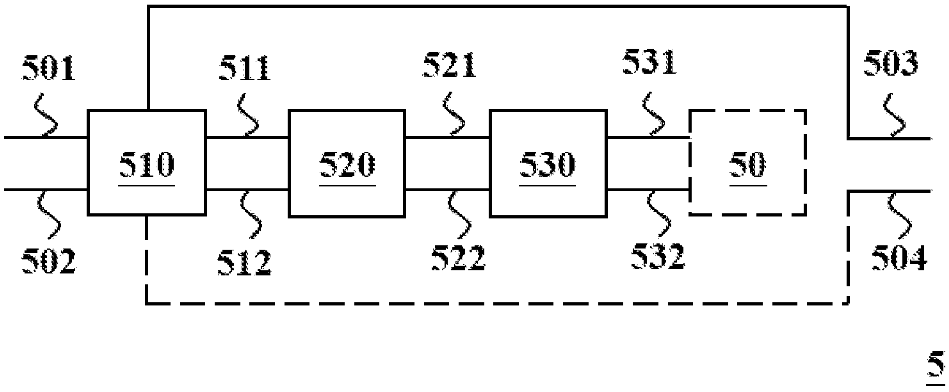

FIG. 9C is a block diagram of an exemplary LED lamp according to some exemplary embodiments. Referring to FIG. 9C, the power supply module of LED tube lamp includes a rectifying circuit 510, a filtering circuit 520 and a driving circuit 530, which can also be utilized in the single-end power supply configuration or the dual-end power supply configuration. The difference between the embodiments illustrated in FIG. 9C and FIG. 9B is that the rectifying circuit 510 in FIG. 9C has three input terminals to be coupled to the pins 501 to 503, respectively. The rectifying circuit 510 rectifies the signals received from the pins 501 to 503, in which the pin 504 can be set to the floating state or connected to the pin 503. Therefore, the second rectifying circuit 540 can be omitted in the present embodiment. The rest of circuitry operates substantially the same as the embodiment illustrated in FIG. 9B, so the detailed description is not repeated herein.

Although there are two rectifying output terminals 511 and 512 and two filtering output terminals 521 and 522 in the embodiments of these Figures, in practice the number of ports or terminals for coupling between the rectifying circuit 510, the filtering circuit 520, the driving circuit 530 and the LED module 50 may be one or more depending on the needs of signal transmission between the circuits or devices.

Embodiments of the power supply module in the LED tube lamp illustrated in any of FIGS. 9A to 9C or of the power supply module described below are not only applicable to an LED tube lamp, but also can be used in any other type of lighting circuit structure having two conductive pins used to conduct power, such as any of various kinds of lamp including LED light bulbs, personal area lights (PAL), and plug-in LED lamps (such as types of PL-S, PL-D, PL-T, PL-L, etc.), respectively having different specifications of base or holder. Further, for implementation in LED light bulbs, such embodiments of the power supply module can be used along with structural implementations disclosed in the Chinese Applications CN105465630A or CN105465663.

When an LED tube lamp disclosed herein is applied with a power-supply configuration using at least one pin at each of its two opposite ends, the LED tube lamp 500 may be modified or retrofitted, and then installed in a lamp holder including a lamp driver circuit or ballast 505 (e.g., electronic ballast or inductive ballast), which is also suitable for being power-supplied by an AC power source 508 (e.g., mains electricity) bypassing through the ballast 505 instead.

Figure 10A:
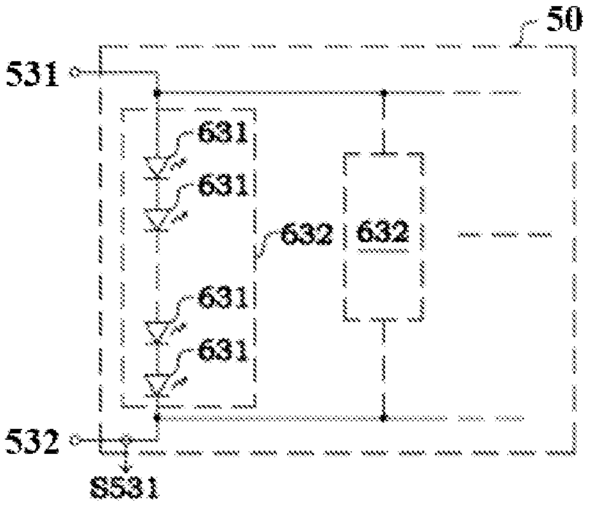
FIGS. 10A-10B are schematic diagrams of exemplary LED modules according to some exemplary embodiments.

FIG. 10A is a schematic diagram of an LED module according to an embodiment. Referring to FIG. 10A, an LED module 50 has an anode connected to a driving output terminal 531, a cathode connected to a driving output terminal 532, and includes at least one LED unit 632, such as the light source mentioned above. When two or more LED units are included, they are connected in parallel. The anode of each LED unit 632 is connected to the anode of LED module 50 to couple with the driving output terminal 531, and the cathode of each LED unit 632 is connected to the cathode of LED module 50 to couple to the driving output terminal 532. Each LED unit 632 includes at least one LED 631. When multiple LEDs 631 are included in an LED unit 632, they are connected in series with the anode of the first LED 631 connected to the anode of this LED unit 632 (the anode of the first LED 631 and the anode of the LED unit 632 may be the same terminal) and the cathode of the first LED 631 connected to the next or second LED 631. And the anode of the last LED 631 in this LED unit 632 is connected to the cathode of a previous LED 631 and the cathode of the last LED 631 connected to the cathode of this LED unit 632 (the cathode of the last LED 631 and the cathode of the LED unit 632 may be the same terminal). In some embodiments, the LED module 50 may produce a current detection signal S531 reflecting the magnitude of current through the LED module 50 and being used for controlling or detecting the LED module 50.

Figure 10B:
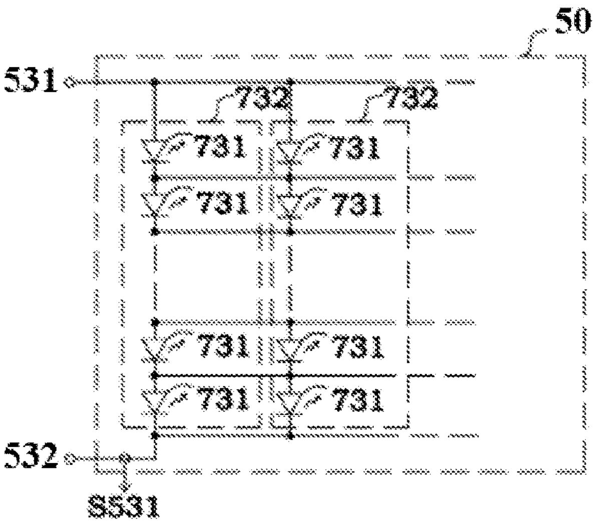

FIG. 10B is a schematic diagram of an LED module according to an exemplary embodiment. Referring to FIG. 10B, an LED module 50 has an anode connected to a filtering output terminal 531, a cathode connected to a filtering output terminal 532, and includes at least two LED units 732 with the anode of each LED unit 732 connected to the anode of LED module 50 and the cathode of each LED unit 732 connected to the cathode of LED module 50 (the anode of each LED unit 732 and the anode of the LED module 50 may be the same terminal, and the cathode of each LED unit 732 and the cathode of the LED module 50 may be the same terminal). Each LED unit 732 includes at least two LEDs 731 connected in the same way as those described in FIG. 10A. For example, the anode of the first LED 731 in an LED unit 732 is connected to the anode of this LED unit 732, the cathode of the first LED 731 is connected to the anode of the next or second LED 731, and the cathode of the last LED 731 is connected to the cathode of this LED unit 732. Further, LED units 732 in an LED module 50 are connected to each other in this embodiment. All of the n-th LEDs 731 in the related LED units 732 thereof are connected by their anodes and cathodes, where n is a positive integer. In this way, the LEDs in the LED module 50 of this embodiment are connected in the form of a mesh. In some embodiments, the number of LEDs 731 included by an LED unit 732 is in the range of 15-25 and may be in some embodiments in the range of 18-22.

Figure 10C:
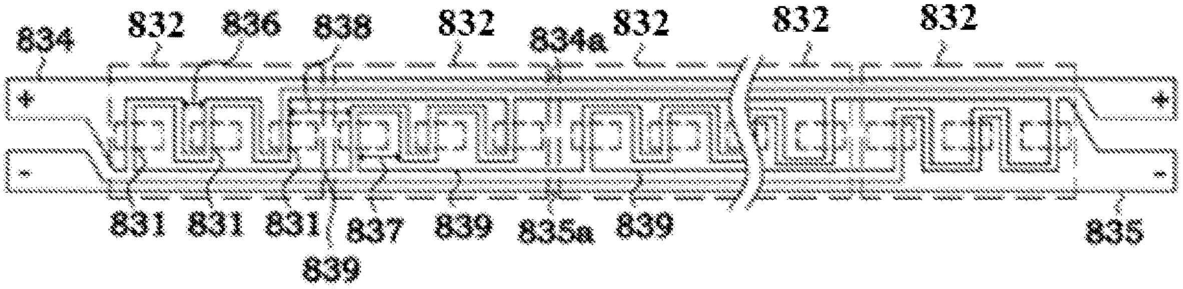
FIGS. 10C-10I are plan views of a circuit layout of the LED module according to an exemplary embodiment.

FIG. 10C is a plan view of a circuit layout of the LED module according to an embodiment. Referring to FIG. 10C, in this embodiment, multiple LEDs 831 are connected in the same way as described in FIG. 10B, and three LED units are assumed in the LED module 630 and described as follows for illustration. A positive conductive line 834 and a negative conductive line 835 are to receive a driving signal for supplying power to the LEDs 831. For example, the positive conductive line 834 may be coupled to the filtering output terminal 521 of the filtering circuit 520 described above, and the negative conductive line 835 coupled to the filtering output terminal 522 of the filtering circuit 520 to receive a filtered signal. For the convenience of illustration, all three of the n-th LEDs 832 in the three related LED units thereof are grouped as an LED set 833 in FIG. 10C.

The positive conductive line 834 connects the first LED components 831 of the leftmost three related LED units, i.e., it connects the anodes (e.g., terminals at the left-hand sides) of the three LED components in the leftmost LED set 832 as shown in FIG. 10C. The negative conductive line 835 connects the last LED components 831 of the rightmost three LED units, i.e., it connects the cathodes (e.g., terminals at the right-hand sides) of the three last LED components 831 in the rightmost LED set 832 as shown in FIG. 10C. The cathodes of the first LED component 831 of each LED unit, the anodes of the last LED component 831, and the anodes and cathodes of all remaining LED component 831 are connected by connection lines 839.

In other words, the anodes of the three LED components 831 in the leftmost LED set 832 can be connected together by a positive conductive line 834, and their cathodes can be connected together by a leftmost connection part 839. The anodes of the three LED components 831 in the second, next-leftmost LED set 832 are also connected together by the leftmost connection part 839, whereas the cathodes thereof are connected together by a second, next-leftmost connection part 839. Since the cathodes of the three LED components 831 in the leftmost LED set 832 and the anodes of the three LED components 831 in the second, next-leftmost LED set 832 are connected together by the same leftmost connection part 839, the cathode of the first LED component 831 in each of the three LED units is connected to the anode of the next or second LED component 831. The remaining LED components 831 of the three LED units are also connected in the same way to form the mesh connection structure as shown in FIG. 10B.

In this embodiment, the length 836 of a portion of each conductive part 839 that connects to the anode of an LED 831 is smaller than the length 837 of another portion of each conductive part 839 that connects to the cathode of an LED 831. This makes the area of the latter portion connecting to the cathode larger than that of the former portion connecting to the anode. Moreover, the length 837 may be smaller than a length 838 of a portion of each conductive part 839 that connects the cathode of an LED 831 and the anode of the next LED 831 in two adjacent LED sets 833. This makes the area of the portion of each conductive part 839 that connects a cathode and an anode larger than the area of any other portion of each conductive part 839 that connects to only a cathode or an anode of an LED 831. Due to the length differences and area differences, this layout structure improves heat dissipation of the LEDs 831.

In some embodiments, the positive conductive line 834 includes a lengthwise portion 834*a*, and the negative conductive line 835 includes a lengthwise portion 835*a*, which are conducive to make the LED module have a positive "+" connective portion and a negative "−" connective portion at each of the two ends of the LED module, as shown in FIG. 10C. Such a layout structure allows for coupling any of other circuits of the power supply module of the LED lamp, including e.g., the filtering circuit 520 and the rectifying circuits 510 and 540, to the LED module through the positive connective portion and/or the negative connective portion at each or both ends of the LED lamp. Thus, the layout structure increases the flexibility in arranging actual circuits in the LED lamp.

Figure 10D:
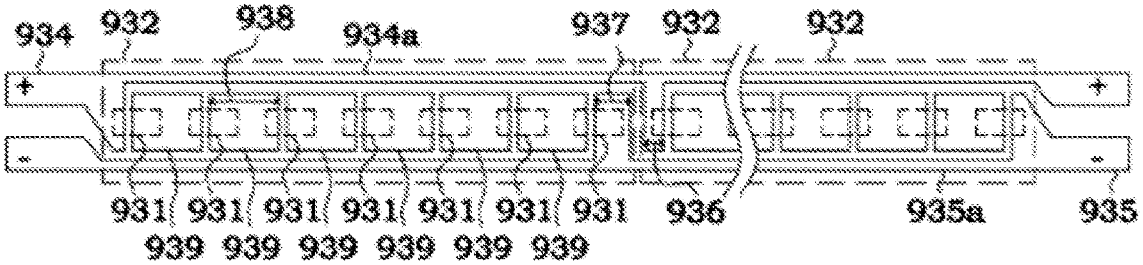

FIG. 10D is a plan view of a circuit layout of the LED module according to another embodiment. Referring to FIG. 10D, in this embodiment, multiple LEDs 931 are connected in the same way as described in FIG. 10A, and three LED units each including 7 LEDs 931 are assumed in the LED module 630 and described as follows for illustration. A positive conductive line 934 and a negative conductive line 935 are to receive a driving signal for supplying power to the LEDs 931. For example, the positive conductive line 934 may be coupled to the filtering output terminal 521 of the filtering circuit 520 described above, and the negative conductive line 935 is coupled to the filtering output terminal 522 of the filtering circuit 520, so as to receive a filtered signal. For the convenience of illustration, all seven LEDs 931 of each of the three LED units are grouped as an LED set 932 in FIG. 10D. Thus, there are three LED sets 932 corresponding to the three LED units.

The positive conductive line 934 connects the anode on the left side of the first or leftmost LED 931 of each of the three LED sets 932. The negative conductive line 935 connects the cathode on the right side of the last or rightmost LED 931 of each of the three LED sets 932. In each LED set 932 of each two adjacent LEDs 931, the LED 931 on the left has a cathode connected by a conductive part 939 to an anode of the LED 931 on the right. By such a layout, the LEDs 931 of each LED set 932 are connected in series.

It is noted that the connection part 939 is configured to connect the anode and the cathode respectively of two consecutive LED components 931. The negative conductive line 935 connects to the cathode of the last or rightmost LED component 931 of each LED set 932. And the positive conductive line 934 connects to the anode of the first or leftmost LED component 931 of each LED set 932. Therefore, the width of each of these connection part and conductive lines and the area of each for heat dissipation for an LED component is ranked as from relatively large to relatively small in the above-described sequence of these described connection part and conductive lines. That is, as shown in FIG. 10D, the width 938 of the connection part 939 is the largest and larger than the width 937 of the negative conductive line 935 connecting to a cathode of an LED component 931, which is in turn larger than the width 936 of the positive conductive line 934 connecting to an anode of an LED component 931. Therefore, such a layout structure of conductive lines and connection parts benefits heat dissipation for the LED components.

The positive conductive line 934 may include a lengthwise portion 934*a*, and the negative conductive line 935 may include a lengthwise portion 935*a*, which are conducive to make the LED module have a positive "+" connective portion and a negative "–" connective portion at each of the two ends of the LED module, as shown in FIG. 10D. Such a layout structure allows for coupling any of other circuits of the power supply module of the LED lamp, including e.g., the filtering circuit 520 and the rectifying circuits 510 and 540, to the LED module through the positive connective portion 934*a* and/or the negative connective portion 935*a* at each or both ends of the LED lamp. Thus, the layout structure increases the flexibility in arranging actual circuits in the LED lamp.

Further, the circuit layouts as shown in FIGS. 10C and 10D may be implemented with a bendable circuit sheet or substrate or may be a flexible circuit board depending on its specific construction. For example, the bendable circuit sheet may comprise one conductive layer where the positive conductive line 834, the positive lengthwise portion 834*a*, the negative conductive line 835, the negative lengthwise portion 835*a*, and the conductive parts 839 shown in FIG. 10C, and the positive conductive line 934, the positive lengthwise portion 934*a*, the negative conductive line 935, the negative lengthwise portion 935*a*, and the conductive parts 939 shown in FIG. 10D are formed by the method of etching.

Figure 10E:
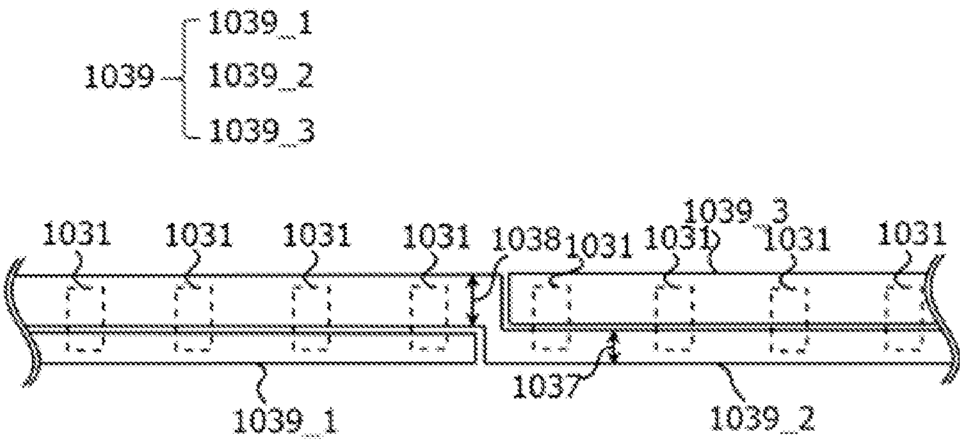

FIG. 10E is a plan view of a circuit layout of the LED module according to another embodiment. Referring to FIG. 10E, the connection relationship of the LEDs 1031 is the same as FIG. 10B. The configuration of the positive conductive line and the negative conductive line (not shown) and the connection relationship between the conductive lines and other circuits is substantially the same as FIG. 10C. The difference between the present embodiment and the above embodiments is that the LEDs 1031 are modified to be arranged in the longitudinal direction (i.e., the positive and negative electrodes of each LEDs are disposed along the direction perpendicular to the lead extension direction) from the transverse direction such as arrangement of the LEDs 831 shown in FIG. 10C (i.e., the positive and negative electrodes of each LEDs are disposed along the lead extension direction), and the connection configuration of the present embodiment are correspondingly adjusted due to the arrangement direction.

Specifically, taking a conductive part 1039_2 for example, the conductive part 1039_2 includes a first long-side portion having a width 1037, a second long-side portion having a width 1038 which is greater than the width of the first long-side portion, and a transition portion connecting the first and the second long-side portions. The conductive part 1039_2 can be formed in a right-angled Z shape, which means the joints of each long-side portions and the transition portion are perpendicular. The first long-side portion of the conductive part 1039_2 and the second long-side portion of the adjacent conductive part 1039_3 are correspondingly disposed; similarly, the second long-side portion of the conductive part 1039_2 and the first long-side portion of the adjacent conductive part 1039_1 are correspondingly disposed. According to the configuration described above, the conductive part 1039 is arranged along the extension direction of the long-side portions, and the first long-side portion of each conductive parts 1039 and the second long-side portion of each adjacent conductive parts 1039 are correspondingly disposed; similarly, the second long-side portion of each conductive parts 1039 and the first long-side portion of each adjacent conductive parts 1039 are correspondingly disposed. Therefore, each of the conductive parts 1039 can be formed as a wiring configuration having consistent width. The configuration of the other conductive parts 1039 can be similar to the description of the conductive part 1039_2 described above.

The conductive part 1039 is taken as an example for explaining the relative configuration of the LEDs 1031 and the conductive parts 1039 as well. In the present embodiment, the positive electrodes of part of the LEDs 1031 (e.g., the four LEDs 1031 at the right-hand side) are connected to the first long-side portion of the conductive part 1039_2 and connected to each other via the first long-side portion; and the negative electrodes of the part of the LEDs 1031 are connected to the second long-side portion of the adjacent conductive part 1039_3 and connected to each other via the conductive part 1039_3. On the other hand, the positive electrodes of another part of the LEDs 1031 (e.g., the four LEDs 1031 at the left-hand side) are connected to the first long-side portion of the conductive part 1039_1, and the negative electrodes of another part of the LEDs 1031 are connected to the second long-side portion of the conductive part 1039_2.

As can be seen in FIG. 10E, positive electrodes of the four LEDs 1031 at the left-hand side are connected to each other via the conductive part 1039_1, and the negative electrodes of the four LEDs 1031 at the left-hand side are connected to each other via the conductive part 1039_2. The positive electrodes of the four LEDs 1031 at the right-hand side are connected to each other via the conductive part 1039_2, and the negative electrodes of the four LEDs 1031 at the right-hand side are connected to each other via the conductive part 1039_3. Since the negative electrodes of the four LEDs 1031 at the left-hand side are connected to the positive electrodes of the four LEDs 1031 at the right-hand side via the conductive part 1039_2, the left four LEDs 1031 can be respectively referred to as the first LED in the four LED units, and the right four LEDs can be respectively referred to as the second LED in the four LED units. The connection relationship of the other LEDs can be derived from the above configuration, so as to form the mesh connection as shown in FIG. 10B.

It should be noted that, compared to FIG. 10C, the LEDs 1031 of the present embodiment are modified to be arranged in the longitudinal direction, such that the gap between the LEDs 1031 can be increased, which allows the effective width (which can be referred to the lead width) of the conductive part to be broadened. Therefore, the risk that the circuit is easily punctured when reconditioning the tube lamp can be avoided. Moreover, the short-circuit issue caused by the insufficient coverage area of the copper foil between the LEDs 1031 when the LEDs 1031 require to be arranged tightly can be removed or reduced.

On the other hand, by designing the width 1037 of the first long-side portion connected to the positive electrodes smaller than the width 1038 of the second long-side portion connected to the negative electrodes, the connection area of the negative electrodes on the LEDs 1031 is larger than the connection area of the positive electrodes on the LEDs 1031. Thus, such wiring architecture facilitates heat dissipation of the LEDs.

Figure 10F:
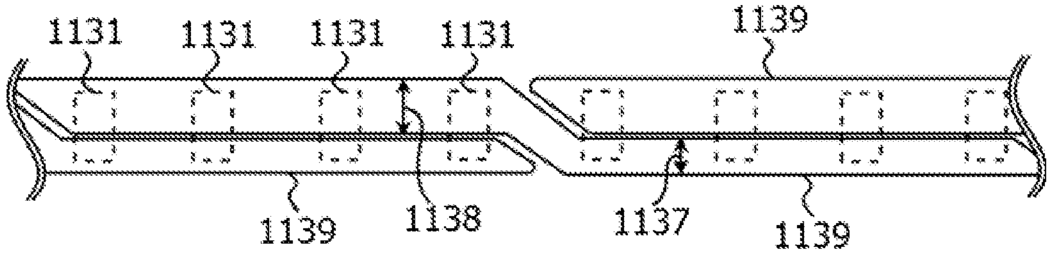

FIG. 10F is a planar view of a circuit layout of an LED module according to another embodiment. Referring to FIG.

10F, the present embodiment is largely similar to the embodiment illustrated in FIG. 10E, with a difference that in the embodiment of FIG. 10F, a connection part 1139 is formed in a Z shape rather than in a right-angled form. In other words, in the present embodiment, the transition portion of a connection part 1139 is formed along an oblique direction, such that each joint between each lengthwise portion and the transition portion does not exhibit a right angle. In the configuration of the present embodiment, in addition to increasing the gap between positions of the LEDs 1131 and achieving the effect of broadened width of each connection part 1139 by disposing the LEDs 1131 along the lengthwise direction, configuring part of a connection part 1139 along an oblique direction in this embodiment may reduce the incidence of displacement or being shifted of an LED component when attaching the LED component to an uneven or not-level soldering pad. Similarly, the connection part 1139 in this embodiment can be configured such that the width 1137 of the lengthwise portion of the connection part 1139 acting for connecting anodes of the LED components is smaller than a width 1138 of a lengthwise portion of the connection part 1139 for connecting cathodes of the LED components, and the effect of heat-dissipation can also be improved.

Specifically, according to the embodiment utilizing the flexible circuit board as the LED light strip, the vertical conductive parts/leads (e.g., portions that extend in a vertical direction in the configuration shown in FIG. 10C to FIG. 10E) cause a regular recessed/indented area at the transition portion, so that the soldering spots of the LED soldering pads on the conductive parts are relatively on a raised position. Since the soldering spots are not a flat surface, it is hard to dispose the LEDs on the predetermined position when attaching the LEDs on the LED light strip. Thus, the present embodiment eliminates the recessed area by adjusting the configuration of the vertical wiring to the oblique wiring, so that the strength of the copper foil of the whole wiring can be uniform without a bulge or uneven situation at a specific position crossing the width of the LED light strip. Accordingly, the LEDs 1131 can be attached on the conductive part easier, so as to enhance the reliability of tube lamp installation process. Also, since each of the LED units only passes the oblique wiring once on the LED light strip, the strength of the entire LED light strip can be greatly improved, therefore, the LED light strip can be prevented from being bent and the length of the LED light strip can be shortened.

In addition, in an exemplary embodiment, the copper foil can be covered (e.g., extend laterally) around the soldering pads of the LEDs 1131, so as to eliminate effects of an offset generated from attaching the LEDs 1131 and avoid a short-circuit caused by the solder ball. This is particularly the case for an offset in the lengthwise direction of the LED light strip.

Figure 10G:
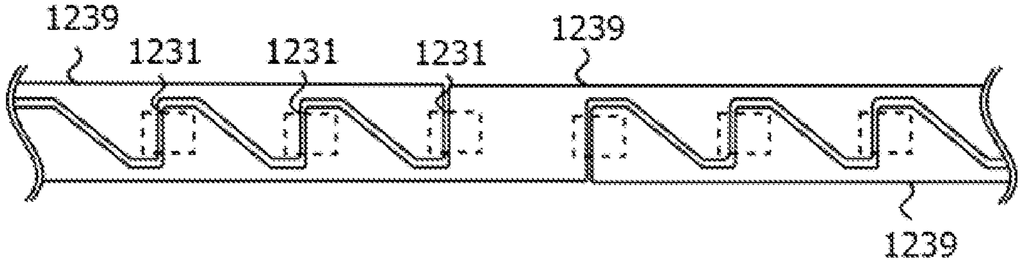

FIG. 10G is a planar view of a circuit layout of the LED module according to another embodiment. Referring to FIG. 10G, the present embodiment is similar to the embodiment illustrated in FIG. 10C, with the difference that the corresponding/matching shapes between two connection parts 1239 (except for corresponding shapes which the soldering pads of the LED components 1231 are positioned across) are formed/arranged along an oblique direction. In the embodiments of FIG. 10G, through arranging some corresponding shapes of two connection parts 1239 along an oblique direction, rather than along a transverse and perpendicular direction, this arrangement can make the strength of copper foil/clad in the overall wirings even or uniform and avoid/reduce occurrence of some positions protruding or being uneven, therefore making attaching the LED components to conductive parts/lines easier and improving reliability in assembling the LED tube lamp.

Figure 10H:
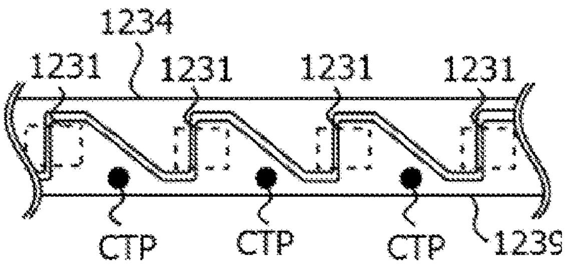

In addition, according to the configuration of the present embodiment, color temperature points CTP can be uniformly disposed between LED components 1231 as shown in FIG. 10H. FIG. 10H is a planar view of a circuit layout of an LED module according to another embodiment. In the present embodiment, by disposing color temperature points CTP uniformly between the LED components, and the conductive parts 1234 and 1239 are matched to form an LED module, the color temperature points CTP on corresponding positions on each of the conductive parts 1234 and 1239 can be aligned along the same line. In this case, only several or few tapes are needed to cover/block all color temperature points CTP on the LED module during soldering (e.g., as shown in FIG. 10H, only three tapes are needed if three color temperature points CTP are disposed on each conductive part). As a result, the smoothness in assembling process of the LED tube lamp can be improved and the time needed in assembling can be saved thereby.

Figure 10I:
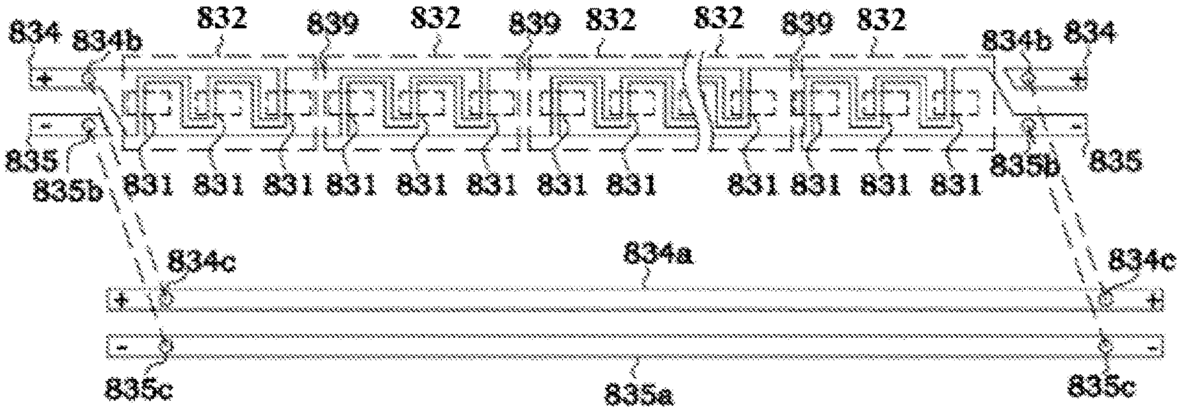

FIG. 10I is a planar view of a circuit layout of an LED module according to an embodiment. Referring to FIG. 10I, in the embodiment of FIG. 10I two-layer structure of wiring layer is deployed instead of a one-layer structure of wiring layer as shown in the embodiment of FIG. 10C, mainly by disposing a positive-pole lengthwise portion 834*a* and a negative-pole lengthwise portion 835*a* in a second wiring layer. Details of the embodiment of FIG. 10I would be described as follows.

As a variation of the above embodiments, an LED tube lamp is also provided herein that at least some electronic components of power supply module thereof is disposed on a light strip of the LED tube lamp. For example, the technique of printed electronic circuit (PEC) can be used to print, insert, or embed the at least some electronic components of the power supply module onto the LED light strip.

In one embodiment, all electronic components of a power supply module are disposed on a light strip. The production process may include or proceed with the following steps: preparing of a circuit substrate (e.g., preparing a flexible printed circuit board); inkjet printing the metallic nano-ink; inkjet printing the active and passive components (as of the power supply module); drying/sintering; inkjet printing the interlayer bumps; spraying the insulating ink; inkjet printing of metallic nano-ink; inkjet printing the active and passive components (to sequentially form the layers on the circuit substrate); spraying the soldering pad(s) on the surface; and spraying solder resist against the LED components.

In this embodiment, if all the electronic components of the power supply module are disposed on the LED light strip, electrical connection between terminal pins of the LED tube lamp of the power supply module and the light strip can be achieved by connecting the pins to conductive lines at the ends of the light strip through soldering. In this case, another substrate for supporting the power supply module is not required, allowing further improved design or arrangement in the end cap(s) of the LED tube lamp. In some embodiments, (components of) the power supply module are disposed at two ends of the light strip, such that the impact of heat generated from the power supply module's operations on the LED components can be greatly reduced. Since no substrate other than the light strip is used to support the power supply module in this case, the total amount of welding or soldering can be significantly reduced and the general reliability of the power supply module can be improved thereby.

Another case is that some electronic components of the power supply module, such as some resistors and/or smaller-size capacitors, are printed onto a light strip, and some bigger-size components, such as some inductors and/or electrolytic capacitors, are disposed in the end cap(s). The production process of the light strip in this case can be the same as that described above. And in this case, disposing some electronic components of the power supply module on the light strip is conducive to achieving a reasonable layout of the power supply module in the LED tube lamp, which may allow of an improved design in the end cap(s).

As a variation of the above embodiment, electronic components of a power supply module can be disposed on the light strip by embedding or inserting, for example, by embedding the electronic components onto the bendable or flexible light strip. In some embodiments, this embedding is preferably realized by using copper-clad laminates (CCL) with a resistor or capacitor formed; using ink related to silkscreen printing; or inkjet printing to embed passive components, wherein an inkjet printer is used to directly print conductive inks and inks with related functions as passive components and related functionalities to designated positions on the light strip. Then, through processing by ultraviolet (UV) light or drying/sintering, the light strip with embedded passive components is formed. The electronic components embedded onto the light strip can include for example, resistors, capacitors, and inductors. In some embodiments, active components may also be embedded. Through such design of embedding the components onto the light strip, a reasonable layout of the power supply module can be achieved to allow of an improved design in the end cap(s). Since some resistors and/or capacitors are embedded onto the light strip, precious surface area on a printed circuit board used for carrying components of the power supply module can be reduced or smaller, and as a result, the size, weight, and thickness of a resulting printed circuit board carrying components of the power supply module is also smaller or reduced. In addition, with such design, the soldering points on the printed circuit board for soldering the resistors and/or capacitors are eliminated, the reliability of the power supply module is improved, in view of the fact that these soldering points are most liable to cause faults, malfunctions, or failures. Further, the length of conductive lines needed for connecting components on the printed circuit board is reduced thereby, which allows of a more compact layout of components on the printed circuit board and thus improving electrical functionalities of these components.

Next, methods to produce embedded capacitors and resistors are explained as follows.

Usually, methods for manufacturing embedded capacitors employ or involve a concept called distributed or planar capacitance. As described herein, on a substrate of a copper layer, a very thin insulation layer is applied or pressed, which is generally disposed between a pair of layers including a power conductive layer and a ground layer. This thin insulation layer makes the distance between the power conductive layer and the ground layer very short. A capacitance resulting from this structure can also be realized by a conventional technique of a plated-through hole. Basically, this step is used to create a structure comprising a big parallel-plate capacitor on a circuit substrate.

Of products each of high electrical capacity or capacitance, certain types of products employ distributed capacitances, and other types of products employ separate embedded capacitances. Through putting or adding a high dielectric-constant material, such as barium titanate, into an insulation layer, such a high electrical capacity is achieved.

A usual method for manufacturing embedded resistors employs resistive adhesive. This may include, for example, a resin to which conductive carbon or graphite is added, can be used as an additive or filler. The additive resin is silkscreen printed to designated location, and then be processed to laminate inside a circuit board. The resulting resistor is connected to other electronic components through plated-through holes or micro vias. Another method is called Ohmega-Ply, by which a two-metallic-layer structure of a copper layer and a thin nickel-alloy layer constitutes elements of a layer resistor formed relative to a substrate. Then through etching the copper layer and nickel-alloy layer, different nickel-alloy resistors with copper terminals can be formed. These resistors are each laminated in the circuit board.

In an embodiment, conductive wires/lines are directly printed in a linear layout on an inner surface of a glass lamp tube, with LED components directly attached on the inner surface and electrically connected by the conductive wires. In some embodiments, LED components in the form of chips are directly attached over the conductive wires on the inner surface, and connective points are disposed at terminals of the conductive wires for connecting the LED components and the power supply module. After being attached, the LED-component chips may have fluorescent powder applied or dropped thereon, for producing white light or light of other color by the operating LED tube lamp.

In some embodiments, luminous efficacy of the LED or LED component is 80 lm/W or above, and in some embodiments, it is preferably 120 lm/W or above, or more preferably 160 lm/W or above. White light emitted by an LED tube lamp in this disclosure can be produced by mixing fluorescent powder with monochromatic light emitted by a monochromatic LED chip. The white light's spectrum includes major wavelength ranges of 430-460 nm and 550-560 nm, or major wavelength ranges of 430-460 nm, 540-560 nm, and 620-640 nm.

It is also noted that the different configurations of circuit connection or layout of an LED module 50 illustrated in FIGS. 10A to 10I are not limited to being applied with an LED tube lamp, but can be applicable to other different types of LED lamps powered by AC electrical power (i.e., not provided by a ballast of an LED lamp), such as LED light bulbs, LED filament lamps, and integrally formed LED lamps, but the present disclosure is not limited to these recited types.

As mentioned above, electronic components of the power supply module can be disposed either on the circuit board disposed on the light strip or on the circuit board disposed in the end cap(s) of the tube lamp. For improving benefits or advantages of the power supply module, in some embodiments, capacitor(s) in the power supply module can be chip capacitor(s), such as multilayer ceramic chip capacitor(s), disposed either on the circuit board disposed on the light strip or on the circuit board disposed in the end cap(s). However, such disposed chip capacitor(s) is likely to produce or incur distinct noises due to piezoelectric effects during use, which may adversely affect the degree of comfort in using the LED tube lamp by consumers. To address and reduce this problem, in the LED tube lamp disclosed herein, a hole or groove can be disposed (directly) below the chip capacitor by drilling or boring, which may significantly reduce the noise by changing the vibration system formed under piezoelectric effects between the chip capacitor and the circuit board carrying the chip capacitor. The shape of the circumference of the hole or groove can be substantially close to, for example, a circle or round, an oval or ellipse, or a rectangle. In some embodiments, the hole or groove is formed in the conductive layer in the light strip, or in the circuit board disposed in the end cap(s), and below the chip capacitor(s).

Figure 10J:
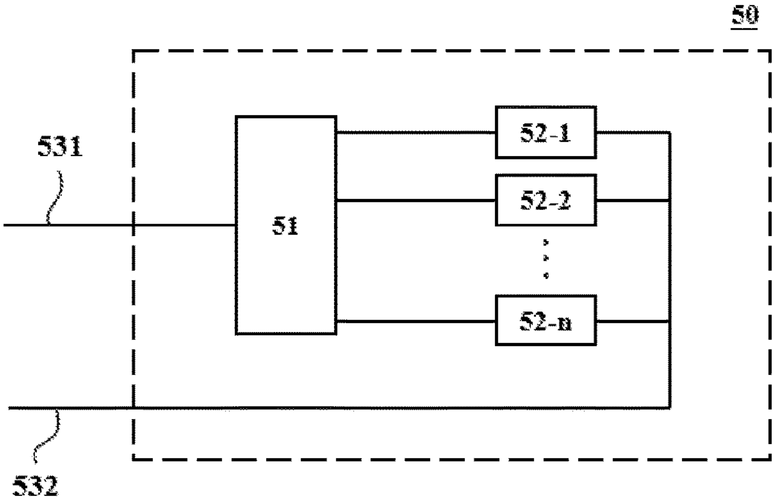
FIGS. 10J-10M are circuit structure diagrams of an LED module according to some embodiments.

Referring to FIG. 10J, it is a circuit structure diagram of an LED module according to some embodiments. In these embodiments, an LED module 50 includes a switching circuit 51 and a plurality or LED units 52. The plurality or LED units 52 may be configured to have different color temperatures, such as the LED unit 52-1 having a color temperature of 3500K, the LED unit 52-2 having a color temperature of 4500K, and the n-th LED unit **52-*n* having a color temperature of 5500K, wherein the n is an integer larger than or equal to 1. The LED units 52-1, 52-2, . . . , 52-*n* are respectively electrically connected to the switching circuit 51 and a second driving output terminal 532, and the switching circuit 51 is electrically connected to a first driving output terminal 531**.

In some occasions of use, when it's needed to switch into a different or set color temperature in an LED lamp, the switching circuit 51 is configured to connect an LED unit of a set color temperature to a power loop. More specifically, assuming the LED unit 52-1 has a color temperature of 3500K, when the LED lamp's color temperature is set to be 3500K, a switching circuit 51 electrically connects the LED unit 52-1 to a power loop, thus resulting in the LED unit 52-1 being electrically connected to the first driving output terminal 531 and second driving output terminal 532, and the LED lamp having a color temperature of 3500K when the LED unit 52-1 receives a driving signal from a driving circuit 530 to be lighted up. When the LED lamp is set to have another color temperature, the switching circuit 51 in response connects an LED unit of the other color temperature to the power loop.

Figure 10K:
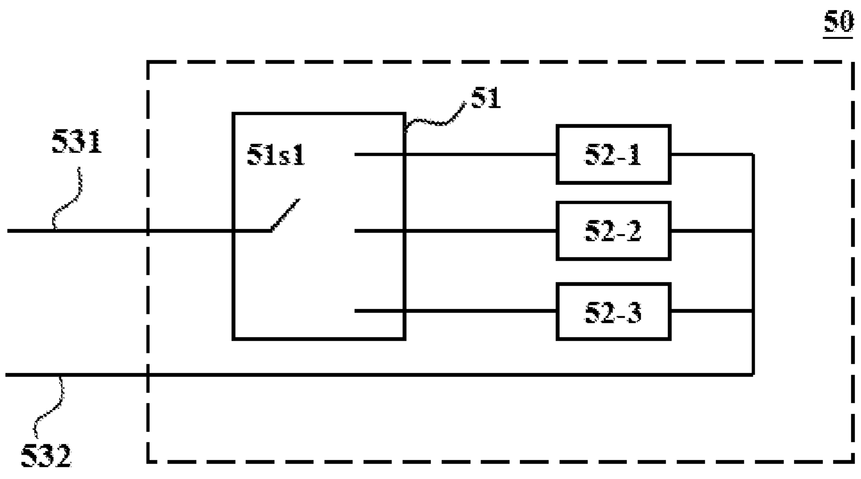

FIG. 10K is a circuit structure diagram of a switching circuit according to some embodiments. Referring to FIG. 10K, in these embodiments, an LED module includes LED units 52-1, 52-2, and 52-3 respectively of different color temperatures. A switching circuit 51 includes a switch **51*s*1 comprising a three-sectional mechanic switch. When the switch 51*s*1 is at its first section, the LED unit 52-1 is connected to a power loop, thus resulting in the LED unit 52-1 being electrically connected to a first driving output terminal 531 and a second driving output terminal 532. When the switch 51*s*1 is at its second section, the LED unit 52-2 is connected to the power loop, thus resulting in the LED unit 52-2 being electrically connected to the first driving output terminal 531 and the second driving output terminal 532. And when the switch 51*s*1 is at its third section, the LED unit 52-3 is connected to the power loop, thus resulting in the LED unit 52-3 being electrically connected to the first driving output terminal 531 and the second driving output terminal 532**.

In this embodiment, an LED unit 52-1 has a color temperature of 3500K, an LED unit 52-2 has a color temperature of 4500K, and an LED unit 52-3 has a color temperature of 5500K. When the switch **51*s*1 is at its first section, the LED lamp's color temperature is set to be 3500K and the LED unit 52-1 is lighted up. When the switch 51*s*1 is at its second section, the LED lamp's color temperature is set to be 4500K and the LED unit 52-2 is lighted up. When the switch 51*s*1 is at its third section, the LED lamp's color temperature is set to be 5500K and the LED unit 52-3** is lighted up.

In other embodiments, an LED module 50 may comprise more LED units configured to respectively have different color temperatures. Therefore, by switching to connect a distinct LED unit to a power loop, the LED module 50's color temperature can be set to be a corresponding color temperature, so as to realize the purpose of switching between different color temperatures to satisfy needs of use in different occasions.

Figure 10L:
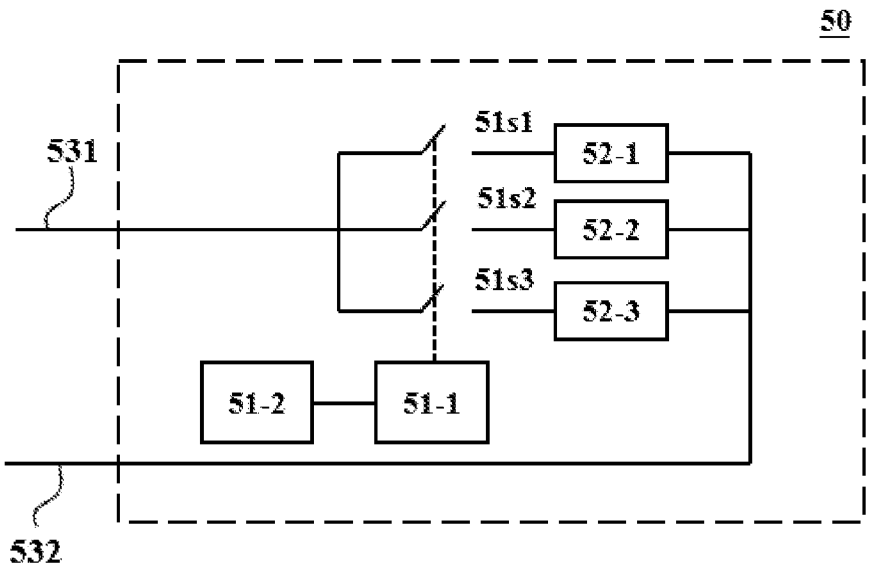

FIG. 10L is a circuit structure diagram of a switching circuit according to some embodiments. Referring to FIG. 10L, in these embodiments, a switching circuit 51 includes a switches **51*s*1, 51*s*2, and 51*s*3, a control unit 51-1, and an input unit 51-2. The switch 51*s*1 has a first pin electrically connected to a first driving output terminal 531, a second pin electrically connected to an LED unit 52-1, and a control terminal electrically connected to the control unit 51-1. The switch 51*s*2 has a first pin electrically connected to the first driving output terminal 531, a second pin electrically connected to an LED unit 52-2, and a control terminal electrically connected to the control unit 51-1. The switch 51*s*3 has a first pin electrically connected to the first driving output terminal 531, a second pin electrically connected to an LED unit 52-3, and a control terminal electrically connected to the control unit 51-1. The LED unit 52-1 is electrically connected to the switch 51*s*1 and a second driving output terminal 532, the LED unit 52-2 is electrically connected to the switch 51*s*2 and the second driving output terminal 532, and the LED unit 52-3 is electrically connected to the switch 51*s*3 and the second driving output terminal 532. And the input unit 51-2 is electrically connected to the control unit 51-1**.

In this embodiment, the switches **51*s*1, 51*s*2, and 51*s*3 are respectively field effect transistors. In other embodiments, other types of electronic switches may be used and the present invention is not limited to any of the various types. The LED units 52-1, 52-2, and 52-3 are configured to respectively have different color temperatures, such as the LED unit 52-1 having a color temperature 3500K, the LED unit 52-2 having a color temperature 4500K, and the LED unit 52-3 having a color temperature 5500K. The input unit 51-2 is configured to generate a color-temperature adjusting signal according to a user operation. The control unit 51-1 receives the color-temperature adjusting signal and controls operation of a switch according to the color-temperature adjusting signal. When the input unit 51-2 is used to set a color temperature to be 3500K, the control unit 51-1 causes the switch 52*s*1 to be closed, coupling the LED unit 52-1 to a power loop to receive a driving signal and thus be lighted up, while the other switches are in a cutoff state, resulting in the LED lamp to have a color temperature of 3500K. When the input unit 51-2 is used to set a color temperature to be 4500K, the control unit 51-1 causes the switch 52*s*2 to be closed, coupling the LED unit 52-2** to a power loop to receive a driving signal and thus be lighted up, while the other switches are in a cutoff state, resulting in the LED lamp to have a color temperature of 4500K. Realizing any other value to which a color temperature of the LED lamp is set is likewise achieved.

It's noted that an input unit 51-2 can be used to set a color temperature only to each of existing color-temperature degrees respectively of the LED units. In this embodiment, an input unit 52-2 may be used to set a color temperature to each of 3500K, 4500K, and 5500K. The input unit 51-2 may be realized by a multi-sectional switch, meaning different positions of the multi-sectional switch correspond to different color temperatures respectively, and adjusting the position of the multi-sectional switch can adjust color temperature. The multi-sectional switch may be disposed on an end cap of an LED lamp, or disposed in a panel of switch(s) on a wall, but the present invention is not limited to any of these embodiments.

In other embodiments, an input unit 51-2 may use any of other ways to generate a color-temperature adjusting signal, but the present invention is not limited to any of the mentioned ways.

In some embodiments, a switching circuit 51 may connect a plurality of LED units to a power loop, such as conducting switches 51$s$1 and 51$s$2 concurrently to connect an LED unit 52-1 and an LED unit 52-2 concurrently to a power loop to light up both the LED units 52-1 and 52-2, wherein the resulting color temperature of the LED lamp is a result of adding the color temperatures respectively of the LED units 52-1 and 52-2.

Figure 10M:
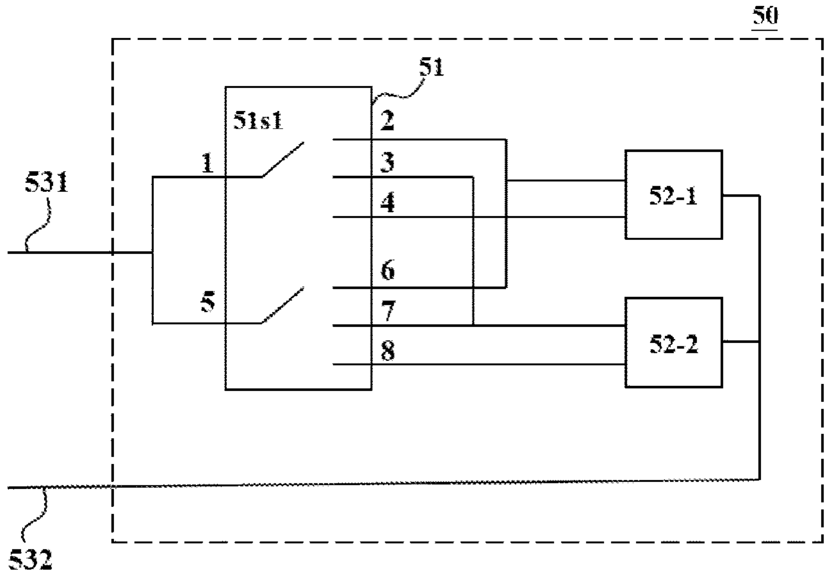

FIG. 10M is a circuit structure diagram of a switching circuit according to some embodiments. Referring to FIG. 10M, in these embodiments, a switching circuit 51 includes a double-pole three-sectional slide switch 51$s$1 (herein below referred to as a slide switch 51$s$1). The slide switch 51$s$1 includes 8 electrical pins, including pins 1-4 forming a first pole of three-sectional switch with the pin 1 being a common pin; and including pins 5-8 forming a second pole of three-sectional switch with the pin 5 being a common pin. The first pole of three-sectional switch and the second pole of three-sectional switch operate concurrently, meaning when the first pole of three-sectional switch conducts a path between the pins 1 and 2, the second pole of three-sectional switch conducts a path between the pins 5 and 6; when the first pole of three-sectional switch conducts a path between the pins 1 and 3, the second pole of three-sectional switch conducts a path between the pins 5 and 7; and when the first pole of three-sectional switch conducts a path between the pins 1 and 4, the second pole of three-sectional switch conducts a path between the pins 5 and 8.

Next, operation principle(s) of the switching circuit 51 are described. When a slide switch 51$s$1 is switched to its section 3, its pins 1 and 2 are conducted and pins 5 and 6 are conducted, so that as shown in FIG. 10M the pins 1 and 5 of the slide switch 51$s$1 are electrically connected and connected to a first driving output terminal 531 and the pins 2 and 6 of the slide switch 51$s$1 are electrically connected and connected to an LED unit 52-1, which is connected to a second driving output terminal 532. In this case the LED unit 52-1 is coupled to a power loop in order to receive a driving signal and then be lighted up. When the slide switch 51$s$1 is switched to its section 2, its pins 1 and 3 are conducted and pins 5 and 7 are conducted, so that as shown in FIG. 10M the pins 5 and 7 of the slide switch 51$s$1 are electrically connected and connected to an LED unit 52-2, which is then coupled to a power loop in order to receive a driving signal and then be lighted up. When the slide switch 51$s$1 is switched to its section 3, its pins 1 and 4 are conducted and pins 5 and 8 are conducted, so that as shown in FIG. 10M the pin 4 of the slide switch 51$s$1 is electrically connected to the LED unit 52-1 and the pin 8 of the slide switch 51$s$1 is electrically connected to the LED unit 52-2, which LED units 52-1 and 52-2 are then concurrently coupled to a power loop in order to receive a driving signal and then be lighted up. In these embodiments of FIG. 10M, the LED units 52-1 and 52-2 may be disposed to have different color temperatures, and switching between three color temperatures may be realized by switching the slide switch 51$s$1 between its three sections as described above.

In some embodiments, different LED units may be configured to respectively emit lights in different colors, but the present invention is not limited thereto.

Through the circuit configurations illustrated in FIGS. 10J-10M, it may be easily and conveniently realized to switch between different color temperatures in an LED lamp. In the case of disposing LED units in order to have different color temperatures in an LED lamp, switching between the different color temperatures may be realized by switching between the LED units to couple one or more of them to a power loop to have one of the different color temperatures. Therefore, in designing and production, production of merely one model of such a designed LED lamp is needed to satisfy customers' need for an LED lamp having a function of having different color temperatures.

Figure 11A:
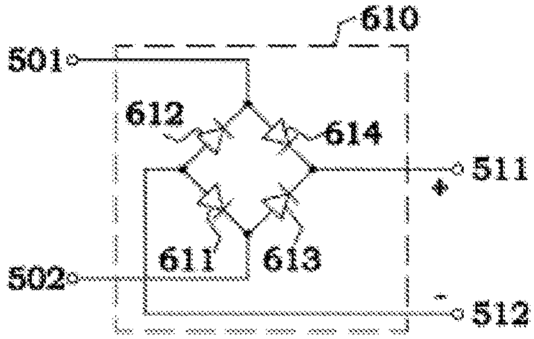
FIGS. 11A-11F are schematic circuit diagrams of exemplary rectifying circuits according to some exemplary embodiments.

FIG. 11A is a schematic circuit diagram of a rectifying circuit according to an embodiment. Referring to FIG. 11A, a rectifying circuit 610, i.e., a bridge rectifier, includes four rectifying diodes 611, 612, 613, and 614, configured to full wave rectify a received signal. The diode 611 has an anode connected to the output terminal 512, and a cathode connected to the pin 502. The diode 612 has an anode connected to the output terminal 512, and a cathode connected to the pin 501. The diode 613 has an anode connected to the pin 502, and a cathode connected to the output terminal 511. The diode 614 has an anode connected to the pin 501, and a cathode connected to the output terminal 511.

The rectifying circuit 610 in this embodiment can output or produce a proper rectified signal regardless of whether the received input signal is an AC or DC signal.

Figure 11B:
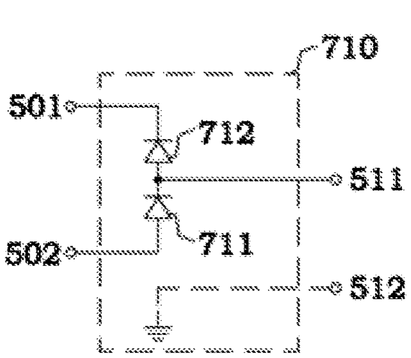

FIG. 11B is a schematic diagram of a rectifying circuit according to an embodiment. Referring to FIG. 11B, a rectifying circuit 710 includes two rectifying diodes 711 and 712, configured to half-wave rectify a received signal. The rectifying diode 711 has an anode connected to the pin 502, and a cathode connected to the rectifying output terminal 511. The rectifying diode 712 has an anode connected to the rectifying output terminal 511, and a cathode connected to the pin 501. The rectifying output terminal 512 can be omitted or connected to ground according to the practical application.

The rectified signal produced or output by the rectifying circuit 710 is a half-wave rectified signal.

Figure 11C:
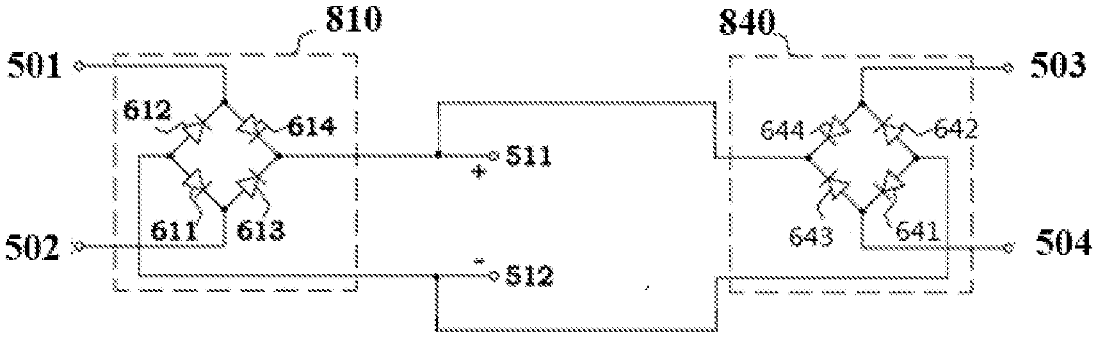

It should be noted that when the pins 501 and 502 shown in FIG. 11A and FIG. 11B are respectively changed to the pins 503 and 504, the rectifying circuit 610 and 710 can be considered as the rectifying circuit 540 illustrated in FIG. 9B. More specifically, in an exemplary embodiment, when the full-wave rectifying circuit 610 shown in FIG. 11A is applied to the dual-end tube lamp shown in FIG. 9B, the configuration of the rectifying circuits 510 and 540 is shown in FIG. 11C. FIG. 11C is a schematic diagram of a rectifying circuit according to an embodiment.

Referring to FIG. 11C, the rectifying circuit 840 has the same configuration as the rectifying circuit 810, which is the bridge rectifying circuit. The rectifying circuit 810 includes four rectifying diodes 611 to 614, which has the same configuration as the embodiment illustrated in FIG. 11A. The rectifying circuit 840 includes four rectifying diodes 641 to 644 and is configured to perform full-wave rectification on the received signal. The rectifying diode 641 has an anode coupled to the rectifying output terminal 512, and a cathode coupled to the pin 504. The rectifying diode 642 has an anode coupled to the rectifying output terminal 512, and a cathode coupled to the pin 503. The rectifying diode 643 has an anode coupled to the pin 502, and a cathode coupled to the rectifying output terminal 511. The rectifying diode 644 has an anode coupled to the pin 503, and a cathode coupled to the rectifying output terminal 511.

In the present embodiment, the rectifying circuits 810 and 840 are configured to correspond to each other, in which the difference between the rectifying circuits 610 and 840 is that the input terminal of the rectifying circuit 810 (which can be used as the rectifying circuit 510 shown in FIG. 9B) is coupled to the pins 501 and 502, but the input terminal of the rectifying circuit 840 (which can be used as the rectifying circuit 540 shown in FIG. 9B) is coupled to the pins 503 and 504. Therefore, the present embodiment applies a structure including two full-wave rectifying circuits for implementing the dual-end-dual-pin circuit configuration.

Further, in a rectifying circuit shown in the embodiments of FIG. 11C, although a circuit configuration having two pins at each of the two ends of an LED tube lamp including the rectifying circuit is disposed for power supplying, each of other power-supplying ways, including providing power to only one end of an LED tube lamp and providing power to a conductive pin at each of the two ends of the LED tube lamp, may be adopted for providing power to the LED tube lamp with the circuit structure of the rectifying circuit in the embodiments of FIG. 10C. Specific operations in these embodiments are described below.

When the AC supply signal is provided through both pins on single end cap, the AC supply signal can be applied to the pins 501 and 502, or to the pins 503 and 504. When the AC supply signal is applied to the pins 501 and 502, the rectifying circuit 810 performs full-wave rectification on the AC supply signal based on the operation illustrated in the embodiment of FIG. 9A, and the rectifying circuit 840 does not operate. On the contrary, when the external driving signal is applied to the pins 503 and 504, the rectifying circuit 840 performs full-wave rectification on the AC supply signal based on the operation illustrated in the embodiment of FIG. 9A, and the rectifying circuit 810 does not operate.

When the AC supply signal is provided through a single pin on each end cap, the AC supply signal can be applied to the pins 501 and 504, or to the pins 502 and 503. When the AC supply signal is applied to the pins 501 and 504, during the AC supply signal's positive half cycle (e.g., the voltage at pin 501 is higher than the voltage at pin 504), the AC supply signal is input through the pin 501, the diode 614, and the output terminal 511 in sequence, and later output through the output terminal 512, the diode 641, and the pin 504 in sequence. In this manner, output terminal 511 remains at a higher voltage than output terminal 512. During the AC supply signal's negative half cycle (e.g., the voltage at pin 504 is higher than the voltage at pin 501), the AC supply signal is input through the pin 504, the diode 643, and the output terminal 511 in sequence, and later output through the output terminal 512, the diode 612, and the pin 501 in sequence. In this manner, output terminal 511 still remains at a higher voltage than output terminal 512. Therefore, during the AC supply signal's full cycle, the positive pole of the rectified signal remains at the output terminal 511, and the negative pole of the rectified signal remains at the output terminal 512. Accordingly, the diodes 612 and 614 of the rectifying circuit 810 and the diodes 641 and 643 of the rectifying circuit 840 are configured to perform the full-wave rectification on the AC supply signal and thus the rectified signal produced or output by the diodes 612, 614, 641, and 643 is a full-wave rectified signal.

On the other hand, when the AC supply signal as the external driving signal is applied to the pins 502 and 503, during the positive half cycle of the AC supply signal (e.g., the voltage at pin 502 is higher than the voltage at pin 503), the AC supply signal is input through the pin 503, the diode 644, and the input terminal 511 in sequence, and later output through the output terminal 512, the diode 611, and the pin 502. During the negative half cycle of the AC supply signal (e.g., the voltage at pin 503 is higher than the voltage at pin 502), the AC supply signal is input through the pin 502, the diode 613, and the output terminal 511 in sequence, and later output through the output terminal 512, the diode 642, and the pin 503 in sequence. Therefore, during the AC supply signal's full cycle, the positive pole of the rectified signal remains at the output terminal 511, and the negative pole of the rectified signal remains at the output terminal 512. Accordingly, the diodes 611 and 613 of the rectifying circuit 810 and the diodes 642 and 644 of the rectifying circuit 840 are configured to perform the full-wave rectification on the AC supply signal and thus the rectified signal produced and output by the diodes 611, 613, 642, and 644 is a full-wave rectified signal.

When the AC supply signal is provided through two pins on each end cap, the operation in each of the rectifying circuits 810 and 840 can be referred to the embodiment illustrated in FIG. 11A, and it will not be repeated herein. The rectified signal produced by the rectifying circuits 810 and 840 is output to the back-end circuit after superposing on the output terminals 511 and 512.

Figure 11D:
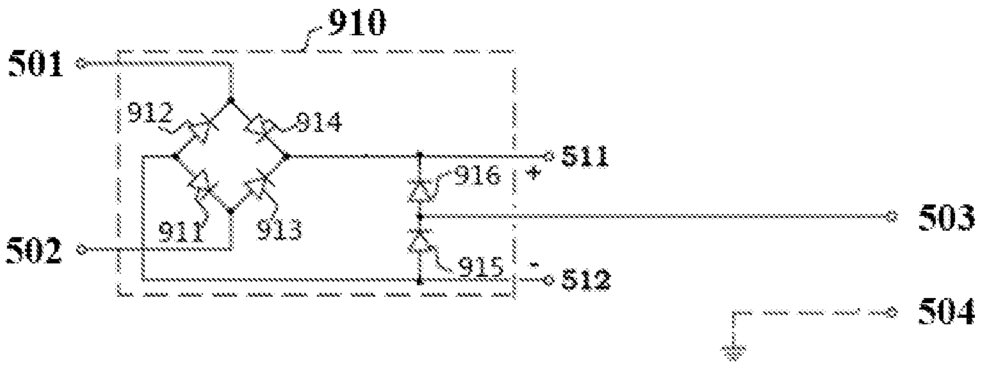

In an exemplary embodiment, the rectifying circuit 510 illustrated in FIG. 9C can be implemented by the configuration illustrated in FIG. 11D. FIG. 11D is a schematic diagram of a rectifying circuit according to an embodiment. Referring to FIG. 11D, the rectifying circuit 910 includes diodes 911 to 914, which are configured as the embodiment illustrated in FIG. 11A. In the present embodiment, the rectifying circuit 910 further includes rectifying diodes 915 and 916. The diode 915 has an anode coupled to the rectifying output terminal 512, and a cathode coupled to the pin 503. The diode 916 has an anode coupled to the pin 503, and a cathode coupled to the rectifying output terminal 511. The pin 504 is set to the float state in the present embodiment.

Specifically, the rectifying circuit 910 can be regarded as a rectifying circuit including three sets of bridge arms, in which each of the bridge arms provides an input signal receiving terminal. For example, the diodes 911 and 913 constitute a first bridge arm for receiving the signal on the pin 502; the diodes 912 and 914 constitute a second bridge arm for receiving the signal on the pin 501; and the diodes 915 and 916 constitute a third bridge arm for receiving the signal on the pin 503. According to the rectifying circuit 910 illustrated in FIG. 11D, the full-wave rectification can be performed as long as AC signal with different polarity are respectively received by two of the bridge arms. Accordingly, under the configuration illustrated in FIG. 11D, no matter what kind of power supply configuration, such as the AC supply signal being provided to both pins on a single end cap, a single pin on each end cap, or both pins on each end cap, the rectifying circuit 910 is compatible for producing the rectified signal, correctly. Detailed operations of the are described below.

When the AC supply signal is provided through both pins on single end cap, the AC supply signal can be applied to the pins 501 and 502. The diodes 911 to 914 perform full-wave rectification on the AC supply signal based on the operation illustrated in the embodiment of FIG. 11A, and the diodes 915 and 916 do not operate.

When the AC supply signal is provided through single pin on each end cap, the AC supply signal can be applied to the pins 501 and 503, or to the pins 502 and 503. When the AC supply signal is applied to the pins 501 and 503, during the AC supply signal's positive half cycle (e.g., when the signal on pin 501 has a greater voltage than the signal on pin 503), the AC supply signal is input through the pin 501, the diode 914, and the output terminal 511 in sequence, and later output through the output terminal 512, the diode 915, and the pin 503 in sequence. During the AC supply signal's negative half cycle (e.g., when the signal on pin 503 has a greater voltage than the signal on pin 501), the AC supply signal is input through the pin 503, the diode 916, and the output terminal 511 in sequence, and later output through the output terminal 512, the diode 912, and the pin 501 in sequence. Therefore, during the AC supply signal's full cycle, the positive pole of the rectified signal remains at the output terminal 511, and the negative pole of the rectified signal remains at the output terminal 512. Accordingly, the diodes 912, 914, 915, and 916 of the rectifying circuit 910 are configured to perform the full-wave rectification on the AC supply signal and thus the rectified signal produced or output by the diodes 912, 914, 915, and 916 is a full-wave rectified signal.

On the other hand, when an external driving signal is applied to the second pin 502 and third pin 503 and the external driving signal is an AC signal, during the positive half cycle of the AC signal, the AC signal is input and flows in through the third pin 50 3, the sixth rectifying diode 916, and the first rectifying output terminal 511 in sequence, and is later output and flows out through the second rectifying output terminal 512, the first rectifying diode 911, and the second pin 502 in sequence. During the negative half cycle of the AC signal, the AC signal is input and flows in through the second pin 502, the third rectifying diode 913, and the first rectifying output terminal 511 in sequence, and is later output and flows out through the second rectifying output terminal 512, the fifth rectifying diode 915, and the third pin 503 in sequence. Therefore, no matter whether the AC signal is in the positive half cycle or negative half cycle thereof, the positive pole of the rectified signal remains at the first rectifying output terminal 511, and the negative pole of the rectified signal remains at the second rectifying output terminal 512. According to the above description of operations, the first, third, fifth, and sixth rectifying diodes 911, 913, 915, and 916 of the rectifying circuit 910 are configured to perform full-wave rectification on the AC signal and thus the output rectified signal is a full-wave rectified signal.

When the AC supply signal is provided through two pins on each end cap, the operation of the diodes 911 to 914 can be referred to the embodiment illustrated in FIG. 11A, and it will not be repeated herein. Also, if the signal polarity of the pin 503 is the same as the pin 501, the operation of the diodes 915 and 916 is similar to that of the diodes 912 and 914 (i.e., the first bridge arm). On the other hand, if the signal polarity of the pin 503 is the same as that of the pin 502, the operation of the diodes 915 and 916 is similar with the diodes 912 and 914 (i.e., the second bridge arm).

Figure 11E:
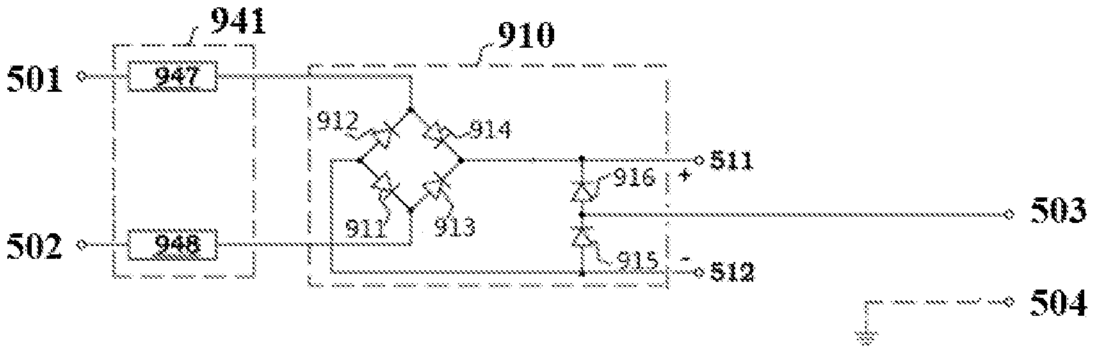

FIG. 11E is a circuit structure diagram of a rectifying circuit according to some exemplary embodiments. Referring to FIG. 11E, the embodiments shown in FIG. 11E similar to the embodiment of FIG. 11D, with a difference that input terminals of a first rectifying circuit 910 in FIG. 11E are coupled to a terminal adapter circuit 941. In these embodiments, the terminal adapter circuit 941 comprises fuses 947 and 948. The fuse 947 has an end connected to a first pin 501, and another end connected to a common node between a second rectifying diode 912 and a fourth rectifying diode 914, which is an input terminal of a first bridge arm. The fuse 948 has an end connected to a second pin 502, and another end connected to a common node between a first rectifying diode 911 and a third rectifying diode 913, which is an input terminal of a second bridge arm. With this structure, when a current flowing through the first pin 501 or second pin 502 exceeds a current rating of the fuse 947 or 948 respectively, the fuses 947 or 948 will correspondingly melt and then break the circuit in order to achieve overcurrent protection function. Besides, in the case that only one of the fuses 947 and 948 has melted, for example, when an overcurrent condition happened just briefly and soon disappeared, after the overcurrent condition disappeared the rectifying circuit in these embodiments may continue to operate steadily based on the power-supply configuration using one conductive pin at each of the two ends of the LED tube lamp including the rectifying circuit.

Figure 11F:
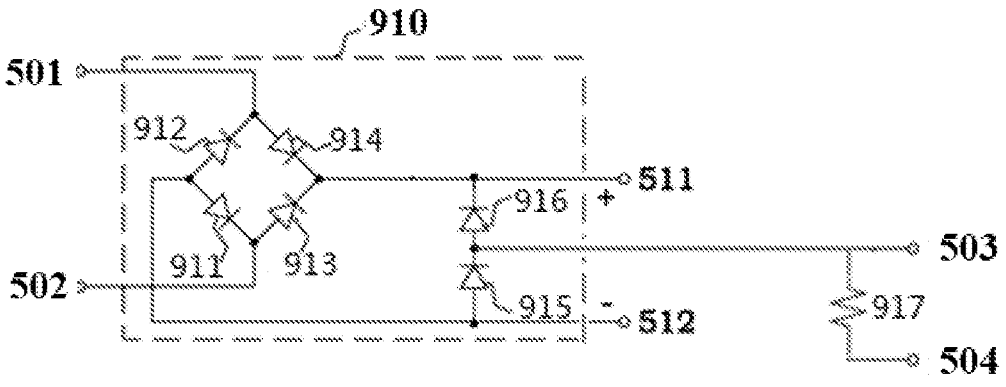

FIG. 11F is a circuit structure diagram of a rectifying circuit according to some exemplary embodiments. Referring to FIG. 11F, the embodiment shown in FIG. 11F is similar to the embodiment of FIG. 11D, with a difference that two pins 503 and 504 in FIG. 11F are connected to each other through a thin conductive line 917. Compared to the embodiments shown respectively in FIGS. 11D and 11E, when power supplying configuration using a pin at each of the two ends of the LED tube lamp is applied in the embodiments of FIG. 11F, no matter whether an external driving signal is input to the third pin 503 or fourth pin 504, the rectifying circuit in the embodiments of FIG. 11F can normally operate. Beside, when the third pin 503 and fourth pin 504 of the tube lamp are wrongly connected to the lamp socket/base configured for the power supplying configuration using only one of the two ends of the tube lamp, the thin conductive line 917 can be melted reliably, so that after the tube lamp is again connected to a suitable lamp socket, the tube lamp using the rectifying circuit in the embodiments of FIG. 11F can still perform normal rectification.

It can be known from the above description that the rectifying circuit in the embodiments of FIGS. 11C to 11F can be compatible with each of the situations of providing power to only one end of an LED tube lamp, providing power to a conductive pin at each of the two ends of an LED tube lamp, and providing power to two conductive pins at each of the two ends of an LED tube lamp, so as to improve an LED tube lamp's overall compatibility with different application environments. In addition, considering actual circuit layout circumstances, circuit configurations in a tube lamp in the embodiments of FIGS. 11C to 11F require merely three soldering pads disposed for connecting to corresponding pins at the two end caps, which few numbers of pads can significantly contribute to improving yields in the overall manufacturing process.

Figure 12A:
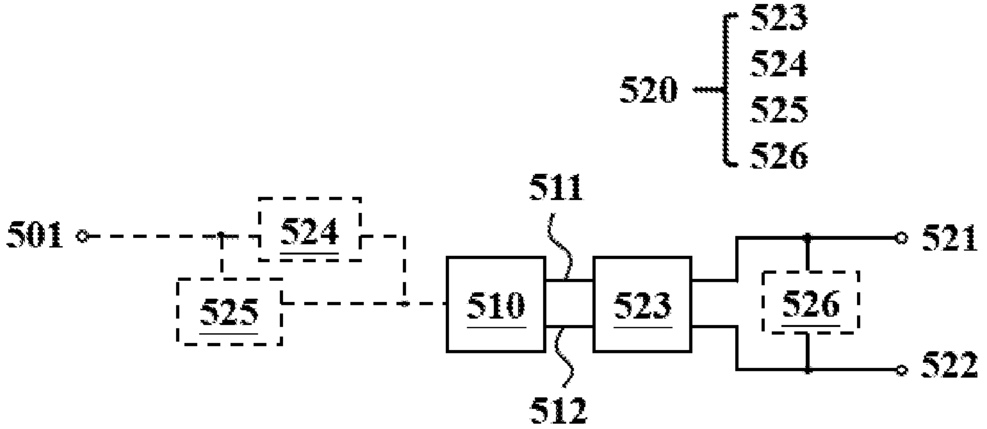
FIGS. 12A-12C are schematic circuit diagrams of exemplary rectifying circuits according to some exemplary embodiments.

FIG. 12A is a circuit block diagram of a filtering circuit according to some embodiments. The rectifying circuit 510 is shown in FIG. 12A for illustrating its connection with other circuits, without intending the filtering circuit 520 to include the rectifying circuit 510. Referring to FIG. 12A, the filtering circuit 520 includes a filtering unit 523 coupled to a first rectifying output terminal 511 and a second rectifying output terminal 512, in order to receive a rectified signal output from the rectifying circuit 510, to filter out ripples of the rectified signal, and then to output a filtered signal. Therefore, the waveform of the filtered signal is smoother than that of the rectified signal. The filtering circuit 520 may further include a filtering unit 524 coupled between a rectifying circuit and a corresponding conductive pin, in order to perform filtering with respect to a specific frequency, so as to filter out the specific frequency from the external driving signal. For example, a filtering unit 524 can be coupled between the first rectifying circuit 510 and a first pin 501, between the first rectifying circuit 510 and a second pin 502, between the second rectifying circuit 540 and a third pin 503, or between the second rectifying circuit 540 and a fourth pin 504. In the embodiments of FIG. 12A, the filtering unit 524 is coupled between a first pin 501 and the first rectifying circuit 510. The filtering circuit 520 may further include a filtering unit 525 coupled between one of the first and second pins 501 and 502 and one of the diodes of the first rectifying circuit 510, or between one of the third and fourth pins 503 and 504 and one of the diodes of the second rectifying circuit 540, in order to reduce or filter out electromagnetic interference (EMI). In the embodiments of FIG. 12A, the filtering unit 525 is coupled between the first pin 501 and one of diodes (not shown in FIG. 12A) of the first rectifying circuit 510.

In some embodiments, a filtering circuit 520 may further include a negative-voltage offsetting unit 526. The negative-voltage offsetting unit 526 is coupled to a filtering unit 523, in order to eliminate possible effects of a negative voltage generated during resonance occurring in the filtering unit 523, thereby preventing circuit chip(s) or controller(s) in a later-stage driving circuit from being damaged. Specifically, the filtering unit 523 is usually a circuit including a combination of resistor(s), capacitor(s), and/or inductor(s), wherein characteristics respectively of a capacitor and an inductor may cause the filtering unit 523 to exhibit purely resistive property under specific frequency (i.e., a resonance point). At the resonance point, a signal received by the filtering unit 523 will be amplified and then output, causing a phenomenon of signal oscillation observable at an output terminal of the filtering unit 523. When an amplitude of the signal oscillation is excessive to cause a wave-trough voltage level below a ground voltage level, a negative voltage will occur on the filtering output terminals 521 and 522, which negative voltage will be applied to, and thus liable to cause damages to, later-stage circuit(s). The negative-voltage offsetting unit 526 is configured to conduct a discharging loop when the negative voltage occurs, in order to release a reverse current caused by the negative voltage to a main power line through the discharging loop, thereby preventing the reverse current from flowing to later-stage circuit(s).

Since the filtering units 524 and 525 and the negative-voltage offsetting unit 526 may be added or omitted depending on circumstances of practical applications, the filtering units 524 and 525 and the negative-voltage offsetting unit 526 are depicted by dotted lines in FIG. 12A.

Figure 12B:
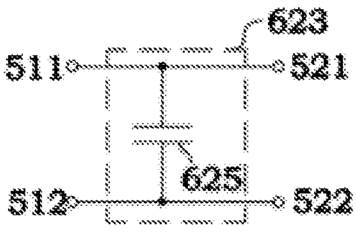

FIG. 12B is a schematic diagram of the filtering unit according to an embodiment. Referring to FIG. 12B, a filtering unit 623 includes a capacitor 625 having an end coupled to the output terminal 511 and a filtering output terminal 521 and the other end thereof coupled to the output terminal 512 and a filtering output terminal 522, and is configured to low-pass filter a rectified signal from the output terminals 511 and 512, so as to filter out high-frequency components of the rectified signal and thereby output a filtered signal at the filtering output terminals 521 and 522.

Figure 12C:
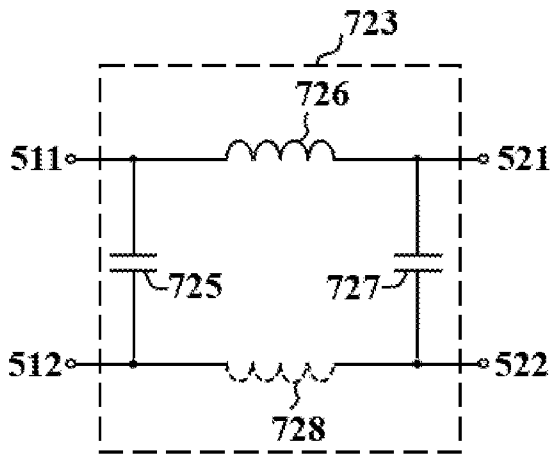

FIG. 12C is a circuit structure diagram of a filtering unit according to some embodiments. Referring to FIG. 12C, the filtering unit 723 includes a pi filter circuit including a capacitor 725, an inductor 726, and a capacitor 727, where the structure of the pi filter circuit is similar the symbol Tr. The capacitor 725 has an end coupled to a first rectifying output terminal 511 and coupled to a first filtering output terminal 521 through the inductor 726, and another end coupled to a second rectifying output terminal 512 and a second filtering output terminal 522. The inductor 726 is coupled between the first rectifying output terminal 511 and the first filtering output terminal 521. The capacitor 727 has an end coupled to the first rectifying output terminal 511 through the inductor 726 and coupled to the first filtering output terminal 521, and another end coupled to the second rectifying output terminal 512 and the second filtering output terminal 522.

Equivalently, the filtering unit 723 compared to the filtering unit 623 in FIG. 12B additionally has an inductor 726 and a capacitor 727, which perform the function of low pass filtering like the capacitor 725 does. Therefore, the filtering unit 723 in this embodiment compared to the filtering unit 623 in FIG. 12B has a better ability to filter out high-frequency components to output a filtered signal with a smoother waveform. In some embodiments, the filtering unit 723 further includes an inductor 728 serially connected between the second rectifying output terminal 512 and the second filtering output terminal 522. The inductance values of the inductor 726 and 728 in the embodiments mentioned above are chosen in the range of, for example, about 10 nH to 10 mH. And the capacitance values of the capacitors 625, 725, and 727 in the embodiments described above are chosen in the range of, for example, about 100 pF to 1 μF.

Figure 13A:
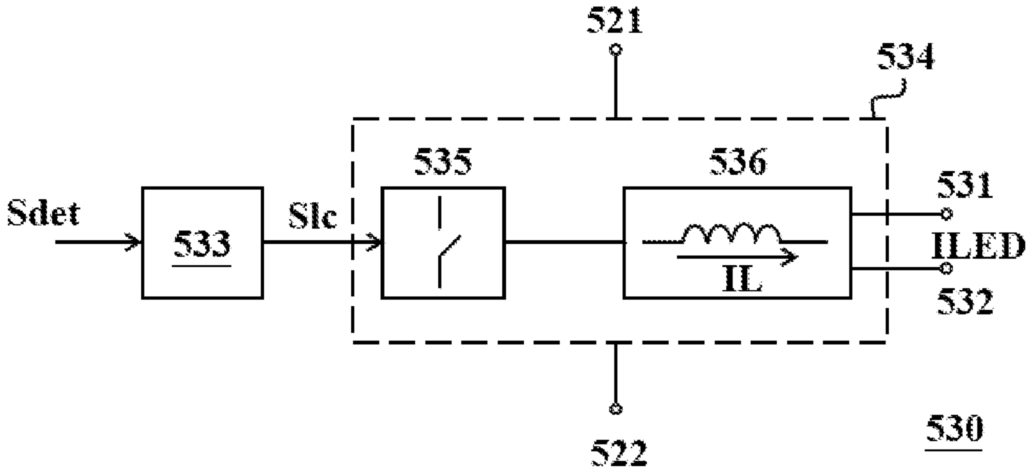
FIGS. 13A-13F are schematic circuit structure diagrams of driving circuits according to some exemplary embodiments.

FIG. 13A is a block diagram of the driving circuit according to an embodiment. Referring to FIG. 13A, the driving circuit 530 includes a controller 533, and a conversion circuit 534 for power conversion based on a current source, for driving an LED module to emit light. The conversion circuit 534 includes a switching circuit 535 (also known as a power switch) and an energy storage circuit 536. And the conversion circuit 534 is coupled to first and second filtering output terminals 521 and 522 in order to receive and then convert a filtered signal, under the control by the controller 533, into a driving signal at first and second driving output terminals 531 and 532 for driving the LED module. Under the control by the controller 533, the driving signal output by the conversion circuit 534 comprises a steady current, making the LED module emit steady light.

Figure 14A:
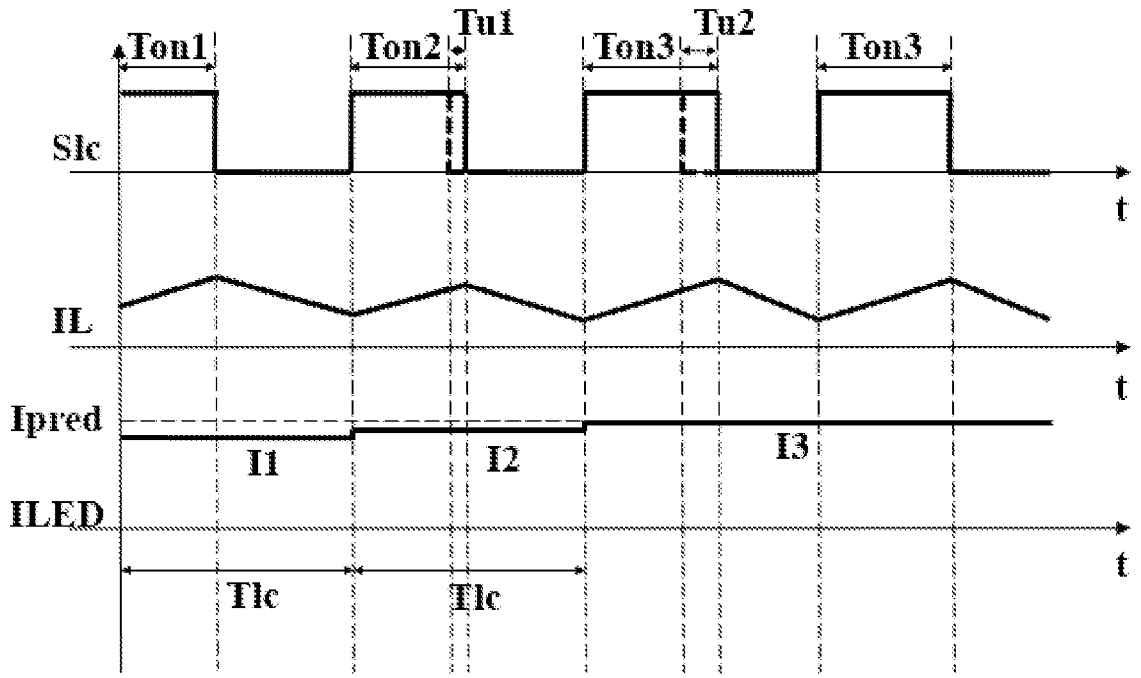
FIGS. 14A and 14B are the signal waveform variations of the driving circuit according to some exemplary embodiments.
Figure 14B:
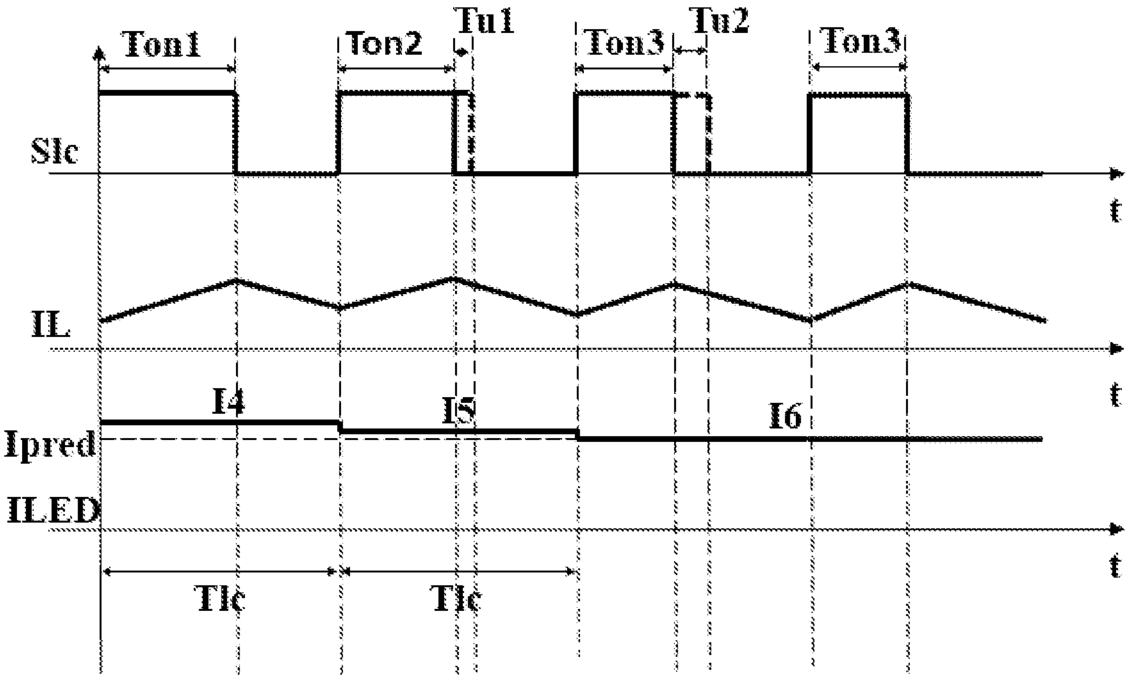
Figure 15A:
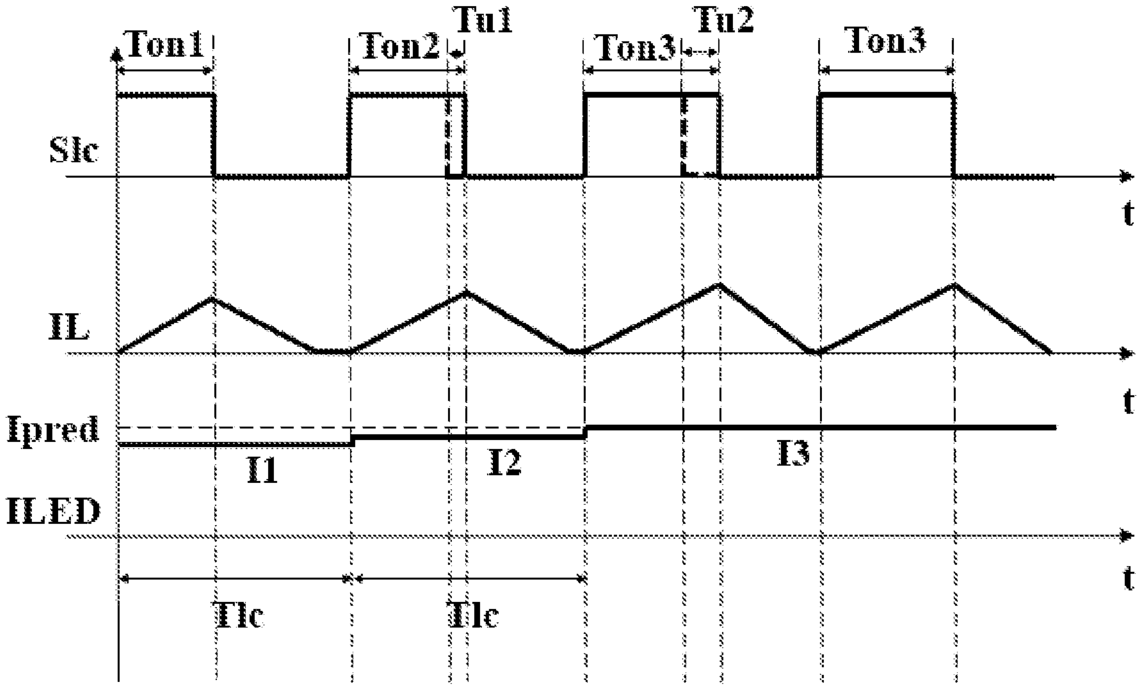
FIG. 15A is a signal waveform diagram of a driving circuit according to some exemplary embodiments.
Figure 15B:
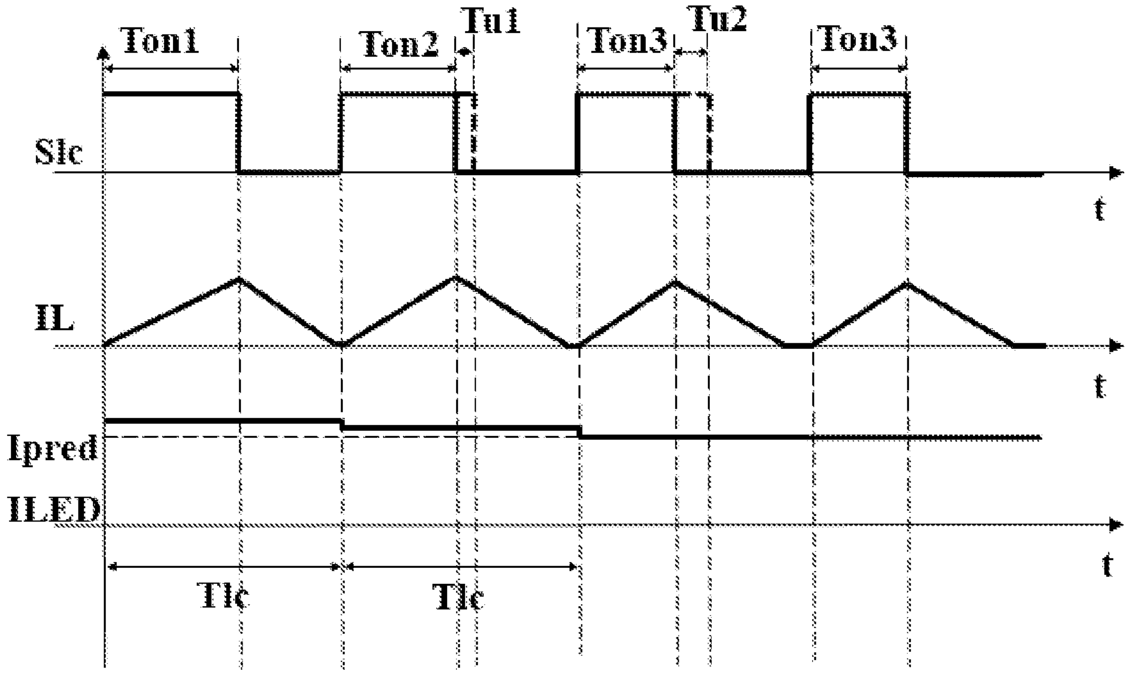
FIG. 15B is a signal waveform diagram of a driving circuit according to some exemplary embodiments.

The operation of the driving circuit 530 is further described based on the signal waveform illustrated in FIGS. 14A to 15B. FIGS. 14A to 15B are signal waveform diagrams of exemplary driving circuits according to some exemplary embodiments, in which FIGS. 14A and 14B illustrate the signal waveform and the control condition when the driving circuit 530 is operated in a Continuous-Conduction Mode (CCM) and FIGS. 15A and 15B illustrate the signal waveform and the control condition when the driving circuit 530 is operated in a Discontinuous-Conduction Mode (DCM). In signal waveform diagrams, the horizontal axis represents time (represented by a symbol "t"), and the vertical axis represents a voltage or current value (depending on the type of the signal).

The controller 533 can be, for example, a constant current controller which can generate a lighting control signal Slc and adjust the duty cycle of the lighting control signal Slc based on a current detection signal Sdet, so that the switch circuit 535 is turned on or off in response to the lighting control signal Slc. The energy storage circuit 536 is repeatedly charged and discharged according to the on/off state of the switch circuit 535, so that the driving current ILED received by the LED module 50 can be stably maintained at a predetermined current value Ipred. In some embodiments, the lighting control signal Slc may have fixed signal period Tlc and signal amplitude, and the pulse-on period (also known as the pulse width) of each signal period Tlc, such as Ton1, Ton2 and Ton3, can be adjusted according to the control requirement. In the present embodiment, the duty cycle of the lighting control signal Slc represents a ratio of the pulse-on period and the signal period Tlc. For example, when the pulse-on period Ton1 is 40% of the signal period Tlc, the duty cycle of the lighting control signal Slc under the first signal period Tlc is 0.4.

In addition, the signal level of the current detection signal may represent the magnitude of the current flowing through the LED module 50 or represent the magnitude of the current flowing through the switching circuit 535; the present disclosure is not limited thereto.

Referring to FIGS. 13A and 14A, FIG. 14A illustrates the signal waveform variation of the driving circuit 530 during a plurality of signal periods Tlc when the driving current ILED is smaller than the predetermined current value Ipred. Specifically, under the first signal period Tlc, the switching circuit 535 is turned on during the pulse-on period Ton1 in response to the high-level voltage of the lighting control signal Slc. In the meantime, the conversion circuit 534 provides the driving current ILED to the LED module 50 according to an input power received from the first and the second filtering output terminals 521 and 522, and further charges the energy storage circuit 536 via the turned-on switch circuit 535, so that the current IL flowing through the energy storage circuit 536 gradually increases. In this manner, during the pulse-on period Ton1, the energy storage circuit 536 is charged in response to the input power received from the first and the second filtering output terminals 521 and 522.

After the pulse-on period Ton1, the switch circuit 535 is turned off in response to the low-level voltage of the lighting control signal Slc. During a cut-off period of the switch circuit 535, the input power output from the first and the second filtering output terminals 521 and 522 would not be provided to the LED module 50, and the driving current ILED is dominated by the energy storage circuit 536 (i.e., the driving current ILED is generated by the energy storage circuit 536 by discharging). Due to the energy storage circuit 536 discharging during the cut-off period, the current IL is gradually decreased. Therefore, even when the lighting control signal Slc is at the low level (i.e., the disabled period of the lighting control signal Slc), the driving circuit 530 continuously supply power to the LED module 50 by discharging the energy storage circuit 536. In this embodiment, no matter whether the switch circuit 535 is turned on or off, the driving circuit 530 continuously provides a stable driving current ILED to the LED module 50, and the current value of the driving current ILED is I1 during the first signal period Tlc.

Under the first signal period Tlc, the controller 533 determines the current value I1 of the driving current ILED is smaller than the predetermined current value Ipred, so that the pulse-on period of the lighting control signal Slc is adjusted to Ton2 when entering the second signal period Tlc. The length of the pulse-on period Ton2 equals to the length of the pulse-on period Ton1 plus a unit period Tu1.

Under the second signal period Tlc, the operation of the switch circuit 535 and the energy storage circuit 536 are similar to the operation under the first signal period Tlc. The difference of the operation between the first and the second signal periods Tlc is the energy storage circuit 536 has relatively longer charging time and shorter discharging time since the pulse-on period Ton2 is longer than pulse-on period Ton1. Therefore, the average current value of the driving current ILED under the second signal period Tlc is increased to a current value I2 closer to the predetermined current value Ipred.

Similarly, since the current value I2 of the driving current ILED is still smaller than the predetermined current value Ipred, the controller 533 further adjusts, under the third signal period Tlc, the pulse-on period of the lighting control signal Slc to Ton3, in which the length of the pulse-on period Ton3 equals the length of the pulse-on period Ton2 plus the unit period Tu1 and equals the pulse enable period Ton1 plus the period Tu2 (equivalent to two unit periods Tu1). Under the third signal period Ton3, the operation of the switch circuit 535 and the energy storage circuit 536 are similar to the operation under the first and the second signal periods Tlc. Due to the pulse-on period Ton3 being further increased in comparison with the pulse-on period Ton1 and Ton2, the current value of the driving current ILED is increased to I3, and substantially reaches the predetermined current value Ipred. Since the current value I3 of the driving current ILED has reached the predetermined current value Ipred, the controller 533 maintains the same duty cycle after the third signal period Tlc, so that the driving current ILED can be substantially maintained at the predetermined current value Ipred.

Referring to FIGS. 13A and 14B, FIG. 14B illustrates the signal waveform variation of the driving circuit 530 during a plurality of signal periods Tlc when the driving current ILED is larger than the predetermined current value Ipred. Specifically, under the first signal period Tlc, the switching circuit 535 is turned on during the pulse-on time Ton1 in response to the high-level voltage of the lighting control signal Slc. In the meantime, the conversion circuit 534 provides the driving current ILED to the LED module 50 according to an input power received from the first and the second filtering output terminals 521 and 522, and further charges the energy storage circuit 536 via the turned-on switch circuit 535, so that the current IL flowing through the energy storage circuit 536 gradually increases. As a result, during the pulse-on time Ton1, the energy storage circuit 536 is charged in response to the input power received from the first and the second filtering output terminals 521 and 522.

After the pulse-on time Ton1, the switch circuit 535 is turned off in response to the low-level voltage of the lighting control signal Slc. During a cut-off period of the switch circuit 535, the input power output from the first and the second filtering output terminals 521 and 522 would not be provided to the LED module 50, and the driving current ILED is dominated by the energy storage circuit 536 (i.e., the driving current ILED is generated by the energy storage circuit 536 by discharging). Due to the energy storage circuit 536 discharging during the cut-off period, the current IL is gradually decreased. Therefore, even when the lighting control signal Slc is at the low level (i.e., the disabled period of the lighting control signal Slc), the driving circuit 530 continuously supplies power to the LED module 50 by discharging the energy storage circuit 536. Accordingly, no matter whether the switch circuit 535 is turned on or turned off, the driving circuit 530 continuously provides a stable driving current ILED to the LED module 50, and the current value of the driving current ILED is I4 during the first signal period Tlc.

Under the first signal period Tlc, the controller 533 determines the current value I4 of the driving current ILED is larger than the predetermined current value Ipred, so that the pulse-on time of the lighting control signal Slc is adjusted to Ton2 when entering the second signal period Tlc. The length of the pulse-on time Ton2 equals to the length of the pulse-on time Ton1 minus the unit period Tu1.

Under the second signal period Tlc, the operation of the switch circuit 535 and the energy storage circuit 536 are similar to the operation under the first signal period Tlc. The difference of the operation between the first and the second signal periods Tlc is the energy storage circuit 536 has relatively shorter charging time and longer discharging time since the pulse-on time Ton2 is shorter than pulse-on time Ton1 Therefore, the average current value of the driving current ILED under the second signal period Tlc is decreased to a current value I5 closer to the predetermined current value Ipred.

Similarly, since the current value I5 of the driving current ILED is still larger than the predetermined current value Ipred, the controller 533 further adjusts, under the third signal period Tlc, the pulse-on time of the lighting control signal Slc to Ton3, in which the length of the pulse-on time Ton3 equals to the length of the pulse-on time Ton2 minus the unit period Tut. Under the third signal period Tlc, the operation of the switch circuit 535 and the energy storage circuit 536 are similar to the operation under the first and the second signal periods Tlc. Since the pulse-on time Ton3 is further decreased in comparison with the pulse-on time Ton1 and Ton2, the current value of the driving current ILED is decreased to I6, so that the driving current ILED substantially reaches the predetermined current value Ipred. Since the current value I6 of the driving current ILED has reached the predetermined current value Ipred, the controller 533 maintains the same duty cycle after the third signal period Tlc, so that the driving current ILED can be substantially maintained on the predetermined current value Ipred.

According to the above operations, the driving circuit 530 may adjust, by a stepped approach, the pulse-on time/pulse width of the lighting control signal Slc, so that the driving current ILED is gradually adjusted to be close to the predetermined current value Ipred. Therefore, the constant current output can be realized.

In the present embodiment, the driving circuit 530 is operated in CCM for example, which means the energy storage circuit 536 will not be discharged to zero current (i.e., the current IL will not be decreased to zero) during the cut-off period of the switch circuit 535. By utilizing the driving circuit 530 operating in CCM to provide power to the LED module 50, the power provided to the LED module 50 can be more stable and has a low ripple.

The control operation of the driving circuit 530 operating in DCM will be described below. Referring to FIGS. 13A and 15A, the operation and the signal waveform of the driving circuit 530 illustrated in FIG. 14C are similar to the FIG. 14A. The difference between the FIGS. 14A and 14A is that the driving circuit 530 in FIG. 15A operates in DCM, so that the energy storage circuit 536 discharges, during the pulse-off time of the lighting control signal Slc, to zero current (i.e., the current IL equals to zero) and then re-charges in the next signal period Tlc. The other operation of the driving circuit 530 can be referred to the embodiments of FIG. 14A and will not be described in detail herein.

Referring to FIGS. 13A and 15B, the operation and the signal waveform of the driving circuit 530 illustrated in FIG. 15B are similar to that of FIG. 14B. The difference between the FIGS. 15B and 14B is that the driving circuit 530 in FIG. 15B operates in DCM, so that the energy storage circuit 536 discharges, during the pulse-off time of the lighting control signal Slc, to zero current (i.e., the current IL decreases to zero) and then re-charges in the next signal period Tlc. The other operation of the driving circuit 530 can be referred to the embodiments of FIG. 14B and will not be described in detail herein.

By utilizing the driving circuit 530 operating in DCM to provide power to the LED module 50, the driving circuit 530 may have lower power consumption, so as to obtain higher power conversion efficiency.

It is noted that although a single-stage DC-to-DC converter circuit is taken as an example of the mentioned driving circuit 530, the driving circuit 530 in this disclosure is not limited to such type of circuit. For example, the driving circuit 530 may comprise a two-stage driving circuit including an active power-factor correction circuit and a DC-to-DC converter circuit. In other words, any power conversion circuit structure that can be used for driving LED light sources can be applied in the present disclosure.

In addition, the embodiments of the power conversion operation described above are not limited to be utilized in a tube lamp. The embodiments can be applied to any kind of LED lamp directly powered by the mains electricity/commercial electricity (i.e., the AC power without passing a ballast), such as an LED bulb, an LED filament lamp, an integrated LED lamp or etc. The disclosure is not limited to these specific examples.

Figure 13B:
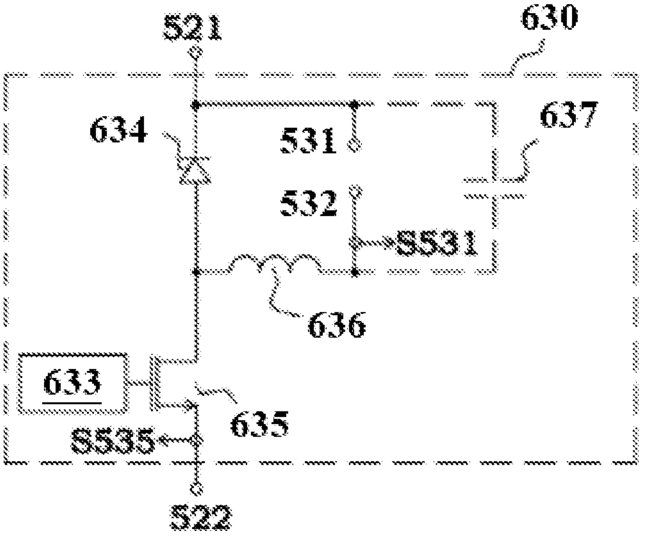

FIG. 13B is a schematic diagram of the driving circuit according to an embodiment of the present disclosure. Referring to FIG. 13B, a driving circuit 630 in this embodiment comprises a buck DC-to-DC converter circuit having a controller 633 and a conversion circuit. The conversion circuit includes an inductor 636, a diode 634 for "freewheeling" of current, a capacitor 637, and a switch 635. The driving circuit 630 is coupled to the filtering output terminals 521 and 522 to receive and then convert a filtered signal into a lamp driving signal for driving an LED module connected between the driving output terminals 531 and 532.

In this embodiment, the switch 635 includes a metal-oxide-semiconductor field-effect transistor (MOSFET) and has a first terminal coupled to the anode of freewheeling diode 634, a second terminal coupled to the filtering output terminal 522, and a control terminal coupled to the controller 633 used for controlling current conduction or cutoff between the first and second terminals of switch 635. The driving output terminal 531 is connected to the filtering output terminal 521, and the driving output terminal 532 is connected to an end of the inductor 636, which has another end connected to the first terminal of switch 635. The capacitor 637 is coupled between the driving output terminals 531 and 532 to stabilize the voltage between the driving output terminals 531 and 532. The freewheeling diode 634 has a cathode connected to the driving output terminal 531.

Next, a description follows as to an exemplary operation of the driving circuit 630.

The controller 633 is configured for determining when to turn the switch 635 on (in a conducting state) or off (in a cutoff state) according to a current detection signal S535 and/or a current detection signal S531. For example, in some embodiments, the controller 633 is configured to control the duty cycle of switch 635 being on and switch 635 being off in order to adjust the size or magnitude of the lamp driving signal. The current detection signal S535 represents the magnitude of current through the switch 635. The current detection signal S531 represents the magnitude of current through the LED module coupled between the driving output terminals 531 and 532. The controller 633 may control the duty cycle of the switch 635 being on and off, based on, for example, a magnitude of a current detected based on current detection signal S531 or S535. As such, when the magnitude is above a threshold, the switch may be off (cutoff state) for more time, and when magnitude goes below the threshold, the switch may be on (conducting state) for more time. According to any of current detection signal S535 or current detection signal S531, the controller 633 can obtain information on the magnitude of power converted by the conversion circuit. When the switch 635 is switched on, a current of a filtered signal is input through the filtering output terminal 521, and then flows through the capacitor 637, the driving output terminal 531, the LED module, the inductor 636, and the switch 635, and then flows out from the filtering output terminal 522. During this flowing of current, the capacitor 637 and the inductor 636 are performing storing of energy. On the other hand, when the switch 635 is switched off, the capacitor 637 and the inductor 636 perform releasing of stored energy by a current flowing from the freewheeling diode 634 to the driving output terminal 531 to make the LED module continuing to emit light.

From another aspect, the driving circuit 630 can maintain a stable current flowing through the LED module. Therefore, as for some LED modules (such as white, red, blue, or green LED modules), the phenomenon of the color temperature changing with the magnitude of a current can be improved or reduced. That is, the color temperature of the LED module driven by the driving circuit 630 can be maintained constant or stable even with different luminance of the LED module. When a switch 635 is cut off, the inductor 636 acting as an energy-storage circuit discharges the stored energy thereof, such that the LED module is able to keep lighting steadily, while preventing a current/voltage on the LED module from abruptly dropping to a minimum value. As a result, when the switch 635 is conducting again, rising of the current/voltage on the LED module does not need to start from the minimum value to a maximum value, so as to avoid intermittent light emission by the LED module and thereby to improve overall illumination/luminance of the LED module, to allow reduction of a minimum conduction period, and to allow increasing of a driving signal's frequency.

Figure 13C:
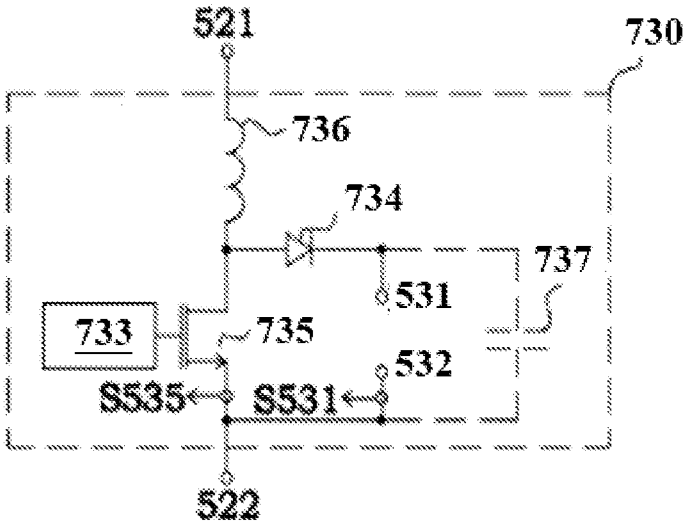

FIG. 13C is a schematic diagram of the driving circuit according to an embodiment of the present disclosure. Referring to FIG. 13C, a driving circuit 730 in this embodiment comprises a boost DC-to-DC converter circuit having a controller 733 and a converter circuit. The converter circuit includes an inductor 736, a diode 734 for "freewheeling" of current, a capacitor 737, and a switch 735. The driving circuit 730 is configured to receive and then convert a filtered signal from the filtering output terminals 521 and 522 into a lamp driving signal for driving an LED module coupled between the driving output terminals 531 and 532.

The inductor 736 has an end connected to the filtering output terminal 521, and another end connected to the anode of freewheeling diode 734 and a first terminal of the switch 735, which has a second terminal connected to the filtering output terminal 522 and the driving output terminal 532. The freewheeling diode 734 has a cathode connected to the driving output terminal 531. And the capacitor 737 is coupled between the driving output terminals 531 and 532.

The controller 733 is coupled to a control terminal of switch 735 and is configured for determining when to turn the switch 735 on (in a conducting state) or off (in a cutoff state), according to a current detection signal S535 and/or a current detection signal S531. When the switch 735 is switched on, a current of a filtered signal is input through the filtering output terminal 521, and then flows through the inductor 736 and the switch 735, and then flows out from the filtering output terminal 522. During this flowing of current, the current through the inductor 736 increases with time, with the inductor 736 being in a state of storing energy, while the capacitor 737 enters a state of releasing energy, making the LED module continuing to emit light. On the other hand, when the switch 735 is switched off, the inductor 736 enters a state of releasing energy as the current through the inductor 736 decreases with time. In this state, the current through the inductor 736 then flows through the freewheeling diode 734, the capacitor 737, and the LED module, while the capacitor 737 enters a state of storing energy.

In some embodiments, the capacitor 737 is an optional element, so it can be omitted and is thus depicted as a dotted line in FIG. 13C. When the capacitor 737 is omitted and the switch 735 is switched on, the current of inductor 736 does not flow through the LED module, making the LED module does not emit light; but when the switch 735 is switched off, the current of inductor 736 flows through the freewheeling diode 734 to reach the LED module, making the LED module emit light. Therefore, by controlling the time that the LED module emits light, and the magnitude of current through the LED module, the average luminance of the LED module can be stabilized to be above a defined value, thus also achieving the effect of emitting a steady light.

For detecting magnitude of current flowing through the switch 735, a detection resistor (not shown) may be disposed between the switch 735 and the second filtering output terminal 522, according to some embodiments of the present disclosure. When the switch 735 is conducting, current flowing through the detection resistor will cause a voltage difference across two terminals of the detection resistor, so using or sending current detection signal S535 to control the controller 733 can be based on the voltage across the detection resistor, namely the voltage difference between the two terminals of the detection resistor. However, at the instant that the LED tube lamp is powered up or is struck by lightning, for example, a relatively large current (as high as 10 A or above) is likely to occur on a circuit loop on the switch 735 that may damage the detection resistor and the controller 733. Therefore, in some embodiments, the driving circuit 730 may further include a clamping component, which is connected to the detection resistor. The clamping component performs a clamping operation on the circuit loop of the detection resistor when a current flowing through the detection resistor or the voltage difference across the detection resistor exceeds a threshold value, so as to limit a current to flow through the detection resistor. In some embodiments, the clamping component may comprise for example a plurality of diodes connected in series and the diode series are connected in parallel with the detection resistor. In such a configuration, when a large current occurs on a circuit loop on the switch 735, the diode series in parallel with the detection resistor will quickly conduct current, so as to limit a voltage across the detection resistor to a specific voltage level. For example, if the diode series comprises 5 diodes, since the forward bias voltage of a diode is about 0.7 V, the diode series can clamp the voltage across the detection resistor to be about 3.5 V.

From another aspect, a driving circuit 730 can maintain a stable current flow through the LED module. Therefore, the color temperature may not change with the current for some LED modules, such as white, red, blue, or green LED modules. For example, an LED can retain the same color temperature under different illumination conditions. In some embodiments, because the inductor 736 acting as the energy-storing circuit releases the stored power when the switch 735 cuts off, the voltage/current flowing through the LED module remains above a predetermined voltage/current level so that the LED module may continue to emit light maintaining the same color temperature. In this way, when the switch 735 conducts again, the voltage/current flowing through the LED module does not need to be adjusted to go from a minimum value to a maximum value. Accordingly, the problem of flickering in the LED module can be avoided, the entire illumination can be improved, the lowest conducting period can be smaller, and the driving frequency can be higher.

Figure 13D:
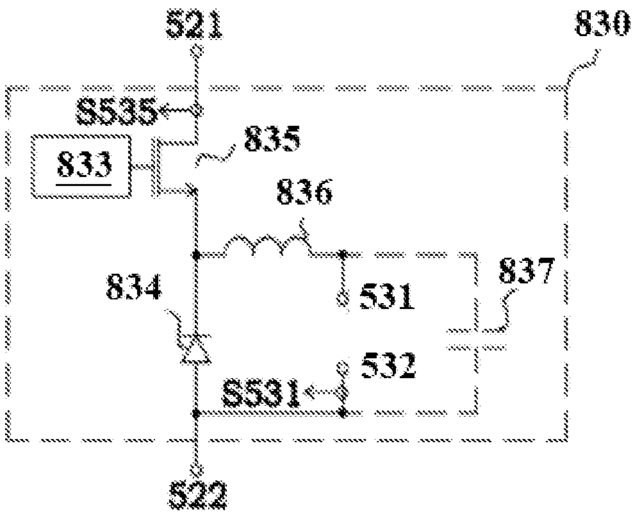

FIG. 13D is a schematic diagram of the driving circuit according to an exemplary embodiment of the present disclosure. Referring to FIG. 13D, a driving circuit 830 in this embodiment comprises a buck DC-to-DC converter circuit having a controller 833 and a conversion circuit. The conversion circuit includes an inductor 836, a diode 834 for "freewheeling" of current, a capacitor 837, and a switch 835. The driving circuit 830 is coupled to the filtering output terminals 521 and 522 to receive and then convert a filtered signal into a lamp driving signal for driving an LED module connected between the driving output terminals 531 and 532.

The switch 835 has a first terminal coupled to the filtering output terminal 521, a second terminal coupled to the cathode of freewheeling diode 834, and a control terminal coupled to the controller 833 to receive a control signal from the controller 833 for controlling current conduction or cutoff between the first and second terminals of the switch 835. The anode of freewheeling diode 834 is connected to the filtering output terminal 522 and the driving output terminal 532. The inductor 836 has an end connected to the second terminal of switch 835, and another end connected to the driving output terminal 531. The capacitor 837 is coupled between the driving output terminals 531 and 532 to stabilize the voltage between the driving output terminals 531 and 532.

The controller 833 is configured for controlling when to turn the switch 835 on (in a conducting state) or off (in a cutoff state) according to a current detection signal S535 and/or a current detection signal S531. When the switch 835 is switched on, a current of a filtered signal is input through the filtering output terminal 521, and then flows through the switch 835, the inductor 836, and the driving output terminals 531 and 532, and then flows out from the filtering output terminal 522. During this flowing of current, the current through the inductor 836 and the voltage of the capacitor 837 both increase with time, so the inductor 836 and the capacitor 837 are in a state of storing energy. On the other hand, when the switch 835 is switched off, the inductor 836 is in a state of releasing energy and thus the current through it decreases with time. In this case, the current through the inductor 836 circulates through the driving output terminals 531 and 532, the freewheeling diode 834, and back to the inductor 836.

In some embodiments the capacitor 837 is an optional element, so it can be omitted and is thus depicted as a dotted line in FIG. 13D. When the capacitor 837 is omitted, no matter whether the switch 835 is turned on or off, the current through the inductor 836 will flow through the driving output terminals 531 and 532 to drive the LED module to continue emitting light.

And then from another point of view, the driving circuit 830 can maintain a stable current flow through the LED module. Therefore, the color temperature may not change with the current for some LED modules, such as white, red, blue, or green LED modules. For example, an LED can retain the same color temperature under different illumination conditions. In some embodiments, because the inductor 836 acting as the energy-storing circuit releases the stored power when the switch 835 cuts off, the voltage/current flowing through the LED module remains above a predetermined voltage/current level so that the LED module may continue to emit light maintaining the same color temperature. In this way, when the switch 835 conducts again, the voltage/current flowing through the LED module does not need to be adjusted to go from a minimum value to a maximum value. Accordingly, the problem of flickering in the LED module can be avoided, the entire illumination can be improved, the lowest conducting period can be smaller, and the driving frequency can be higher.

Figure 13E:
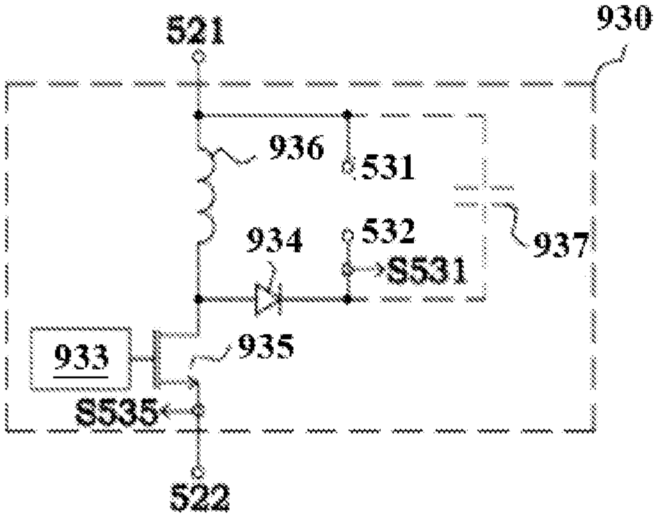

FIG. 13E is a schematic diagram of the driving circuit according to an exemplary embodiment of the present disclosure. Referring to FIG. 13E, a driving circuit 930 in this embodiment comprises a buck DC-to-DC converter circuit having a controller 933 and a conversion circuit. The conversion circuit includes an inductor 936, a diode 934 for "freewheeling" of current, a capacitor 937, and a switch 935. The driving circuit 930 is coupled to the filtering output terminals 521 and 522 to receive and then convert a filtered signal into a lamp driving signal for driving an LED module connected between the driving output terminals 531 and 532.

The inductor 936 has an end connected to the filtering output terminal 521 and the driving output terminal 532, and another end connected to a first end of the switch 935. The switch 935 has a second end connected to the filtering output terminal 522, and a control terminal connected to controller 933 to receive a control signal from controller 933 for controlling current conduction or cutoff of the switch 935. The freewheeling diode 934 has an anode coupled to a node connecting the inductor 936 and the switch 935, and a cathode coupled to the driving output terminal 531. The capacitor 937 is coupled to the driving output terminals 531 and 532 to stabilize the driving of the LED module coupled between the driving output terminals 531 and 532.

The controller 933 is configured for controlling when to turn the switch 935 on (in a conducting state) or off (in a cutoff state) according to a current detection signal S531 and/or a current detection signal S535. When the switch 935 is turned on, a current is input through the filtering output terminal 521, and then flows through the inductor 936 and the switch 935, and then flows out from the filtering output terminal 522. During this flowing of current, the current through the inductor 936 increases with time, so the inductor 936 is in a state of storing energy; but the voltage of the capacitor 937 decreases with time, so the capacitor 937 is in a state of releasing energy to keep the LED module continuing to emit light. On the other hand, when the switch 935 is turned off, the inductor 936 is in a state of releasing energy and its current decreases with time. In this case, the current through the inductor 936 circulates through the freewheeling diode 934, the driving output terminals 531 and 532, and back to the inductor 936. During this circulation, the capacitor 937 is in a state of storing energy and its voltage increases with time.

In some embodiments the capacitor 937 is an optional element, so it can be omitted and is thus depicted as a dotted line in FIG. 13E. When the capacitor 937 is omitted and the switch 935 is turned on, the current through the inductor 936 doesn't flow through the driving output terminals 531 and 532, thereby making the LED module does not emit light. On the other hand, when the switch 935 is turned off, the current through the inductor 936 flows through the freewheeling diode 934 and then the LED module to make the LED module emit light. Therefore, by controlling the time that the LED module emits light, and the magnitude of current through the LED module, the average luminance of the LED module can be stabilized to be above a defined value, thus also achieving the effect of emitting a steady light.

From another aspect, a driving circuit 930 can maintain a stable current flow through the LED module. Therefore, the color temperature may not change with the current for some LED modules, such as white, red, blue, or green LED modules. For example, an LED can retain the same color temperature under different illumination conditions. In some embodiments, because the inductor 936 acting as the energy-storing circuit releases the stored power when the switch 935 cuts off, the voltage/current flowing through the LED module remains above a predetermined voltage/current level so that the LED module may continue to emit light maintaining the same color temperature. In this way, when the switch 935 conducts again, the voltage/current flowing through the LED module does not need to be adjusted to go from a minimum value to a maximum value. Accordingly, the problem of flickering in the LED module can be avoided, the entire illumination can be improved, the lowest conducting period can be smaller, and the driving frequency can be higher.

Figure 13F:
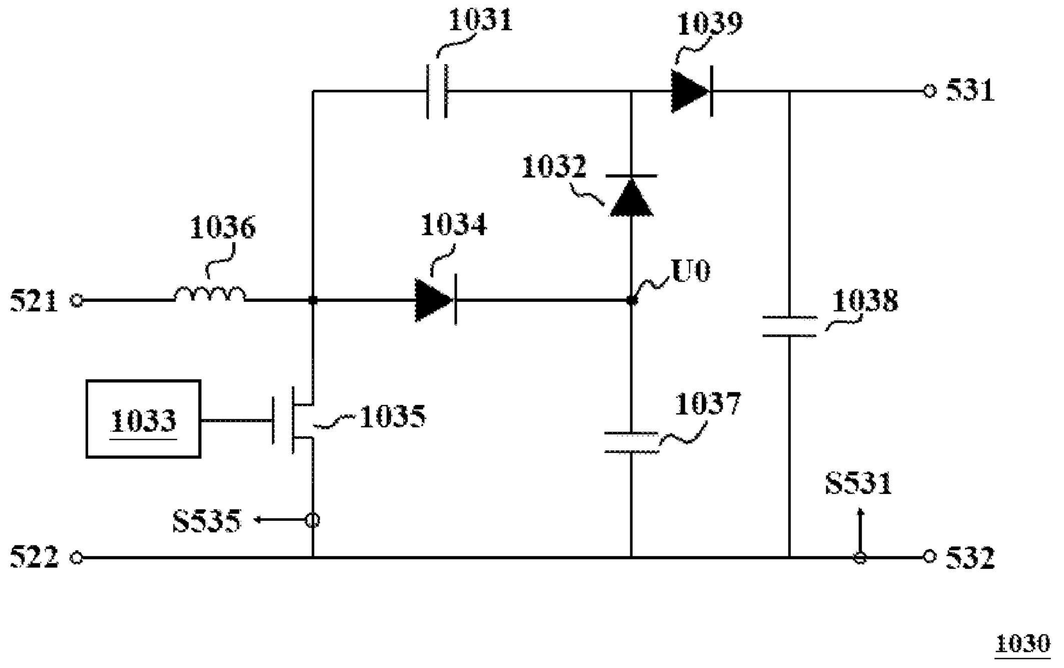

FIG. 13F is a circuit structure diagram of a driving circuit according to some embodiments. Referring to FIG. 13F, in these embodiments, a driving circuit 1030 is a Boost-type DC-to-DC conversion circuit including a controller 1033 and a conversion circuit. The circuit structure of a driving circuit 1030 in these embodiments is similar to that in the described embodiments of FIG. 13C, with a difference that the conversion circuit in these embodiments further includes capacitors 1031 and 1038, and diodes 1032 and 1039. The driving circuit 1030 is coupled to a first filtering output terminal 521 and a second filtering output terminal 522, in order to convert a filtered signal into a driving signal for driving an LED module coupled between a first driving output terminal 531 and a second driving output terminal 532.

In some embodiments, capacitors 1031 and 1038, and diodes 1032 and 1039 may be collectively referred to as a secondary Boost-type circuit, for realizing two conversions for voltage boosting, in order to obtain a higher driving output voltage. Compared to the embodiments of FIG. 13C where an output voltage is for example U0, a driving output voltage in the embodiments of FIG. 13F is about 2U0.

An inductor 1036 has a first end electrically connected to the first filtering output terminal 521, and a second end electrically connected to an anode of the diode 1034 and a second pin of a switch 1035. The switch 1035 has a first pin electrically connected to the controller 1033, and a third pin electrically connected to the second filtering output terminal 522. The diode 1034 has a cathode electrically connected to the anode of the diode 1032 and a first end of the capacitor 1037. A second end of the capacitor 1037 is electrically connected to the second filtering output terminal 522. The capacitor 1031 has a first end electrically connected to the anode of the diode 1034, and a second end electrically connected to the cathode of the diode 1032. The diode 1039 has an anode electrically connected to the cathode of the diode 1032, and a cathode electrically connected to the first driving output terminal 531. The second driving output terminal 532 is electrically connected to the second filtering output terminal 522. And the capacitor 1038 has a first end electrically connected to the first driving output terminal 531, and a second end electrically connected to the second driving output terminal 532.

The controller 1033 is coupled to a control terminal of the switch 1035, and is configured to control current conduction or a cutoff state of the switch 1035, according to a current detection signal S535 and/or a current detection signal S531. When the switch 1035 is conducting, a current flows in from the first filtering output terminal 521, then through the inductor 1036 and switch 1035, to flow out from the second filtering output terminal 522. In the meantime, the current flowing through the inductor 1036 increases with time, with the inductor 1036 in a state of storing energy. When the switch 1035 is in a cutoff state, the inductor 1036 is in a state of releasing energy, thus the current flowing through the inductor 1036 decreases with time. A current flowing through the inductor 1036 flows to the capacitor 1037 through the diode 1034, during which the capacitor 1037 is in a state of storing energy. From another angle, when the switch 1035 is closed, the inductor 1036 performs storing of energy; and when the switch 1035 is in a cutoff state, the inductor 1036 releases energy. Assuming a voltage UL is formed across the inductor 1036, and a filtered signal (from the first and second filtering output terminals 521 and 522) has a voltage UI, then an output voltage U0 in FIG. 13F satisfies the following equation:

$$U0=U1+UL-UD$$

In this above equation, UD represents a voltage drop across the diode 1034. Because this voltage drop is relatively small, it is generally omitted or ignored. So:

$$U0\approx U1+UL>U1$$

When the switch 1035 is conducting again, the inductor 1036 is in a state of storing energy again, while the capacitor 1037 charges the capacitor 1031 along a path comprising the diode 1032, the capacitor 1031, and the switch 1035, which causes the voltage across the capacitor 1031 to gradually rise and the voltage across the capacitor 1037 to gradually decrease, so as to make the voltage across the capacitor 1031 and the voltage across the capacitor 1037 to gradually become equal. When the switch 1035 is in a cutoff state again, the inductor 1036 is in a state of releasing energy again, while the capacitor 1037 and capacitor 1031 charges the capacitor 1038 along a path comprising the diode 1039 and the capacitor 1038, resulting in a voltage U2 across the capacitor 1038 at a driving output terminal. The voltage U2 satisfies the following equation:

$$U2=U0+UC-UD$$

In this above equation, UC represents a voltage across the capacitor 1031, and UD represents a voltage drop across the diode 1034. Because this voltage drop is relatively small, it is generally omitted or ignored. The voltage U2 is the voltage at a driving output terminal. So:

$$U2\approx U0+UC\approx 2*U0$$

The controller 1033 is configured to control current conduction or a cutoff state of the switch 1035, according to a current detection signal S535 and/or a current detection signal S531, in order to change the voltage and/or current at the driving output terminal.

In some embodiments, a signal at the output terminal of a driving circuit 1030 is a constant voltage signal or a constant current signal, to which the present invention is not limited.

In some embodiments, the detection signals S531 and S535 may each be a voltage detection signal, to which the present invention is not limited.

Through the technical solution in this embodiment, compared to the described embodiments in FIG. 13C, a higher output voltage may be achieved to satisfy the needs in different occasions of use.

In these embodiments, a switch 1035 is a field effect transistor, and in other embodiments other types of switches may be adopted, so the present invention is not limited to using a field effect transistor.

For example, a capacitor in a driving circuit, such as a capacitor 637, 737, 837, or 937 in FIGS. 13B to 13E, in practical application may comprise two or more capacitors connected in parallel.

In one embodiment of the LED tube lamp, components of the driving circuit that have relatively high temperature during operation are disposed at one terminal of the lamp tube (which can be referred as a first end of the lamp tube), and the rest of components of the driving circuit are disposed at another terminal of the lamp tube (which can be referred as a second end of the lamp tube). In a lighting system of a plurality of LED tube lamps, the LED tube lamps can be connected to lamp sockets/bases in an arrangement where some of the LED tube lamps are inverted, that is, a first end of each tube lamp is positioned close/adjacent to the opposite second end of a close positioned tube lamp of the rest of the plurality of LED tube lamps. By this arrangement, relatively higher-temperature components can be evenly distributed/disposed among the plurality of LED tube lamps, so as to avoid heat concentration on a certain location among the plurality of LED tube lamps, which heat concentration may adversely affect lighting efficiency of the overall LED tube lamps.

In certain exemplary embodiments, the conversion efficiency of the driving circuits is above 80%. In some embodiments, the conversion efficiency of the driving circuits is above 90%. In still other embodiments, the conversion efficiency of the driving circuits is above 92%. The illumination efficiency of the LED lamps is above 120 lm/W. In some embodiments, the illumination efficiency of the LED lamps is above 160 lm/W. The illumination efficiency including the combination of the driving circuits and the LED modules is above 120 lm/W*90%=108 lm/W. In some embodiments, the illumination efficiency including the combination of the driving circuits and the LED modules is above 160 lm/W*92%=147.2 lm/W.

In some embodiments, the transmittance of the diffusion film in the LED tube lamp is above 85%. As a result, in certain embodiments, the illumination efficiency of the LED lamps is above 108 lm/W*85%=91.8 lm/W. In some embodiments, the illumination efficiency of the LED lamps is above 147.21 lm/W*85%=125.12 lm/W.

Next, a power device including an auxiliary power module is described with reference to FIGS. 16A to 16Y. In a mentioned power device in any of FIGS. 16A to 16Y, its elements or circuits or modules may be reclassified or reorganized, wherein for example circuit(s) except for an auxiliary power module and used for outputting a driving signal based on an external driving signal may be collectively referred to as a main power device, which possibility is not repeated again in some below described embodiments.

Figure 16A:
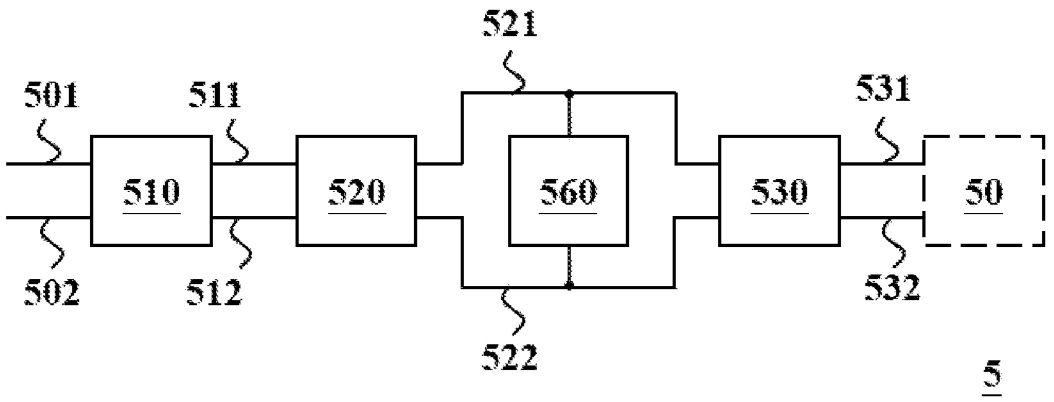
FIG. 16A is a block diagram of an exemplary power supply module of an LED tube lamp according to some exemplary embodiments.

FIG. 16A is a block diagram of a power supply module in an LED tube lamp according to an exemplary embodiment. Compared to that shown in FIG. 9A, the present embodiment comprises a rectifying circuit 510, a filtering circuit 520, and a driving circuit 530, and further comprises an auxiliary power supply module 560, wherein said power supply module 5 may also contain some components of the LED module 50. The auxiliary power supply module 560 is coupled between the filtering output terminals 521 and 522. The auxiliary power supply module 560 detects the filtered signal in the filtering output terminals 521 and 522 and determines whether to provide an auxiliary power to the filtering output terminals 521 and 522 based on the detected result. When the supply of the filtered signal is stopped or a logic level thereof is insufficient, i.e., when a drive voltage for the LED module is below a defined voltage, the auxiliary power supply module provides auxiliary power to keep the LED module 50 continuing to emit light. The defined voltage is determined according to an auxiliary power voltage of the auxiliary power supply module 560.

Figure 16B:
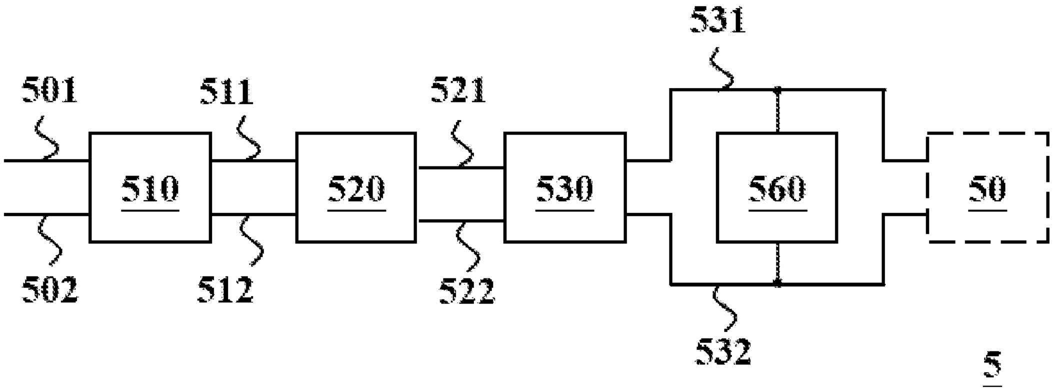
FIG. 16B is a block diagram of an exemplary power supply module of an LED tube lamp according to some exemplary embodiments.

FIG. 16B is a block diagram of a power supply module in an LED tube lamp according to an exemplary embodiment. Compared to that shown in FIG. 9A, the present embodiment comprises a rectifying circuit 510, a filtering circuit 520 and an auxiliary power supply module 560, The auxiliary power supply module 560 is coupled between the driving output terminals 531 and 1522. The auxiliary power supply module 560 detects the driving signal in the driving output terminals 531 and 532 and determines whether to provide an auxiliary power to the driving output terminals 531 and 532 based on the detected result. When the driving signal is no longer being supplied or a logic level thereof is insufficient, the auxiliary power supply module 560 provides the auxiliary power to keep the LED module 50 continuously lighting.

In the embodiments of FIGS. 16A and 16B, a first rectifying circuit 510, a filtering circuit 520, and a driving circuit 530 may collectively be referred to as a main power device. When power supplying by the main power device for an LED module is in an abnormal state, it's up to an auxiliary power module to provide auxiliary power. In another embodiment, when a main power device provides power normally, an auxiliary power module is configured to be a load to be charged by the main power device for storing electricity. In this embodiment, an auxiliary power module is disposed at a later stage than a main power device, such as being connected to an LED module in parallel; so when the main power device provides power normally, the main power device performs power conversion to step down an external driving signal having relatively high voltage, which lowered external driving signal is then used to supply the LED module and charge the auxiliary power module, which is then charged by an electrical signal having relatively low voltage to store electric power for use when power supplying by the main power device is in an abnormal state. By this design as in this embodiment, voltage withstanding requirements for electronic components needed in an auxiliary power module are significantly reduced, and thus the production cost is further reduced and stability in circuit operations may be guaranteed. It should be noted that an LED module may be replaced with other load; a main power device may also perform other type of conversion to an external driving signal, such as a voltage-boosting conversion, but the present invention is not limited to any type of conversion.

In some embodiments, auxiliary power provided by an auxiliary power module 560 may be referred to as an auxiliary power signal.

Figure 16C:
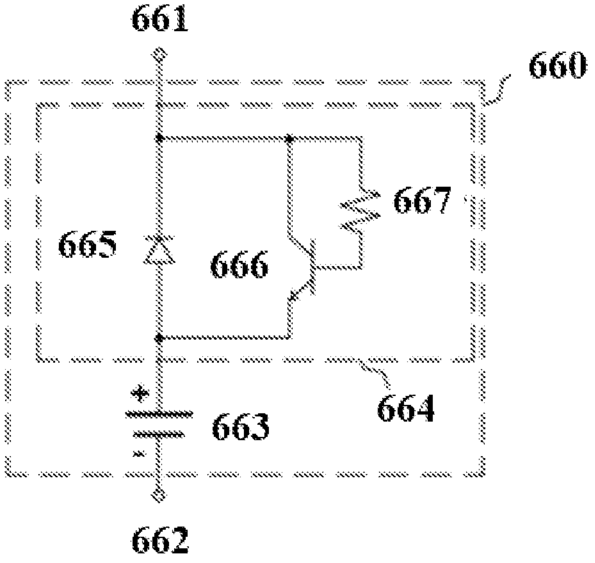
FIG. 16C is a block diagram of an exemplary auxiliary power supply module according to some exemplary embodiments.

FIG. 16C is a schematic diagram of an auxiliary power supply module according to an embodiment. The auxiliary power supply module 660 can be applied, for example, to the configuration of the auxiliary power supply module 560 illustrated in FIG. 16B. The auxiliary power supply module 660 comprises an energy storage unit 663 and a voltage detection circuit 664. The auxiliary power supply module further comprises an auxiliary power positive terminal 661 and an auxiliary power negative terminal 662 for being respectively coupled to the filtering output terminals 521 and 522 or the driving output terminals 531 and 532. The voltage detection circuit 664 detects a logic level of a signal at the auxiliary power positive terminal 661 and the auxiliary power negative terminal 662 to determine whether releasing outward the power of the energy storage unit 663 through the auxiliary power positive terminal 661 and the auxiliary power negative terminal 662.

In some embodiments, the energy storage unit 663 is a battery or a supercapacitor. When a voltage difference of the auxiliary power positive terminal 661 and the auxiliary power negative terminal 662 (the drive voltage for the LED module) is higher than the auxiliary power voltage of the energy storage unit 663, the voltage detection circuit 664 charges the energy storage unit 663 by the signal in the auxiliary power positive terminal 661 and the auxiliary power negative terminal 662. When the drive voltage is lower than the auxiliary power voltage, the energy storage unit 663 releases the stored energy outward through the auxiliary power positive terminal 661 and the auxiliary power negative terminal 662.

The voltage detection circuit 664 comprises a diode 665, a bipolar junction transistor (BJT) 666 and a resistor 667. A positive end of the diode 665 is coupled to a positive end of the energy storage unit 663 and a negative end of the diode 665 is coupled to the auxiliary power positive terminal 661. The negative end of the energy storage unit 663 is coupled to the auxiliary power negative terminal 662. A collector of the BJT 666 is coupled to the auxiliary power positive terminal 661, and an emitter thereof is coupled to the positive end of the energy storage unit 663. One end of the resistor 667 is coupled to the auxiliary power positive terminal 661 and the other end is coupled to a base of the BJT 666. When the collector of the BJT 666 is a cut-in voltage higher than the emitter thereof, the resistor 667 conducts the BJT 666. When the power source provides power to the LED tube lamp normally, the energy storage unit 663 is charged by the filtered signal through the filtering output terminals 521 and 522 and the conducted BJT 666 or by the driving signal through the driving output terminals 531 and 532 and the conducted BJT 666 until that the collector-emitter voltage of the BJT 666 is lower than or equal to the cut-in voltage. When the filtered signal or the driving signal is no longer being supplied or the logic level thereof is insufficient, the energy storage unit 663 provides power through the diode 665 to keep the LED module 50 continuously lighting.

In some embodiments, the maximum voltage of the charged energy storage unit 663 is at least one cut-in voltage of the BJT 666 lower than the voltage difference applied between the auxiliary power positive terminal 661 and the auxiliary power negative terminal 662. The voltage difference provided between the auxiliary power positive terminal 661 and the auxiliary power negative terminal 662 is a turn-on voltage of the diode 665 lower than the voltage of the energy storage unit 663. Hence, when the auxiliary power supply module 660 provides power, the voltage applied at the LED module 50 is lower (about the sum of the cut-in voltage of the BJT 666 and the turn-on voltage of the diode 665). In the embodiment shown in the FIG. 16B, the brightness of the LED module 50 is reduced when the auxiliary power supply module supplies power thereto. Thereby, when the auxiliary power supply module is applied to an emergency lighting system or a constant lighting system, the user realizes the main power supply, such as commercial power, is abnormal and then performs necessary precautions therefor.

In addition to utilizing the embodiments illustrated in FIG. 16A to FIG. 16C in a single tube lamp architecture for emergency power supply, the embodiments also can be utilized in a lamp module including a multi tube lamp. Taking the lamp module having four parallel arranged LED tube lamps as an example, in an exemplary embodiment, one of the LED tube lamps includes the auxiliary power supply module. When the external driving signal is abnormal, the LED tube lamp including the auxiliary power supply module is continuously lighted up and the others LED tube lamps go off. According to the consideration of the uniformity of illumination, the LED tube lamp having the auxiliary power supply module can be arranged in the middle position of the lamp module.

In another exemplary embodiment, a plurality of the LED tube lamps respectively includes the auxiliary power supply module. When the external driving signal is abnormal, the LED tube lamps including the auxiliary power supply module are continuously lighted up and the other LED tube lamps (if any) go off. In this way, even if the lamp module is operated in an emergency situation, a certain brightness can still be provided for the lamp module. In addition, if there are two LED lamps that have the auxiliary power supply module, the LED tube lamps having the auxiliary power supply module can be arranged, according to the consideration of the uniformity of illumination, in a staggered way with the LED tube lamps that don't have the auxiliary power supply module.

In still another exemplary embodiment, a plurality of the LED tube lamps respectively includes the auxiliary power supply module. When the external driving signal is abnormal, part of the LED tube lamps including the auxiliary power supply module is first lighted up by the auxiliary power, and the other part of the LED tube lamps including the auxiliary power supply module is then lighted up by the auxiliary power after a predetermined period. In this way, the lighting time of the lamp module can be extended during the emergency situation by coordinating the auxiliary power supply sequence of the LED tube lamps.

The embodiment of coordinating the auxiliary power supply sequence of the LED tube lamps can be implemented by setting different start-up time for the auxiliary power supply module disposed in different tube lamp, or by disposing controllers in each tube lamp for communicating the operation state of each auxiliary power supply module. The present disclosure is not limited thereto.

Figure 16D:
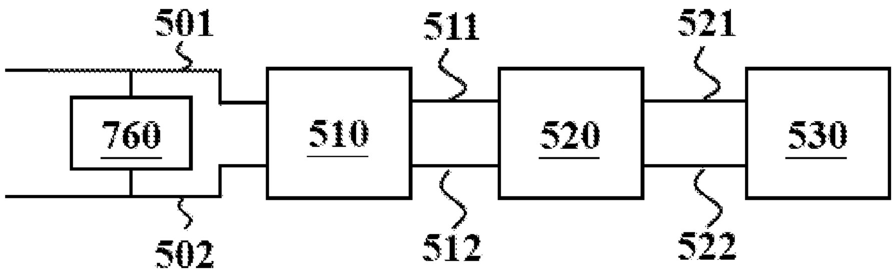
FIG. 16D is a block diagram of an exemplary power supply module of an LED tube lamp according to some exemplary embodiments.

FIG. 16D is a block diagram of a power supply module in an LED tube lamp according to an exemplary embodiment. Referring to FIG. 16D, the power supply module 5 of FIG. 16D includes a rectifying circuit 510, a filtering circuit 520, a driving circuit 530, and an auxiliary power supply module 760, according to one embodiment. The auxiliary power supply module 760 of FIG. 16D is connected between the pins 501 and 502 to receive the external driving signal and perform a charge-discharge operation based on the external driving signal, according to some embodiments.

In some embodiments, the operation of the auxiliary power supply module 760 can be compared to an Off-line uninterruptible power supply (Off-line UPS). Normally, when an AC power source (e.g., the mains electricity, the commercial electricity or the power grid) supplies the external driving signal to the LED tube lamp, the external driving signal is supplied to the rectifying circuit 510 while charging the auxiliary power supply module 760. Once the AC power source is unstable or abnormal, the auxiliary power supply module 760 takes the place of the AC power source to supply power to the rectifying circuit 510 until the AC power source recovers normal power supply. As such, the auxiliary power supply module 760 can operate in a backup manner by the auxiliary power supply module 760 interceding on behalf of the power supply process when the AC power source is unstable or abnormal. Herein, the power supplied by the auxiliary power supply module 760 can be an AC power or a DC power.

The auxiliary power supply module 760 includes an energy storage unit and a voltage detection circuit, according to some embodiments. The voltage detection circuit detects the external driving signal and determines whether the energy storage unit provides the auxiliary power to the input terminal of the rectifying circuit 510 according to the detection result. When the external driving signal stops providing or the AC signal level of the external driving signal is insufficient, the energy storage unit of the auxiliary power supply module 760 provides the auxiliary power, such that the LED module 50 continues to emit light based on the auxiliary power provided by the auxiliary power supply module 760. In some embodiments, the energy storage unit for providing auxiliary power can be implemented by an energy storage assembly such as a battery or a super capacitor. However, the energy storage assembly of the auxiliary power supply module 760 are not limited to the above exemplary embodiments and other energy storage assemblies are contemplated.

Figure 16E:
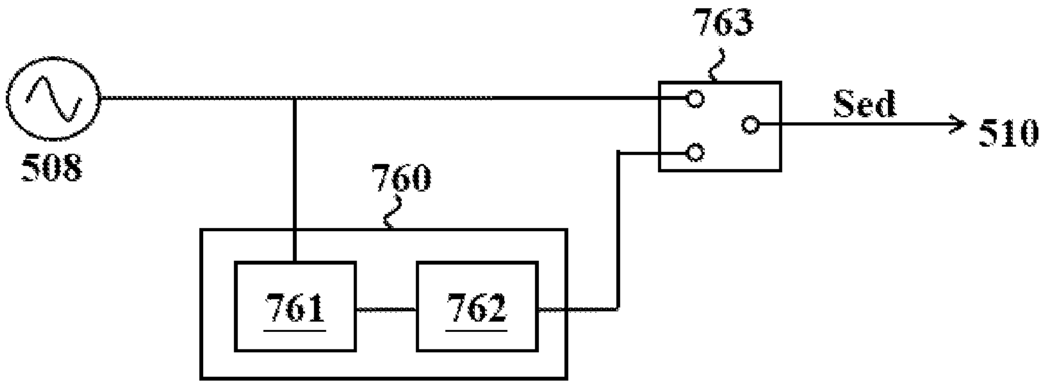
FIG. 16E is a block diagram of an exemplary auxiliary power supply module according to some exemplary embodiments.

FIG. 16E illustrates an exemplary configuration of the auxiliary power supply module 760 operating in an Off-line UPS mode according to some embodiments of the present disclosure. Referring to FIG. 16E, the auxiliary power supply module 760 includes a charging unit 761 and an auxiliary power supply unit 762. The charging unit 761 has an input terminal coupled to an external AC power supply 508 and an output terminal coupled to an input terminal of the auxiliary power supply unit 762. The auxiliary power supply module 760 further includes a switching unit 763, having terminals connected to the external AC power source 508, an output terminal of the auxiliary power supply unit 762, and an input terminal of the rectifying circuit 510, respectively, according to some embodiments. In operation, depending on the state of power supply by the external AC power source 508, the switching unit 763 is configured to selectively conduct a circuit loop passing through the external AC power supply 508 and the rectifying circuit 510, or conduct a circuit loop passing through the auxiliary power supply module 760 and the rectifying circuit 510. The auxiliary power supply unit 762 has the input terminal coupled to the output terminal of the charging unit 761 and an output terminal coupled to a power loop between the external AC power supply 508 and the rectifying circuit 510, via the switching unit 763, according to one embodiment. Specifically, when the external AC power supply 508 operates normally, the power, supplied by the external AC power supply 508, will be provided to the input terminal of the rectifying circuit 510 as an external driving signal Sed via the switching unit 763, namely, the switching unit 763 is switched to a state that connects the external AC power supply 508 to the rectifying circuit 510. Meanwhile, the charging unit 761 charges the auxiliary power supply unit 762 based on the power supplied by the external AC power supply 508, but the auxiliary power supply unit 762 does not output power to the rectifying circuit 510 because the external driving signal Sed is correctly transmitted on the power loop. When the external AC power supply 508 is unstable or abnormal, the auxiliary power supply unit 762 starts to supply an auxiliary power, serving as the external driving signal Sed, to the rectifying circuit 510 via the switching unit 763, namely, the switching unit 763 is switched to a state that connects the output terminal of the auxiliary power supply unit 762 to the rectifying circuit 510.

Figure 16F:
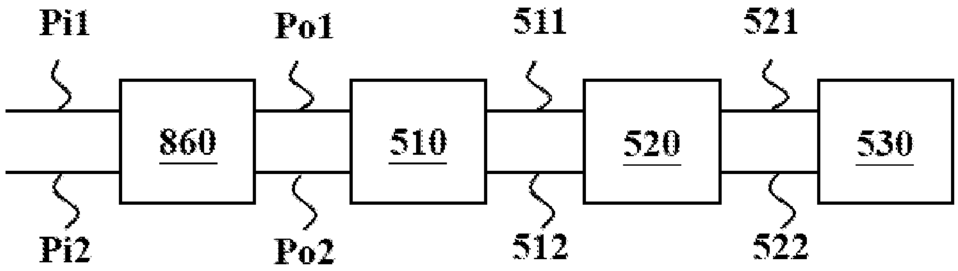
FIG. 16F is a block diagram of a power supply module in an LED tube lamp according to an exemplary embodiment.

FIG. 16F is a block diagram of a power supply module in an LED tube lamp according to an exemplary embodiment. Referring to FIG. 16F, the power supply module 5 of the present embodiment includes a rectifying circuit 510, a filtering circuit 520, a driving circuit 530 and an auxiliary power supply module 860 of FIG. 16F. Compared to the embodiment illustrated in FIG. 16D, the input terminals Pi1 and Pi2 of the auxiliary power supply module 860 are configured to receive an external driving signal and perform a charge-discharge operation based on the external driving signal, and then supply an auxiliary power, generated from the output terminals Po1 and Po2, to the rectifying circuit 510. From the perspective of the structure of the LED tube lamp, the input terminals Pi1 and Pi2 or the output terminals Po1 and Po2 of the auxiliary power supply module 860 are connected to the pins of the LED tube lamp (e.g., 501 and 502 in FIG. 16D). If the pins 501 and 502 of the LED tube lamp are connected to the input terminals Pi1 and Pi2 of the auxiliary power supply module 860, it means the auxiliary power supply module 860 is disposed inside the LED tube lamp and receives the external driving signal through the pins 501 and 502. On the other hand, if the pins 501 and 502 of the LED tube lamp are connected to the output terminals Po1 and Po2 of the auxiliary power supply module 860, it means the auxiliary power supply module 860 is disposed outside the LED tube lamp and outputs the auxiliary power to the rectifying circuit through the pins 501 and 502. The detail structure of the auxiliary power supply module will be further described in the following embodiments.

In some embodiments, the operation of the auxiliary power supply module 860 can be similar to an On-line uninterruptible power supply (On-line UPS). Under the On-line UPS operation, the external AC power source would not directly supply power to the rectifying circuit 510 but supplies power through the auxiliary power supply module 860. Therefore, the external AC power source can be isolated from the LED tube lamp, and the auxiliary power supply module 860 intervenes the whole power supply process, so that the power supplied to the rectifying circuit 510 is not affected by the unstable or abnormal AC power source.

Figure 16G:
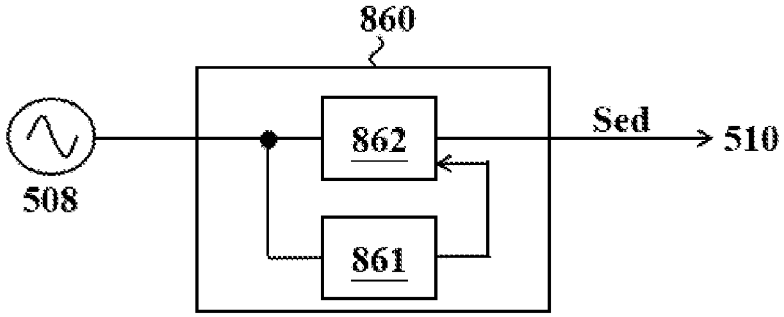
FIGS. 16G-16H are block diagrams of exemplary auxiliary power supply modules according to some exemplary embodiments.

FIG. 16G illustrates an exemplary configuration of the auxiliary power supply module 860 operating in an On-line UPS mode according to some embodiments of the present disclosure. Referring to FIG. 16G, the auxiliary power supply module 860 includes a charging unit 861 and an auxiliary power supply unit 862. The charging unit 861 has an input terminal coupled to an external AC power supply 508 and an output terminal coupled to a first input terminal of the auxiliary power supply unit 862. The auxiliary power supply unit 862 further has a second input terminal coupled to the external AC power supply 508 and an output terminal coupled to the rectifying circuit 510. Specifically, when the external AC power supply 508 operates normally, the auxiliary power supply unit 862 performs the power conversion based on the power supplied by the external AC power source 508, and accordingly provides an external driving signal Sed to the rectifying circuit 510. In the meantime, the charging unit 861 charges an energy storage unit of the auxiliary power supply unit 862. When the external AC power source is unstable or abnormal, the auxiliary power supply unit 862 performs the power conversion based on the power stored in the energy storage unit, and accordingly provides the external driving signal Sed to the rectifying circuit 510. It should be noted that the power conversion described herein could be rectification, filtering, boost-conversion, buck-conversion or a reasonable combination of above operations. The present disclosure is not limited thereto.

In some embodiments, the operation of the auxiliary power supply module 860 can be similar to a Line-Interactive UPS. The basic operation of the auxiliary power supply module 860 under a Line-Interactive UPS mode is similar to the auxiliary power supply module 760 under the Off-line UPS mode, the difference between the Line-Interactive UPS mode and the Off-line UPS mode is the auxiliary 860 has a boost and buck compensation circuit and can monitor the power supply condition of the external AC power source at any time. Therefore, the auxiliary power supply module 860 can correct the power output to the power supply module of the LED tube lamp when the external AC power source is not ideal (e.g., the external driving signal is unstable, but the variation does not exceed the threshold value), so as to reduce the frequency of using the battery for power supply.

Figure 16H:
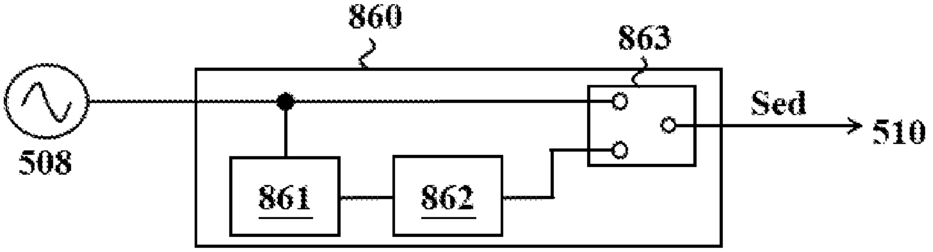

FIG. 16H illustrates an exemplary configuration of the auxiliary power supply module 860 operating in the Line-Interactive mode according to some embodiments of the present disclosure. Referring to FIG. 16H, the auxiliary power supply module 860 includes a charging unit 861, an auxiliary power supply unit 862 and a switching unit 863. The charging unit 861 has an input terminal coupled to an external AC power supply 508. The switching unit 863 is coupled between an output terminal of the auxiliary power supply unit 862 and an input terminal of the rectifying circuit 510, in which the switching unit 863 may selectively conduct a current on a path between the external AC power supply 508 and the rectifying circuit 510 or on a path between the auxiliary power supply unit 862 and the rectifying circuit 510 according to the power supply condition of the external AC power supply 508. In detail, when the external AC power source is normal, the switching unit 863 is switched to conduct a current on the path between the external AC power supply 508 and the rectifying circuit 510 and cut off the path between the auxiliary power supply unit 862 and the rectifying circuit 510. Thus, when the external AC power source is normal, the external AC power supply 508 provides power, regarded as the external driving signal Sed, to the input terminal of the rectifying circuit 510 via the switching unit 863. In the meantime, the charging unit 861 charges the auxiliary power unit 862 based on the external AC power supply 508. When the external AC power source is unstable or abnormal, the switching unit 863 is switched to conduct a current on the path between the auxiliary power supply unit 862 and the rectifying circuit 510 and cut off the path between the AC power supply 508 and the rectifying circuit 510. The auxiliary power supply unit 862 starts to supply power, regarded as the external driving signal Sed, to the rectifying circuit 510.

In the embodiments of the auxiliary power supply module, the auxiliary power provided by the auxiliary power supply unit 762/862 can be in either AC or DC. When the auxiliary power is provided in AC, the auxiliary power supply unit 762/862 includes, for example, an energy storage unit and a DC-to-AC converter. When the auxiliary power is provided in DC, the auxiliary power supply unit 762/862 includes, for example, an energy storage unit and a DC-to-DC converter, or simply includes an energy storage unit; the present disclosure is not limited thereto, and other energy storage units are contemplated. In some embodiments, the energy storage unit can be a set of batteries. In some embodiments, the DC-to-DC converter can be a boost converter, a buck converter or a buck-boost converter. The energy storage unit may be e.g., a battery module composed of a number of batteries. The DC-to-DC converter may be e.g., of the type of buck, boost, or buck-boost converter. And the auxiliary power supply module 760/860 further includes a voltage detection circuit, not shown in FIGS. 9A to 9E. The voltage detection circuit is configured to detect an operating state of the external AC power supply 508 and generate a signal, according to the detection result, to control the switching unit 763/863 or the auxiliary power supply unit 862, in order to determine whether the LED tube lamp operates in a normal lighting mode (i.e., supplied by the external AC power supply 508) or in an emergency lighting mode (i.e., supplied by the auxiliary power supply module 760/860). In such embodiments, the switching unit 763/863 may be implemented by a three-terminal switch or two complementary switches having a complementary relation. When using the complementary switches, one of the complementary switches may be serially connected on the power loop of the external AC power supply 508 and the other one of the complementary switches may be serially connected on the power loop of the auxiliary power supply module 760/860, wherein the two complementary switches are controlled in a way that when one switch is conducting the other switch is cut off.

In an exemplary embodiment, the switching unit 763/863 is implemented by a relay. The relay operates similar to a two-mode switch. In function, when the LED tube lamp is operating in a normal lighting mode (i.e., electricity provided from the external AC power supply 508 is normally input to the LED tube lamp as an external driving signal), the relay is pulled in so that the power supply module of the LED tube lamp is not electrically connected to the auxiliary power supply module 760/860. On the other hand, when the AC power line is abnormal and fails to provide power as the external AC power supply 508, magnetic force in the relay disappears so that the relay is released to a default position, causing the power supply module of the LED tube lamp to be electrically connected to the auxiliary power supply module 760/860 through the relay, thus using the auxiliary power supply module 760/860 as a power source.

According to some embodiments, from the perspective of the entire lighting system, when used in the normal lighting occasion, the auxiliary power supply module 760/860 is not active to provide power, and the LED module 50 is supplied by the AC power line, which also may charge the battery module of the auxiliary power supply module 760/860. On the other hand, when used in the emergency lighting occasion, voltage of the battery module is increased by the boost-type DC-to-DC converter to a level required by the LED module 50 to operate in order to emit light. In some embodiments, the voltage level after the boosting is usually or commonly about 4 to 10 times that of the battery module before the boosting and is in some embodiments 4 to 6 times that of the battery module before the boosting. In this embodiment, the voltage level required by the LED module 50 to operate is in the range 40 to 80 V, and is preferably in the range 55 to 75 V. In one disclosed embodiment herein, 60 V is chosen as the voltage level, but the voltage level may be other values in other embodiments.

In one embodiment, the battery module includes or is implemented by a single cylindrical battery or cell packaged in a metallic shell to reduce the risk of leakage of electrolyte from the battery. In one embodiment, the battery can be modularized as a packaged battery module including for example two battery cells connected in series, in which a plurality of the battery module can be electrically connected in sequence (e.g., in series or in parallel) and disposed inside the lamp fixture so as to reduce the complexity of maintenance. For instance, when one or part of the battery modules are damaged or bad, each damaged battery module can be easily replaced without the need to replace all of the plurality of battery modules. In some embodiments of the present disclosure, the battery module may be designed to have a cylindrical shape whose internal diameter is slightly longer than the outer diameter of each of its battery cells, for the battery module to accommodate its battery cells in sequence and to form a positive electrode and a negative electrode at two terminals of the battery module. In some embodiments, the voltage of the battery modules electrically connected in series may be designed to be lower than e.g., 36V. In some embodiments, the battery module is designed to have a cuboid shape whose width is slightly longer than the outer diameter of each of its battery cells, for its battery cells to be securely engaged in the battery module, wherein the battery module may be designed to have a snap-fit structure or other structure for easily plugging-in and pulling-out of its battery cells. However, it is understood by those skilled in the art that in some other embodiments the battery module may have other shapes besides cuboid, such as rectangular.

In one embodiment, the charging unit 761/861 is e.g., a battery management system (BMS), which is used to manage the battery module, mainly for intelligent management and maintenance of the battery module in order to prevent over-charging and over-discharging of the battery cells of the battery module. The BMS prolongs the usage lifetime of the battery cells, and to monitor states of the battery cells.

The BMS may be designed to have a port capable of connecting an external module or circuit, for reading or accessing information/data related to the battery cells through the port during periodical examinations of the battery module. If an abnormal condition of the battery module is detected, the abnormal battery module can be replaced.

In other embodiments, the number of battery cells that a battery module can hold may be more than 2, such as 3, 4, 30, or another number, and the battery cells in a battery module may be designed to be connected in series, or some of which are connected in series and some of which are connected in parallel, depending on actual application occasions. In some embodiments where lithium battery cells are used, the rated voltage of a single lithium battery cell is about 3.7V. In some embodiments the number of battery cells of a battery module can be reduced to keep the voltage of the battery unit to be below about 36V.

The relay used in these embodiments is e.g., a magnetic relay mainly including an iron core, coil(s), an armature, and contacts or a reed. The operations principle of the relay may be: when power is applied to two ends of the coil, a current is passed through the coil to produce electromagnetic force, activating the armature to overcome a force provided by a spring and be attracted to the iron core. The movement of the armature brings one of the contacts to connect to a fixed normally open contact of the contacts. During a power outage or when the current is switched off, the electromagnetic force disappears and so the armature is returned by a reaction force provided by the spring to its relaxed position, bringing the moving contact to connect to a fixed normally closed contact of the contacts. By these different movements of switching, current conduction and cutoff through the relay can be achieved. A normally open contact and a normally closed contact of a relay may be defined such that a fixed contact which is in an open state when the coil of the relay is de-energized is called a normally-open contact, and a fixed contact which is in a closed state when the coil of the relay is de-energized is called a normally-closed contact.

In an exemplary embodiment, the brightness of the LED module supplied by the external driving signal is different from the brightness of the LED module supplied by the auxiliary power supply module. Therefore, a user may find the external power is abnormal when observing that the brightness of LED module changed, and thus the user can eliminate the problem as soon as possible. In this manner, the operation of the auxiliary power supply module 760 can be considered as an indication of whether the external driving signal is normally provided, wherein when the external driving signal becomes abnormal, the auxiliary power supply module 760 provides the auxiliary power having the output power different from that of the normal external driving signal. For example, in some embodiments, the luminance of the LED module is 1600 to 2000 lm when being lighted up by the external driving signal; and the luminance of the LED module is 200 to 250 lm when being lighted up by the auxiliary power. From the perspective of the auxiliary power supply module 760, in order to let the luminance of the LED module reach 200 to 250 lm, the output power of the auxiliary power supply module 760 is, for example, 1 watt to 5 watts, but the present disclosure is not limited thereto. In addition, the electrical capacity of the energy storage unit in the auxiliary power supply module 760 may be, for example, 1.5 to 7.5 Wh (watt-hour) or above, so that the LED module can be lighted up for 90 minutes under 200-250 lm based on the auxiliary power. However, the present disclosure is not limited thereto.

Figure 16I:
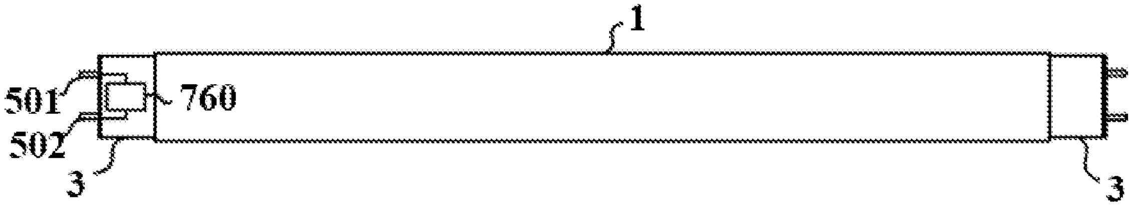
FIGS. 16I-16J are schematic structures of an auxiliary power supply module disposed in an LED tube lamp according to some exemplary embodiments.

FIG. 16I illustrates a schematic structure of an auxiliary power supply module disposed in an LED tube lamp according to an exemplary embodiment. In one embodiment, in addition, or as an alternative, the auxiliary power supply module 760/860 is disposed in the lamp tube 1. In another embodiment, the auxiliary power supply module 760/860 is disposed in the end cap 3. In order to make the description clearer, the auxiliary power supply module 760 is chosen as a representative of the auxiliary power supply modules 760 and 860 in the following paragraph, and only 760 is indicated in the figures. When the auxiliary power supply module 760 is disposed in an end cap 3, in some embodiments the auxiliary power supply module 760 connects to the corresponding pins 501 and 502 via internal wiring of the end cap 3, so as to receive the external driving signal provided to the pins 501 and 502. Compared to the structure of disposing the auxiliary power supply module into the lamp tube 1, the auxiliary power supply module 760 can be disposed far apart from the LED module since the auxiliary power supply module 760 is disposed in the end cap 3 which is connected to the respective end of the lamp tube 1. Therefore, the operation and illumination of the LED module won't be affected by heat generated by the charging or discharging of the auxiliary power supply module 760. In some embodiments, the auxiliary power supply module 760 and the power supply module of the LED tube lamp are disposed in the same end cap, and in other embodiments the auxiliary power supply module 760 and the power supply module are disposed in different end caps on the respective ends of the lamp tube. In those embodiments where the auxiliary power supply module 760 and the power supply module of the LED tube lamp are respectively disposed in the different end caps, each module may have more area for circuit layout.

Figure 16J:
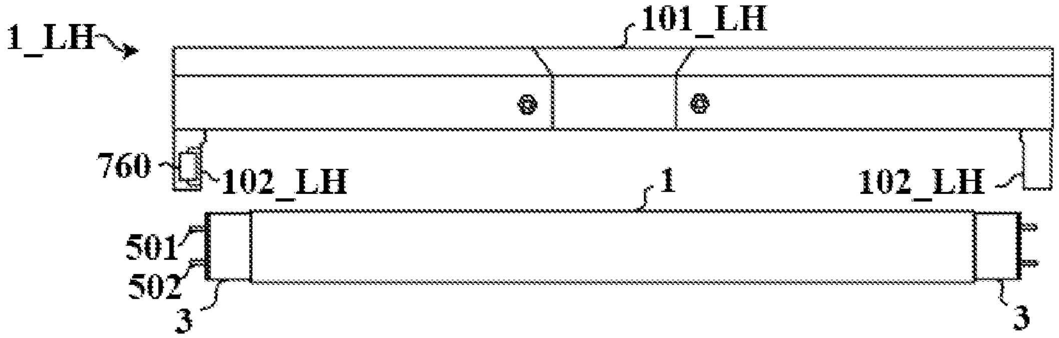

Referring to FIG. 16J, the auxiliary power supply module 760 is disposed in a lamp socket 1_LH of the LED tube lamp, according to one embodiment. In one embodiment, the lamp socket 1_LH includes a base 101_LH and a connecting socket 102_LH. The base 101_LH has power line disposed inside and is adapted to lock/attach to a fixed object such as a wall or a ceiling. The connecting socket 102_LH has slot corresponding to the pin (e.g., the pins 501 and 502) on the LED tube lamp, in which the slot is electrically connected to the corresponding power line. In the embodiment shown in FIG. 16J, the connecting socket 102_LH and the base 101_LH are formed of one piece. In another embodiment, the connecting socket 102_LH is removably disposed on the base 101_LH. It is understood by those skilled in the art that the particular lamp socket 1_LH arrangement is not limited one of these embodiments but that other arrangements are also contemplated.

In some embodiments when the LED tube lamp is installed in the lamp socket 1_LH, the pins on both end caps 3 are respectively inserted into the slot of the corresponding connecting socket 102_LH, and thus the power line can be connected to the LED tube lamp for providing the external driving signal to the corresponding pins of the LED tube lamp. Taking the configuration of the left end cap 3 as an example, when the pins 501 and 502 are inserted into the slots of the connecting socket 102_LH, the auxiliary power supply module 760 is electrically connected to the pins 501 and 502 via the slots, so as to implement the connection configuration shown in FIG. 16D.

Compared to the embodiment of disposing the auxiliary power supply module 760 in the end cap 3, the connecting socket 102_LH and the auxiliary power supply module 760 can be integrated as a module since the connecting socket can be designed as a removable configuration in an exemplary embodiment. Under such configuration, when the auxiliary power supply module 760 has a fault or the service life of the energy storage unit in the auxiliary power supply module 760 has run out, a new auxiliary power supply module can be replaced for use by replacing the modularized connecting socket 102_LH, instead of replacing the entire LED tube lamp. Thus, in addition to reducing the thermal effect of the auxiliary power supply module, the modularized design of the auxiliary power supply module has the added advantage of making the replacement of the auxiliary power supply module easier. Therefore, the durability as well as the cost savings of the LED tube lamp is evident since it is no longer necessary to replace the entire LED tube lamp when a problem occurs to the auxiliary power supply module. In addition, in some embodiments, the auxiliary power supply module 760 is disposed inside the base 101_LH. In other embodiments, the auxiliary power supply module 760 is disposed outside the base 101_LH. It is understood that the particular arrangement of the auxiliary power supply module 760 with respect to the base 101_LH is not limited to what is described in the present disclosure but that other arrangements are also contemplated.

In summary, the structural configuration of the auxiliary power supply module 760 can be divided into the following two types: (1) the auxiliary power supply module is integrated into the LED tube lamp; and (2) the auxiliary power supply module 760 is disposed independent from the LED tube lamp. Under the configuration of disposing the auxiliary power supply module 760 independent from the LED tube lamp, if the auxiliary power supply module 760 operates in the Off-line UPS mode, the auxiliary power supply module 760 and the external AC power source can provide power, through different pins or through sharing at least one pin, to the LED tube lamp. On the other hand, if the auxiliary power supply module 760 operates in the On-line UPS mode or the Line-Interactive mode, the external AC power source provides power through the auxiliary power supply module 760 rather than directly to the pins of the LED tube lamp. The detailed configuration of disposing the auxiliary power supply module independent from the LED tube lamp (hereinafter the independent auxiliary power supply module) is further described below.

Figure 16K:
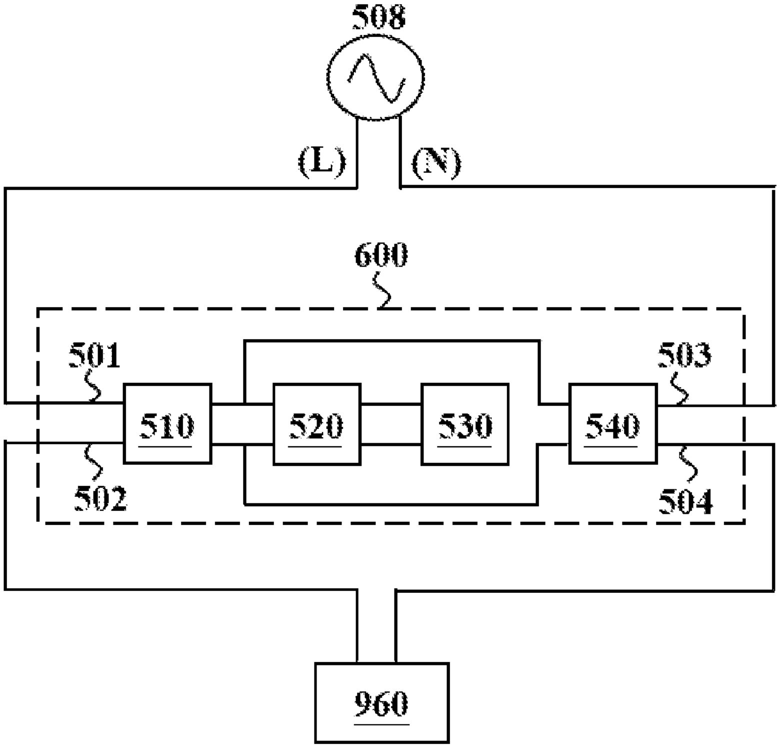
FIGS. 16K-16M are block diagrams of LED lighting systems according to some exemplary embodiments.

FIG. 16K is a block diagram of an LED lighting system according to an exemplary embodiment. Referring to FIG. 16K, the LED lighting system includes an LED tube lamp 600 and an auxiliary power supply module 960. The LED tube lamp 600 includes rectifying circuits 510 and 540, a filtering circuit 520, a driving circuit 530 and an LED module (not shown). The rectifying circuits 510 and 540 can be respectively implemented by the full-wave rectifier 610 illustrated in FIG. 11A or the half-wave rectifier 710 as shown in FIG. 11B, in which two input terminals of the rectifying circuit 510 are coupled to the pins 501 and 502 and two input terminals of the rectifying circuit 540 are coupled to the pins 503 and 504.

In the embodiment shown in FIG. 16K, the LED tube lamp 600 is configured as a dual-end power supply structure for example. The external AC power supply 508 is coupled to the pins 501 and 503 on the respective end caps of the LED tube lamp 600, and the auxiliary power supply module 960 is coupled to the pins 502 and 504 on the respective end caps of the LED tube lamp 600. In this embodiment, the external AC power supply 508 and the auxiliary power supply module 960 provide power to the LED tube lamp 600 through different pairs of the pins. Although the present embodiment is illustrated in dual-end power supply structure for example, the present disclosure is not limited thereto. In another embodiment, the external AC power supply 508 can provide power through the pins 501 and 503 on the end cap at one side of the lamp tube (i.e., the single-end power supply structure), and the auxiliary power supply module 960 can provide power through the pins 502 and 504 on the end cap at the other side of the lamp tube. Accordingly, no matter whether the LED tube lamp 600 is configured in the single-end or the dual-end power supply structure, the unused pins of the original LED tube lamp (e.g., 503 and 504 illustrated in FIG. 16K) can be the interface for receiving the auxiliary power, so that the emergency lighting function can be integrated in the LED tube lamp 600.

Figure 16L:
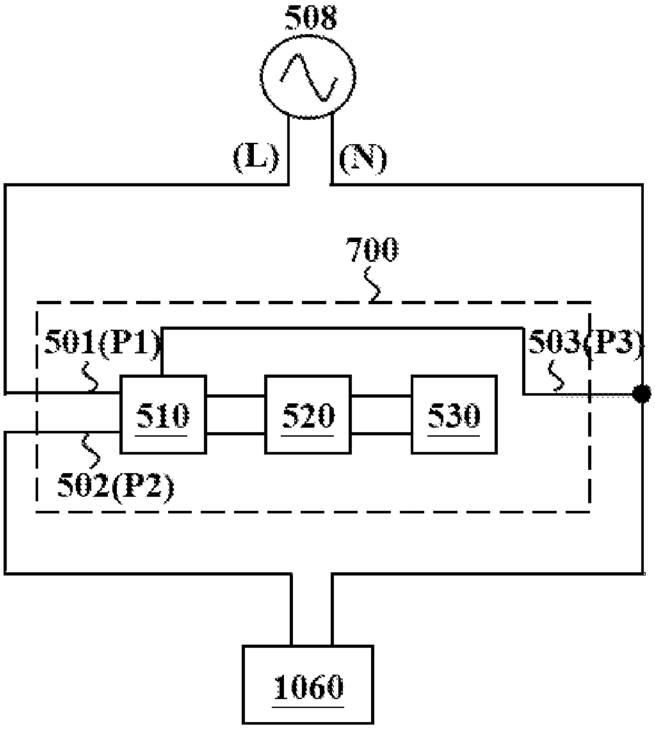

FIG. 16L is a block diagram of an LED lighting system according to another exemplary embodiment. Referring to FIG. 16L, the LED lighting system includes an LED tube lamp 700 and an auxiliary power supply module 1060. The LED tube lamp 700 includes a rectifying circuit 510, a filtering circuit 520, a driving circuit 530 and an LED module (not shown). The rectifying circuit 510 can be implemented by the rectifying circuit 910 having three bridge arms as shown in any of FIGS. 11D to 11F, in which the rectifying circuit 510 has a first signal input terminal P1 coupled to the pin 501, a second signal input terminal P2 coupled to the pin 502 and the auxiliary power supply module 1060 and a third input terminal P3 coupled to the auxiliary power supply module 1060.

In the present embodiment, the LED tube lamp 700 is configured as a dual-end power supply structure for example. The external AC power supply 508 is coupled to the pins 501 and 503 on the respective end caps of the LED tube lamp 500. The difference between the present embodiment shown in FIG. 16L and the embodiment illustrated in FIG. 16K is that besides being coupled to the pin 502, the auxiliary power supply module 1060 in FIG. 16L further shares the pin 503 with the external AC power supply 508. Under the configuration of FIG. 16L, the external AC power supply 508 provides power to the signal input terminals P1 and P3 of the rectifying circuit 510 through the pins 501 and 503, and the auxiliary power supply module 1060 provides power to the signal input terminals P2 and P3 of the rectifying circuit 510 through the pins 502 and 503. In detail, if the leads connected to the pins 501 and 503 are respectively configured as a live wire (denoted by "(L)") and a neutral wire (denoted by "(N)"), the auxiliary power supply module 1060 shares the lead (N) with the external AC power supply 508 and has a lead for transmitting power as a live wire distinct from the external AC power supply 508. In this manner, the signal input terminal P3 is a common terminal between the external AC power supply 508 and the auxiliary power supply module 1060.

In operation, when the external AC power source normally operates, the rectifying circuit 510 performs the full-wave rectification by the bridge arms corresponding to the signal input terminals P1 and P2, so as to provide power to the LED module 50 based on the external AC power supply 508. However, when the external AC power source is unstable or abnormal, the rectifying circuit 510 performs the full-wave rectification by the bridge arms corresponding to the signal input terminals P2 and P3, so as to provide power to the LED module 50 based on the auxiliary power provided by the auxiliary power supply module 1060. In the above-described embodiments, the characteristic of unidirectionally conducting of a diode in a rectifying circuit 510 can isolate the inputting respectively of the external driving signal and the auxiliary power from each other, preventing the two from affecting each other, while achieving the effects of providing the auxiliary power when the external power grid 508 is in abnormal status. In actual applications, the rectifying circuit 510 can be realized by fast recovery diodes, in order to be responsive to high-frequency characteristics of the output current from an emergency power supply.

In addition, since the LED tube lamp receives the auxiliary power provided by the auxiliary power supply module 1060 through sharing the pin 503, an unused pin (e.g., pin 504) can be used as a signal input interface of other control functions. These other control functions can be a dimming function, a communication function or a sensing function, though the present disclosure is not limited thereto. The embodiment of integrating the dimming function through the unused pin 504 is further described below.

Figure 16M:
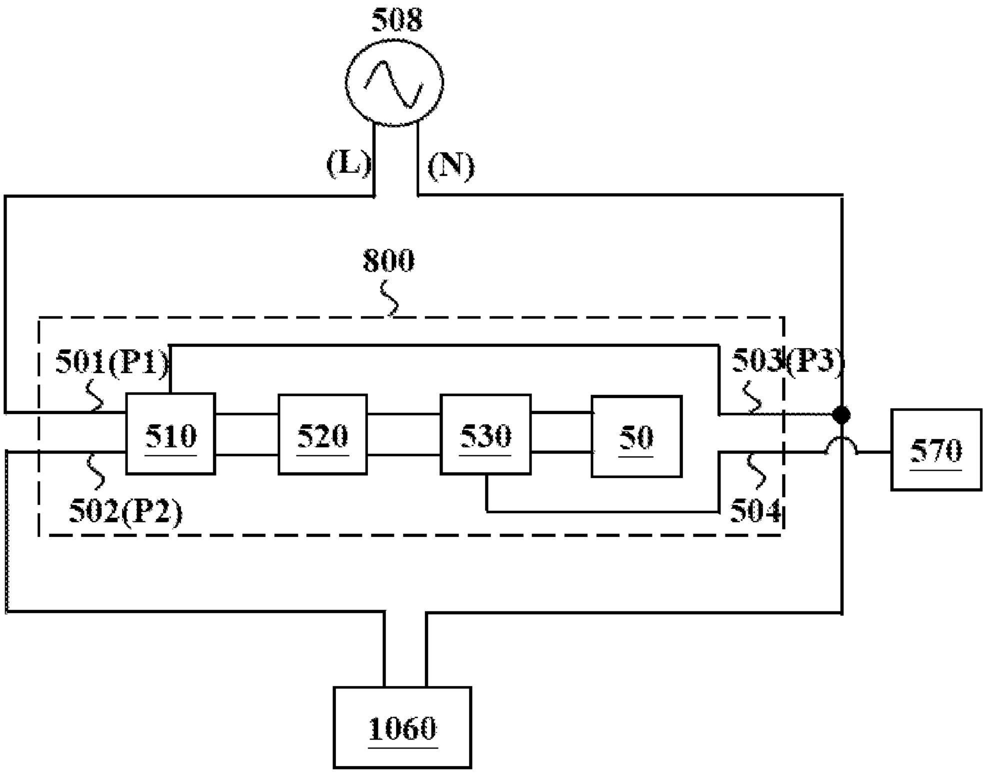

FIG. 16M is a block diagram of an LED lighting system according to still another exemplary embodiment. Referring to FIG. 16M, the LED lighting system includes an LED tube lamp 800 and an auxiliary power supply module 1060. The LED tube lamp 800 includes a rectifying circuit 510, a filtering circuit 520, a driving circuit 530 and an LED module 50. The configuration of the present embodiment is similar to the embodiment illustrated in FIG. 16L. The difference between the embodiments of FIGS. 16M and 16L is, as shown in FIG. 16M, the pin 504 of the LED tube lamp 800 is further coupled to a dimming control circuit 570, in which the dimming control circuit 570 is coupled to the driving circuit 530 through the pin 504, so that the driving circuit 530 can adjust the magnitude of the driving current, supplied to the LED module 50, according to a dimming signal received from the dimming control circuit 570. Therefore, the brightness and/or the color temperature of the LED module 50 can be varied according to the dimming signal.

For example, the dimming control circuit 570 can be implemented by a circuit including a variable impedance component (e.g., a variable resistor, a variable capacitor or a variable inductor) and a signal conversion circuit. The impedance of the variable impedance component can be tuned by a user, so that the dimming control circuit 570 generates the dimming signal having signal level corresponding to the impedance. After converting the signal formation (e.g., signal level, frequency or phase) of the dimming signal to conform the signal formation of the driving circuit 530, the converted dimming signal is transmitted to the driving circuit 530, so that the driving circuit 530 adjusts the magnitude of the driving current based on the converted dimming signal. In some embodiments, the brightness of the LED module 50 can be adjusted by tuning the frequency or the reference level of the lamp driving signal. In some embodiments, the color temperature of the LED module 50 can be adjusted by tuning the brightness of the red LED units.

It should be noted that, by utilizing the structural configurations as shown in FIGS. 16I and 16J, the auxiliary power supply module 960/1060 can obtain the similar benefits and advantages described in the embodiments of FIGS. 16I and 16J.

The disposition or configuration of the embodiments respectively in FIGS. 16D to 16M can be applied not only for providing emergency power for one tube lamp, but also for providing auxiliary emergency power in a structure of multiple tube lamps connected in parallel. Specifically, under the structure of multiple tube lamps connected in parallel, conductive pin(s) at each end of each tube lamp is/are connected to corresponding pins at corresponding ends respectively of the other tube lamps, in order to receive an identical external driving signal. For example, the first pins 501 respectively of the multiple tube lamps are connected to each other, the second pins respectively of the multiple tube lamps are connected to each other, and so on. Under this type of connection disposition, the auxiliary power supply module 760/860 is equivalent to be connected to conductive pin(s) of each of the multiple tube lamps connected in parallel. Therefore, as long as the output power of the auxiliary power supply module 760/860 is sufficient to light up all of the multiple tube lamps connected in parallel, when an abnormal condition occurs to the external power source (so an external driving signal cannot be provided), the auxiliary power supply module 760/860 may provide auxiliary power to light up all of the multiple tube lamps for emergency lighting. In practical applications, taking a structure of 4 LED tube lamps connected in parallel as an example, an auxiliary power supply module 760 can be designed to be an energy-storage unit having energy capacity in the range of 1.5-7.5 Wh (watt-hour) and having output power in the range of 1-5 W. Under this power specification, when the auxiliary power supply module 760 provides the auxiliary power to light up LED modules, the multiple LED tube lamps as a whole can have a luminance in the range of at least 200-250 Lumens (lm) and can be lighting continuously for about 90 minutes.

In a lamp structure of multiple tube lamps, similar to the described embodiments in FIGS. 16A to 16C, only one or part of the multiple tube lamps in these embodiments respectively of FIGS. 16D to 16M may have a disposed auxiliary power supply module, and the considerations in the arrangement of the multiple tube lamps for lighting uniformity can also be applied in these embodiments. In application to the lamp structure of multiple tube lamps, a main difference between these embodiments of FIGS. 16D to 16M and the described embodiments in FIGS. 16A to 16C is that, even if only one of the multiple tube lamps in these embodiments of FIGS. 16D to 16M has a disposed auxiliary power supply module, this auxiliary power supply module can still be used to provide the auxiliary power to the rest of the multiple tube lamps.

It should be noted that although the above explanation takes a structure of 4 LED tube lamps connected in parallel as an example, a person of ordinary skill in the art after referencing the description herein should understand how to choose appropriate energy-storage unit(s) for implementation in a structure of 2, 3, or more than 4 LED tube lamps connected in parallel. Thus, each embodiment where auxiliary power supply module(s) 760 can provide power concurrently to one or more of the multiple tube lamps connected in parallel to enable the supplied tube lamp(s) to exhibit certain luminance in response to the provided auxiliary power, is within the scope of embodiments as described herein.

In some embodiments, each of the auxiliary power supply modules 560, 660, 760, 960, and 1060 in FIGS. 16D to 16M can be further configured to determine, according to a lighting signal, whether to provide the auxiliary power to an LED tube lamp. Specifically, the lighting signal can be a signal indicative of or reflecting a switching state of a light switch of the LED tube lamp for turning on/off the light from the LED tube lamp. For example, according to a switching state of the switch, a signal level of the lighting signal can be adjusted into a first level (such as a high logic level) or into a second level (such as a low logic level) different from the first level. When a user switches the light switch of the LED tube lamp to a position of lighting up or turning on, the lighting signal of the LED tube lamp is adjusted into the first level; and when the user switches the light switch off to a position of turning off, the lighting signal of the LED tube lamp is adjusted into the second level. In other words, when a lighting signal of an LED tube lamp is at the first level, this indicates the light switch of the LED tube lamp is switched to the position of lighting up; and when the lighting signal is at the second level, this indicates the light switch of the LED tube lamp is switched to the position of turning off. Generation of the lighting signal of an LED tube lamp can be realized by a circuit for detecting a switching state of the light switch of the LED tube lamp.

In some embodiments, each of the auxiliary power supply modules 560, 660, 760, 860, 960, and 1060 may further include a lighting determining circuit configured to receive the lighting signal; and the lighting determining circuit is also configured to determine whether to allow the energy-storage unit in the auxiliary power supply module 560, 660, 760, 860, 960, and 1060 to provide power to later-stage circuit(s), according to the signal level of the lighting signal and a detection result of a voltage detection circuit. Specifically, based on the signal level of the lighting signal and the detection result of the voltage detection circuit, there can be the following three states: (1) the lighting signal is at a first level and an external driving signal is normally provided; (2) the lighting signal is at the first level and the external driving signal is no longer provided or has insufficient AC level; and (3) the lighting signal is at a second level and the external driving signal is no longer provided. Among the three states, state (1) corresponds to the case of a user turning on the light switch of the LED tube lamp and an external power source normally provides power to the LED tube lamp, state (2) corresponds to the case of the user turning on the light switch of the LED tube lamp but the external power supplying is in an abnormal state, and state (3) corresponds to the case of the user turning off the light switch of the LED tube lamp to stop power supplying from the external power source.

As described herein, both the states (1) and (3) are normal operation states, meaning the external power source is normally provided upon the user turning on the LED tube lamp and the external power source is no longer provided upon the user turning off the LED tube lamp, respectively. Therefore, under each of the states (1) and (3), the auxiliary power supply module does not provide power for later-stage circuit(s). More specifically, according to a determination result of the state (1) or state (3), the lighting determining circuit causes the energy-storage unit of the auxiliary power supply module not to provide power for later-stage circuit(s). Under the state (1), the external driving signal is directly input to a rectifying circuit 510 and also used to electrically charge the energy-storage unit; and under the state (3), the external driving signal is not provided and thus not used to electrically charge the energy-storage unit.

The state (2) corresponds to the case of power from the external power source being not normally provided to the LED tube lamp upon the user turning on (a light switch of) the LED tube lamp, so according to the determination result of the state (2), the lighting determining circuit causes the energy-storage unit of the auxiliary power supply module to provide power for later-stage circuit(s), enabling the LED module 50 to emit light based on the auxiliary power provided by the energy-storage unit.

Accordingly, in applications of such lighting determining circuit, the LED module 50 can be configured to have three different sections in luminance variation. The first section is for the LED module 50 to present a first luminance (such as in the range of 1600 to 2200 lms) when the external power source is normally provided to the LED tube lamp of the LED module. The second section is for the LED module 50 to present a second luminance (such as in the range of 200 to 250 lms) when the external power source is not normally provided, and auxiliary power is used to supply instead. And the third section is for the LED module 50 to present a third luminance (as of not lighting the LED module) when the user himself turns off the power supply to prevent provision of the external power source to the LED tube lamp.

More specifically, with reference to the embodiment of FIG. 16C, the lighting determining circuit can be for example, a switch circuit (not illustrated) serially connected between an auxiliary power positive terminal 661 and an auxiliary power negative terminal 662, where the switch circuit has a control terminal for receiving the lighting signal. When the lighting signal is at the first level, the switch circuit enters into a conducting state in response to the lighting signal, so as to allow a current to electrically charge the energy-storage unit 663 through the auxiliary power positive terminal 661 and auxiliary power negative terminal 662 when an external driving signal is normally provided (e.g., state 1); or to allow the energy-storage unit 663 to provide auxiliary power through the auxiliary power positive terminal 661 and auxiliary power negative terminal 662 for use by a later-stage LED module 50, when an external driving signal is not provided or has insufficient AC level (e.g., state 2). On the other hand, when the lighting signal is at the second level, the switch circuit is cut off in response to the lighting signal, so as to prevent the energy-storage unit 663 from providing auxiliary power to later-stage circuit/module even when an external driving signal is not provided or has insufficient AC level.

In applications of the above-described auxiliary power supply module, if an auxiliary power unit (e.g., the auxiliary power unit 762 or the auxiliary power unit 862) is designed in a circuit structure that has an open-loop control mechanism, that is, there is no feedback signal to the output voltage of the auxiliary power unit. Under this mechanism, if a load is open circuited from the auxiliary power unit, the output voltage of the auxiliary power supply module will keep increasing, which may cause the auxiliary power supply module to burn or be damaged. To solve such issues, the disclosure provides multiple circuit embodiments of the auxiliary power supply module having open-circuit protection, as shown in FIGS. 16N and 16O.

Figure 16N:
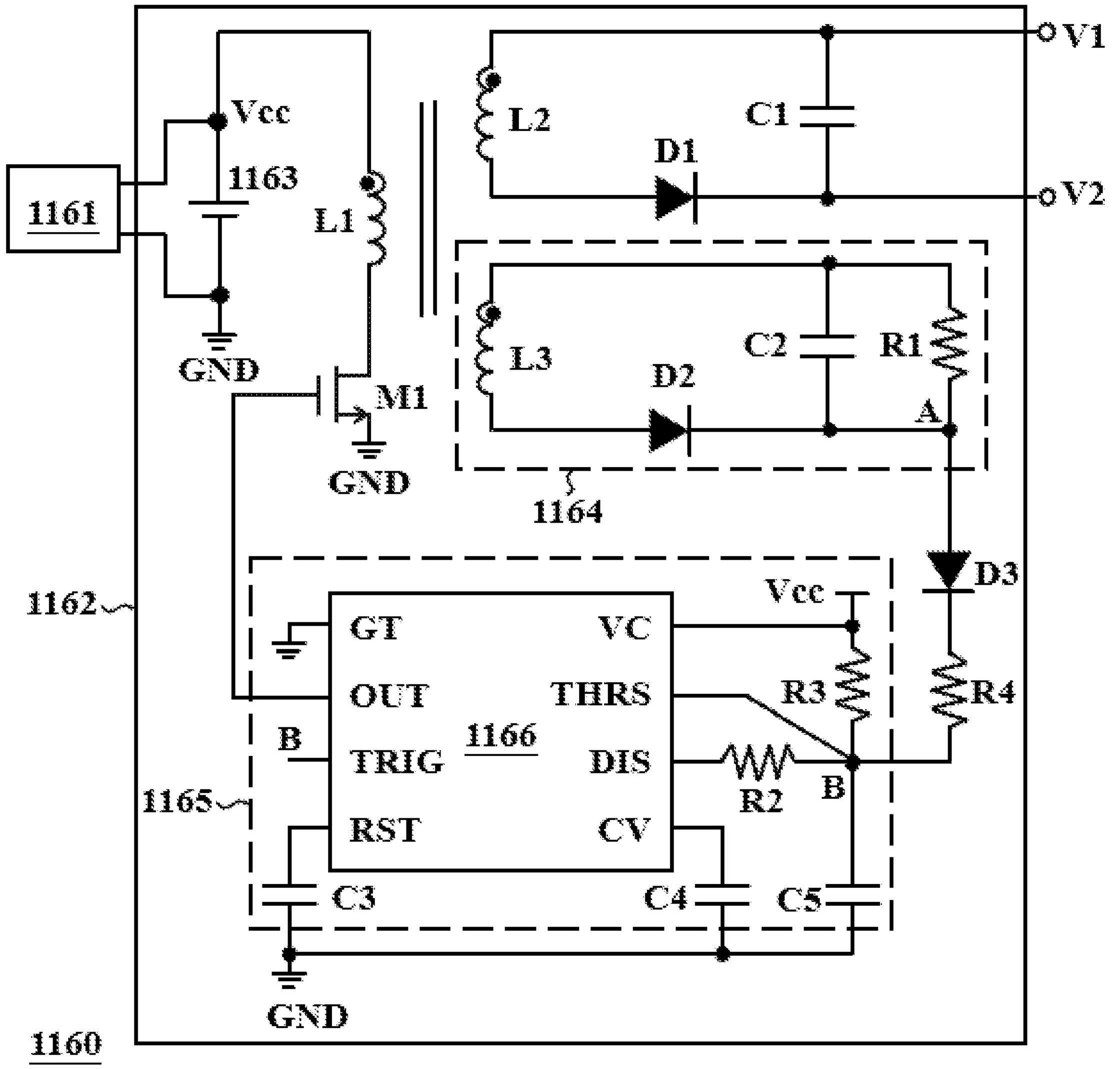
FIGS. 16N-16O are schematic circuit diagrams of auxiliary power supply modules according to some exemplary embodiments.
Figure 16O:
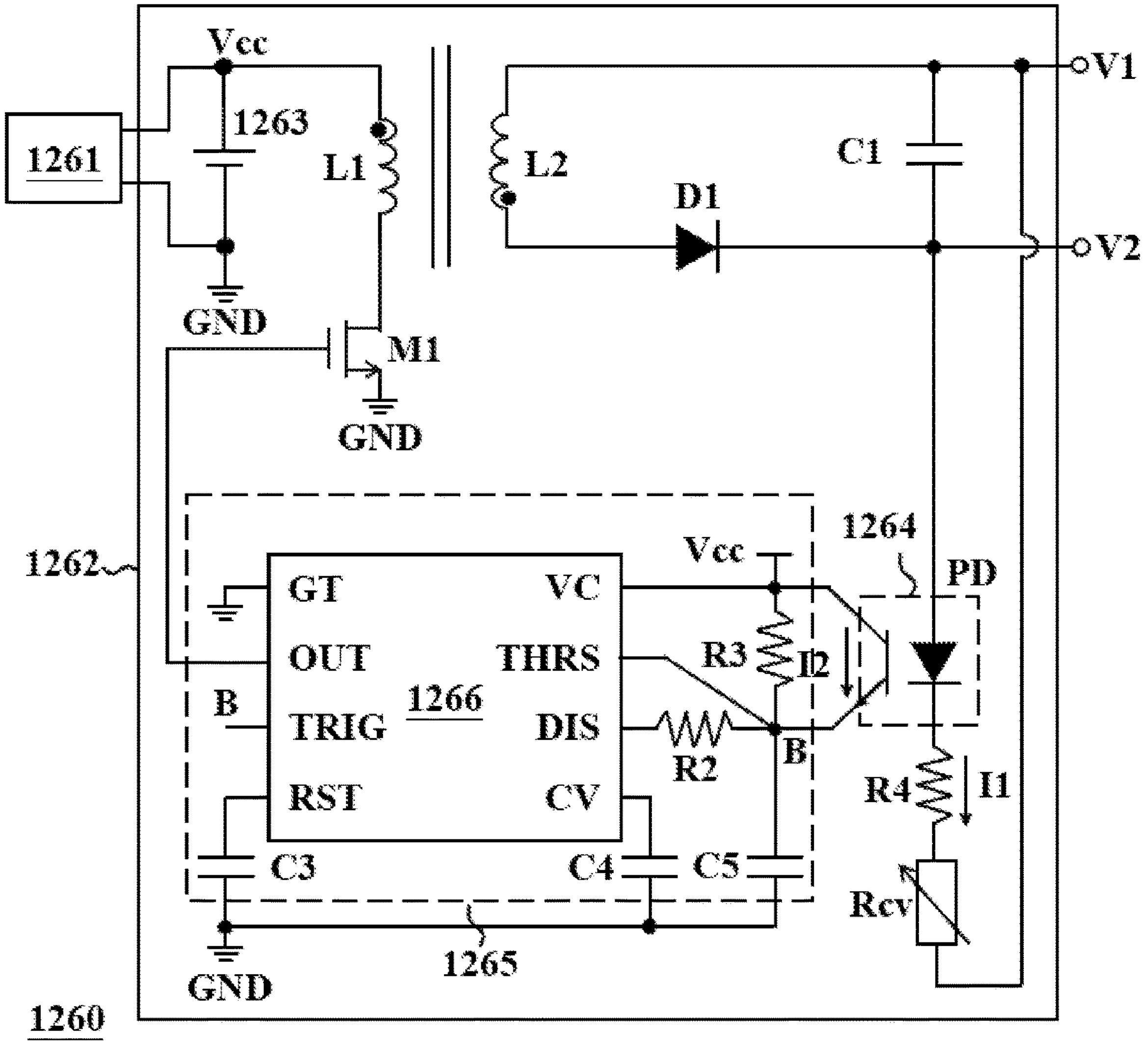

FIG. 16N is a circuit diagram of the auxiliary power supply module according to an embodiment. Referring to FIG. 16N, in this embodiment, the auxiliary power supply module 1160 includes a charging unit 1161 and an auxiliary power unit 1162. The auxiliary power unit 1162 includes a transformer, a sampling module 1164, a control module 1165, and an energy storage unit 1163 for providing a supply voltage Vcc. In the auxiliary power supply module 1160, also with reference to FIG. 16E, the transformer includes a primary winding L1 and a secondary winding L2. A terminal of the secondary winding L2 is electrically connected to switching unit 763 and therefore is electrically connected to an end of the LED tube lamp (or to input terminal(s) of rectifying circuit 510), and the other terminal of the secondary winding L2 is electrically connected to the other end of the LED tube lamp. Sampling module 1164 includes an auxiliary winding L3, which is wound along with the secondary winding L2 at the secondary side. Voltage of the secondary winding L2 is sampled by the auxiliary winding L3. If the sampled voltage exceeds a set threshold value, the sampled voltage is fed back to the control module 1165, and then the control module 1165 modulates switching frequency of a switch M1 electrically connected to the primary winding L1 based on the sampled voltage. This way of modulating the switching frequency of switch M1 then controls output voltage at the secondary side, thereby realizing open-circuit protection.

Specifically, the transformer includes a primary side unit and a secondary side unit. The primary side unit includes an energy storage unit 1163, a primary winding L1, and a switch M1. A positive electrode of the energy storage unit 1163 is electrically connected to a dotted terminal of the primary winding L1, and a negative electrode of the energy storage unit 1163 is electrically connected to a ground terminal. A non-dotted terminal of the primary winding L1 is electrically connected to the drain terminal of the switch M1 (such as a MOSFET). The gate terminal of the switch M1 is electrically connected to control module 1165, and the source terminal of switch M1 is connected to a ground terminal. The secondary side unit includes secondary winding L2, a diode D1, and a capacitor C1. A non-dotted terminal of the secondary winding L2 is electrically connected to the anode of diode D1, and a dotted terminal of secondary winding L2 is electrically connected to an end of the capacitor C1. The cathode of the diode D1 is electrically connected to the other end of the capacitor C1. The two ends of the capacitor C1 can be regarded as auxiliary power supply output terminals V1 and V2 (corresponding to two terminals of the auxiliary power supply module 960 in FIG. 16K, or two terminals of the auxiliary power supply module 1060 in FIGS. 16L and 16M).

Sampling module 1164 includes an auxiliary winding L3, a diode D2, a capacitor C2, and a resistor R1. A non-dotted terminal of the auxiliary winding L3 is electrically connected to the anode of diode D2, and a dotted terminal of auxiliary winding L3 is electrically connected to a first common end connecting the capacitor C2 and the resistor R1. The cathode of diode D2 is electrically connected to another common end (marked with "A" in FIG. 16N) connecting the capacitor C2 and the resistor R1. And the capacitor C2 and the resistor R1 are electrically connected to control module 1165 through the node A.

The control module 1165 includes a controller 1166, a diode D3, capacitors C3, C4 and C5, and resistors R2, R3, and R4. The ground pin GT of the controller 1166 is grounded to the ground terminal GND. The output pin OUT of the controller 1166 is electrically connected to the gate terminal of switch M1. The trigger pin TRIG of the controller 1166 is electrically connected to an end (marked with "B") of the resistor R2. The discharge pin DIS of the controller 1166 is electrically connected to the other end of resistor R2. The reset pin RST of the controller 1166 is electrically connected to an end of the capacitor C3, which has the other end connected to the ground terminal GND. The constant voltage pin CV of the controller 1166 is electrically connected to an end of the capacitor C4, which has the other end connected to the ground terminal GND. The discharge terminal DIS of the controller 1166 is coupled to an end of the capacitor C5 through the resistor R2, which capacitor C5 has the other end connected to the ground terminal GND. The power supply pin VC of the controller 1166 receives supply voltage Vcc and is electrically connected to an end of the resistor R3, which has the other end electrically connected to the node B. The anode of the diode D3 is electrically connected to the node A, the cathode of diode D3 is electrically connected to an end of the resistor R4, which has the other end electrically connected to the node B.

What follows here is a description of operations of the circuit embodiment in FIG. 16N. When the auxiliary power supply module 1160 is in a normal state, the output voltage between output terminals V1 and V2 of the auxiliary power supply module 1160 is low and usually lower than a specific value, for example 100 V. In the present embodiment, the output voltage between the output terminals V1 and V2 is in the range 60 V to 80 V. At this time the voltage, relative to the ground terminal GND, sampled at the node A of the sampling module 1164 is low such that a small current is flowing through the resistor R4 and can be ignored. When the auxiliary power supply module 1160 is in an abnormal state, the output voltage between the output terminals V1 and V2 of the auxiliary power supply module 1160 is relatively high, for example over 300 V, and then the voltage sampled at the node A of the sampling module 1164 is relatively high such that a relatively large current is flowing through the resistor R4. The relatively large current flowing through the resistor R4 increases the discharge time of the capacitor C5, whose charge time is unchanged, and this amounts to adjusting the duty cycle of the switch M1 to increase the cutoff time. With respect to the output side of the transformer, the adjusting of the duty cycle causes a smaller output energy, and thus the output voltage will not keep increasing, so as to achieve the purpose of open-circuit protection.

In this embodiment, the trigger terminal TRIG of the controller 1166 is electrically connected to the discharge terminal DIS of the controller 1166 through the resistor R2, and the discharge terminal DIS is triggered when the voltage at the node B is in the range (⅓)*Vcc to (⅔)*Vcc (the "*" denoting multiplication). When the auxiliary power supply module 1160 is in the normal state, i.e., its output voltage does not exceed a set threshold value, the voltage sampled at the node A may be lower than (⅓)*Vcc. When the auxiliary power supply module 1160 is in the abnormal state, the voltage sampled at the node A may reach or be higher than (½)*Vcc.

Figure 16P:
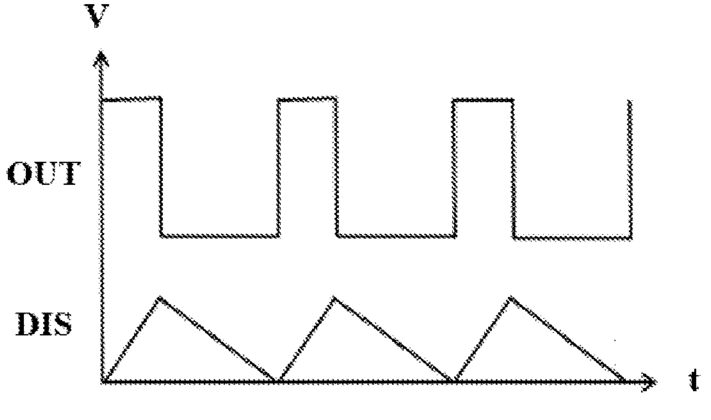
FIGS. 16P-16Q are charge-discharge waveforms of auxiliary power supply modules according to some exemplary embodiments.

In this embodiment, during the normal state, the auxiliary power supply module 1160 supplies power normally when the discharge pin DIS of the controller 1166 is triggered. The waveforms of the voltages at the discharge pin DIS and the output pin OUT are shown in FIG. 16P. FIG. 16P shows charge-discharge waveform at the discharge pin DIS and the voltage waveform at the output terminal OUT along the time axis when auxiliary power supply module 1160 is in the normal state. As shown in FIG. 16P, when the discharge pin DIS is triggered, meaning the controller 1166 is in a discharge stage (to discharge the capacitor C5), a low voltage is output at the output pin OUT. When the discharge pin DIS is not triggered, meaning the controller 1166 is in a charge stage (to charge the capacitor C5), a high voltage is output at the output pin OUT. Accordingly, the high and low voltage levels output at the output pin OUT are respectively used to control current conduction and cutoff of the switch M1.

Figure 16Q:
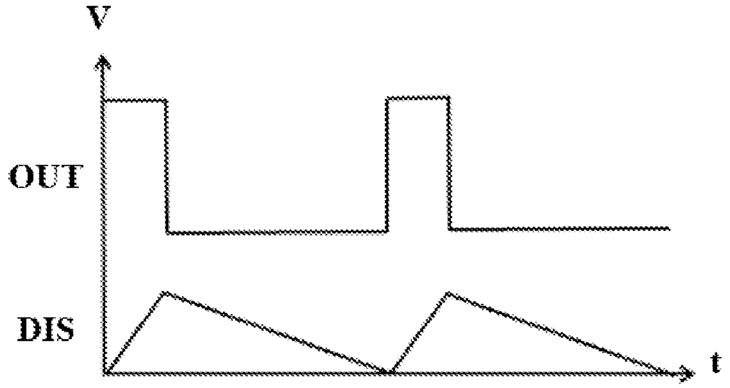

On the other hand, when the auxiliary power supply module 1160 is in the abnormal state, charge-discharge waveform at the discharge pin DIS and voltage waveform at the output pin OUT along the time axis are shown in FIG. 16Q. It is clear from FIGS. 16P and 16Q that no matter whether the auxiliary power supply module 1160 is in the normal state or the abnormal state, the period for which the discharge pin DIS is not triggered, which amounts to the period for which the capacitor C5 is charged, is the same for the two cases. And when auxiliary power supply module 1160 is in the abnormal state, since there is a current flowing from the node B to the discharge pin DIS, which results in the discharge time of the capacitor C5 being extended, a smaller or relatively small output energy results at the output side of the transformer or the auxiliary power supply module 1160 and thus the output voltage does not keep increasing, so as to achieve the purpose of open-circuit protection.

In the present embodiment, an example that can be chosen as or to constitute the control module 1166 is a chip with regulation function by time, such as a 555 timer IC, for example to control the cutoff period of the switch M1. And the present embodiment can be implemented by using resistors and capacitors to achieve the prolonging of discharge time, without using a complicated control scheme. And the voltage range for the supply voltage Vcc in this embodiment is 4.5V to 16V.

By using circuit in the embodiment discussed above, open-circuit output voltage of the auxiliary power supply module 1160 can be limited to be below a specific value, such as 300V, which can be determined by choosing appropriate values for parameters in the circuit.

It should be noted that in the circuit of the above embodiment, each electrical element or component depicted in the relevant figures, such as a resistor, capacitor, diode, or MOSFET (as switch M1), is intended to be a representative or equivalent of any plurality of such an element that may be actually used and connected according to relevant rules to implement this embodiment.

FIG. 16O is a circuit diagram of the auxiliary power supply module according to an embodiment. Referring to FIG. 16O, the auxiliary power supply module 1260 includes a charging unit 1261 and an auxiliary power unit 1262. The auxiliary power unit 1262 includes a transformer, a sampling module 1264, a control module 1265, and an energy storage unit 1263 for providing a supply voltage Vcc. The difference between embodiments of FIG. 16O and FIG. 16N is that the sampling module 1264 in the embodiment of FIG. 16O is implemented by an optical coupler.

The transformer includes a primary winding L1 and a secondary winding L2. Configuration of the primary winding L1 with a switch M1 is the same as that in the above-described embodiment. A dotted terminal of the secondary winding L2 is electrically connected to the anode of a diode D1, and a non-dotted terminal of the secondary winding L2 is electrically connected to an end of a capacitor C1. The cathode of the diode D1 is electrically connected to the other end of the capacitor C1. And the two ends of the capacitor C1 can be regarded as auxiliary power supply output terminals V1 and V2.

The sampling module 1264 includes an optical coupler PD having at least one photodiode, whose anode is electrically connected to the cathode of the diode D1 and an end of the capacitor C1 and whose cathode is electrically connected to an end of a resistor R4. The other end of the resistor R4 is electrically connected to an end of a clamping component Rcv, which has the other end electrically connected to the other end of the capacitor C1. A bipolar junction transistor in the optical coupler PD has a collector and an emitter electrically connected to two ends of a resistor R3 respectively.

The control module 1265 includes a controller 1266, capacitors C3, C4 and C5, and resistors R2 and R3. The power supply pin VC of the controller 1266 is electrically connected to the collector of the bipolar junction transistor in the optical coupler PD. The discharge pin DIS of the controller 1166 is electrically connected to an end of the resistor R2, which has the other end electrically connected to the collector of the bipolar junction transistor in the optical coupler PD. The sample pin THRS of the controller 1166 is electrically connected to the emitter of the bipolar junction transistor in the optical coupler PD and is connected to an end of the capacitor C5, which capacitor C5 has the other end electrically connected to the ground terminal GND. The ground pin GT of the controller 1166 is grounded to the ground terminal GND. The reset pin RST of the controller 1166 is electrically connected to an end of the capacitor C3, which has the other end connected to the ground terminal GND. The constant voltage pin CV of the controller 1166 is electrically connected to an end of the capacitor C4, which has the other end connected to the ground terminal GND. The trigger pin TRIG of the controller 1166 is electrically connected to the sample pin THRS. And the output pin OUT of the controller 1166 is electrically connected to the gate terminal of the switch M1.

What follows here is a description of operations of the circuit embodiment in FIG. 16O. When the auxiliary power supply module 1260 is in a normal state, the output voltage between the output terminals V1 and V2 of the auxiliary power supply module 1260 is lower than a clamping voltage of the clamping component Rcv, so a current I1 flowing through the resistor R4 is small and can be ignored. And a current I2 flowing through the collector and emitter of the bipolar junction transistor in the optical coupler PD is also small.

When the load is in an open-circuit condition, the output voltage between the output terminals V1 and V2 of the auxiliary power supply module 1260 increases and, when the output voltage exceeding a threshold voltage value of the clamping component Rcv, then conducts the clamping component Rcv, causing the current I1 flowing through the resistor R4 to increase. The increase of the current I1 then lights up the photodiode of the optical coupler PD, which causes the current I2 flowing through the collector and emitter of the bipolar junction transistor in the optical coupler PD to proportionally increase. The increase of the current I2 then compensates for discharging of the capacitor C5 through the resistor R2, prolonging the discharging time of the capacitor C5 and thereby prolonging the cutoff time of the switch M1 (i.e., reducing the duty cycle of the switch M1). With respect to the output side of the transformer, this reducing or adjusting of the duty cycle causes a smaller output energy, and thus the output voltage will not keep increasing, so as to achieve the purpose of open-circuit protection.

In this embodiment of the auxiliary power supply module 1260, the clamping component Rcv may be or comprise for example a varistor, a transient voltage suppressor diode (TVS diode), or a voltage regulation diode such as a Zener diode. The trigger threshold value of the clamping component Rcv may be in the range 100 to 400 V, and is preferably in the range 150 to 350 V. In some example embodiments herein, 300 V is chosen as the trigger threshold value.

In one embodiment of the auxiliary power supply module 1260, the resistor R4 operates mainly to limit current, and its resistance may be in the range 20 k to 1M ohm (the "M" denoting a million) and is preferably in the range 20 k to 500 k ohm. In some disclosed embodiments herein, 50 k ohm is chosen as the resistance of the resistor 6511. And the resistor R3 operates mainly to limit current, and its resistance may be in the range 1 k to 100 k ohm and is preferably in the range 5 k to 50 k ohm. In the disclosed embodiments herein, 6 k ohm is chosen as the resistance of the resistor R3. In this embodiment of the auxiliary power supply module 1260, capacitance of the capacitor C5 may be in the range 1 nF to 1000 nF and is preferably in the range 1 nF-to 100 nF. In some disclosed embodiments herein, 2.2 nF is chosen as the capacitance of the capacitor C5. Capacitance of the capacitor C4 may be in the range 1 nF to 1 pF and is preferably in the range 5 nF to 50 nF. In some disclosed embodiments herein, 10 nF is chosen as the capacitance of the capacitor C4. And capacitance of the capacitor C1 may be in the range 1 uF to 100 uF and is preferably in the range 1 uF to 10 uF. In some disclosed embodiments herein, 4.7 uF is chosen as the capacitance of the capacitor C1. The specific values for components described above in connection with FIG. 16O may be combined in one embodiment, or some of them may be used with other components having different values from the specific values described above.

In the embodiments of FIG. 16N and FIG. 16O, the energy storage unit 1163 of the auxiliary power supply module 1160/1260 may comprise for example a battery or a super capacitor. In the above embodiments, DC power supply by the auxiliary power supply module 1160/1260 may be managed by a BMS so as to charge the capacitor C5 when the LED tube lamp operates in a normal lighting mode. Or the capacitor C5 may be charged when the LED tube lamp operates in a normal lighting mode, without the BMS. Through choosing appropriate values of parameters of components of the auxiliary power supply module 1160/1260, a small current, for example not exceed 300 mA, can be used to charge the auxiliary power supply module 1160/1260.

Advantages of using the auxiliary power supply module 1160/1260 embodiments of FIGS. 16N and 16O include that it has relatively simple circuit topology; a specialized integrated circuit chip is not needed to implement it; relatively few components are used to implement the open-circuit protection and thus the reliability of the auxiliary power supply module can be improved. The topology of the auxiliary power supply module 1160/1260 can be implemented by an isolation circuit structure so as to reduce the risks of current leakage.

In summary, the principle of using the auxiliary power supply module 1160/1260 embodiments of FIGS. 16N and 16O is to sample an output voltage (or current) as by using the sampling module 1164; and if the voltage/current sample exceeds a predefined threshold value, to prolong the cutoff period of the switch M1 by prolonging time of discharge through the discharge terminal DIS/THRS of the controller 1166, thereby modulating the duty cycle of the switch M1. The operating voltage at the discharge terminal DIS/THRS of the controller 1166 is in the range between (⅓)*Vcc and (⅔)*Vcc, each charge time of the capacitor C5 is about the same, but its discharge time is prolonged. Therefore, this adjusting of the duty cycle causes a smaller output energy, and thus the output voltage will not keep increasing, so as to achieve the purpose of open-circuit protection.

FIG. 16P and FIG. 16Q show a time diagram including corresponding waveforms of the voltage at the OUT terminal and the voltage at the DIS terminal of the control module 1165, when the auxiliary power supply module is working in the normal state. FIG. 9N shows a time diagram including corresponding waveforms of the voltage at the OUT terminal and the voltage at the DIS/THRS terminal of the control module 1165, when the auxiliary power supply module is in an abnormal state (as when the load is open-circuited). The voltage at the OUT terminal is initially at a high level while the DIS/THRS terminal is not triggered (so the capacitor C5 is being charged). When the DIS/THRS terminal is triggered (so the capacitor C5 is discharging), the voltage at the OUT terminal falls to be at a low level. The waveform or signal of the voltage at the OUT terminal is thus used to control current conduction and cutoff of the switch M1.

Figure 16R:
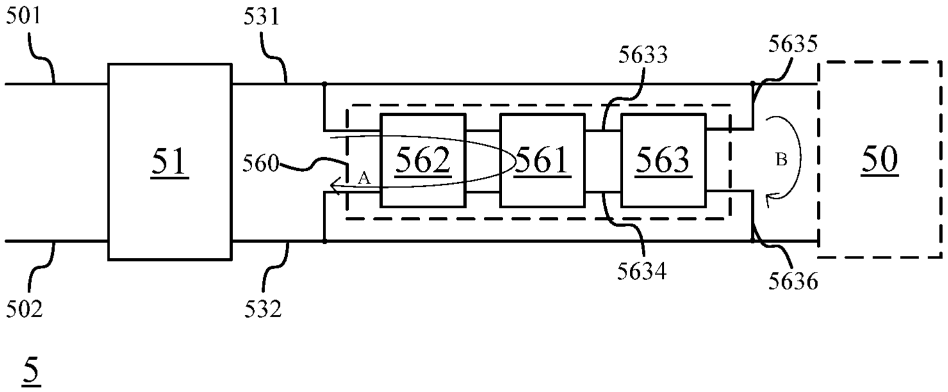
FIG. 16R is a circuit block diagram of a power module according to some embodiments.

FIG. 16R is a circuit block diagram of a power module according to some embodiments. Referring to FIG. 16R, a power device 5 includes a main power device 51 and an auxiliary power module 560, wherein the main power device 51 is coupled to a first pin 501 and a second pin 502 in order to receive an external driving signal. The main power device 51 includes a first driving output terminal 531 and a second driving output terminal 532, both are configured to be coupled to an LED module 50 and to connect to the auxiliary power module 560. In other words, the auxiliary power module 560 is connected to the LED module 50 in parallel. And auxiliary power module 560 includes an auxiliary power source 561, a charging circuit 562, and a discharging circuit 563.

The auxiliary power source 561 is used for providing auxiliary power and storing electric energy, and is such as a battery or supercapacitor. When the main power device 51 is supplying power normally, the auxiliary power source 561 acts as a load to the main power device 51, which charges the auxiliary power source 561. When (power supplying by) the main power device 51 is in an abnormal state, the auxiliary power source 561 discharges electricity out as an electric power source.

The charging circuit 562 is connected to the auxiliary power source 561, first driving output terminal 531, and second driving output terminal 532, and is configured to charge the auxiliary power source 561 based on an electrical signal outputted by the main power device 51. The charging circuit 562 generates a charging signal for charging the auxiliary power source 561. When the main power device 51 is supplying power normally, the charging circuit 562 receives and performs power conversion to an electrical signal outputted through the first driving output terminal 531 and second driving output terminal 532, to output a charging signal matching and for charging the auxiliary power source 561 (the charging direction is as illustrated by a route A shown in FIG. 16R). For example, when the auxiliary power source 561 needs to be charged under a rated voltage or rated current or rated power, the charging circuit 562 may be correspondingly configured to be a DC-to-DC conversion circuit of the type of constant voltage, constant current, or constant power. Similarly, for example, when an electrical signal outputted by a main power device 51 is larger than an electrical signal needed for charging an auxiliary power source 561, a charging circuit 562 may be configured to be a Buck-type DC-to-DC conversion circuit in order to step down an electrical signal outputted by the main power device 51. When (power supplying by) the main power device 51 is in an abnormal state, no electrical signal or a too low electrical signal is outputted through a first driving output terminal 531 and a second driving output terminal 532 and insufficient for charging an auxiliary power source 561, then a charging circuit 562 does not operate (meaning a charging route A in FIG. 16R is cut off). It should be noted that these examples merely illustrate a charging circuit 562, and in practical applications a person of ordinary skill in the art may choose an electrical power conversion circuit, according to and suitable for the type of an adopted auxiliary power source 561, to be a charging circuit.

A discharging circuit 563 is coupled to an auxiliary power source 561 and an LED module 50, and configured to decide whether to operate or not based on a main power device 51's state of supplying power. As shown in FIG. 16R, a discharging circuit 563 has a first discharging input terminal 5633, a second discharging input terminal 5634, a first discharging output terminal 5635, and a second discharging output terminal 5636; is coupled to an auxiliary power source 561 through the first discharging input terminal 5633 and second discharging input terminal 5634; and is coupled to an LED module 50 through the first discharging output terminal 5635 and second discharging output terminal 5636. Further, when a main power device 51 is supplying power normally, the discharging circuit 563 does not operate (so the power route B illustrated in FIG. 16R is cut off). When (power supplying by) the main power device 51 is in an abnormal state, the discharging circuit 563 performs power conversion to auxiliary power provided by the auxiliary power source 561, in order to output an auxiliary power signal matching the LED module 50 (the discharging direction is as illustrated by the route B shown in FIG. 16R). For example, when an electrical signal needed for lighting up the LED module 50 is larger than auxiliary power provided by the auxiliary power source 561, the discharging circuit 563 may be configured to be a Boost-type DC-to-DC conversion circuit in order to boost or increase the voltage of the auxiliary power. It should be noted that a person of ordinary skill in the art may choose an electrical power conversion circuit, according to and suitable for the type of an adopted LED module, to be a discharging circuit, which electrical power conversion circuit can output a stable auxiliary power signal to light up the LED module. Besides, the LED module may be replaced with another load. As long as according to and suitable for the type of an adopted LED module, a person of ordinary skill in the art can choose an electrical power conversion circuit to be a discharging circuit. And an auxiliary power signal is for example a constant-voltage or constant-current signal.

Figure 16S:
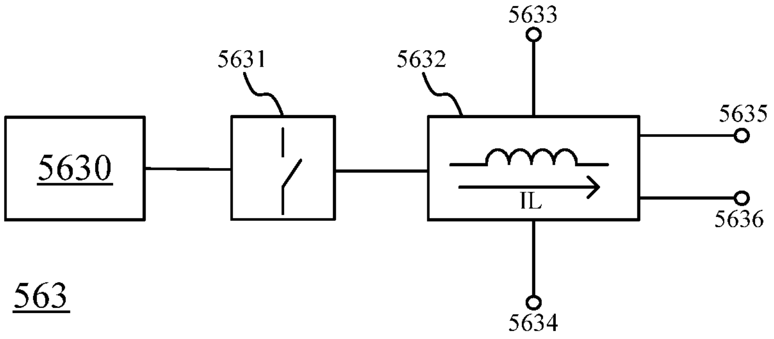
FIG. 16S is a circuit block diagram of a discharging circuit according to some embodiments.

FIG. 16S is a circuit block diagram of a discharging circuit according to some embodiments. Referring to FIG. 16S, a discharging circuit 563 includes a controller 5630, a switch 5631, and an energy-storage circuit 5632. The switch 5631 has a control terminal coupled to the controller 5630, and is configured to conduct or be cut off under the control by the controller 5630. The energy-storage circuit 5632 is coupled to a first discharging input terminal 5633 and a second discharging input terminal 5634, in order to receive auxiliary power provided by an auxiliary power source; and is coupled to the switch 5631 in order to convert the auxiliary power provided by the auxiliary power source based on the switch 5631's conducting or being cut off, so as to output, through a first discharging output terminal 5635 and a second discharging output terminal 5636, an auxiliary power signal matching an LED module.

In some embodiments, a discharging circuit 563 may adopt a power conversion circuit in current existing technologies, such as a Boost-type power conversion circuit, a Buck-type power conversion circuit, or a Buck-Boost type power conversion circuit, but the present application is not limited to any of these.

In some embodiments, a discharging circuit 563 may adopt a power conversion circuit structure in the described embodiments in FIGS. 13C and 13F. Specially, when an output voltage outputted by an auxiliary power source 561 is relatively low, this may happen in a structurally-limited LED lamp where an auxiliary power source 561 comprises a single-cell Lithium-ion battery, which has a typical output voltage in the range of 3.7V-4.2V or smaller than or equal to 5V. If a discharging circuit 563 adopts a power conversion circuit structure in FIG. 13C, its output voltage may be in the range of 20V-30V, which may not satisfy a power-supply requirement for an LED module 50. If a discharging circuit 563 adopts a power conversion circuit structure in FIG. 13F, its output voltage may reach the range of 40V-60V (including 40V and 60V), which may satisfy a power-supply requirement for an LED module 50.

Through such circuit configurations in the above-described embodiments, an emergency mode may be realized in which an auxiliary power module 560 can light up all LEDs in an LED module, rather than lighting up only some of the LEDs in the LED module due to a limited output voltage of a discharging circuit. So light emission by such an LED lamp may be even smooth in an emergency mode. In another aspect, the technical solutions or plans disclosed in this disclosure may be applicable to an LED lamp of a type with a smaller structure.

Figure 16T:
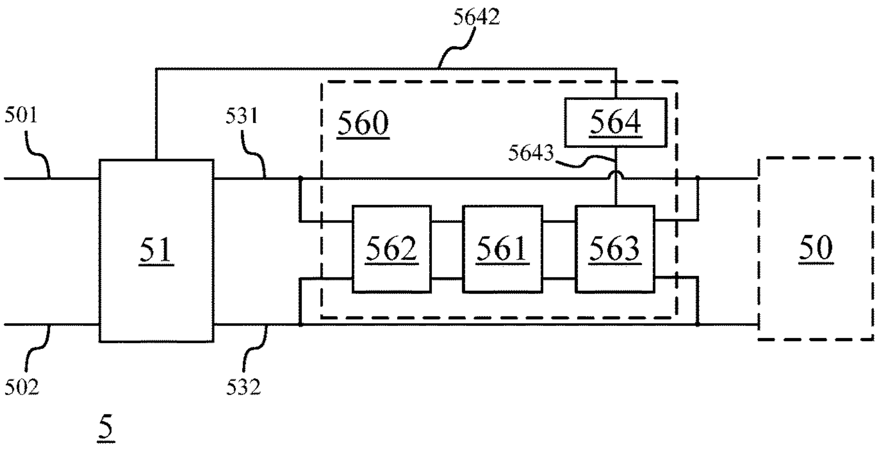
FIG. 16T is a circuit block diagram of a power module according to some embodiments.

FIG. 16T is a circuit block diagram of a power module according to some embodiments. Compared to the embodiment(s) in FIG. 16R, on the basis of the power device in FIG. 16R, an auxiliary power module 560 of a power device 5 in FIG. 16T further includes a power-supply detection circuit 564 including a voltage input terminal 5642 and a voltage output terminal 5643. The power-supply detection circuit 564 is coupled to a main power device 51 through the voltage input terminal 5642 and coupled to a discharging circuit 563 through the voltage output terminal 5643, and is configured to detect the main power device 51's state of supplying power in order to output a power-supply detection signal to the discharging circuit 563. The power-supply detection circuit 564 may realize detecting of the main power device 51's state of supplying power, by detecting an external driving signal or an electrical signal outputted by the main power device 51. For example, a voltage input terminal 5642 of a power-supply detection circuit 564 is coupled to a first pin 501 in order to detect an external driving signal; when the external driving signal is normally provided, a power-supply detection signal outputted by the power-supply detection circuit 564 based on the external driving signal is at a high level, based on which a discharging circuit 563 does not operate or is not active; but when (inputting of) the external driving signal is in an abnormal state, a power-supply detection signal outputted by the power-supply detection circuit 564 is at a low level, based on which the discharging circuit 563 operates or is active. Also for example, a voltage input terminal 5642 of a power-supply detection circuit 564 is coupled to a first driving output terminal 531 in order to detect an electrical signal outputted by a main power device 51; when the main power device 51 normally outputs an electrical signal, based on which a power-supply detection signal outputted by the power-supply detection circuit 564 is at a high level, based on which a discharging circuit 563 does not operate or is not active; but when an electrical signal outputted by the main power device 51 is in an abnormal state, based on which a power-supply detection signal outputted by the power-supply detection circuit 564 is at a low level, based on which the discharging circuit 563 operates or is active. Specifically, taking a discharging circuit 563 in FIG. 16S as an example, a voltage output terminal 5643 may be coupled to a controller 5630 in the discharging circuit 563 in order to output a power-supply detection signal to the controller 5630; the controller 5630 does not operate or stops operating, based on the power-supply detection signal being at a high level, so as to cause the discharging circuit 563 not to operate; and the controller 5630 operates, based on the power-supply detection signal being at a low level, so as to control current conduction or a cutoff state of a switch 5631, causing an energy-storage circuit 5632 to based on auxiliary power output an auxiliary power signal for an LED module 50.

Figure 16U:
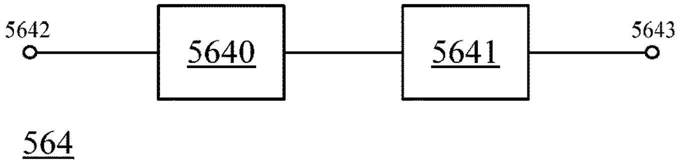
FIG. 16U is a circuit block diagram of a power-supply detection circuit according to some embodiments.

FIG. 16U is a circuit block diagram of a power-supply detection circuit according to some embodiments. Referring to FIG. 16U, a power-supply detection circuit 564 includes a rectifying circuit 5640 and a voltage division circuit 5641. The rectifying circuit 5640 is connected to a voltage input terminal 5642 and the voltage division circuit 5641, and is configured to rectify a signal (such as an external driving signal or an electrical signal outputted by a first driving output terminal 531) received by the voltage input terminal 5642. The voltage division circuit 5641 is coupled to a voltage output terminal 5643 and is configured to detect an electrical signal outputted by the rectifying circuit 5640 in order to output a power-supply detection signal.

It is noted that at least some module(s)/circuit(s)/element(s) of a power-supply detection circuit 564 may be integrated as part of a discharging circuit. For example, a voltage division circuit 5641 may be integrated in a controller 5630 of a discharging circuit as in FIG. 16S. Or a rectifying circuit 5640 and a voltage division circuit 5641 are both integrated in a controller 5630 of a discharging circuit as in FIG. 16S. The rectifying circuit 5640 comprises for example a diode (not illustrated), which has an anode coupled to the voltage input terminal 5642 and a cathode coupled to the voltage division circuit 5641. In an example where a voltage input terminal 5642 is connected to a first pin 501, a rectifying circuit 5640 is configured to rectify an external driving signal received by the first pin 501. In an example where a voltage input terminal 5642 is connected to a first driving output terminal 531, a rectifying circuit 5640 may be omitted, with a voltage division circuit 5641 being configured to directly detect an electrical signal outputted by the first driving output terminal 531. A voltage division circuit 5641 comprises for example two resistors connected in series for voltage division (not illustrated), wherein a connection node between the two resistors is connected to a voltage output terminal 5643. A voltage division circuit 5641 may further comprise a voltage stabilizing component (as a capacitor) connected in parallel with two ends of the two series-connected resistors for voltage regulation. Specific implementations for a power-supply detection circuit 564 are not specifically limited by the disclosure, and any circuit is within the scope of the present invention as long as it can detect a main power device 51's state of supplying power.

Figure 16V:
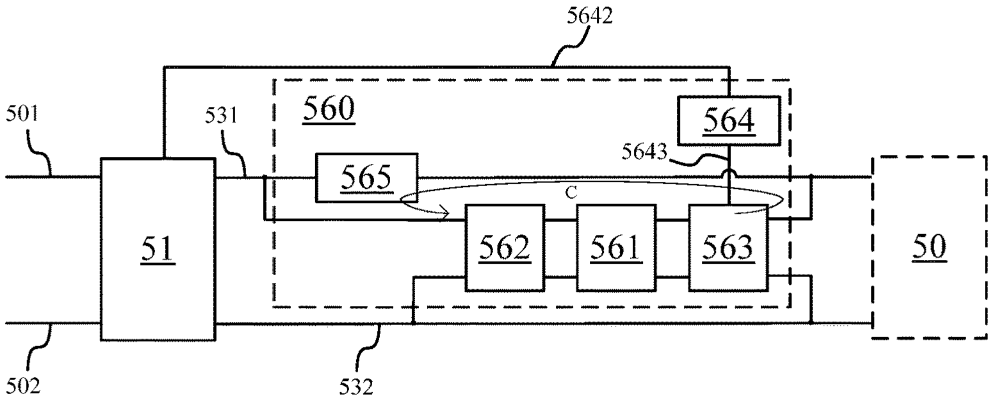
FIG. 16V is a circuit block diagram of a power module according to some embodiments.

FIG. 16V is a circuit block diagram of a power module according to some embodiments. Compared to the embodiment(s) in FIG. 16T, on the basis of the power device in FIG. 16T, an auxiliary power module 560 of a power device 5 in FIG. 16V further includes a counter-reverse-charging circuit 565, which is coupled to a charging circuit 562 through a first driving output terminal 531 and connected to a discharging circuit 563. The counter-reverse-charging circuit 565 is configured to break a power route between the charging circuit 562 and discharging circuit 563 (as breaking a power route C in FIG. 16V) when the discharging circuit 563 is operating (as when an auxiliary power source 561 is supplying an LED module 50), in order to prevent an auxiliary power signal outputted by the discharging circuit 563 from being transmitted to the charging circuit 562 and thus further prevent the charging circuit 562 from using the auxiliary power signal to charge the auxiliary power source 561.

In some embodiments, a counter-reverse-charging circuit 565 comprises for example an electronic component having a unidirectional conductivity. When a discharging circuit 563 is operating (meaning an auxiliary power source 561 is providing power for an LED module 50), an auxiliary power signal outputted by the discharging circuit 563 is at a high level, causing the unidirectional-conductivity electronic component to be in a cutoff state (the counter-reverse-charging circuit 565 in FIG. 16V at a cutoff state), so as to break a power route between the discharging circuit 563 and a charging circuit 562. When the discharging circuit 563 is not operating (meaning a main power device 51 is providing power for the LED module 50), this causes the unidirectional-conductivity electronic component to be in a conducting state (the counter-reverse-charging circuit 565 in FIG. 16V at a conducting state), which then does not interfere with the main power device 51 providing power for the LED module 50. For example, the unidirectional-conductivity electronic component may comprise a diode, which has an anode coupled to a first driving output terminal 531 and a cathode coupled to a discharging circuit 563. When the discharging circuit 563 is operating, since the anode of the diode does not receive an electrical signal or receives an insufficient-level electrical signal, the cathode of the diode receives an auxiliary power signal outputted by the discharging circuit 563, causing the diode to bear a reverse-biased voltage and thus be cut off, which breaks a power route C to prevent the auxiliary power signal from flowing to the auxiliary power source 561 through the charging circuit 562. On the other hand, when the discharging circuit 563 is not operating, since the anode of the diode receives an electrical signal outputted through a first driving output terminal 531 and the cathode of the diode does not receive an auxiliary power signal, the diode bears a forward-biased voltage and thus conducts, allowing power supplying by a main power device 51 to go to an LED module 50.

In some embodiments, a counter-reverse-charging circuit 565 may comprise a controllable switch, which is configured to conduct or be cut off based on an operation state of a discharging circuit 563, so as to be able to break a power route C when the discharging circuit 563 is operating. The controllable switch may be connected to a power-supply detection circuit, and be configured to conduct or be cut off based on a detection result of the power-supply detection circuit. For example, a controllable switch is configured to be cut off based on a power-supply detection signal being at a low level and outputted by a power-supply detection circuit, so as to realize breaking a conduction path between a discharging circuit 563 and a charging circuit 562 when the discharging circuit 563 is operating; and the controllable switch is configured to conduct based on a power-supply detection signal being at a high level and outputted by the power-supply detection circuit, so as to allow power supplying by a main power device 51 to go to an LED module 50.

Still referring to FIG. 16R, as mentioned above, a main power device 51 is to couple to a load in order to supply the load based on an external driving signal, and may include any of the embodiments shown in FIGS. 9A-9C. Considering the usual practice that a main power device 51 is to be controlled to light up an LED module connected thereto (the controlling is such as by a user to turn on a control switch for the LED module), that is, without a control command to cause the main power device 51 to light up, the main power device may not operate to output an electrical signal for use by a later-stage circuit (or outputting an electrical signal weak or insufficient to be used by a later-stage circuit), therefore an above mentioned power-supply detection circuit may wrongly detect an abnormal state of power supplying by the main power device 51 based on the main power device 51's state of not operating, so as to cause a discharging circuit to operate to light up an LED module by mistake. In light of such issues, in some embodiments, on the basis of any of the embodiments in FIGS. 9A-9C a main power device 51 further includes a state detection circuit coupled to a driving circuit in the main power device 51 and configured to output a state detection signal based on a triggering operation, in order to cause the driving circuit to change an operating mode based on the state detection signal. It's noted that the main power device 51 may include additional circuit module(s) for other function(s), such as an installation detection module or a surge protection circuit described below, which possibility is not repeatedly mentioned below.

Figure 16W:
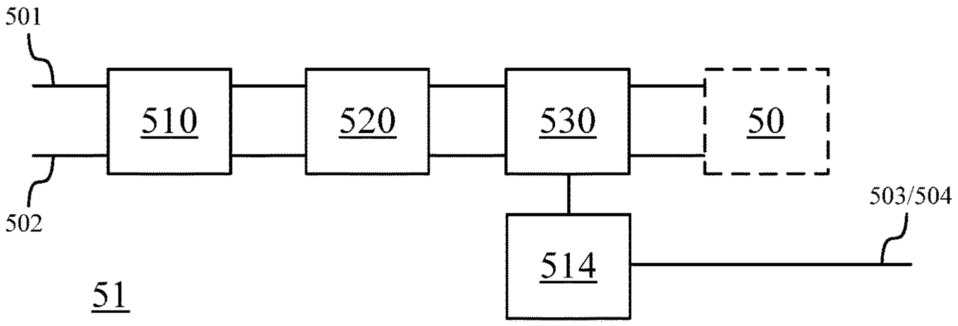
FIG. 16W is a circuit block diagram of a main power device according to some embodiments.

FIG. 16W is a circuit block diagram of a main power device according to some embodiments. Compared to the embodiments in FIGS. 9A-9C, a main power device 51 in the embodiments of FIG. 16W includes a rectifying circuit 510 (also referred to as a first rectifying circuit 510), a filtering circuit 520, and a driving circuit 530, and further includes a state detection circuit 514 (illustrated in FIG. 16W on the basis of that in FIG. 9C). The main power device 51 may include some components of an LED module 50, and the rectifying circuit 510 may adopt any of the circuit structures in FIGS. 11A to 11F. The state detection circuit 514 is coupled to a third pin 503 or a fourth pin 504, and coupled to the driving circuit 530, and configured to output a state detection signal based on a triggering operation, in order to cause the driving circuit 530 to change an operating mode based on the state detection signal. Specifically, taking a driving circuit 530 of FIG. 13A as an example, a state detection circuit 514 may be coupled to a controller 533 in the driving circuit 530, in order to output a state detection signal to the controller 533, which is configured to control an operating mode of a conversion circuit 534 based on the state detection signal. Or some or all modules/circuits/units/components of a state detection circuit 514 may be integrated in the driving circuit 530 (such as being integrated in the controller 533) as part of the driving circuit 530, which is then configured to change an operating mode based on a triggering operation.

Such a triggering operation includes a triggering operation of conducting or cutting off generated by a triggering switch. The triggering switch provides a physical structure for a user of the LED lamp to interact with a main power device 51. The triggering switch is configured to generate the triggering operation of conducting or cutting off based on triggering by the user, and comprises any of a mechanical switch, a touch switch, etc. For example, by rotating or pushing a mechanical switch a user causes the mechanical switch to generate a triggering operation of conducting or cutting off, or by lightly touching a touch switch a user causes the touch switch to generate a triggering operation of conducting or cutting off.

Figure 16X:
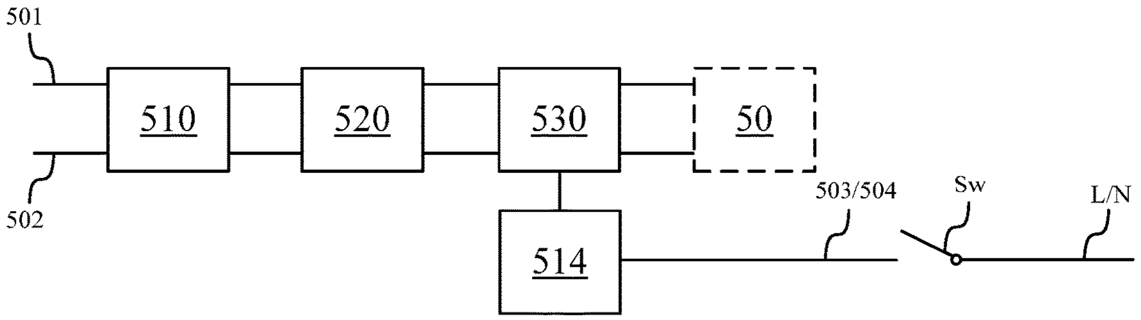
FIG. 16X is a diagram showing the position relationship between a triggering switch and a main power device according to some embodiments.

FIG. 16X is a diagram showing position relationship between a triggering switch and a main power device according to some embodiments. Referring to FIG. 16X, in these embodiments, a triggering switch Sw has one end for coupling to a third pin 503 or a fourth pin 504, in order to connect to a state detection circuit 514 through the third pin 503 or fourth pin 504, and has another end coupled to a Live wire (marked as "L") or a Neutral wire (marked as "N"). The state detection circuit 514 is configured to detect a triggering operation of the triggering switch Sw. It's noted that FIG. 16X illustrates merely an example of the triggering switch Sw; and in other embodiments a main power device includes a communications module and a triggering switch Sw includes corresponding units of communication ports, by which the triggering switch Sw is coupled to a state detection circuit 514 through wired connection or wireless communication (such as Bluetooth or WiFi).

As shown in FIGS. 16W and 16X, a state detection circuit 514 is configured to detect a triggering operation of a triggering switch, in order to output a state detection signal, so as to cause a driving circuit 530 to change an operating mode based on the state detection signal, wherein the changing of operating mode refers to the driving circuit 530 switching from one outputting state to another outputting state, such as a changing in the magnitude of an electrical signal outputted by the driving circuit 530, or a changing in the way of outputting an electrical signal (for example changing from outputting a constant current to outputting a constant voltage). In one embodiment, when a state detection circuit 514 detects a triggering operation as of conducting, the state detection signal outputted by the state detection circuit 514 is at a high level, then a driving circuit 530 is configured to operate under a first operating mode based on the state detection signal being at a high level, wherein the first operating mode corresponds to the case where an outputted electrical signal is a driving signal sufficient to drive an LED module to steadily emit light. On the other hand, when the state detection circuit 514 detects a triggering operation as of cutting off, the state detection signal outputted by the state detection circuit 514 is at a low level, then the driving circuit 530 is configured to operate under a second operating mode based on the state detection signal being at a low level, wherein the second operating mode corresponds to the case where an outputted electrical signal is insufficient to drive the LED module to emit light but sufficient to charge an auxiliary power source through a charging circuit. In other words, in this embodiment, when a user turns on an LED lamp through a triggering switch, an electrical signal outputted by a driving circuit 530 in a main power module in one aspect drives an LED module to continually emit light, and in another aspect charges an auxiliary power source. But when a user turns off the LED lamp through the triggering switch, an electrical signal outputted by the driving circuit 530 in the main power module still may be detected by a power-supply detection circuit 564 as shown in FIG. 16T, such as a power-supply detection circuit 564 illustrated as connected to a first driving output terminal 531, so that an auxiliary power module 560 still may be charged based on an electrical signal outputted by the driving circuit 530, in order to prevent activation of the auxiliary power module 560 by mistake to light up the LED lamp when a user is turning off the LED lamp through a triggering operation.

Figure 16Y:
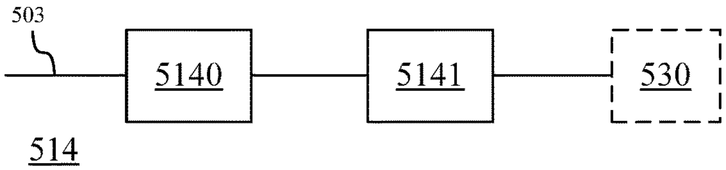
FIG. 16Y is a circuit block diagram of a state detection circuit according to some embodiments.

FIG. 16Y is a circuit block diagram of a state detection circuit according to some embodiments. Referring to FIG. 16Y, a state detection circuit 514 includes a rectifying circuit 5140 and a voltage division circuit 5141. The rectifying circuit 5140 is coupled to a third pin 503 and the voltage division circuit 5141, and is configured to rectify an external driving signal to output a rectified signal to the voltage division circuit 5141. The voltage division circuit 5141 is coupled to a driving circuit 530 and is configured to detect an electrical signal outputted by the rectifying circuit 5140 in order to output a state detection signal for the driving circuit 530.

It is noted that at least some module(s)/circuit(s)/element(s) of a state detection circuit 514 may be integrated as part of a driving circuit. For example, a voltage division circuit 5641 may be integrated in a controller 533 of a driving circuit 530 as in FIG. 13A. Or a rectifying circuit 5140 and a voltage division circuit 5141 are both integrated in a controller 533 of a driving circuit 530 as in FIG. 13A. The rectifying circuit 5140 comprises for example a diode (not illustrated), which has an anode coupled to a third pin 503 and a cathode coupled to the voltage division circuit 5141, for performing rectification to an external driving signal. A voltage division circuit 5141 comprises for example two resistors connected in series for voltage division (not illustrated), wherein a connection node between the two resistors is connected to a driving circuit 530. The voltage division circuit 5141 may further comprise a voltage stabilizing component (as a capacitor) connected in parallel with two ends of the two series-connected resistors for voltage regulation. Specific implementations for a state detection circuit 514 are not specifically limited by the disclosure, and any circuit is within the scope of the present invention as long as it can detect a triggering operation of a triggering switch.

In another example embodiment, the LED module 50 can only receive the auxiliary power supply provided by the auxiliary power supply module 560 as the working power supply, while the external drive signal is used to charge the auxiliary power supply module 560. In this embodiment, only the auxiliary power provided by the auxiliary power supply module 560 is used to light up the LED module 50, that is, whether the external drive signal is provided by the mains or the ballast, the energy storage unit of the auxiliary power supply module 560 is charged first, and then the energy storage unit provides power to the back end. Thus, the LED straight lamp with the power module architecture applied in this embodiment can be compatible with the external drive signal provided by the mains.

From a structural point of view, since the above auxiliary power supply module 560 is connected between the output of filter circuit 520 (first filter output 521 and second filter output 522) or the output of drive circuit 530 (first drive output 531 and second drive output 532), in a sample embodiment, The circuit can be placed in the lamp tube (for example, near the LED module 50) to avoid power transmission loss caused by excessive wiring. In another example embodiment, the circuit of the auxiliary power supply module 560 can also be placed in the lamp cap, so that the heat generated by the auxiliary power supply module 560 during charging and discharging is less likely to affect the operation and luminous efficiency of the LED module.

Figure 17A:
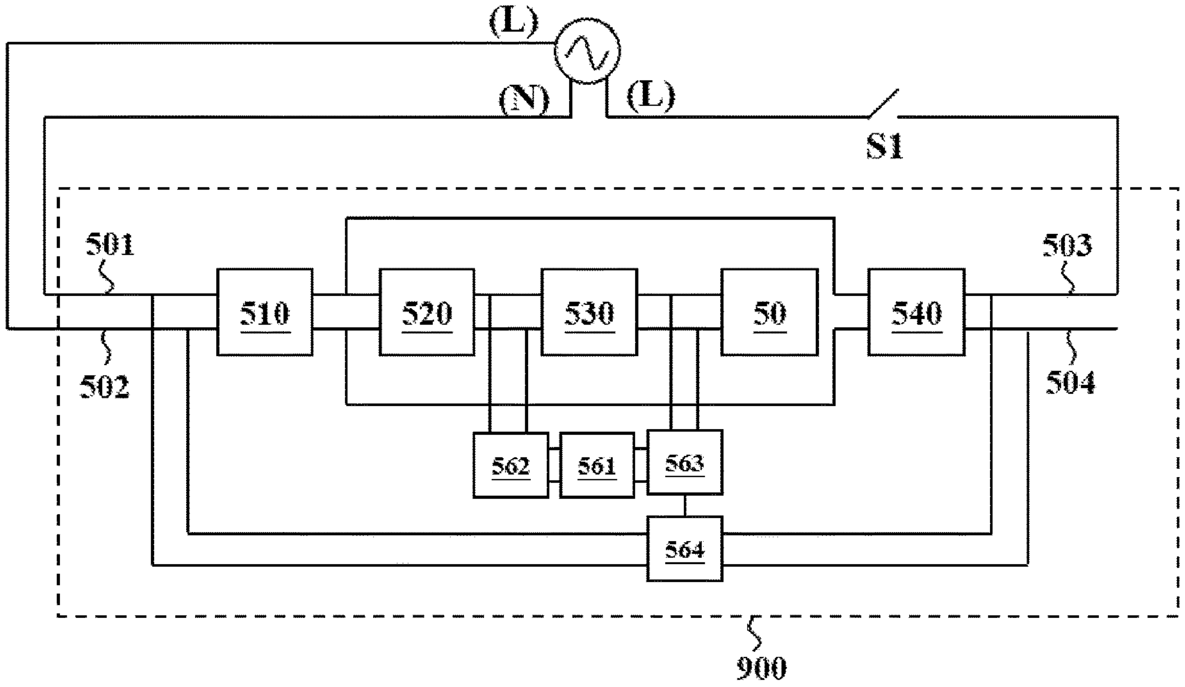
FIG. 17A is a circuit block diagram of an LED tube lamp according to some embodiments.

FIG. 17A is a circuit block diagram of an LED tube lamp according to some embodiments. Referring to FIG. 17A, an LED tube lamp 900 in these embodiments includes rectifying circuits 510 and 540, a filtering circuit 520, a driving circuit 530, an LED module 50, and an auxiliary power module 560. The auxiliary power module 560 includes an auxiliary power source 561, a charging circuit 562, a discharging circuit 563, and a power-supply detection circuit 564. The rectifying circuits 510 and 540 may each comprise a full-wave rectifying circuit 610 illustrated in FIG. 11A or a half-wave rectifying circuit 710 illustrated in FIG. 11B, wherein two input terminals of the rectifying circuit 510 are respectively electrically connected to a first pin 501 and a second pin 502, and two input terminals of the rectifying circuit 540 are respectively electrically connected to a third pin 503 and a fourth pin 504.

An auxiliary power module 560 in these embodiments is configured in a way similar to that in FIG. 16R, with a difference that in these embodiments input terminal(s) of a charging circuit 562 are electrically connected to first and second filtering output terminals, in order to receive a filtered signal and to charge the auxiliary power source 561. The auxiliary power source 561 is electrically connected to the discharging circuit 563. The discharging circuit 563 is electrically connected to the power-supply detection circuit 564 and the LED module 50. And the driving circuit 530 is electrically connected to the power-supply detection circuit 564 (which connection is not explicitly illustrated in FIG. 17A) in order to receive a power-supply detection signal generated by the power-supply detection circuit 564.

A power-supply detection circuit 564 is electrically connected to the first pin 501, second pin 502, third pin 503, and fourth pin 504, in order to judge a circuit state of the LED tube lamp 900 according to voltage levels at the four pins, and then to determine circuit operations of the discharging circuit 563 and the driving circuit 530 according to the circuit state.

Next, circuit states in the LED tube lamp 900 are further described. The first pin 501 of the LED tube lamp 900 is electrically connected to a Neutral (N) wire of a power-main's signal, the second pin 502 is electrically connected to a Live (L) wire of the power-main's signal, the third pin 503 is electrically connected to the Live (L) wire of the power-main's signal through a switch, and the fourth pin 504 is floating.

When an external driving signal is input normally, which is a power main's signal in these embodiments, and the external switch S1 is closed, a power main's signal may be detected at each of the first pin 501, second pin 502, and third pin 503 of the LED tube lamp 900, so the power-supply detection circuit 564 of the LED tube lamp 900 judges that the external driving signal is input normally and then performs an operation of turning on the lamp by outputting a first power-supply detection signal, based on which the discharging circuit 563 does not operate and the driving circuit 530 operates normally. When an external driving signal is input normally, and the external switch S1 is in a cutoff state, a power main's signal may be detected at each of the first pin 501 and second pin 502 of the LED tube lamp 900, but not at the third pin 503, so the power-supply detection circuit 564 of the LED tube lamp 900 judges that the external driving signal is input normally and then performs an operation of turning off the lamp by outputting a second power-supply detection signal, based on which the discharging circuit 563 does not operate and the driving circuit 530 does not operate, resulting in the LED tube lamp 900 not lighting up, When inputting of an external driving signal is abnormal, and the external switch S1 is closed or in a cutoff state, a power main's signal may not be detected at each of the first pin 501, second pin 502, and third pin 503 of the LED tube lamp 900, so the power-supply detection circuit 564 of the LED tube lamp 900 judges that inputting of the external driving signal is abnormal and then outputs a third power-supply detection signal, based on which the discharging circuit 563 operates and the driving circuit 530 does not operate.

Accordingly, by adopting the described disposition and connection of the four pins of the LED tube lamp 900, it can be realized to correctly judge a state of the LED tube lamp 900 and then to perform a corresponding operation such as turning on the lamp, turning off the lamp, or activating an emergency lighting module, and it can also be realized to have no need to consider polarity issues when installing the LED tube lamp 900. And the opposite way of disposition and connection of the four pins of the LED tube lamp 900 can also achieve the logic of judging and technical effects as in these embodiments, wherein the opposite way refers to electrically connecting the third pin 503 and the fourth pin 504 of the LED tube lamp 900 respectively to the L wire and the N wire of a power main's signal, electrically connecting the first pin 501 through an external switch to the L wire of a power main's signal, and letting the second pin 502 be floating.

Further, the described technical effects in these embodiments may be achieved with as few as 3 pins of the 4 pins of the LED tube lamp 900 being connected to a power main's signal. It's noted that at least one of the three pins connected to a power main's signal must be connected to a Neutral wire of the power main's signal, the external switch may not be disposed on the wiring of this pin, and at least one of the three pins must be connected to a Live wire of the power main's signal.

In other embodiments, when a first pin 501 of the LED tube lamp 900 is electrically connected to a Neutral (N) wire of a power-main's signal, a second pin 502 is electrically connected to a Live (L) wire of the power-main's signal, a third pin 503 is electrically connected to the N wire of the power-main's signal through a switch, and a fourth pin 504 is floating, the described desired effects in the embodiments of FIG. 17A may be similarly achieved, so a description of these other embodiments is not repeated here.

In some embodiments, since the 4 pins of an LED tube lamp 900 are equivalent in circuit structure, so connecting as few as 3 pins of the 4 pins to a power main's signal may achieve the described desired effects in these embodiments. It's noted that one of the 3 pins is electrically connected to a Neutral (N) wire of a power-main's signal, a second one of the 3 pins is electrically connected to a Live (L) wire of the power-main's signal, and a third one of the 3 pins is electrically connected to the N wire or L wire of the power-main's signal through a switch. When the power main's signal is input normally, the switch is configured to give a signal for turning on the lamp or turning off the lamp. When inputting of the power main's signal is abnormal or out of order, the LED tube lamp enters into an emergency mode.

Figure 17B:
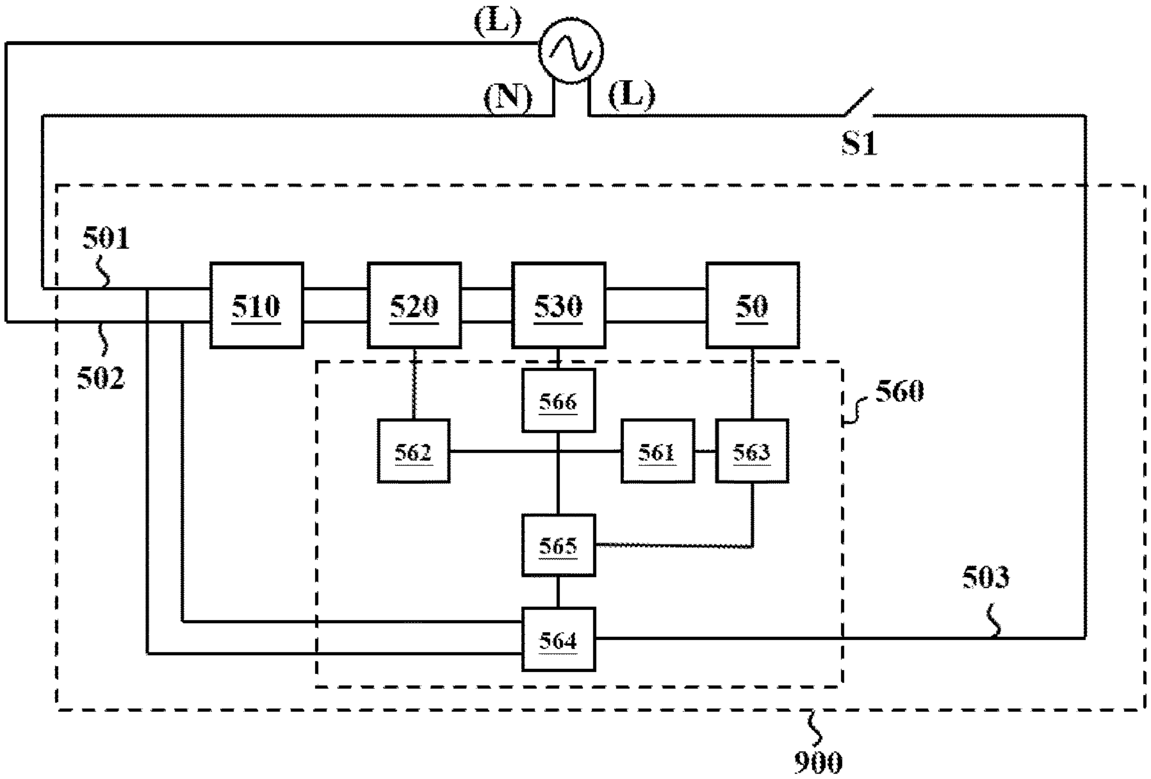
FIG. 17B is a circuit block diagram of an LED lamp according to some embodiments.

FIG. 17B is a circuit block diagram of an LED lamp according to some embodiments. The circuit structure of an LED lamp 900 in these embodiments of FIG. 17B is similar to that of an LED lamp in the embodiments of FIG. 17A, with a difference that an LED lamp 900 in these embodiments of FIG. 17B is not limited to being an LED tube lamp, but may comprise any of other types of LED lamp, such as an LED bulb or an LED ceiling lamp. In these embodiments, an LED lamp 900 includes at least 3 pins 501, 502, and 503, wherein the first pin 501 is electrically connected to a Neutral (N) wire of a power-main's signal, the second pin 502 is electrically connected to a Live (L) wire of the power-main's signal, and the third pin 503 is electrically connected to the L wire of the power-main's signal through a switch S1. Referring to FIG. 17B, the LED lamp 900 includes a rectifying circuit 510, a filtering circuit 520, a driving circuit 530, an LED module 50, and an auxiliary power module 560. The auxiliary power module 560 includes an auxiliary power source 561, a charging circuit 562, a discharging circuit 563, a power-supply detection circuit 564, a central processing unit 565, and a driving control circuit 566. The rectifying circuit 510 is configured to be electrically connected to an external power source through the first pin 501 and second pin 502, in order to receive and rectify an external power signal, converting an AC signal into a DC signal. The filtering circuit 520 is electrically connected to the rectifying circuit 510, and is configured to receive and filter a rectified signal, in order to produce a filtered signal. The driving circuit 530 is electrically connected to the filtering circuit 520, and is configured to receive and perform power conversion to a filtered signal, in order to produce a driving signal. The LED module 50 is electrically connected to the driving circuit 530 in order to receive the driving signal and thus be lighted up. The auxiliary power module 560 is configured to receive the external power signal and to store some electrical energy, in order to provide a power signal for the LED lamp 900 when power supplying by the external power is stopped.

In an auxiliary power module 560, an auxiliary power source 561 is electrically connected to a charging circuit 562, in order to store electric energy. The charging circuit 562 is electrically connected to a filtering circuit and is configured to charge the auxiliary power source 561. A discharging circuit 563 is electrically connected to the auxiliary power source 561, in order to use the electric energy stored by the auxiliary power source 561 to light up an LED module 50. A power-supply detection circuit 564 is electrically connected to three pins 501, 502, and 503, in order to judge a state of power supplying by an external power signal and a state of a switch S1 and to generate a power-supply detection signal. A central processing unit 565 is electrically connected to the power-supply detection circuit 564 and is configured to receive the power-supply detection signal and perform logic operation(s) according to the power-supply detection signal, so as to control operating states of the driving circuit 530 and the discharging circuit 563. For more effectively controlling an operating state of the driving circuit 530, a driving control circuit 566 is disposed between the central processing unit 565 and the driving circuit 530. The driving control circuit 566 is electrically connected to the central processing unit 565 and the driving circuit 530.

Next, control logic of the central processing unit 565 is described. When providing or power supplying of the external power signal is normal and the switch S1 is in a cutoff state, the central processing unit 565 performs an operation of turning off the lamp according to a power-supply detection signal, meaning to control the driving circuit 530 and the discharging circuit 563 respectively into not operating.

When providing or power supplying of the external power signal is normal and the switch S1 is in a closed state, the central processing unit 565 performs an operation of turning on the lamp according to a power-supply detection signal, meaning to control the driving circuit 530 into operating and the discharging circuit 563 into not operating. When providing or power supplying of the external power signal is stopped or not present, the central processing unit 565 performs emergency lighting according to a power-supply detection signal, meaning to control the driving circuit 530 into not operating and the discharging circuit 563 into operating, wherein the auxiliary power module 560 provides electric power for the LED module 50.

Figure 17C:
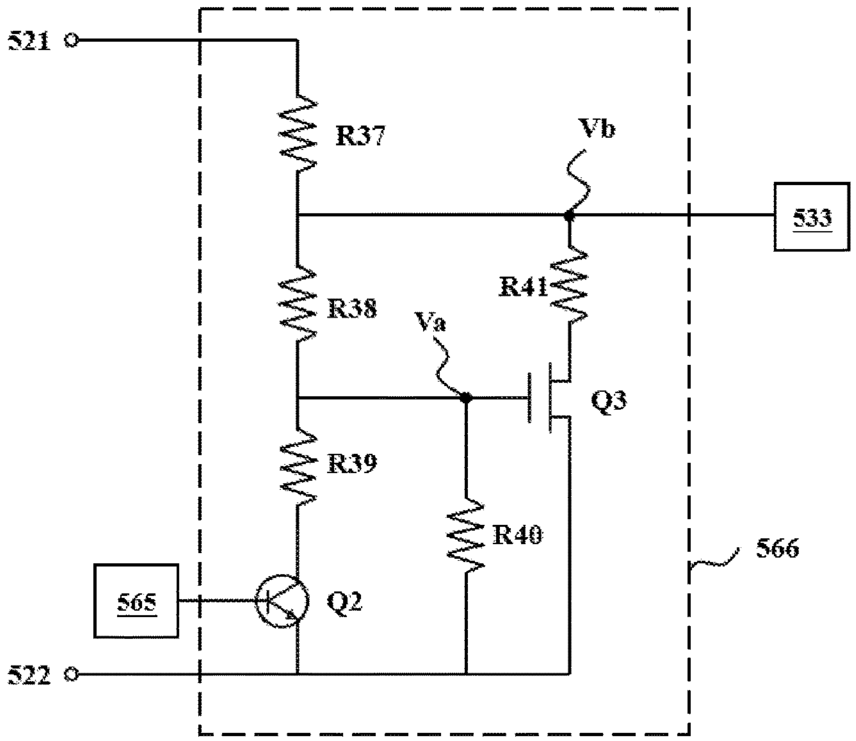
FIG. 17C is a circuit structure diagram of a driving control circuit according to some embodiments.

FIG. 17C is a circuit structure diagram of a driving control circuit according to some embodiments. Referring to FIG. 17C, a driving control circuit 566 includes resistors R37, R38, R39, R40, and R41, a bipolar junction transistor Q2, and a transistor Q3. The resistor R37 has a first end electrically connected to a first filtering output terminal 521, and a second end electrically connected to a first end of the resistor R38, a first end of the resistor R41, and a power input terminal of a controller 533 of a driving circuit 530. The resistor R38 has a second end electrically connected to a first end of the resistor R39, a first terminal of the transistor Q3, and a first end of the resistor R40. The resistor R41 has a second end electrically connected to a second terminal of the transistor Q3. The bipolar junction transistor Q2 has a first terminal electrically connected to a central processing unit 565, a second terminal electrically connected to a second end of the resistor R39, and a third terminal electrically connected to a second end of the resistor R40, a third terminal of the transistor Q3, and a second filtering output terminal 522. In these embodiments, the first filtering output terminal 521 and second filtering output terminal 522 are two output terminals of a filtering circuit 520 for outputting a filtered signal.

Next, operation principles of a driving control circuit 566 are described. A controller 533 of a driving circuit 530 is configured to control the driving circuit 530 for performing power conversion; is configured to operate normally when a voltage at the controller 533's power-supply terminal is larger than a nominal voltage; and is configured to not operate when a voltage at the controller 533's power-supply terminal is smaller than the nominal voltage, the non-operating controller 533 causing the driving circuit 530 not to operate and output a driving signal. The driving control circuit 566 is configured to control an operating state of the controller 533 by controlling the voltage level at the controller 533's power-supply terminal, thereby controlling an operating state of the driving circuit 530.

When an output terminal of the central processing unit 565 connected to the bipolar junction transistor Q2 outputs a low voltage level, the bipolar junction transistor Q2 is cut off and a filtered signal first flows through a path composed of the resistors R37, R38, and R40. From voltage division principle, the flowing of the filtered signal results in a division voltage at the first terminal of the transistor Q3, which causes the transistor Q3 to conduct. When the transistor Q3 is conducting, the filtered signal then flows through a second path composed of the resistors R37 and R41, and transistor Q3. By adjusting resistance values of resistors in the voltage divider, voltages at respective nodes on the voltage divider may be changed such that upon the transistor Q3 conducting a voltage Vb at the first end of the resistor R41 is smaller than a nominal voltage of the controller 533. Also from voltage division principle, in this case a voltage Va at the first end of the resistor R40 is smaller than the voltage Vb. By setting resistance values in the circuit's resistor parameters, the voltage Vb may be larger than a conduction voltage of the transistor Q3, maintaining a conducting state of the transistor Q3. Since in this case the voltage Vb is smaller than the nominal voltage of the controller 533, the driving circuit 530 does not operate.

When the output terminal of the central processing unit 565 connected to the bipolar junction transistor Q2 outputs a high voltage level, the bipolar junction transistor Q2 conducts, and through a defined setting of resistor parameters in the circuit structure a voltage Va (at the first end of the resistor R40) is smaller than the conduction voltage of the transistor Q3, which causes the transistor Q3 to be cut off, wherein the voltage Va is larger than or equal to the nominal voltage of the controller 533, causing the controller 533 and the driving circuit 530 respectively to operate normally.

Accordingly, when the central processing unit 565 outputs a low voltage level, the driving circuit 530 does not operate. When the central processing unit 565 outputs a high voltage level, the driving circuit 530 operates. Through the described technical solution in these embodiments, a central processing unit 565 may enter into a hibernate mode after the LED lamp is turned off, during which mode the central processing unit 565 continually outputs a low voltage level with maximally improved efficiency in saving energy.

Accordingly, because a driving control circuit 566 enables/activates a driving circuit 530 to operate, by using a high voltage level, even if a central processing unit 565 does not output a control signal for the driving control circuit 566, upon receiving electrical power the driving circuit 530 enters into a state of not operating by default; and when the driving control circuit 566 receives a high voltage level enable signal from the central processing unit 565, the driving control circuit 566 activates/enables the driving circuit 530 to operate normally.

If a driving control circuit 566 enables/activates a driving circuit 530 to operate, by using a low voltage level, upon the LED lamp receiving electrical power, the driving circuit 530 may enter into an operating state, prior to a central processing unit 565, in order to light up an LED module; and if the central processing unit 565 later transmits a disable signal to the driving control circuit 566 to disable the driving circuit 530, lighting by the LED module is turned off, with possible problem of flickering upon turning off the lamp.

Through the technical solution(s) in the embodiments of FIG. 17C, it may be avoided that light flickering happens on the LED lamp when it's coupled to and receives a power supply.

Figure 17D:
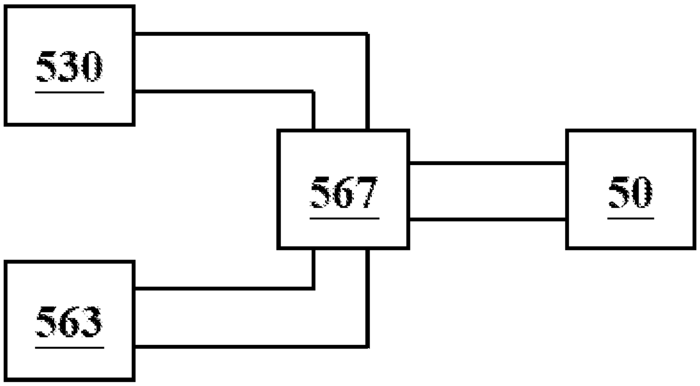
FIG. 17D is a circuit block diagram of a partial circuit structure of an LED lamp according to some embodiments.

FIG. 17D is a circuit block diagram of a partial circuit structure of an LED lamp according to some embodiments. The technical solution(s) in these embodiments of FIG. 17D are now described with reference to FIG. 17B. The circuit structure in these embodiments of FIG. 17D is similar to that in the embodiments of FIG. 17B, with difference that an auxiliary power module 560 in the embodiments of FIG. 17D further includes a power switching circuit 567. The power switching circuit 567 is electrically connected to a driving circuit 530, a discharging circuit 563, and an LED module 50. The power switching circuit 567 is configured to switch its operating state according to a state of an external power signal, in order to choose the driving circuit 530 or the discharging circuit 563 as for providing power for the LED module 50.

When providing or power supplying of an external power signal is normal, the power switching circuit 567 chooses the driving circuit 530 as for providing power for the LED module 50. When providing or power supplying of an external power signal is abnormal, the power switching circuit 567 chooses the discharging circuit 563 as for providing power for the LED module 50. Meanwhile, the power switching circuit 567 isolates an output terminal of the driving circuit 530 from that of the discharging circuit 563, and at a time only the output terminal of the driving circuit 530 or the discharging circuit 563 is electrically connected to the LED module 50.

A central processing unit 565 is coupled to the power switching circuit 567; and is configured to control the power switching circuit 567 to perform switching, according to a state of an external power signal, in order to choose the driving circuit 530 or the discharging circuit 563 as for providing power for the LED module 50.

Through the described configuration, the output terminal of the driving circuit 530 is isolated from that of the discharging circuit 563 in order to prevent signals respectively of the driving circuit 530 and the discharging circuit 563 from interfering with each other to cause an abnormal state of the LED lamp's system.

Figure 17E:
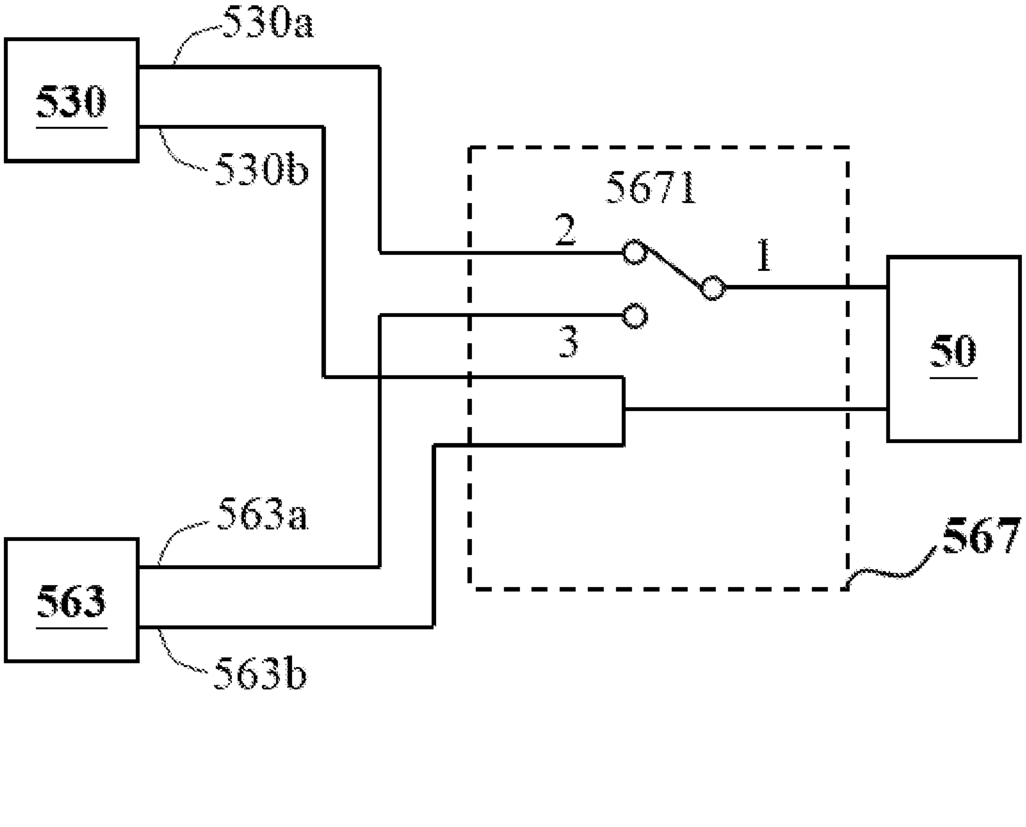
FIG. 17E is a circuit structure diagram of a power switching circuit according to some embodiments.

FIG. 17E is a circuit structure diagram of a power switching circuit according to some embodiments. Referring to FIG. 17E, in these embodiments, a power switching circuit 567 includes a switch 5671, which is a single-pole selection switch including a first contact, a second contact, and a third contact. The first contact is a common contact for electrically connecting to the second contact or the third contact. In these embodiments, a driving circuit 530 has a first driving output terminal 530*a* electrically connected to the second contact of the switch 5671. A discharging circuit 563 has a first output terminal 563*a* electrically connected to the third contact of the switch 5671. The driving circuit 530 has a second driving output terminal 530*b* electrically connected to a second output terminal 563*b* of the discharging circuit 563 and an LED module 50, which LED module 50 is electrically connected to the first contact of the switch 5671. The switch 5671 is controlled by a central processing unit 565.

When providing or power supplying of an external power signal is normal, the switch 5671 conducts a path between the first contact and the second contact, during which conduction the driving circuit 530 is electrically connected to the LED module 50 and configured to provide power for the LED module 50. When providing or power supplying of an external power signal is abnormal, the switch 5671 conducts a path between the first contact and the third contact, during which conduction the discharging circuit 563 is electrically connected to the LED module 50 and configured to provide power for the LED module 50. The central processing unit 565 is configured to control the switch 5671 according to a state of an external power signal.

Through such a configuration, isolation between outputs respectively of the driving circuit 530 and the discharging circuit 563 may be realized, in order to prevent signals respectively of the driving circuit 530 and the discharging circuit 563 from interfering with each other to cause an abnormal state of the LED lamp's system.

In some embodiments, the switch 5671 is a relay.

Next, circuit operations of a power switching circuit 567 in the embodiments of FIG. 17E are described with reference to FIG. 17B. When providing or power supplying of an external power signal is normal and the switch S1 is closed, the central processing unit 565 performs an operation of turning on the lamp according to a power-supply detection signal, causing the switch 5671 to conduct a path between the first contact and the second contact, controlling the driving circuit 530 into operating, and controlling the discharging circuit 563 into not operating. When providing or power supplying of the external power signal is normal and the switch S1 is in a cutoff state, the central processing unit 565 performs an operation of turning off the lamp according to a power-supply detection signal, causing the switch 5671 to conduct a path between the first contact and the second contact, controlling the driving circuit 530 into not operating, and controlling the discharging circuit 563 into not operating. When providing or power supplying of an external power signal is abnormal or stopped, the central processing unit 565 performs emergency lighting according to a power-supply detection signal, first controlling the driving circuit 530 into not operating, then controlling the switch 5671 into conducting a path between the first contact and the third contact, and controlling the discharging circuit 563 into operating, wherein the auxiliary power module 560 provides electric power for the LED module 50. When providing or power supplying of an external power signal becomes normal again from an abnormal state, and the switch S1 is closed, the central processing unit 565 controls the discharging circuit 563 into not operating according to a power-supply detection signal, controlling the switch 5671 into conducting a path between the first contact and the second contact, and controlling the driving circuit 530 into operating. And when providing or power supplying of an external power signal becomes normal again from an abnormal state, and the switch S1 is in a cutoff state, the central processing unit 565 controls the discharging circuit 563 into not operating according to a power-supply detection signal, controlling the switch 5671 into conducting a path between the first contact and the second contact, and controlling the driving circuit 530 into not operating.

Figure 17F:
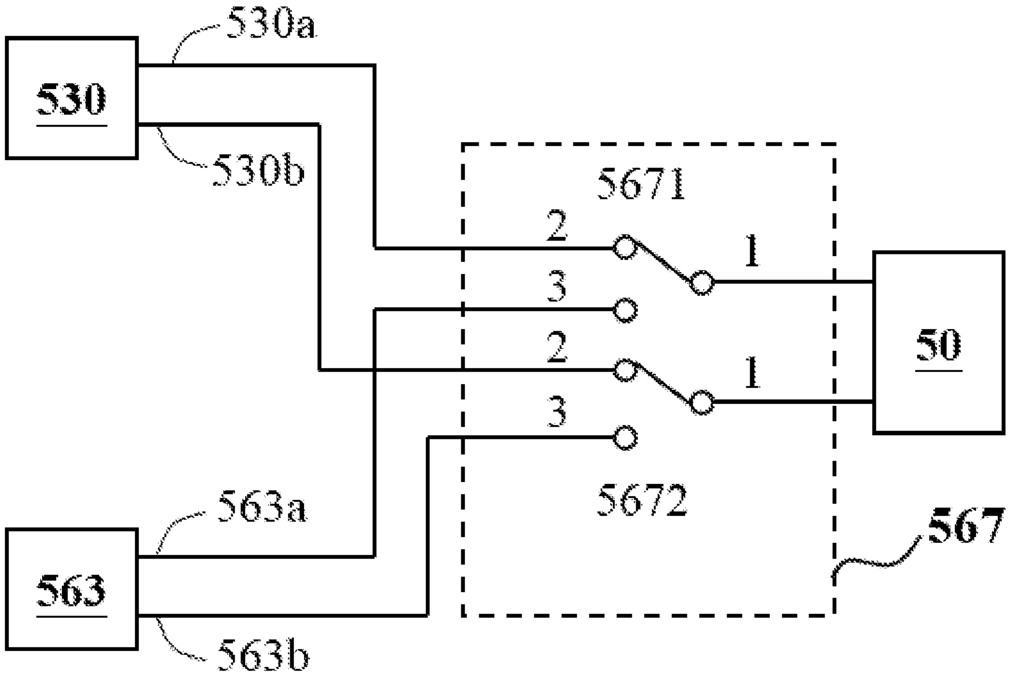
FIG. 17F is a circuit structure diagram of a power switching circuit according to some embodiments.

FIG. 17F is a circuit structure diagram of a power switching circuit according to some embodiments. A power switching circuit 567 in the embodiments of FIG. 17F is similar to that in the embodiments of FIG. 17E, with difference that a power switching circuit 567 in the embodiments of FIG. 17F further includes a switch 5672, which is a single-pole selection switch including a first contact, a second contact, and a third contact. The first contact is a common contact for electrically connecting to the second contact or the third contact. In these embodiments, a driving circuit 530 has a second driving output terminal 530*b* electrically connected to the second contact of the switch 5672. A discharging circuit 563 has a second output terminal 563*b* electrically connected to the third contact of the switch 5672. The first contact of the switch 5672 is electrically connected to an LED module 50. And the switch 5672 is controlled by a central processing unit 565.

When providing or power supplying of an external power signal is normal, the switch 5671 conducts a path between its first contact and second contact, and the switch 5672 conducts a path between its first contact and second contact, during which case the driving circuit 530 is electrically connected to the LED module 50 and configured to provide power for the LED module 50. When providing or power supplying of an external power signal is abnormal, the switch 5671 conducts a path between its first contact and third contact, and the switch 5672 conducts a path between its first contact and third contact, during which case the discharging circuit 563 is electrically connected to the LED module 50 and configured to provide power for the LED module 50. The central processing unit 565 is configured to control the switch 5671 and the switch 5672 according to a state of an external power signal.

Through such a configuration, isolation between outputs respectively of the driving circuit 530 and the discharging circuit 563 may be realized, in order to prevent signals respectively of the driving circuit 530 and the discharging circuit 563 from interfering with each other to cause an abnormal state of the LED lamp's system.

In some embodiments, the switch 5671 and the switch 5672 each comprise a relay.

In some embodiments, the switch 5671 and the switch 5672 may be replaced with a double-pole relay, but the present invention is not limited to this replacing example.

Next, circuit operations of a power switching circuit 567 in the embodiments of FIG. 17F are described with reference to FIG. 17B. When providing or power supplying of an external power signal is normal and the switch S1 is closed, the central processing unit 565 performs an operation of turning on the lamp according to a power-supply detection signal, causing the switch 5671 to conduct a path between its first contact and second contact and causing the switch 5672 to conduct a path between its first contact and second contact, controlling the driving circuit 530 into operating, and controlling the discharging circuit 563 into not operating. When providing or power supplying of an external power signal is normal and the switch S1 is in a cutoff state, the central processing unit 565 performs an operation of turning off the lamp according to a power-supply detection signal, causing the switch 5671 to conduct a path between its first contact and second contact and causing the switch 5672 to conduct a path between its first contact and second contact, controlling the driving circuit 530 into not operating, and controlling the discharging circuit 563 into not operating. When providing or power supplying of an external power signal is abnormal or stopped, the central processing unit 565 performs emergency lighting according to a power-supply detection signal, first controlling the driving circuit 530 into not operating, then controlling the switch 5671 into conducting a path between its first contact and third contact and controlling the switch 5672 into conducting a path between its first contact and third contact, and controlling the discharging circuit 563 into operating, wherein the auxiliary power module 560 provides electric power for the LED module 50. When providing or power supplying of an external power signal becomes normal again from an abnormal state, and the switch S1 is closed, the central processing unit 565 controls the discharging circuit 563 into not operating according to a power-supply detection signal, controlling the switch 5671 into conducting a path between its first contact and second contact and controlling the switch 5672 into conducting a path between its first contact and second contact, and controlling the driving circuit 530 into operating. And when providing or power supplying of an external power signal becomes normal again from an abnormal state, and the switch S1 is in a cutoff state, the central processing unit 565 controls the discharging circuit 563 into not operating according to a power-supply detection signal, controlling the switch 5671 into conducting a path between its first contact and second contact and controlling the switch 5672 into conducting a path between its first contact and second contact, and controlling the driving circuit 530 into not operating.

Figure 17G:
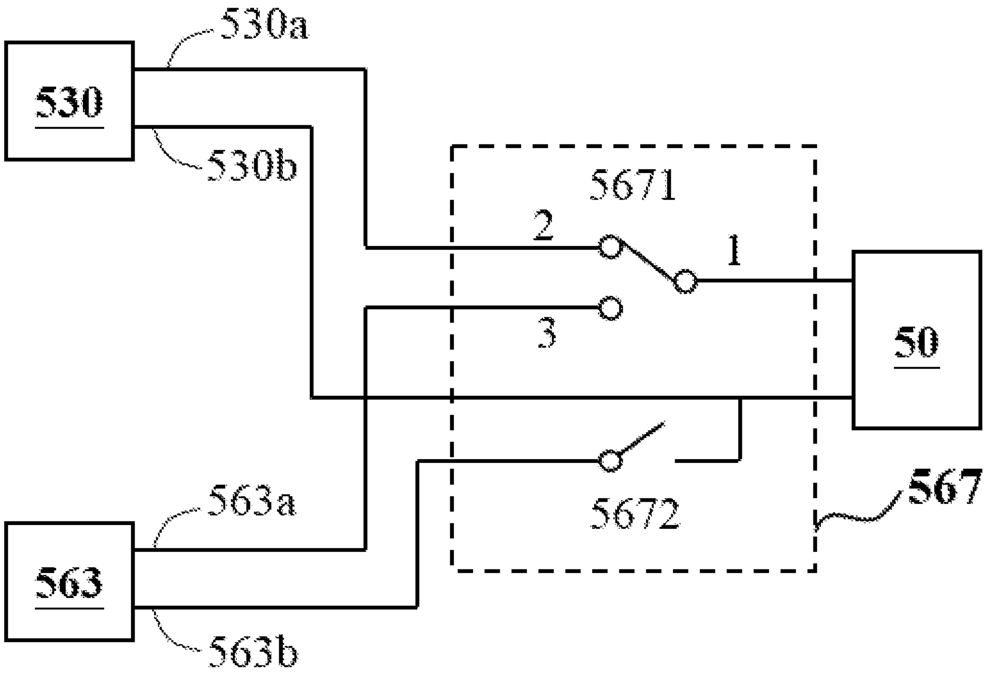
FIG. 17G is a circuit structure diagram of a power switching circuit according to some embodiments.

FIG. 17G is a circuit structure diagram of a power switching circuit according to some embodiments. A power switching circuit 567 in the embodiments of FIG. 17G is similar to that in the embodiments of FIG. 17E, with difference that a power switching circuit 567 in the embodiments of FIG. 17G further includes a switch 5672. In these embodiments, a driving circuit 530 has a second driving output terminal 530*b* electrically connected to an LED module 50. A discharging circuit 563 has a second output terminal 563*b* electrically connected to the second driving output terminal 530*b* of the driving circuit 530 through the switch 5672.

When providing or power supplying of an external power signal is normal, the switch 5671 conducts a path between its first contact and second contact and the switch 5672 is in a cutoff state, then the driving circuit 530 is electrically connected to the LED module 50 and configured to provide power for the LED module 50. When providing or power supplying of an external power signal is abnormal, the switch 5671 conducts a path between its first contact and third contact and the switch 5672 is closed, then the discharging circuit 563 is electrically connected to the LED module 50 and configured to provide power for the LED module 50. When the LED lamp switches from an emergency state to a normal operating state, meaning power supplying by the discharging circuit 563 for the LED module 50 is changed to power supplying by the driving circuit 530, the switch 5672 is in a cutoff state and the switch 5671 conducts a path between its first contact and second contact. It is specially noted that the switch 5672 acts before the switch 5671 acts, in order to prevent signals respectively of the driving circuit 530 and the discharging circuit 563 from affecting each other. And a central processing unit 565 is configured to control the switch 5671 and the switch 5672 according to a state of an external power signal.

Next, circuit operations of a power switching circuit 567 in the embodiments of FIG. 17G are described with reference to FIG. 17B. When providing or power supplying of an external power signal is normal and the switch S1 is closed, the central processing unit 565 performs an operation of turning on the lamp according to a power-supply detection signal, controlling the switch 5671 into conducting a path between its first contact and second contact and controlling the switch 5672 into a cutoff state, controlling the driving circuit 530 into operating, and controlling the discharging circuit 563 into not operating. When providing or power supplying of the external power signal is normal and the switch S1 is in a cutoff state, the central processing unit 565 performs an operation of turning off the lamp according to a power-supply detection signal, controlling the switch 5671 into conducting a path between its first contact and second contact and controlling the switch 5672 into a cutoff state, controlling the driving circuit 530 into not operating, and controlling the discharging circuit 563 into not operating. When providing or power supplying of an external power signal is abnormal or stopped, the central processing unit 565 performs emergency lighting according to a power-supply detection signal, first controlling the driving circuit 530 into not operating, then controlling the switch 5671 into conducting a path between its first contact and third contact and controlling the switch 5672 into a closed state to conduct, and controlling the discharging circuit 563 into operating, wherein the auxiliary power module 560 provides electric power for the LED module 50. When providing or power supplying of an external power signal becomes normal again from an abnormal state, and the switch S1 is closed, the central processing unit 565 controls the discharging circuit 563 into not operating according to a power-supply detection signal, controlling the switch 5671 into conducting a path between its first contact and second contact and controlling the switch 5672 into a cutoff state, and controlling the driving circuit 530 into operating. And when providing or power supplying of an external power signal becomes normal again from an abnormal state, and the switch S1 is in a cutoff state, the central processing unit 565 controls the discharging circuit 563 into not operating according to a power-supply detection signal, controlling the switch 5671 into conducting a path between its first contact and second contact and controlling the switch 5672 into a cutoff state, and controlling the driving circuit 530 into not operating.

Figure 17H:
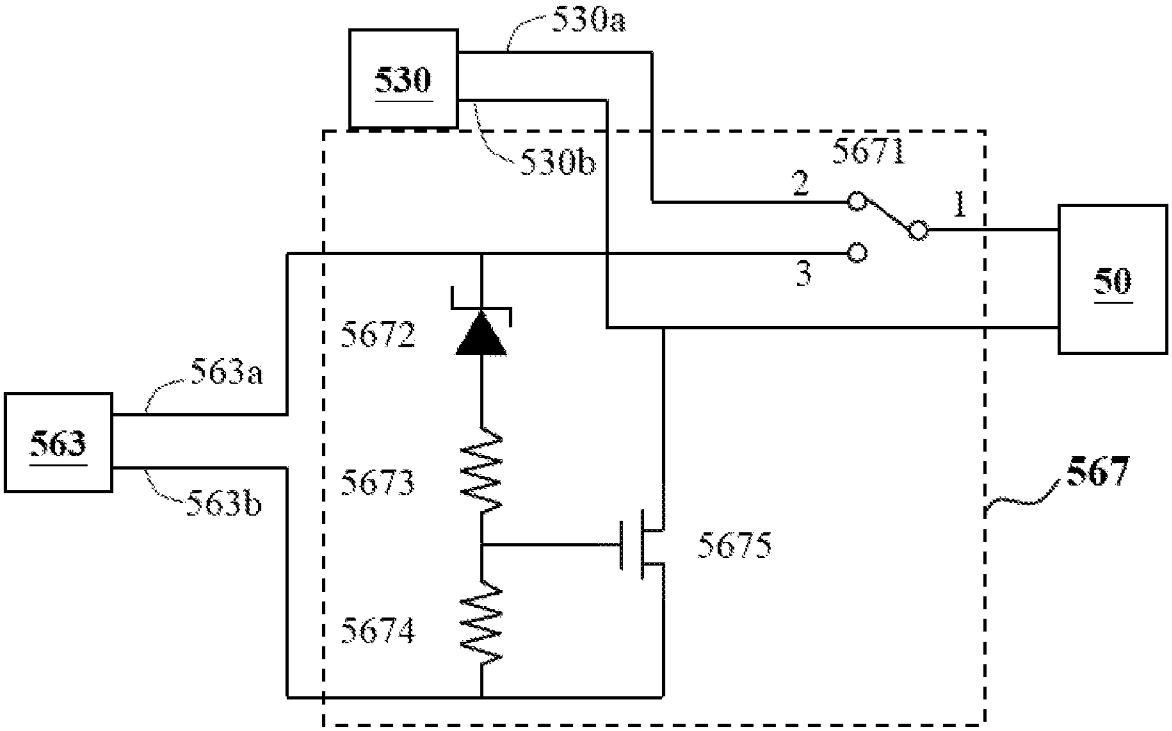
FIG. 17H is a circuit structure diagram of a power switching circuit according to some embodiments.

FIG. 17H is a circuit structure diagram of a power switching circuit according to some embodiments. A power switching circuit 567 in the embodiments of FIG. 17H is similar to that in the embodiments of FIG. 17G, with difference that in the embodiments of FIG. 17H a field effect transistor 5675 replaces the switch 5672 in the embodiments of FIG. 17G. The power switching circuit 567 in FIG. 17H includes a switch 5671, a voltage-stabilizing diode 5672, resistors 5673 and 5674, and a field effect transistor 5675. The voltage-stabilizing diode 5672 has a cathode electrically connected to a first output terminal 563*a* of a discharging circuit 563, and an anode electrically connected to a first end of the resistor 5673. The resistor 5674 has a first end electrically connected to a second end of the resistor 5673 and a first terminal of the field effect transistor 5675 (hereinafter referred to as MOS transistor), and has a second end electrically connected to a third terminal of the MOS transistor 5675 and a second output terminal 563*b* of the discharging circuit 563. The MOS transistor 5675 has a second terminal electrically connected to a second driving output terminal 530*b* of a driving circuit 530. The switch 5671 can choose to conduct a path between its first contact and second contact, or to conduct a path between its first contact and third contact. When the MOS transistor 5675 is enabled or turned on, it conducts a path between its second terminal and third terminal.

Next, principle(s) of the MOS transistor 5675's operations is described. When the discharging circuit 563 is operating, a voltage is output between its first output terminal 563*a* and second output terminal 563*b*, which voltage after voltage division by the voltage-stabilizing diode 5672 and resistors 5673 and 5674 may produce a division voltage at the first terminal of the MOS transistor 5675 to enable or turn on the MOS transistor 5675, causing a conduction between the second terminal and third terminal of the MOS transistor 5675. When the discharging circuit 563 is not operating, no voltage is output between its first output terminal 563*a* and second output terminal 563*b*, causing the MOS transistor 5675 to be in a disabled or turned-off state, meaning a path between the second terminal and third terminal of the MOS transistor 5675 is in a cutoff state. That is, when the discharging circuit 563 is operating, the MOS transistor 5675 is enabled or turned on; and when the discharging circuit 563 is not operating, the MOS transistor 5675 is disabled or in a cutoff state.

Next, circuit operations of a power switching circuit 567 in the embodiments of FIG. 17H are described with reference to FIG. 17B. When providing or power supplying of an external power signal is normal and the switch S1 is closed, a central processing unit 565 performs an operation of turning on the lamp according to a power-supply detection signal, controlling the switch 5671 into conducting a path between its first contact and second contact, controlling the driving circuit 530 into operating, and controlling the discharging circuit 563 into not operating, in which case the MOS transistor 5675 is in a disabled or turned-off state and thus a path between its second terminal and third terminal is in a cutoff state. When providing or power supplying of the external power signal is normal and the switch S1 is in a cutoff state, the central processing unit 565 performs an operation of turning off the lamp according to a power-supply detection signal, controlling the switch 5671 into conducting a path between its first contact and second contact, controlling the driving circuit 530 into not operating, and controlling the discharging circuit 563 into not operating, in which case the MOS transistor 5675 is in a disabled or turned-off state and thus a path between its second terminal and third terminal is in a cutoff state. When providing or power supplying of an external power signal is abnormal or stopped, the central processing unit 565 performs emergency lighting according to a power-supply detection signal, first controlling the driving circuit 530 into not operating, then controlling the switch 5671 into conducting a path between its first contact and third contact, and controlling the discharging circuit 563 into operating, in which case the MOS transistor 5675 is enabled or in a turned-on state conducting a path between its second terminal and third terminal, and the auxiliary power module 560 provides electric power for the LED module 50. When providing or power supplying of an external power signal becomes normal again from an abnormal state, and the switch S1 is closed, the central processing unit 565 controls the discharging circuit 563 into not operating according to a power-supply detection signal, then the MOS transistor 5675 is in a disabled or turned-off state and thus a path between its second terminal and third terminal is in a cutoff state, the switch 5671 is controlled into conducting a path between its first contact and second contact, and the driving circuit 530 is controlled into operating. And when providing or power supplying of an external power signal becomes normal again from an abnormal state, and the switch S1 is in a cutoff state, the central processing unit 565 controls the discharging circuit 563 into not operating according to a power-supply detection signal, then the MOS transistor 5675 is in a disabled or turned-off state and thus a path between its second terminal and third terminal is in a cutoff state, the switch 5671 is controlled into conducting a path between its first contact and second contact, the voltage-stabilizing diode 5672 is controlled into a cutoff state, and the driving circuit 530 is controlled into not operating.

A difference in the embodiments of FIG. 17H from previously described sets of embodiments is that in FIG. 17H the MOS transistor 5675 is not directly controlled by the central processing unit 565 into conducting or a cutoff state, but is configured to conduct or be in a cutoff state according to an operating state of the discharging circuit 563.

Through the above-described embodiments, isolation between outputs respectively of a driving circuit 530 and a discharging circuit 563 may be realized through a power switching circuit 567, in order to prevent signals respectively of the driving circuit 530 and the discharging circuit 563 from interfering with each other to cause an abnormal state of the LED lamp's system.

In some embodiments, a voltage-stabilizing diode 5672 may be omitted without affecting/impacting desirable effects to be achieved by the present invention.

Figure 17I:
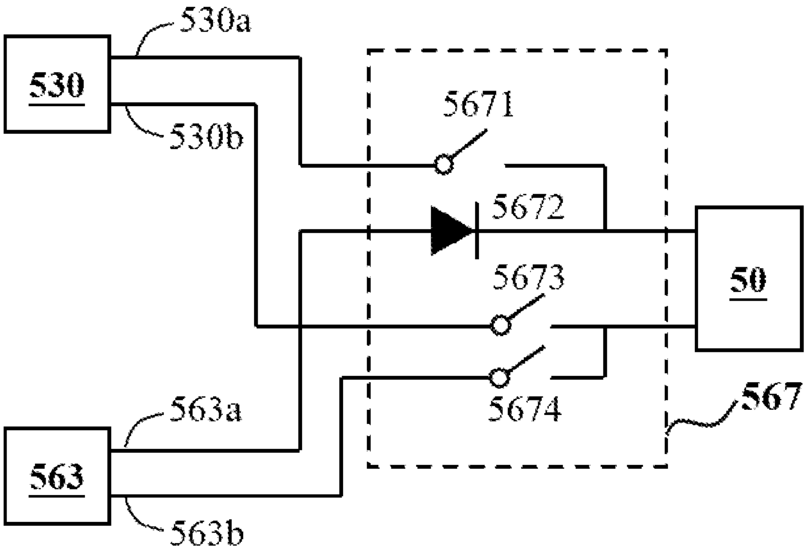
FIG. 17I is a circuit structure diagram of a power switching circuit according to some embodiments.

FIG. 17I is a circuit structure diagram of a power switching circuit according to some embodiments. In these embodiments of FIG. 17I, a power switching circuit 567 includes switches 5671, 5673, and 5674, and a diode 5672. The switch 5671 has a first terminal electrically connected to a first driving output terminal 530*a* of a driving circuit 530, and has a second terminal electrically connected to an LED module 50. The diode 5672 has an anode electrically connected to a first output terminal 563*a* of a discharging circuit 563, and a cathode electrically connected to the LED module

50. The switch 5673 has a first terminal electrically connected to a second driving output terminal 530*b* of the driving circuit 530, and a second terminal electrically connected to the LED module 50. The switch 5674 has a first terminal electrically connected to a second output terminal 563*b* of the discharging circuit 563, and a second terminal electrically connected to the LED module 50.

Next, circuit operations of a power switching circuit 567 in the embodiments of FIG. 17I are described with reference to FIG. 17B. When providing or power supplying of an external power signal is normal and the switch S1 is closed, a central processing unit 565 performs an operation of turning on the lamp according to a power-supply detection signal, controlling the switches 5671 and 5673 into conducting, controlling the switch 5674 into a cutoff state, controlling the driving circuit 530 into operating, and controlling the discharging circuit 563 into not operating. When providing or power supplying of the external power signal is normal and the switch S1 is in a cutoff state, the central processing unit 565 performs an operation of turning off the lamp according to a power-supply detection signal, controlling the switches 5671 and 5673 into conducting, controlling the switch 5674 into a cutoff state, controlling the driving circuit 530 into not operating, and controlling the discharging circuit 563 into not operating. When providing or power supplying of an external power signal is abnormal or stopped, the central processing unit 565 performs emergency lighting according to a power-supply detection signal, first controlling the driving circuit 530 into not operating, then controlling the switches 5671 and 5673 respectively into a cutoff state, controlling the switch 5674 into conducting, and controlling the discharging circuit 563 into operating, in which case an auxiliary power module 560 provides electric power for the LED module 50. When providing or power supplying of an external power signal becomes normal again from an abnormal state, and the switch S1 is closed, the central processing unit 565 controls the discharging circuit 563 into not operating according to a power-supply detection signal, controlling the switch 5674 into a cutoff state, controlling the switches 5671 and 5673 into conducting, and controlling the driving circuit 530 into operating. When providing or power supplying of an external power signal becomes normal again from an abnormal state, and the switch S1 is in a cutoff state, the central processing unit 565 controls the discharging circuit 563 into not operating according to a power-supply detection signal, controlling the switch 5674 into a cutoff state, controlling the switches 5671 and 5673 into conducting, and controlling the driving circuit 530 into not operating. The diode 5672 is connected between the first driving output terminal 530*a* of the driving circuit 530 and the first output terminal 563*a* of the discharging circuit 563, in order to prevent a signal from the driving circuit 530 from flowing to the discharging circuit 563.

Figure 17J:
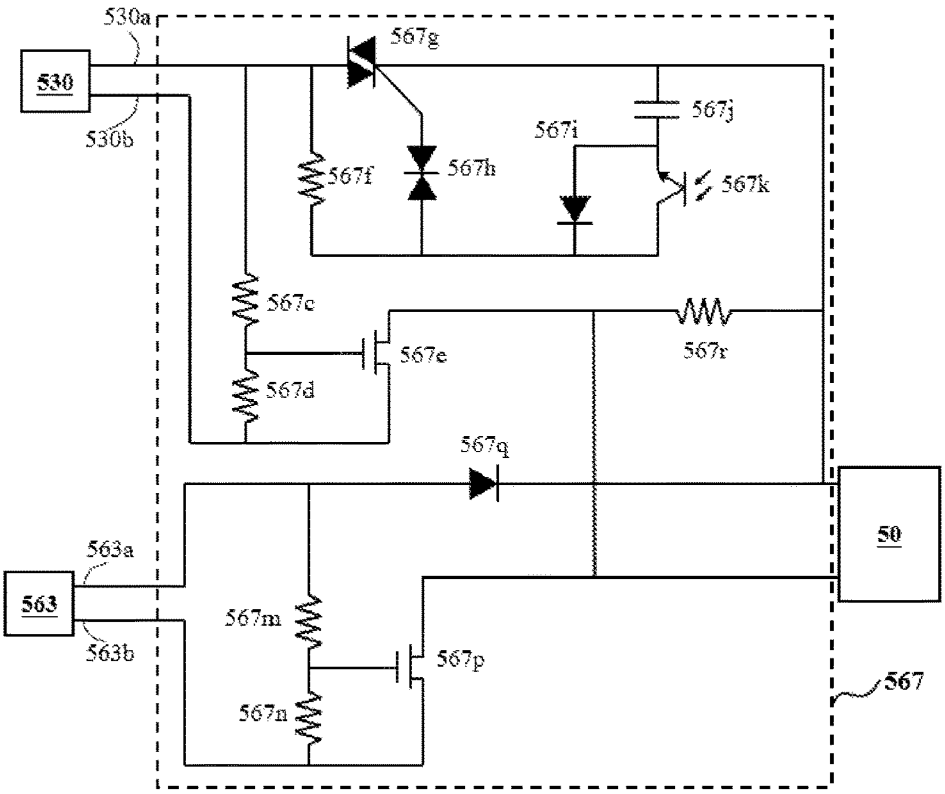
FIG. 17J is a circuit structure diagram of a power switching circuit according to some embodiments.

FIG. 17J is a circuit structure diagram of a power switching circuit according to some embodiments. The embodiments of FIG. 17J are species embodiments under the more generic embodiments of FIG. 17I. A switch 5671 in FIG. 17I is replaced with a bidirectional triode thyristor (TRIAC) 567*g* in FIG. 17J; a switch 5673 in FIG. 17I is replaced with a MOS transistor 567*e* in FIG. 17J for equivalence; and a switch 5674 in FIG. 17I is replaced with a MOS transistor 567*p* in FIG. 17J for equivalence. In these embodiments of FIG. 17J, a power switching circuit 567 includes resistors 567*c*, 567*d*, 567*f*, 567*m*, 567*n*, and 567*r*, a bidirectional triode thyristor 567*g*, a symmetrical trigger diode (DIAC) 567*h*, diodes 567*i* and 567*q*, an optical coupler 567*k*, a capacitor 567*j*, and MOS transistors 567*e* and 567*p*. The resistor 567*f* has a first end electrically connected to a first driving output terminal 530*a* of a driving circuit 530 and a first terminal of the bidirectional triode thyristor 567*g*, and has a second end electrically connected to a second terminal of the symmetrical trigger diode 567*h*. The bidirectional triode thyristor 567*g* has a second terminal electrically connected to a first end of the capacitor 567*j* and an LED module 50, and has a third terminal electrically connected to a first terminal of the symmetrical trigger diode 567*h*. The diode 567*i* has an anode electrically connected to a second end of the capacitor 567*j*, and a cathode electrically connected to the second end of the resistor 567*f*. The optical coupler 567*k* has a first terminal electrically connected to the anode of the diode 567*i*, and a second terminal electrically connected to the cathode of the diode 567*i*. The resistor 567*c* has a first end electrically connected to the first driving output terminal 530*a*, and a second end electrically connected to a first end of the resistor 567*d* and a first terminal of the MOS transistor 567*e*. The resistor 567*d* has a second end electrically connected to a second driving output terminal 530*b* of the driving circuit 530 and a third terminal of the MOS transistor 567*e*. The MOS transistor 567*e* has a second terminal electrically connected to a first end of the resistor 567*r* and the LED module 50. The resistor 567*r* has a second end electrically connected to the first end of the capacitor 567*j*. The resistor 567*m* has a first end electrically connected to a first output terminal 563*a* of a discharging circuit 563, and has a second end electrically connected to a first end of the resistor 567*n* and a first terminal of the MOS transistor 567*p*. The resistor 567*n* has a second end electrically connected to a second output terminal 563*b* of the discharging circuit 563 and a third terminal of the MOS transistor 567*p*. The MOS transistor 567*p* has a second terminal electrically connected to the first end of the resistor 567*r*. The diode 567*q* has an anode electrically connected to the first end of the resistor 567*m*, and a cathode electrically connected to the second end of the resistor 567*r*.

Next, the principle(s) of the MOS transistor 567*e*'s operations is described. When the driving circuit 530 is operating, a voltage is output between its first driving output terminal 530*a* and second driving output terminal 530*b*, which voltage after voltage division by the resistors 567*c* and 567*d* may enable or turn on the MOS transistor 567*e*, causing a conduction between the second terminal and third terminal of the MOS transistor 567*e*. That is, when the driving circuit 530 is operating, the MOS transistor 567*e* is enabled to conduct; and when the driving circuit 530 is not operating, the MOS transistor 567*e* is disabled or in a cutoff state.

Next, principle(s) of the bidirectional triode thyristor 567*g*'s operations is described. A control terminal (not illustrated) of the bidirectional triode thyristor 567*g* is electrically connected to a central processing unit 565 and is configured to operate in response to the control by the central processing unit 565. When the central processing unit 565 controls the optical coupler 567*k* into conducting, the optical coupler 567*k* conducts between its first terminal and second terminal, and then a driving signal outputted by the driving circuit 530 charges the capacitor 567*k* through a path formed through the resistor 567*f*, optical coupler 567*k*, capacitor 567*j*, resistor 567*r*, and MOS transistor 567*e*. When a voltage across two ends of the capacitor 567*k* is larger than a threshold voltage of the symmetrical trigger diode 567*h*, the symmetrical trigger diode 567*h* conducts so as to cause the bidirectional triode thyristor 567*g* to conduct. Such that the bidirectional triode thyristor 567*g* is configured to conduct or be in a cutoff state in response to the control by the central processing unit 565.

The principle(s) of the MOS transistor 567_p_'s operations is the same as that of the MOS transistor 567_e_'s operations, so is not repeatedly described again here. That is, when the discharging circuit 563 is operating, the MOS transistor 567_p_ is enabled to conduct; and when discharging circuit 563 is not operating, the MOS transistor 567_p_ is disabled or in a cutoff state.

Next, circuit operations of a power switching circuit 567 in the embodiments of FIG. 17J are described with reference to FIG. 17B. When providing or power supplying of an external power signal is normal and the switch 51 is closed, the central processing unit 565 performs an operation of turning on the lamp according to a power-supply detection signal, controlling the discharging circuit 563 into not operating, causing the MOS transistor 567_p_ to be in a cutoff state, controlling the driving circuit 530 into operating, controlling the bidirectional triode thyristor 567_g_ into conducting, and causing the MOS transistor 567_e_ to conduct, wherein the LED module 50 is power supplied by the driving circuit 530. When providing or power supplying of the external power signal is normal and the switch 51 is in a cutoff state, the central processing unit 565 performs an operation of turning off the lamp according to a power-supply detection signal, controlling the discharging circuit 563 into not operating, causing the MOS transistor 567_p_ to be in a cutoff state, controlling the driving circuit 530 into not operating, controlling the bidirectional triode thyristor 567_g_ into a cutoff state, and causing the MOS transistor 567_e_ to be in a cutoff state, wherein the LED module 50 does not operate. When providing or power supplying of an external power signal is abnormal or stopped, the central processing unit 565 performs emergency lighting according to a power-supply detection signal, first controlling the driving circuit 530 into not operating, then controlling the bidirectional triode thyristor 567_g_ into a cutoff state, causing the MOS transistor 567_e_ to be in a cutoff state, controlling the discharging circuit 563 into operating, and causing the MOS transistor 567_p_ to conduct, wherein the LED module 50 is power supplied by the discharging circuit 563.

When providing or power supplying of an external power signal becomes normal again from an abnormal state, and the switch S1 is closed, the central processing unit 565 controls the discharging circuit 563 into not operating according to a power-supply detection signal, causing the MOS transistor 567_p_ to be in a cutoff state, controlling the driving circuit 530 into operating, causing the MOS transistor 567_e_ to conduct, and controlling the bidirectional triode thyristor 567_g_ into conducting. When providing or power supplying of an external power signal becomes normal again from an abnormal state, and the switch S1 is in a cutoff state, the central processing unit 565 controls the discharging circuit 563 into not operating according to a power-supply detection signal, causing the MOS transistor 567_p_ to be in a cutoff state, controlling the driving circuit 530 into not operating, causing the MOS transistor 567_e_ to be in a cutoff state, and controlling the bidirectional triode thyristor 567_g_ into a cutoff state. The diode 567_q_ is connected between the first driving output terminal 530_a_ of the driving circuit 530 and the first output terminal 563_a_ of the discharging circuit 563, in order to prevent a signal from the driving circuit 530 from flowing to the discharging circuit 563.

Through the power-supply circuit structures in FIGS. 17D to 17J, isolation between output signals respectively of a driving circuit 530 and a discharging circuit 563 may be realized, in order to prevent the output signals from interfering with each other. In the embodiments of FIGS. 17D to 17J, the driving circuit 530 and the discharging circuit 563 may be non-isolated from each other in a power-supply circuit structure, which generally occupies less space compared to an isolated type of power-supply circuit structure and thus is applicable to occasions having higher requirement for space.

Figure 18A:
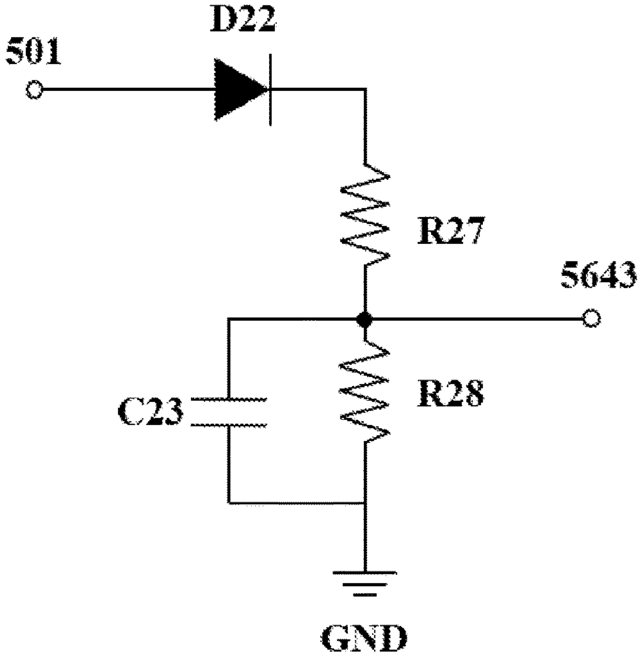
FIG. 18A is a circuit structure diagram of a power-supply detection circuit according to some embodiments.

FIG. 18A is a circuit structure diagram of a power-supply detection circuit according to some embodiments. The embodiments of FIG. 18A are species embodiments under the more generic embodiments of FIG. 16U. In these embodiments of FIG. 18A, a power-supply detection circuit 564 includes a diode D22, resistors R27 and R28, and a capacitor C23. The diode D22 has an anode electrically connected to a first pin 501 of an LED tube lamp, and a cathode electrically connected to a first end of the resistor R27, which has a second end electrically connected to a first end of the resistor R28 and a voltage output terminal 5643. The resistor R28 has a second end electrically connected to a common ground terminal GND. The capacitor C23 is connected in parallel with the resistor R28. The diode D22 may be referred to as a rectifying circuit, and the resistors R27 and R28 and the capacitor C23 may be collectively referred to as a voltage division circuit.

In the embodiments of FIG. 18A, the diode D22 is configured to rectify a received external power signal in order to produce a rectified signal. After voltage division by the resistors R27 and R28, the rectified signal results in a division voltage signal to be outputted at the voltage output terminal 5643, which division voltage signal is then regulated or stabilized by the capacitor C23. When power supplying from an external power source connected to the first pin 501 is present, the division voltage signal is of high voltage level. When power supplying from an external power source connected to the first pin 501 is stopped or not present, the division voltage signal is of low voltage level. By the division voltage signal, the power-supply detection circuit 564 judges whether power supplying is present at the first pin 501.

Figure 18B:
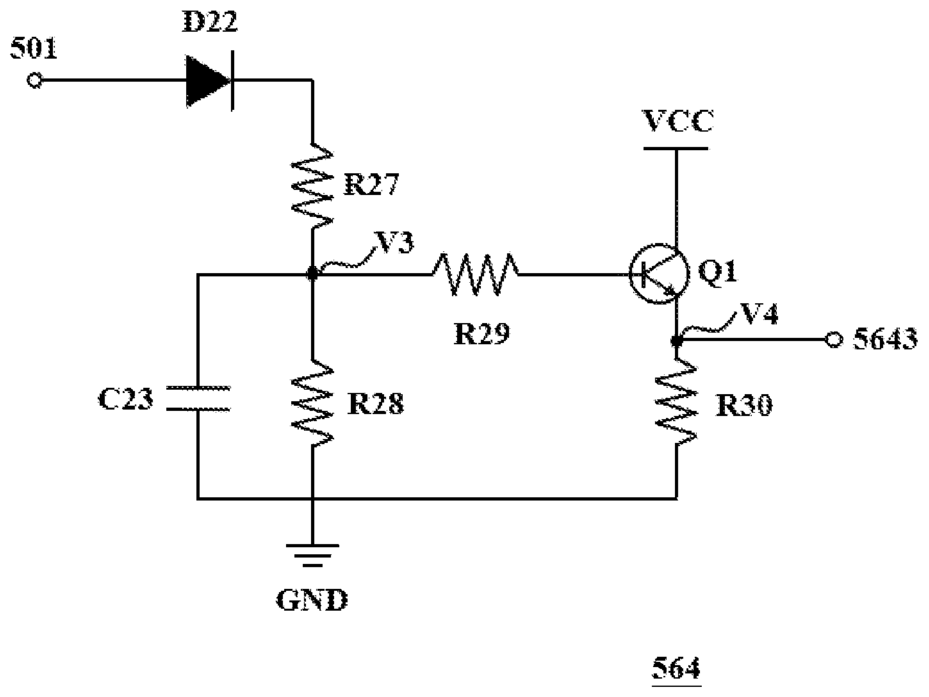
FIG. 18B is a circuit structure diagram of a power-supply detection circuit according to some embodiments.

FIG. 18B is a circuit structure diagram of a power-supply detection circuit according to some embodiments. Similar to the embodiments of FIG. 18A, in these embodiments of FIG. 18B a power-supply detection circuit 564 includes a diode D22, resistors R27 and R28, and a capacitor C23, with difference that the power-supply detection circuit 564 of FIG. 18B further includes resistors R29 and R30, and a bipolar junction transistor Q1. The resistor R29 has a first end electrically connected to a first end of the resistor R28, and a second end electrically connected to a base of the bipolar junction transistor Q1. The bipolar junction transistor Q1 has a collector electrically connected to a DC voltage source VCC, and an emitter electrically connected to a first end of the resistor R30 and the voltage output terminal 5643. The resistor R30 has a second end electrically connected to the common ground terminal GND.

Next, principle(s) of operations in these embodiments of 18B is described. As described in the embodiments of FIG. 18A, an external power signal may be a broad-range power-main voltage signal: for example in order for an LED lamp to be usable in different countries, the LED lamp should be compatible with power-main voltages respectively of the different countries, so a broad range of voltage variation in a power main is generally 110-277 V. Referring to FIG. 18B, with an external power signal being a broad-range power-main voltage signal, a division voltage signal V3 produced after voltage division by the resistors R27 and R28 is still a broad-range voltage signal. If the division voltage signal V3 is directly transmitted to the power-supply detection circuit 564 through the voltage output terminal 5643, the division voltage signal V3 may exceed a voltage range of the power-supply detection circuit 564, so as to cause the power-supply detection circuit 564 to be unable to judge normally. In these embodiments of FIG. 18B, the resistors R29 and R30 and the bipolar junction transistor Q1 form a voltage conversion circuit, which is configured to convert a division voltage signal V3 of broad-range voltage into a constant voltage signal. For example, when an external power signal is of 110V, and a division voltage signal V3 is of 5V, resistances of the resistors R29 and R30 may be set such as to cause the bipolar junction transistor Q1 to conduct, producing an output signal V4 complying with the following equation:

$$V4=VCC-Vce1 \quad \text{equation 1}$$

In equation 1, Vce1 is a voltage from the collector to the emitter of the bipolar junction transistor Q1 as conducting.

When an external power signal is of 277V, and a division voltage signal V3 is of 12.6V, resistances of the resistors R29 and R30 may be set such as to similarly conduct the bipolar junction transistor Q1, producing an output signal V4 complying with the following equation:

$$V4=VCC-Vce2 \quad \text{equation 2}$$

In equation 2, Vce2 is a voltage from the collector to the emitter of the bipolar junction transistor Q1 as conducting.

In the above equations, Vce1 and Vce2 are approximately equal, so under each of different power-main voltages an output signal V4 has constant output voltage. When power supplying from an external power source connected to the first pin 501 is not present, the voltage of the external power source is smaller than a set threshold V5, then an output signal V4 is of low voltage level, for which case the power-supply detection circuit 564 judges that power supplying is not present at the first pin 501. When power supplying from an external power source connected to the first pin 501 is present, the voltage of the external power source is larger than or equal to the set threshold V5, then an output signal V4 is of constant high voltage level, for which case the power-supply detection circuit 564 judges that power supplying is present at the first pin 501. In these embodiments of FIG. 18B, the set threshold V5 is 80V. In other embodiments, the threshold V5 may be set to have another value, but the present invention is not limited to any particular value of the threshold V5.

Figure 18C:
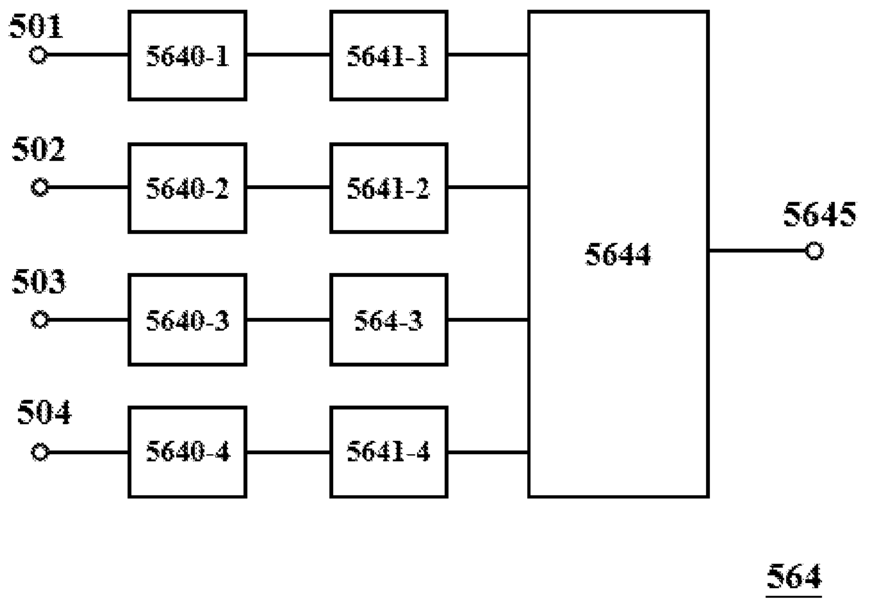
FIG. 18C is a circuit block diagram of a power-supply detection circuit according to some embodiments.

Through the circuit structures of a power-supply detection circuit in the embodiments of FIG. 18C, when a pin for inputting (a pin 501) has an external power signal, a power-supply detection circuit 564 is configured to indicate the input pin 501 is receiving power supply, by outputting a high-electrical-level signal (as an output signal V4); and when the input pin 501 does not have an external power signal, the power-supply detection circuit 564 is configured to indicate the input pin 501 is not receiving power supply, by outputting a low-electrical-level signal (as an output signal V4). In these embodiments, the resistors R27 and R28 for voltage division may have relatively large chosen resistances respectively, in order to reduce power consumption by reducing current(s) flowing through the voltage-division circuit.

In some embodiments, an external power signal is a DC power-supply signal. Through setting (values of) parameters of internal components of a power-supply detection circuit 564, a threshold value may be set for judging whether an external power signal is provided normally. For example, when a maximum or peak value of an external power signal is larger than or equal to a set threshold value, a power-supply detection circuit judges that an external power signal is provided normally, as judging that electric power is being provided. When a maximum or peak value of an external power signal is smaller than a set threshold value, the power-supply detection circuit judges that providing of an external power signal is abnormal, as judging that electric power is not being provided.

FIG. 18C is a circuit block diagram of a power-supply detection circuit according to some embodiments. In these embodiments of FIG. 18C, a power-supply detection circuit 564 includes 4 rectifying circuits 5640-1, 5640-2, 5640-3, and 5640-4 respectively configured in the same way, and 4 voltage division circuits 5641-1, 5641-2, 5641-3, and 5641-4 respectively configured in the same way. The power-supply detection circuit 564 further includes a detection determining circuit 5644. The rectifying circuit 5640-1 is electrically connected to a first pin 501. The rectifying circuit 5640-2 is electrically connected to a second pin 502. The rectifying circuit 5640-3 is electrically connected to a third pin 503. And the rectifying circuit 5640-4 is electrically connected to a fourth pin 504. The voltage division circuit 5641-1 is electrically connected respectively to the rectifying circuit 5640-1 and detection determining circuit 5644. The voltage division circuit 5641-2 is electrically connected respectively to the rectifying circuit 5640-2 and detection determining circuit 5644. The voltage division circuit 5641-3 is electrically connected respectively to the rectifying circuit 5640-3 and detection determining circuit 5644. And the voltage division circuit 5641-4 is electrically connected respectively to the rectifying circuit 5640-4 and detection determining circuit 5644.

The principle(s) of circuit operations of the rectifying circuits and voltage division circuits in the embodiments of 18C may be understood by referencing the described embodiments of FIG. 18A, so is not here repeatedly described. The power-supply detection circuit 564 is electrically connected respectively to the four pins 501, 502, 503, and 504 of the LED tube lamp, in order to detect circuit states respectively at the four pins; and is configured to output a power-supply detection signal through an output terminal 5645, through different circuit states at the four pins. The discharging circuit 563 and driving circuit 530 are configured to operate based on the power-supply detection signal.

In some embodiments, an LED tube lamp can realize the described technical effects in these embodiments when any 3 pins of the 4 pins of the LED tube lamp are connected to an external power supply. Here is a description of a logic of judging performed by a detection determining circuit. In these embodiments, the LED tube lamp has a first pin 501 electrically connected to a Live (L) wire of a power-main's signal, a second pin 502 electrically connected to a Neutral (N) wire of the power-main's signal, and a third pin 503 electrically connected to a Live (L) wire or a Neutral (N) wire of the power-main's signal through an external switch. When the power-main's signal is provided normally, and the external switch is in a closed state, the power-main's signal may be detected at each of the three pins, then a detection determining circuit 5644 determines that the power-main signal is normally provided and the LED tube lamp is to be turned on, so the detection determining circuit 5644 outputs a first power-supply detection signal, a discharging circuit 563 based on the first power-supply detection signal does not operate, and a driving circuit 530 operates normally based on the first power-supply detection signal to normally light up the LED tube lamp. When the power-main's signal is provided normally, and the external switch is in a turned-off or cutoff state, the power-main's signal may be detected at each of the first pin 501 and second pin 502, but not at the third pin 503, then the detection determining circuit 5644 determines that the power-main signal is normally provided but the LED tube lamp is to be turned off, so the detection determining circuit 5644 outputs a second power-supply detection signal, the discharging circuit 563 based on the second power-supply detection signal does not operate, and the driving circuit 530 based on the second power-supply detection signal does not operate, causing the LED tube lamp to be in a turned-off state. When providing of the power-main's signal is abnormal, no matter in what state the external switch is, the power-main's signal may be detected at none of the three pins, then the detection determining circuit 5644 determines that providing of the power-main signal is abnormal and the LED tube lamp is to enter into an emergency mode, so the detection determining circuit 5644 outputs a third power-supply detection signal, the discharging circuit 563 based on the third power-supply detection signal operates, and the driving circuit 530 based on the third power-supply detection signal does not operate, causing the LED tube lamp to enter into the emergency mode to light up the LED tube lamp.

In some embodiments, an LED tube lamp has different luminance or color temperatures of its lighting respectively corresponding to an emergency mode of the LED tube lamp and a normal lighting mode of the LED tube lamp, in order for suggesting to a user a current operating state of the LED tube lamp. The LED tube lamp may be configured to activate an indicating lamp corresponding to an emergency mode to indicate its operating state when entering into the emergency mode, but the present invention is not limited to this configuration. In order to make a power device mentioned in any of the above-described embodiments able to effectively reduce damages possibly caused by a surge signal to a load circuit, a surge protection circuit is disposed on a power loop of the power device and the load circuit. The surge protection circuit is configured to perform a surge protection process to a surge signal combined or stacked with an external driving signal, by at least one of the methods of filtering out high-frequency signals, releasing excessive energy, and temporarily storing and then gradually releasing excessive energy. A circuit structure of an LED tube lamp lighting system is taken as an example in the following description, to exemplify a surge protection circuit in the circuit structure.

Figure 19A:
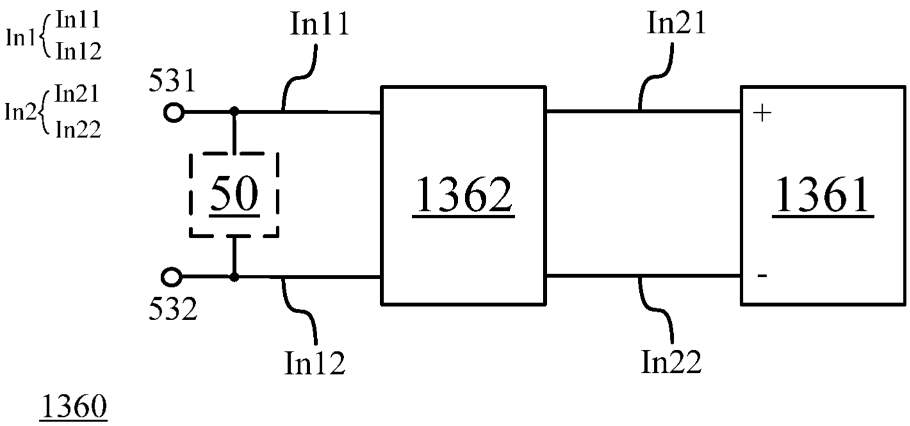
FIG. 19A is a circuit block diagram of an auxiliary power module according to some embodiments.

FIG. 19A is a circuit block diagram of an auxiliary power module according to some embodiments. An auxiliary power module 1360 in these embodiments of FIG. 19A may be applied to the configuration of an auxiliary power module 560 described above. An auxiliary power module 1360 includes an auxiliary power source 1361 and a power conversion circuit 1362. The auxiliary power source 1361 is configured to provide auxiliary power and is for example a battery or a supercapacitor. The power conversion circuit 1362 has a first connection side In1 and a second connection side In2, which first connection side In1 is coupled to a driving circuit 530 and an LED module 50, the power conversion circuit 1362 in FIG. 19A is coupled to a first driving output terminal 531 and a second driving output terminal 532 respectively through a first connection terminal In11 and a second connection terminal In12 of the first connection side In1, and the second connection side In2 is (to be) coupled to the auxiliary power source 1361. The power conversion circuit 1362 in FIG. 19A is coupled to a positive terminal and a negative terminal of the auxiliary power source 1361 respectively through a third connection terminal In21 and a fourth connection terminal In22 of the second connection side In2. When the driving circuit 530 normally provides power for the LED module 50, the power conversion circuit 1362 performs power conversion to a driving signal outputted at the first driving output terminal 531 and second driving output terminal 532, in order to output a signal through the second connection side In2 to charge the auxiliary power source 1361. When the driving circuit 530 stops providing power or provides insufficient level of power, the power conversion circuit 1362 performs power conversion to auxiliary power provided by the auxiliary power source 1361, in order to output a signal through the first connection side In1 to supply power for the LED module 50. Therefore, the power conversion circuit 1362 can realize double functions (of charging the auxiliary power source 1361 and of supplying power for the LED module 50), so as to significantly reduce circuit complexity, make it easier to integrate a planned circuit structure and perform layout on a PCB, and save substantial cost in producing the auxiliary power module 1360.

It's noted that FIG. 19A and the description thereof merely illustrate an occasion of applying a power conversion circuit to an LED module, rather than limiting the power conversion circuit. In practical application(s), a power conversion circuit has a first connection side to be coupled to a first power source in order to receive a first power signal, and has a second connection side to be coupled to a second power source in order to receive a second power signal. The power conversion circuit is configured to perform power conversion to the first power signal to produce an output at the second connection side, or to perform power conversion to the second power signal to produce an output at the first connection side. The first connection side or second connection side may be coupled to another load. In practical applications performed by a person of ordinary skill in the art, the first power source and the second power source are a power source providing the first power signal and a power source providing the second power signal, respectively. Taking the application for supplying an LED module as an example, a first power source may be a power module in any one of the described embodiments in FIGS. 9A-9C, or a power module formed by including additional module/component/circuit/unit (such as an electric shock detection module, an installation detection module, or a surge protection circuit mentioned hereinafter) on the basis of any one of the described embodiments in FIGS. 9A-9C, wherein a first power signal provided by the first power source corresponds to a driving signal mentioned in the embodiments of FIGS. 9A-9C. A second power source may be an auxiliary power source in FIG. 19A, and a second power signal provided by the second power source corresponds to auxiliary power provided by the auxiliary power source. In the description hereinafter of a circuit structure of a power conversion circuit and its operation principle(s), their application to an LED module will be taken as an example, and a person of ordinary skill in the art can understand that such a circuit structure of a power conversion circuit and its operation principle(s) may be applicable or adapted to other load or occasion, so a description of such an application to other load or occasion will not be repeated herein. And it should be noted that a first connection side and a second connection side are not limited to comprising the connection terminals In11 and In12 and comprising connection terminals In21 and In22 in FIG. 19A, respectively, and each of the first connection side and the second connection side may comprise more connection terminals according to an actual application.

Figure 19B:
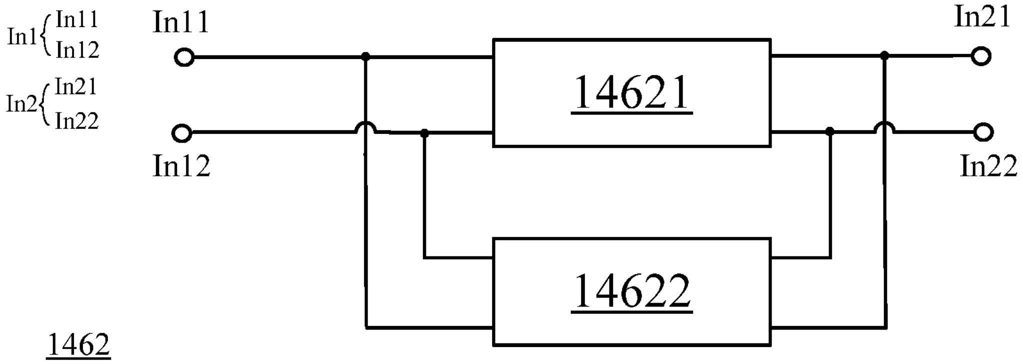
FIG. 19B is a circuit block diagram of a power conversion circuit according to some embodiments.

FIG. 19B is a circuit block diagram of a power conversion circuit according to some embodiments. A power conversion circuit 1462 in the embodiments of FIG. 19B includes a first conversion circuit 14621 and a second conversion circuit 14622. The first conversion circuit 14621 is coupled between a first connection side In1 and a second connection side In2, and is configured to perform power conversion to a first power signal (as a driving signal) received at the first connection side In1. The second conversion circuit 14622 is coupled between the first connection side In1 and the second connection side In2, and is configured to perform power conversion to a second power signal (as an auxiliary power signal) received at the second connection side In2. According to the requirements of a power source or load connected at the first connection side In1 or the second connection side In2, the manners of power conversion respectively performed by the first conversion circuit 14621 and the second conversion circuit 14622 may be the same or different. For example, in a case where an LED module and a driving circuit are connected to the first connection side In1 and an auxiliary power source is connected to the second connection side In2, a first conversion circuit 14621 performs stepping down of voltage to a driving signal, in order to output a charging signal, suitable for the auxiliary power source connected to the second connection side In2, for charging the auxiliary power source; and a second conversion circuit 14622 performs stepping up of voltage to auxiliary power, in order to output an auxiliary power signal, suitable for the LED module connected to the first connection side In1, for the LED module. Also for example, if a second power source connected to a second connection side In2 needs to be charged with a nominal voltage/nominal current/nominal power, a first conversion circuit 14621 may be disposed in order to correspondingly perform constant-voltage power conversion, constant-current power conversion, or constant-power power conversion; and according to a load connected to a first connection side In1*a* second conversion circuit 14622 may be correspondingly disposed in order to perform a suitable manner of power conversion.

It should be noted that at least some components are used/included by each of a first conversion circuit 14621 and a second conversion circuit 14622 described in this Application. In FIG. 19B, although a first conversion circuit 14621 and a second conversion circuit 14622 are depicted as being separate from each other, this depiction is merely for conveniently describing the principle(s) of a power conversion circuit and does not mean a first conversion circuit 14621 and a second conversion circuit 14622 must exist independently from each other. For example, if electronic components included by a first conversion circuit 14621 are all to be used by a second conversion circuit 14622, circuit path controlling may be performed to cause the electronic components to form the first conversion circuit 14621 or the second conversion circuit 14622. Also for example, if some electronic components included by a first conversion circuit 14621 are to be used by a second conversion circuit 14622, circuit path controlling may be performed to cause these electronic components together with other electronic components included by the first conversion circuit 14621 to form the first conversion circuit 14621 for operating, or to cause these electronic components together with other electronic components included by the second conversion circuit 14622 to form the second conversion circuit 14622 for operating.

Figure 19C:
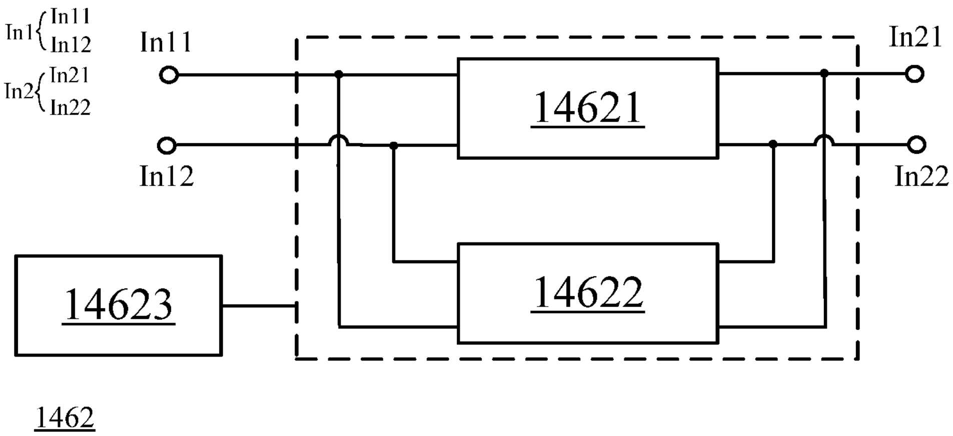
FIG. 19C is a circuit block diagram of a power conversion circuit according to some embodiments.

FIG. 19C is a circuit block diagram of a power conversion circuit according to some embodiments. Compared to the embodiments of FIG. 19B, a power conversion circuit 1462 in the embodiments of FIG. 19C further includes a circuit-path switching circuit 14623, configured to perform circuit-path switching based on a power-supply condition of a first power source connected to a first connection side In1 or a second power source connected to a second connection side In2, so as to cause the power conversion circuit to operate by a first conversion circuit or a second conversion circuit. For example, as mentioned earlier, assuming a power module in any of the embodiments illustrated in FIGS. 9A to 9C as a first power source is coupled to a first connection side In1, and an auxiliary power source is coupled to a second connection side In2, when the first power source normally provides power, meaning a driving signal is normally providing power for an LED module, a circuit-path switching circuit 14623 causes a first conversion circuit to operate, so as to cause the driving signal to charge the auxiliary power source through the first conversion circuit. But when power supplying by the first power source is abnormal, meaning providing of a driving signal is stopped or results in insufficient voltage level, the circuit-path switching circuit 14623 causes a second conversion circuit to operate, so as to cause the auxiliary power source to provide auxiliary power for the LED module through the second conversion circuit. The position and connection configuration of a circuit-path switching circuit illustrated in FIG. 19C are merely exemplary for expressing an overall principle, but are not intended to limit how a circuit-path switching circuit is positioned and connected; and according to the difference between circuit structures adopted respectively by a first conversion circuit and a second conversion circuit, a person of ordinary skill in the art may connect a circuit-path switching circuit to any position in a power conversion circuit, such as to the first conversion circuit, to the second conversion circuit, to a first connection side, or to a second connection side.

In one embodiment, a first conversion circuit includes a first switch and a first transforming circuit, which the first switch is configured to conduct or be cut off based on a first control signal; and the first transforming circuit is coupled to a first power connection side, a second power connection side, and the first switch, and is configured to perform power conversion to the first power signal based on conduction or being cut off of the first switch. A second conversion circuit includes a second switch and a second transforming circuit, which the second switch is configured to conduct or be cut off based on a second control signal; and the second transforming circuit is coupled to the first power connection side, the second power connection side, and the second switch, and is configured to perform power conversion to the second power signal based on conduction or being cut off of the second switch.

The first conversion circuit may further include a first control circuit connected to a control terminal of the first switch; the second conversion circuit may further include a second control circuit connected to a control terminal of the second switch; the first control signal is generated by the first control circuit; and the second control signal is generated by the second control circuit. Considering the harmony and synchronization between controlling the first switch and the second switch, in other embodiments, the first control circuit and the second control circuit may be integrated as a whole into a control circuit in order to be connected to the first switch and the second switch. The present Application does not limit how the first control circuit and the second control circuit are integrated, with the integration being acceptable as long as the first control signal and the second control signal can be outputted for controlling the first switch and the second switch, respectively.

In some embodiments, at least some components of the first transforming circuit are used/included by the second transforming circuit, such as an energy-storing inductor of the first transforming circuit being used/included by the second transforming circuit. In some other embodiments, a first switch and a first transforming circuit of a first conversion circuit are used/included by a second conversion circuit, that is, a second switch of the second conversion circuit is the first switch, and a second transforming circuit of the second conversion circuit is the first transforming circuit, wherein control of the first switch and circuit path direction on the first transforming circuit are changed for a second circuit path on the second conversion circuit.

Next are descriptions of embodiments of a power conversion circuit, to explain composition, multiplexing or component usage by conversion circuits, and operation principle, of respective constituent parts of the power conversion circuit.

Figure 19D:
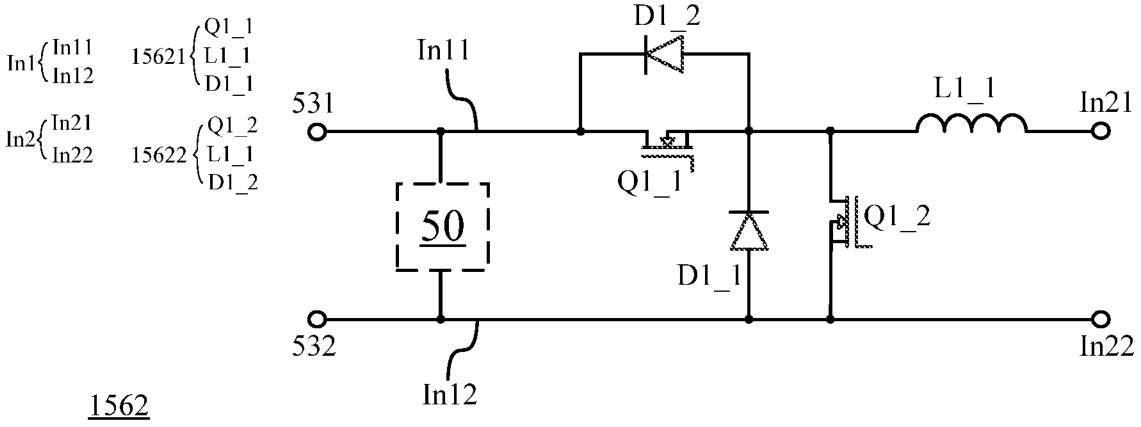
FIGS. 19D-19F are circuit structure diagrams of a power conversion circuit according to some embodiments.
Figure 19E:
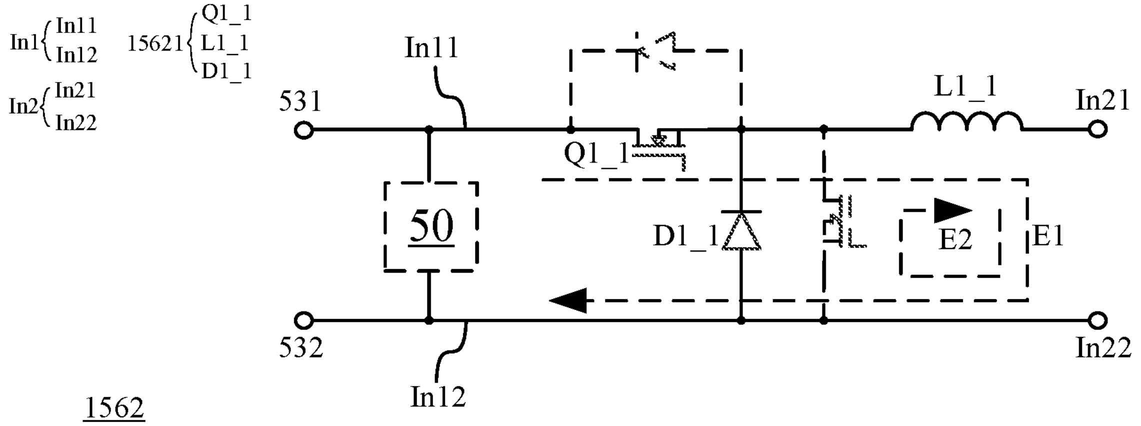
Figure 19F:
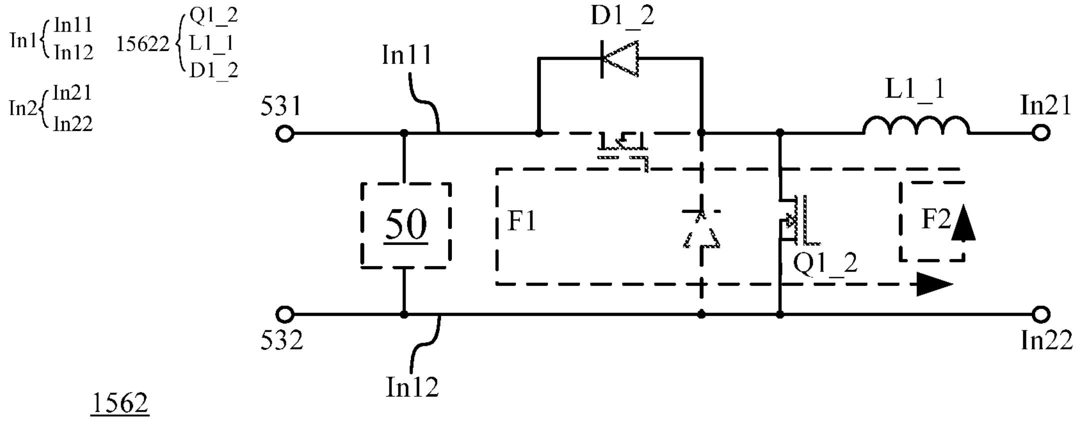

FIGS. 19D to 19F are circuit structure diagrams of a power conversion circuit according to some embodiments. In FIGS. 19D to 19F, a power conversion circuit 1562 has a first connection side In1 and a second connection side In2. The first connection side In1 has a first connection terminal In11 and a second connection terminal In12, respectively connecting to a first driving output terminal 531 and a second driving output terminal 532. The second connection side In2 has a third connection terminal In21 and a fourth connection terminal In22, for connecting to an auxiliary power source. The power conversion circuit 1562 further includes a first conversion circuit 15621 and a second conversion circuit 15622. The first conversion circuit 15621 includes a first switch Q1_1 and a first transforming circuit (not denoted by a mark), which first transforming circuit includes an energy-storing inductor L1_1 and a diode D1_1. The first switch Q1_1 has a first terminal coupled to the first connection terminal In11, and a second terminal coupled to an end of the energy-storing inductor L1_1, which has another end coupled to the third connection terminal In21. The diode D1_1 has a cathode coupled to an end of the energy-storing inductor L1_1, and has an anode coupled to the fourth connection terminal In22. The second conversion circuit 15622 includes a second switch Q1_2 and a second transforming circuit (not denoted by a mark), which second transforming circuit includes the energy-storing inductor L1_1 and a diode D1_2. In other words, the energy-storing inductor L1_1 is commonly used/included by the first conversion circuit and the second conversion circuit. The second switch Q1_2 has a first terminal coupled to an end of the energy-storing inductor L1_1, and has a second terminal coupled to the fourth connection terminal In22, which energy-storing inductor L1_1 has another end coupled to the third connection terminal In21. The diode D1_2 has an anode coupled to an end of the energy-storing inductor L1_1, and has a cathode coupled to the first connection terminal In11.

FIG. 19E illustrates signal flow directions during operations of a first conversion circuit 15621 of a power conversion circuit. For easier understanding and illustration, the parts of a second conversion circuit 15622 not used/included by the first conversion circuit 15621 are depicted by the dotted line in FIG. 19E. When the first conversion circuit 15621 is operating, meaning a driving signal is normally outputted from a first driving output terminal 531 to light up an LED module 50, the second switch Q1_2 is in a cutoff state, and the first switch Q1_1 conducts or is cut off under the control by a first control signal. When the first switch Q1_1 is conducting, the first conversion circuit 15621 operates along the path E1, meaning when a driving signal is outputted from the first driving output terminal 531 to light up the LED module 50, the driving signal is also outputted to the first connection terminal In11 and then flows through the first switch Q1_1, energy-storing inductor L1_1, third connection terminal In21, fourth connection terminal In22, and second connection terminal In12 to store energy in the energy-storing inductor L1_1 and to charge an auxiliary power source (not illustrated in FIG. 19E) coupled between the third connection terminal In21 and fourth connection terminal In22. When the first switch Q1_1 is in a cutoff state, the first conversion circuit 15621 operates along the path E2, meaning the energy-storing inductor L1_1 releases energy through a discharging path through the third connection terminal In21, fourth connection terminal In22, and the diode D1_1, in order to charge an auxiliary power source (not illustrated in FIG. 19E) coupled between the third connection terminal In21 and fourth connection terminal In22. Therefore, the first conversion circuit 15621 realizes the function of performing power conversion to a driving signal received at a first connection side In1 in order to output a signal at a second connection side In2 for charging an auxiliary power source.

FIG. 19F illustrates signal flow directions during operations of the second conversion circuit 15622 of a power conversion circuit. For easier understanding and illustration, the parts of the first conversion circuit 15621 not used/included by the second conversion circuit 15622 are depicted by the dotted line in FIG. 19F. When the second conversion circuit 15622 is operating, meaning a driving signal cannot be or is not outputted from the first driving output terminal 531 to light up the LED module 50, or an output driving signal has insufficient signal level to light up the LED module 50, the first switch Q1_1 is in a cutoff state, and the second switch Q1_2 conducts or is cut off under the control by a second control signal. When the second switch Q1_2 is conducting, the second conversion circuit 15622 operates along the path F2 to store energy in the energy-storing inductor L1_1, meaning an auxiliary power source (not illustrated in FIG. 19F) coupled between the third connection terminal In21 and fourth connection terminal In22 provides auxiliary power flowing through the third connection terminal In21, energy-storing inductor L1_1, second switch Q1_2, and fourth connection terminal In22 to store energy in the energy-storing inductor L1_1. When the second switch Q1_2 is in a cutoff state, the auxiliary power source and the energy-storing inductor L1_1 operate along the path F1 to together provide power for the LED module 50, meaning electric energy stored by the auxiliary power source and the energy-storing inductor L1_1 flows through the diode D1_2, first connection terminal In11, LED module 50, second connection terminal In12, and fourth connection terminal In22 to power the LED module 50. Thus, the second conversion circuit 15622 realizes the function of performing power conversion to auxiliary power received at a first connection side In2 in order to output a signal at a first connection side In1 to power the LED module 50.

On the basis of the embodiments of a power conversion circuit illustrated in FIGS. 19D to 19F, a capacitor may be connected respectively between a first connection terminal In11 and a second connection terminal In12, and between a third connection terminal In21 and a fourth connection terminal In22, so as to regulate or stabilize the voltage on a signal outputted from a first conversion circuit 15621 to a second connection side In2, and to regulate or stabilize the voltage on a signal outputted from a second conversion circuit 15622 to a first connection side In1. For further increasing the stability of the signal (outputted from a first conversion circuit 15621 or a second conversion circuit 15622), a resistor may be connected respectively between a first connection terminal In11 and a second connection terminal In12, and between a third connection terminal In21 and a fourth connection terminal In22, as a dummy load.

It should be noted that on the basis of the embodiments of a power conversion circuit illustrated in FIGS. 19D to 19F, a power conversion circuit may further include a first control circuit, a second control circuit, and a circuit-path switching circuit. The first control circuit is connected to the circuit-path switching circuit and a control terminal of the first switch, in order to output a first control signal based on a switching signal outputted by the circuit-path switching circuit. The second control circuit is connected to the circuit-path switching circuit and a control terminal of the second switch, in order to output a second control signal based on a switching signal outputted by the circuit-path switching circuit. The circuit-path switching circuit is configured to output a switching signal based on a state of power supplying by a driving signal, in order to cause the first control circuit to operate to output the first control signal or cause the second control circuit to operate to output the second control signal. When applied to the exemplary embodiments of a power conversion circuit in FIGS. 19D to 19F, the circuit-path switching circuit may comprise a power-supply detection circuit, which has an input terminal coupled to a circuit of a power module in any of the embodiments in FIGS. 9A to 9C, such as the input terminal being connected to a first driving output terminal 531, a first pin 501, or a third pin 503; and which has an output terminal coupled to the first control circuit and the second control circuit in order to output a switching signal to the first control circuit and the second control circuit. For example, when the power-supply detection circuit detects that power-supplying by a driving signal is normal, an outputted switching signal is of a high level, then the first control circuit operates based on the high level of the switching signal to output a first control signal, so as to cause a first conversion circuit to operate to charge an auxiliary power source. When the power-supply detection circuit detects that a driving signal is insufficient or not provided, an outputted switching signal is of a low level, then the second control circuit operates based on the low level of the switching signal to output a second control signal, so as to cause a second conversion circuit to operate to provide power for an LED module.

The embodiments of FIGS. 19D to 19F are described merely as illustrating examples, and an outputted switching signal of a high level may alternatively correspond to an abnormal power-supply state wherein the first control circuit should be correspondingly adjusted into operating based on the low level of a switching signal and the second control circuit should be correspondingly adjusted into operating based on the high level of a switching signal. Besides, a first control circuit and a second control circuit may be integrated into a control circuit, to be connected to a circuit-path switching circuit and configured to output a first control signal or a second control signal based on a switching signal. Also, a first control circuit, a second control circuit, and a circuit-path switching circuit may be integrated into a circuit as a whole to be a circuit-path switching circuit, which is configured to output a first control signal or a second control signal based on a detection result, but the present invention is not limited to such an integration way.

Figure 19G:
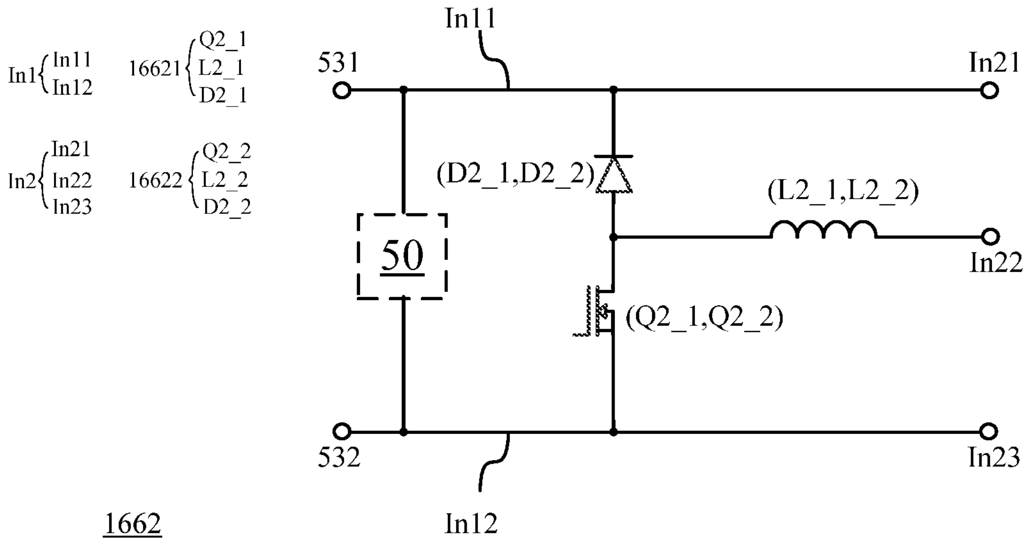
FIGS. 19G-19I are circuit structure diagrams of a power conversion circuit according to some embodiments.
Figure 19H:
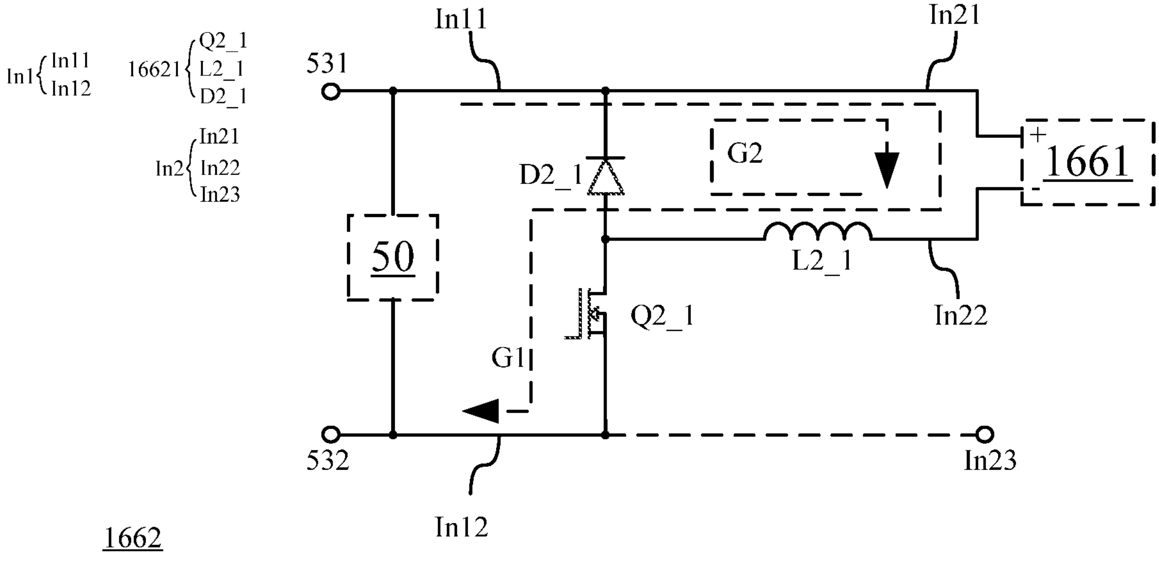
Figure 19I:
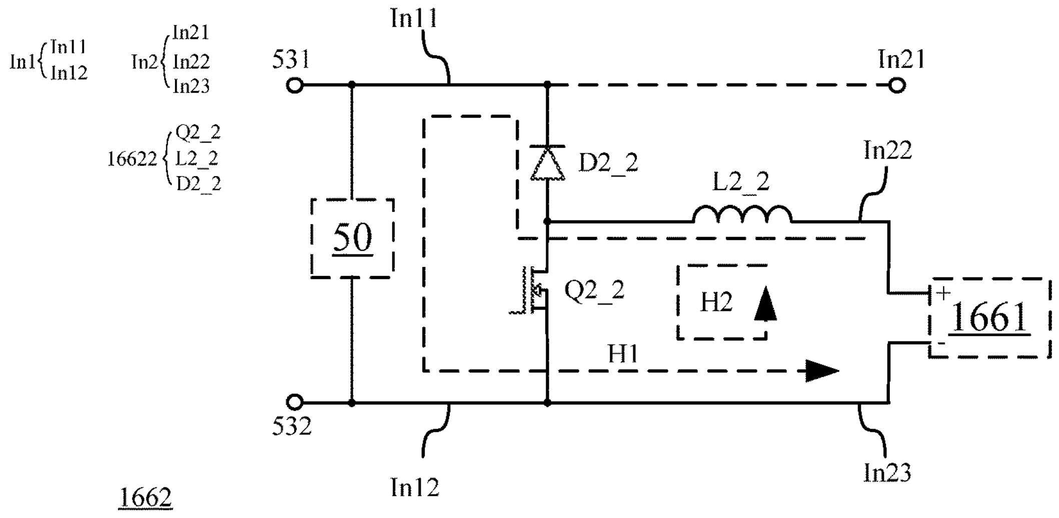

FIGS. 19G to 19I are circuit structure diagrams of a power conversion circuit according to some embodiments. In FIGS. 19G-19I, a power conversion circuit 1662 has a first connection side In1 and a second connection side In2. The first connection side In1 has a first connection terminal In11 and a second connection terminal In12, respectively connecting to a first driving output terminal 531 and a second driving output terminal 532. The second connection side In2 has a third connection terminal In21, a fourth connection terminal In22, and a fifth connection terminal In23, for connecting to an auxiliary power source. The power conversion circuit 1662 further includes a first conversion circuit 16621 and a second conversion circuit 16622. The first conversion circuit 16621 includes a first switch Q2_1 and a first transforming circuit (not denoted by a mark), which first transforming circuit includes an energy-storing inductor L2_1 and a diode D2_1. The first switch Q2_1 has a first terminal coupled to an anode of the diode D2_1, and a second terminal coupled to the second connection terminal In12 and the fifth connection terminal In23. The diode D2_1 has a cathode coupled to the first connection terminal In11 and the third connection terminal In21, and has the anode coupled to an end of the energy-storing inductor L2_1, which has another end coupled to the fourth connection terminal In22. The second conversion circuit 16622 includes a second switch Q2_2 and a second transforming circuit (not denoted by a mark), which second transforming circuit includes an energy-storing inductor L2_2 and a diode D2_2, wherein in these embodiments corresponding parts of the first conversion circuit 16621 are used as the energy-storing inductor L2_2 and diode D2_2 of the second conversion circuit 16622, so the same switch is used as each of the first switch Q2_1 and the second switch Q2_2, the same energy-storing inductor is used as each of the energy-storing inductor L2_1 and the energy-storing inductor L2_2, and the same diode is used as each of the diode D2_1 and the diode D2_2. It should be noted that for easily illustrating the situation of common usage by the first conversion circuit 16621 and the second conversion circuit 16622, denotations of components in FIG. 19G that are commonly used by the first conversion circuit 16621 and the second conversion circuit 16622 are enclosed as a pair by parenthesis, which pair includes two denotations of components respectively operating as part of the first conversion circuit 16621 and operating as part of the second conversion circuit 16622, but which pair does not mean two separate components are included. Besides, since all the mentioned components in FIG. 19G of the first conversion circuit 16621 are used as corresponding parts of the second conversion circuit 16622, the connection relationship among them in the second conversion circuit 16622 is the same as that in the first conversion circuit 16621 and thus not described again.

FIG. 19H illustrates signal flow directions during operations of a first conversion circuit 16621 of a power conversion circuit. For easier understanding and illustration, denotations and operation process of the components of only the first conversion circuit 16621 are shown in FIG. 19H. When a driving signal is normally outputted from a first driving output terminal 531 to light up an LED module 50, an auxiliary power source 1661 has a positive terminal connected to a third connection terminal In21, and a negative terminal connected to a fourth connection terminal In22, and the first conversion circuit 16621 is operating. In this case, a first switch Q2_1 conducts or is cut off under the control by a first control signal. When the first switch Q2_1 is conducting, the first conversion circuit 16621 operates along the path G1, meaning when a driving signal is outputted from the first driving output terminal 531 to light up the LED module 50, the driving signal is also outputted to a first connection terminal In11 and then flows through the auxiliary power source 1661, an energy-storing inductor L2_1, the first switch Q2_1, a second connection terminal In12 to store energy in the energy-storing inductor L2_1 and to charge the auxiliary power source 1661. When the first switch Q2_1 is in a cutoff state, the first conversion circuit 16621 operates along the path G2, meaning the energy-storing inductor L2_1 releases energy through a discharging path through a diode D2_1, the third connection terminal In21, the auxiliary power source 1661, and the fourth connection terminal In22, in order to charge the auxiliary power source 1661. Therefore, the first conversion circuit 16621 realizes the function of performing power conversion to a driving signal received at a first connection side In1 in order to output a signal at a second connection side In2 for charging an auxiliary power source 1661.

FIG. 19I illustrates signal flow directions during operations of a second conversion circuit 16622 of a power conversion circuit. For easier understanding and illustration, denotations and operation process of the components of only the second conversion circuit 16622 are shown in FIG. 19I. When a driving signal cannot be or is not outputted from a first driving output terminal 531 to light up an LED module 50, or an output driving signal has insufficient signal level to light up the LED module 50, an auxiliary power source 1661 has a positive terminal connected to a fourth connection terminal In22, and a negative terminal connected to a fifth connection terminal In23, and the second conversion circuit 16622 is operating. In this case, a second switch Q2_2 conducts or is cut off under the control by a second control signal. When the second switch Q2_2 is conducting, the second conversion circuit 16622 operates along the path H2 in order to cause the auxiliary power source 1661 to provide power, wherein auxiliary power provided by the auxiliary power source 1661 flows through the fourth connection terminal In22, an energy-storing inductor L2_2, the second switch Q2_2, and a fifth connection terminal In23 to store energy in the energy-storing inductor L2_2. When the second switch Q2_2 is in a cutoff state, the auxiliary power source 1661 and the energy-storing inductor L2_2 commonly provide power along the path H1 for the LED module 50, meaning the auxiliary power and energy stored in the energy-storing inductor L2_2 flow through a diode D2_2, a first connection terminal In11, the LED module 50, and the fifth connection terminal In23 to light up the LED module 50. Therefore, the second conversion circuit 16622 realizes the function of performing power conversion to auxiliary power received at a second connection side In2 in order to output a signal at a first connection side In1 for providing power for the LED module 50.

On the basis of the embodiments of a power conversion circuit illustrated in FIGS. 19G to 19I, a capacitor may be connected respectively between a first connection terminal In11 and a second connection terminal In12, and between a third connection terminal In21 and a fourth connection terminal In22, so as to regulate or stabilize the voltage on a signal outputted from a first conversion circuit 16621 to a second connection side In2, and to regulate or stabilize the voltage on a signal outputted from a second conversion circuit 16622 to a first connection side In1. For further increasing the stability of the signal (outputted from the first conversion circuit 16621 or the second conversion circuit 16622), a resistor may be connected respectively between a first connection terminal In11 and a second connection terminal In12, and between a third connection terminal In21 and a fourth connection terminal In22, as a dummy load.

It should be noted that on the basis of the embodiments of a power conversion circuit illustrated in FIGS. 19G to 19I, in one embodiment a power conversion circuit may further include a control circuit and a circuit-path switching circuit. In this embodiment, the circuit-path switching circuit is connected to the control circuit, in order to output a switching signal based on a state of power supplying by a driving signal; and the control circuit is connected to the circuit-path switching circuit and a control terminal of a first switch Q2_1 (also referred to as a second switch Q2_2), in order to output a first control signal or a second control signal based on the switching signal. The circuit-path switching circuit is connected to an auxiliary power source 1661, in order to perform circuit-path switching based on the switching signal, meaning to perform switching into connecting certain connection terminals at the second connection side In2 to positive and negative terminals of the auxiliary power source 1661 based on the switching signal. For example, when the circuit-path switching circuit detects that power supplying by a driving signal is normal, an outputted switching signal is of a high level, then based on the high level of the switching signal the circuit-path switching circuit switches into connecting the positive terminal of the auxiliary power source 1661 to the third connection terminal In21 and connecting the negative terminal of the auxiliary power source 1661 to the fourth connection terminal In22, and based on the high level of the switching signal the control circuit operates to output a first control signal to the first switch Q2_1 (referred to as a second switch Q2_2 when operating as a part of a second conversion circuit 16622), so as to cause a first conversion circuit 16621 to operate. When the circuit-path switching circuit detects that power supplying by a driving signal is abnormal, an outputted switching signal is of a low level, then based on the low level of the switching signal the circuit-path switching circuit switches into connecting the positive terminal of the auxiliary power source 1661 to the fourth connection terminal In22 and connecting the negative terminal of the auxiliary power source 1661 to the fifth connection terminal In23, and based on the low level of the switching signal the control circuit operates to output a second control signal to the second switch Q2_2 (referred to as a first switch Q2_1 when operating as a part of a first conversion circuit 16621), so as to cause a second conversion circuit 16622 to operate.

When applied to the exemplary embodiments of a power conversion circuit in FIGS. 19G to 19I, the circuit-path switching circuit may comprise a power-supply detection circuit and a relay circuit. The power-supply detection circuit has an input terminal coupled to a circuit of a power module in any of the embodiments in FIGS. 9A to 9C, such as the input terminal being connected to a first driving output terminal 531, a first pin 501, or a third pin 503; and has an output terminal coupled to the control circuit connected to the first switch Q2_1 (also referred to as a second switch Q2_2), in order to output a switching signal to the control circuit. The relay circuit is coupled to the power-supply detection circuit and an auxiliary power source 1661, in order to switch into connecting certain connection terminals at a second connection side In2 to the auxiliary power source 1661 based on the switching signal outputted by the power-supply detection circuit.

Still referring to FIG. 19A, as indicated by FIG. 19A and the above description of embodiments therein, a power conversion circuit is configured to perform power conversion to a first power signal (such as a driving signal outputted at a first driving output terminal 531) to produce an output at a second connection side In2, or to perform power conversion to a second power signal (such as auxiliary power provided by an auxiliary power source 1361) to produce an output at a first connection side In1. In some other embodiments, the operation of a power conversion circuit performing power conversion to a first power signal is referred to as a forward-operation mode of the power conversion circuit, and the operation of the power conversion circuit performing power conversion to a second power signal is referred to as a reverse-operation mode of the power conversion circuit, wherein the power conversion circuit is configured to perform mode switching between operating in the forward-operation mode or the forward-operation mode based on a state of power supplying by a first power source or a second power source. As shown in FIG. 19A, taking an application for supplying an LED module as an example, a first power source may comprise a power module in any of the embodiments illustrated in FIGS. 9A to 9C, wherein a first power signal corresponds to a driving signal as described in the embodiments of FIGS. 9A to 9C; the second power source may comprise an auxiliary power source 1361, wherein a second power signal corresponds to auxiliary power provided by the auxiliary power source 1361; and hence a power conversion circuit 1362 is configured to perform mode switching based on a state of power supplying by a power device (such as a power module illustrated in any of the embodiments of FIGS. 9A to 9C) connected to a first driving output terminal 531 and a second driving output terminal 532, in order to cause the power conversion circuit 1362 to operate in a forward-operation mode of charging the auxiliary power source 1361 when a driving signal is normally outputted to light up the LED module 50 (i.e. when power supplying by the first power source is normal), or to cause the power conversion circuit 1362 to operate in a reverse-operation mode allowing the auxiliary power source 1361 to output a signal at the first connection side In1 to supply the LED module 50 when a driving signal is not provided at the first driving output terminal 531 or is of insufficient level to drive the LED module 50 (i.e. when power supplying by the first power source is abnormal). In this way, the power conversion circuit can realize using components for different functions/modes, so as to significantly reduce the circuit complexity, to make it easier to achieve circuit integration and perform the layout of a PCB, and to reduce overall cost.

According to the requirements of a power source or load connected at the first connection side In1 or the second connection side In2, the manners of power conversion performed by the power conversion circuit operating respectively in the forward-operation mode and the reverse-operation mode may be of the same type or different. For example, in a case where an LED module and a driving circuit are connected to the first connection side In1 and an auxiliary power source is connected to the second connection side In2, a forward-operation mode of a power conversion circuit may perform stepping down of voltage to a driving signal, in order to output a charging signal, suitable for an auxiliary power source connected to the second connection side In2, for charging the auxiliary power source; and a reverse-operation mode of the power conversion circuit may perform stepping up of voltage to auxiliary power, in order to output an auxiliary power signal, suitable for the LED module connected to the first connection side In1, for the LED module. Also for example, if a second power source connected to a second connection side In2 needs to be charged with a nominal voltage/nominal current/nominal power, a forward-operation mode of a power conversion circuit may be disposed in order to correspondingly perform constant-voltage power conversion, constant-current power conversion, or constant-power power conversion; and according to a load connected to a first connection side In1*a* reverse-operation mode of the power conversion circuit may be correspondingly disposed in order to perform a suitable manner of power conversion.

Figure 19J:
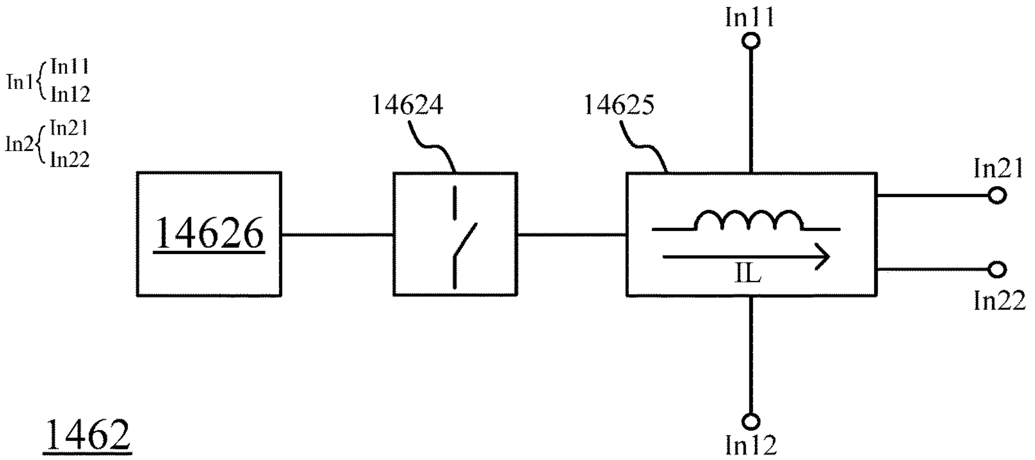
FIG. 19J is a circuit block diagram of a power conversion circuit according to some embodiments.

FIG. 19J is a circuit block diagram of a power conversion circuit according to some embodiments. Referring to FIG. 19J, in these embodiments a power conversion circuit 1462 includes a switching circuit 14624, a transforming circuit 14625, and a control circuit 14626. The control circuit 14626 is configured to output a first control signal or a second control signal. The switching circuit 14624 is coupled to the control circuit 14626, and is configured to conduct or be cut off based on the first control signal or based on the second control signal. The transforming circuit 14625 is coupled to the switching circuit 14624, and is configured to operate in a forward-operation mode based on conduction or a cutoff state of the switching circuit 14624 under the control by the first control signal, in order to perform conversion to a first power signal inputted at a first input side In1 to produce an output at a second input side In2; and is configured to operate in a reverse-operation mode based on conduction or a cutoff state of the switching circuit 14624 under the control by the second control signal, in order to perform conversion to a second power signal inputted at the second input side In2 to produce an output at the first input side In1.

Figure 19K:
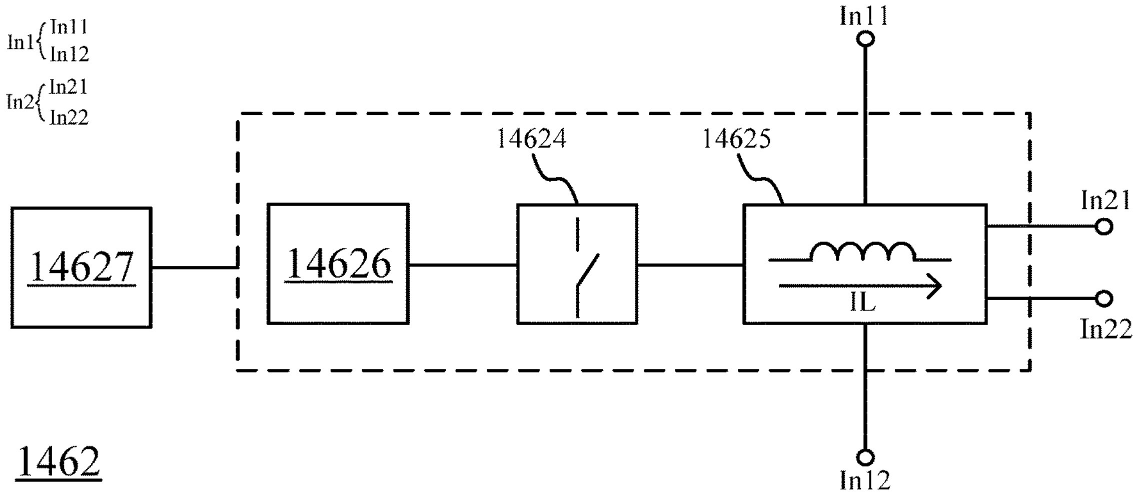
FIG. 19K is a circuit block diagram of a power conversion circuit according to some embodiments.

FIG. 19K is a circuit block diagram of a power conversion circuit according to some embodiments. Compared to embodiments shown in FIG. 19J, in these embodiments of FIG. 19K a power conversion circuit 1462 further includes a mode switching circuit 14627 configured to switch an operating mode of a transforming circuit 14625 based on a state of power supplying by a first power source connected at a first connection side In1 or a second power source connected at a second connection side In2, so as to cause the transforming circuit 14625 to operate in a forward-operation mode or in a reverse-operation mode. For example, as mentioned earlier, assuming a power module in any of the embodiments illustrated in FIGS. 9A to 9C as a first power source is coupled to a first connection side In1, and an auxiliary power source is coupled to a second connection side In2, when the first power source normally provides power, meaning a driving signal is normally providing power for an LED module, the mode switching circuit 14627 causes the transforming circuit 14625 to operate in a forward-operation mode, wherein the driving signal while providing power for the LED module also flows through the first connection side In1, the transforming circuit 14625, and the second connection side In2 to charge the auxiliary power source. But when power supplying by the first power source is abnormal, meaning providing of a driving signal is stopped or results in insufficient level, the mode switching circuit 14627 causes the transforming circuit 14625 to operate in a reverse-operation mode, so as to cause auxiliary power provided by the auxiliary power source to flow through the second connection side In2, the transforming circuit 14625, and the first connection side In1 to be outputted to supply the LED module. The position and connection configuration of a mode switching circuit 14627 illustrated in FIG. 19K are merely exemplary for expressing an overall principle, but are not intended to limit, and according to the difference between circuit structures respectively adopted for a mode switching circuit 14627, a person of ordinary skill in the art may connect a mode switching circuit 14627 to any position in a power conversion circuit, such as to a transforming circuit 14625, to a control circuit 14626, to a first connection side In1, or to a second connection side In2. It should be noted that a mode switching circuit 14627 may be integrated in any module/circuit/unit in a power conversion circuit such as a control circuit 14626 or a transforming circuit 14625, but the present invention is not limited to such an integration.

Figure 19L:
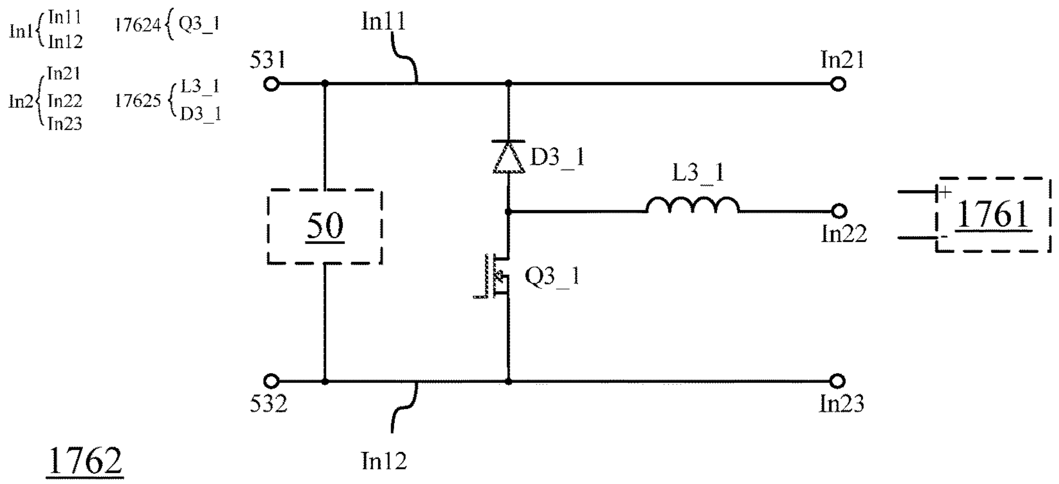
FIG. 19L is a circuit structure diagram of a power conversion circuit according to some embodiments.

FIG. 19L is a circuit structure diagram of a power conversion circuit according to some embodiments. In the embodiments of FIG. 19L, a power conversion circuit 1762 has a first connection side In1 and a second connection side In2. The first connection side In1 has a first connection terminal In11 and a second connection terminal In12, respectively connecting to a first driving output terminal 531 and a second driving output terminal 532. The second connection side In2 has a third connection terminal In21, a fourth connection terminal In22, and a fifth connection terminal In23, for connecting to an auxiliary power source 1761. The power conversion circuit 1762 further includes a switching circuit 17624, a transforming circuit 17625, and a control circuit, which is not illustrated in FIG. 19L but is connected to a control terminal of the switching circuit 17624. The switching circuit 17624 includes a switch Q3_1, and the transforming circuit 17625 includes an energy-storing inductor L3_1 and a diode D3_1. The switch Q3_1 has a first terminal coupled to an anode of the diode D3_1, and a second terminal coupled to the second connection terminal In12 and the fifth connection terminal In23. The diode D3_1 has a cathode coupled to the first connection terminal In11 and the third connection terminal In21, and has the anode coupled to an end of the energy-storing inductor L3_1, which has another end coupled to the fourth connection terminal In22.

When a driving signal is normally outputted from the first driving output terminal 531 to light up an LED module 50, the auxiliary power source 1761 has a positive terminal connected to a third connection terminal In21, and a negative terminal connected to a fourth connection terminal In22, and the control circuit connected to the switch Q3_1 outputs a first control signal to cause the transforming circuit to operate in a forward-operation mode, which has an operation process and signal flow similar to that in the description of a first conversion circuit 16621 of FIG. 19H. Such that the forward-operation mode may be understood by referencing the description of embodiments of FIG. 19H, and thus is not repeatedly described here. When a driving signal cannot be or is not outputted from the first driving output terminal 531 to light up the LED module 50, or an output driving signal has insufficient signal level to light up the LED module 50, the auxiliary power source 1761 has a positive terminal connected to the fourth connection terminal In22, and a negative terminal connected to the fifth connection terminal In23, and the control circuit connected to the switch Q3_1 outputs a second control signal to cause the transforming circuit to operate in a reverse-operation mode, which has an operation process and signal flow similar to that in the description of a second conversion circuit 16622 of FIG. 19I. Such that the reverse-operation mode may be understood by referencing the description of embodiments of FIG. 19I, and thus is not repeatedly described here.

On the basis of the embodiments of a power conversion circuit illustrated in FIG. 19L, a capacitor may be connected respectively between a first connection terminal In11 and a second connection terminal In12, and between a third connection terminal In21 and a fourth connection terminal In22, so as to respectively regulate or stabilize a voltage on a signal outputted at a second connection side In2 under a forward-operation mode, and regulate or stabilize a voltage on a signal outputted at a first connection side In1 under a reverse-operation mode. For further increasing the stability of the signal, a resistor may be connected respectively between the first connection terminal In11 and the second connection terminal In12, and between the third connection terminal In21 and the fourth connection terminal In22, as a dummy load.

It should be noted that on the basis of the embodiments of a power conversion circuit illustrated in FIG. 19L, in one embodiment a power conversion circuit further includes a mode switching circuit, coupled to a control circuit not illustrated in FIG. 19L but connected to a switch Q3_1, and also coupled to an auxiliary power source 1761, in order to output a switching signal and perform mode switching, based on a state of power supplying by a driving signal. The mode switching circuit added on the basis of the embodiments of a power conversion circuit illustrated in FIG. 19L has circuit composition/structure and operation principle(s)_ similar to those of a circuit-path switching circuit added on the basis of the embodiments of a power conversion circuit illustrated in FIGS. 19G to 19I, wherein an operation process of a first conversion circuit in the embodiments of FIGS. 19G to 19I corresponds to a forward-operation mode of the embodiments of FIG. 19L, an operation process of a second conversion circuit in the embodiments of FIGS. 19G to 19I corresponds to a reverse-operation mode of the embodiments of FIG. 19L, and an operation process and structure of a circuit-path switching circuit in the embodiments of FIGS. 19G to 19I correspond to that of a mode switching circuit in the embodiments of FIG. 19L. And a mode switching circuit in the embodiments of FIG. 19L may be understood by referencing the description of a circuit-path switching circuit added on the basis of the embodiments of FIGS. 19G to 19I, so is not repeatedly described here again.

Figure 19M:
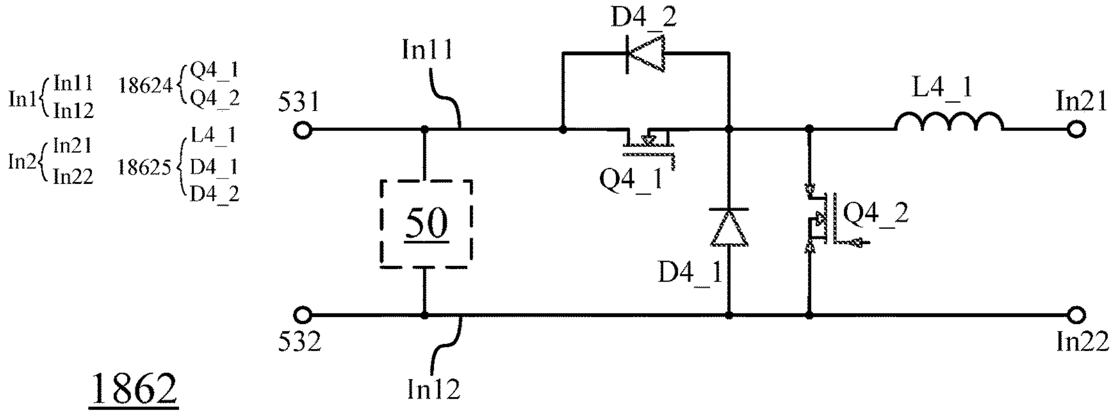
FIG. 19M is a circuit structure diagram of a power conversion circuit according to some embodiments.

FIG. 19M is a circuit structure diagram of a power conversion circuit according to some embodiments. In the embodiments of FIG. 19M, a power conversion circuit 1862 has a first connection side In1 and a second connection side In2. The first connection side In1 has a first connection terminal In11 and a second connection terminal In12, respectively connecting to a first driving output terminal 531 and a second driving output terminal 532. The second connection side In2 has a third connection terminal In21 and a fourth connection terminal In22, for connecting to an auxiliary power source. The power conversion circuit 1862 further includes a switching circuit 18624, a transforming circuit 18625, and a control circuit, which is not illustrated in FIG. 19M but is connected to the switching circuit 18624 in order to output a first control signal or a second control signal. The switching circuit 18624 includes a first switch Q4_1 and a second switch Q4_2. The transforming circuit 18625 includes an energy-storing inductor L4_1, a first diode D4_1, and a second diode D4_2. The first switch Q4_1 has a first terminal coupled to the first connection terminal In11, and a second terminal coupled to an end of the energy-storing inductor L4_1, which has another end coupled to the third connection terminal In21, that is, the energy-storing inductor L4_1 is serially connected between the first connection side In1 and the second connection side In2. The second diode D4_2 has an anode coupled to an end of the energy-storing inductor L4_1, and a cathode coupled to the first connection terminal In11, meaning the second diode D4_2 is connected to the first switch Q4_1 in parallel.

The second switch Q4_2 has a first terminal coupled to an end of the energy-storing inductor L4_1, and a second terminal coupled to the fourth connection terminal In22 and the second connection terminal In12. The first diode D4_1 has a cathode coupled to an end of the energy-storing inductor L4_1, and has an anode coupled to the fourth connection terminal In22 and the second connection terminal In12, meaning the first diode D4_1 is connected to the second switch Q4_2 in parallel. And the energy-storing inductor L4_1 has another end coupled to the third connection terminal In21.

When a driving signal is normally outputted from the first driving output terminal 531 to light up an LED module 50, the control circuit connected to the first switch Q4_1 outputs a first control signal to cause the transforming circuit 18625 to operate in a forward-operation mode, which has an operation process and signal flow similar to that in the description of a first conversion circuit 15621 of FIG. 19E. Such that the forward-operation mode may be understood by referencing the description of embodiments of FIG. 19E, and thus is not repeatedly described here. When a driving signal cannot be or is not outputted from the first driving output terminal 531 to light up the LED module 50, or an output driving signal has insufficient signal level to light up the LED module 50, the control circuit connected to the first switch Q4_1 outputs a second control signal to cause the transforming circuit 18625 to operate in a reverse-operation mode, which has an operation process and signal flow similar to that in the description of a second conversion circuit 17622 of FIG. 19F. So, the reverse-operation mode may be understood by referencing the description of embodiments of FIG. 19F, and thus is not repeatedly described here. In the embodiments of FIG. 19M, the control circuit may be disposed as two mutually-independent circuits for outputting a first control signal and a second control signal respectively, but the present invention is not limited to such a control circuit.

On the basis of the embodiments of a power conversion circuit illustrated in FIG. 19M, a capacitor may be connected respectively between a first connection terminal In11 and a second connection terminal In12, and between a third connection terminal In21 and a fourth connection terminal In22, so as to respectively regulate or stabilize a voltage on a signal outputted at a second connection side In2 under a forward-operation mode, and regulate or stabilize a voltage on a signal outputted at a first connection side In1 under a reverse-operation mode. For further increasing the stability of the signal, a resistor may be connected respectively between a first connection terminal In11 and a second connection terminal In12, and between a third connection terminal In21 and a fourth connection terminal In22, as a dummy load.

It should be noted that on the basis of the embodiments of a power conversion circuit illustrated in FIG. 19M, in one embodiment a power conversion circuit further includes a mode switching circuit, coupled to an auxiliary power source and a control circuit connected to a switching circuit 18624, which auxiliary power source and control circuit are not illustrated in FIG. 19M, in order to output a switching signal and perform mode switching, based on a state of power supplying by a driving signal. The mode switching circuit added on the basis of the embodiments of a power conversion circuit illustrated in FIG. 19M has circuit composition/structure and operation principle(s)_similar to those of a circuit-path switching circuit added on the basis of the embodiments of a power conversion circuit illustrated in FIGS. 19D to 19F, wherein an operation process of a first conversion circuit in the embodiments of FIGS. 19D to 19F corresponds to a forward-operation mode of the embodiments of FIG. 19M, an operation process of a second conversion circuit in the embodiments of FIGS. 19D to 19F corresponds to a reverse-operation mode of the embodiments of FIG. 19M, and an operation process and structure of a circuit-path switching circuit in the embodiments of FIGS. 19D to 19F correspond to that of a mode switching circuit in the embodiments of FIG. 19M. And a mode switching circuit in the embodiments of FIG. 19M may be understood by referencing the description of a circuit-path switching circuit added on the basis of the embodiments of FIGS. 19D to 19F, so is not repeatedly described here again.

Figure 20:
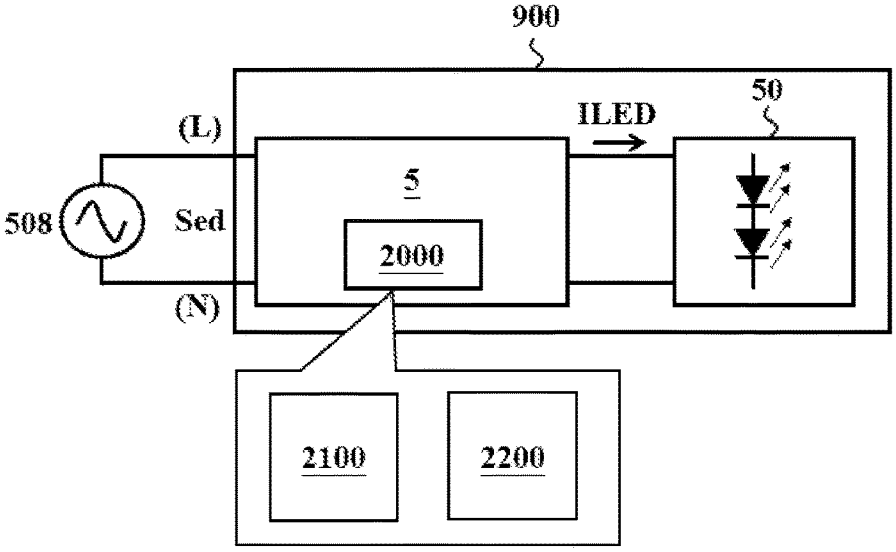
FIG. 20 is a circuit block diagram of an LED lamp lighting system according to some embodiments.

FIG. 20 is a circuit block diagram of an LED lamp lighting system according to some embodiments. In the embodiments of FIG. 20, a power module 5 of an LED lamp 900 includes a rectifying circuit, a filtering circuit, and a driving circuit, and further includes an electric-shock detection module 2000, which includes a detection control circuit 2100 (or referred to as a detection controller) and a current-limiting circuit 2200.

Applicant's prior U.S. patent application Ser. No. 16/667,406 (published as US2020/0256521A1 and incorporated by reference into this Applications) includes an illustrative example which deals with and resolves certain electric-shock issues related to using conventional LED lamps, by providing a shock detection module. Some embodiments disclosed in the U.S. patent application Ser. No. 16/667,406 can be used in combination with one or more embodiments disclosed herein, in order to further reduce the incidence of electric shocks when using an LED lamp. In the design of the power supply module, the external driving signal as described herein can be a low-frequency AC signal (e.g., provided by a mains power or mains electricity) or a DC signal (e.g., provided by a battery or an external driving power supply), and can be input to the LED tube lamp under the double-ended power-supply configuration. In the embodiments using the double-ended power-supply configuration or driving structure for the LED tube lamp, those embodiments may also support a single-ended power-supply configuration that uses merely one of the two ends of the LED tube lamp to receive the external driving signal.

In most cases, an "external driving signal" has the same meaning or reference as that of an "external power signal".

The rectifying circuit in the power supply module of the LED tube lamp can be omitted when the external driving signal input to the LED tube lamp is a DC signal. In the design of the rectifying circuit in the power supply module, a first rectifying unit and a second rectifying unit of a dual rectifying circuit are respectively coupled to conductive pin(s) at one end cap and conductive pin(s) at the other end cap, which two end caps are disposed respectively on two ends of the LED tube lamp. The dual rectifying circuit is applicable to the driving structure of a double-ended power-supply configuration. Besides, the LED tube lamp having at least one rectifying unit is applicable to the driving structure of using a low-frequency AC signal, a high-frequency AC signal, or a DC signal to power the LED tube lamp.

The two rectifying units may comprise, for example, two half-wave rectifier circuits, two full-wave bridge rectifying circuits, or a combination of one half-wave rectifier circuit and one full-wave bridge rectifying circuit.

In the design of conductive pin(s) for the LED tube lamp, arrangements of pins may include disposing one single pin on each end of the LED tube lamp (e.g., two pins in total) or disposing two pins on each end of the LED tube lamp (e.g., four pins in total). The structure of disposing one single pin on each end of the LED tube lamp is applicable to the rectifying-circuit design with one rectifying circuit. The structure of disposing two pins on each end of the LED tube lamp is applicable to the rectifying-circuit design with two rectifying circuits, wherein the external driving signal can be received by the two pins at only one end of the LED tube lamp or any pin at each of two ends.

In the design of a filtering circuit of the power supply module, the filtering circuit may include one single capacitor or a π(pi) filter circuit, which can be used to filter out high-frequency components of a rectified signal in order to provide a DC signal with low ripples as a filtered signal. The filtering circuit may comprise an LC filtering circuit in order to present high impedance at a specific frequency for conforming to current-magnitude requirements at the specific frequency. Moreover, the filtering circuit may comprise a filtering unit coupled between a rectifying circuit and conductive pin(s) in order to reduce the EMI caused by circuit(s) of the LED tube lamp. The LED tube lamp may omit a filtering circuit in the power supply module thereof when a DC signal is input as an external driving signal.

A protection circuit can be additionally added to protect the LED module. The protection circuit may detect the current and/or voltage of the LED module to determine whether to activate corresponding overcurrent and/or overvoltage protection.

In the design of an auxiliary power supply module of the power supply module of the LED tube lamp, the energy storage unit of the auxiliary power supply module can be a battery or a supercapacitor, connected in parallel with the LED module. The auxiliary power supply module may be applied to the design of a power supply module including a driving circuit.

In the design of an LED module with the power supply module, the LED module may comprise a plurality of strings of LED components, which strings are connected in parallel, each string may comprise LED components including single-color LED chips or different-color LED chips, and the LED components of each string may be connected with each other to form a mesh connection structure.

In other words, the abovementioned features can be implemented in any combination and can be used to improve an LED tube lamp.

What is claimed is:

1. A fixing structure suitable for fixing an LED tube lamp to a lamp base, the fixing structure comprising:

a first structure part capable of sleeving over an end of the LED tube lamp, the first structure part including:

a receiving opening having a central axis, the receiving opening capable of being inserted by the end of the LED tube lamp, the receiving opening including aback wall capable of backing against the end of the LED tube lamp;

a position through hole penetrating the back wall of the receiving opening, an area of the position through hole on the back wall being smaller than an area of the bottom wall of the receiving opening, the position through hole capable of engaging with a position part on the end of the LED tube lamp;

at least two pins disposed on an outer surface of the back wall, each of the at least two pins being substantially parallel with the central axis of the receiving opening, the two pins capable of fixing to the lamp base; and two convex walls disposed on two opposite outer surfaces of the first structure part, each of the convex wall forming a coupling structure with the first structure part; and a second structure part capable of connecting to the first structure part, the second structure part including a first wall, a second wall, a third wall and a fourth wall, the third wall having a first side, second side, third side and fourth side, the first side being parallel with the third side and the second side being parallel with the fourth side, the first wall connecting to the first side of the third wall and being substantially perpendicular with the third wall, the second wall connecting to the third side of the third wall and being substantially parallel with the first wall, the fourth wall connecting to the second side and being substantially perpendicular with the third wall, wherein the first wall and the second wall respectively insert into the two opposite coupling structures when the second structure part engages with the first structure part.

2. The fixing structure according to claim 1, wherein each of the first wall and the second wall of the second structure part includes a first position unit at an end thereof, each of the convex wall includes a second position unit, the first position unit and the second position unit cooperate with each other when the second structure part engages with the first structure part.

3. The fixing structure according to claim 2, wherein the first positioning unit includes a wedging hole and the second positioning unit includes a wedge cooperating with the wedging hole when the second structure part engages with the first structure part.

4. The fixing structure according to claim 3, wherein the second structure part includes a backstop disposed on an inner surface of the third wall, the backstop capable of engaging with an insertion path of the lamp base.

5. The fixing structure according to claim 4, wherein the first structure part includes a first engaging structural part disposing on an outer surface of the first structure part, the second structure part includes a second engaging structural part disposed on the third wall, wherein the first engaging structural part capable of engaging with the second engaging structural part when the second structure part engages with the first structure part.

6. The fixing structure according to claim 5, wherein the first engaging structural part comprises a hook and the second engaging structural part comprises a catching hole.

7. An LED tube lamp, comprising:

a lamp tube;

a light strip disposed in the lamp tube;

a first end cap and a second end cap, each of the first and second end caps coupled to a respective end of the lamp tube, the second end cap including a position part disposed on an end wall of the second end cap;

a power module disposed in one or both of the first and second end caps and electrically connected to the light strip;

a fixing structure suitable for fixing an LED tube lamp to a lamp base, the fixing structure comprising:

a first structure part sleeving over the second end cap, the first structure part including:

a receiving opening having a central axis, the second end cap inserted into the receiving opening, the receiving opening including a back wall backing against the second end cap;

a position through hole penetrating the bottom wall of the receiving opening, an area of the position through hole on the back wall being smaller than an area of the back wall of the receiving opening, the position through hole engaging with the position part of the second end cap;

at least two pins disposed on an outer surface of the back wall, each of the at least two pins being substantially parallel with the central axis of the receiving opening, the two pins capable of fixing to the lamp base; and two convex walls disposed on two opposite outer surfaces of the first structure, each of the convex wall forming a coupling structure with the first structure part; and a second structure part connecting to the first structure part, the second structure part including a first wall, a second wall, a third wall and a fourth wall, the third wall having a first side, second side, third side and fourth side, the first side being parallel with the third side and the second side being parallel with the fourth side, the first wall connecting to the first side of the third wall and being substantially perpendicular with the third wall, the second wall connecting to the third side of the third wall and being substantially parallel with the first wall, the fourth wall connecting to the second side and being substantially perpendicular with the third wall, wherein the first wall and the second wall respectively insert into the two opposite coupling structures when the second structure part engages with the first structure part.

8. The LED tube lamp according to claim 7, wherein each of the first wall and the second wall of the second structure part includes a first position unit at an end thereof, each of the convex wall includes a second position unit, the first position unit and the second position unit cooperate with each other when the second structure part engages with the first structure part.

9. The LED tube lamp according to claim 8, wherein the first positioning unit includes a wedging hole and the second positioning unit includes a wedge cooperating with the wedging hole when the second structure part engages with the first structure part.

10. The LED tube lamp according to claim 9, wherein the second structure part includes a backstop disposed on an inner surface of the third wall, the backstop capable of engaging with an insertion path of the lamp base.

11. The LED tube lamp according to claim 10, wherein the first structure part includes a first engaging structural part disposing on an outer surface of the first structure part, the second structure part includes a second engaging structural part disposed on the third wall, wherein the first engaging structural part capable of engaging with the second engaging structural part when the second structure part engages with the first structure part.

12. The LED tube lamp according to claim 11, wherein the first engaging structural part comprises a hook and the second engaging structural part comprises a catching hole.

13. The LED tube lamp according to claim 12, wherein the second end cap includes a positioning part disposed on an end wall of the second end cap, the positioning part engaged with the position through hole by sleeving the first structure part with the second end cap.

14. The LED tube lamp according to claim 13, wherein the positioning part includes a plurality of arms evenly distributed around an axis of the second end cap, wherein an end of each of the arms includes a guiding part and a checking part, the guiding part guides the positioning part to penetrate the positioning through hole and the checking part cooperates with the back wall of the first structure part.

15. The LED tube lamp according to claim 14, wherein the first end cap includes a hole, the power module includes a conductive wire, the conductive wire passes out through the hole of the first end cap to be connected to an external power source.

16. The LED tube lamp according to claim 15, wherein when the LED tube lamp fixes to the lamp base, the two pins on the outer surface of the back wall connect to the lamp base, the backstop on the second structure part engages with an insertion path of the lamp base and the lamp base be disposed between the back wall of the first structure part and the fourth wall of the second structure part.

* * * * *